(12) United States Patent
Nielsen et al.

(10) Patent No.: US 8,938,366 B2
(45) Date of Patent: Jan. 20, 2015

(54) LOCATING EQUIPMENT COMMUNICATIVELY COUPLED TO OR EQUIPPED WITH A MOBILE/PORTABLE DEVICE

(71) Applicant: CertusView Technologies, LLC, Palm Beach Gardens, FL (US)

(72) Inventors: Steven Nielsen, North Palm Beach, FL (US); Curtis Chambers, Palm Beach Gardens, FL (US); Jeffrey Farr, Tequesta, FL (US); Tony Davani, Boynton Beach, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 156 days.

(21) Appl. No.: 13/644,226

(22) Filed: Oct. 3, 2012

(65) Prior Publication Data

US 2013/0268199 A1 Oct. 10, 2013

Related U.S. Application Data

(63) Continuation of application No. 12/854,370, filed on Aug. 11, 2010, now Pat. No. 8,311,765.

(60) Provisional application No. 61/233,105, filed on Aug. 11, 2009, provisional application No. 61/291,017, filed on Dec. 30, 2009.

(30) Foreign Application Priority Data

Aug. 10, 2010 (CA) ..................................... 2710269

(51) Int. Cl.
*G01K 1/00* (2006.01)
*G01V 3/38* (2006.01)
(Continued)

(52) U.S. Cl.
CPC ............... *G01V 3/38* (2013.01); *B65D 83/203* (2013.01); *G01C 15/02* (2013.01)
USPC ....................................................... 702/130

(58) Field of Classification Search
CPC .... B05B 15/00; B65D 83/203; B65D 83/208; B65D 83/36

USPC .................................. 702/130, 150, 182–185
See application file for complete search history.

(56) References Cited

U.S. PATENT DOCUMENTS

| 4,016,748 A | 4/1977 | Boyens |
| 5,349,520 A | 9/1994 | Hickman |

(Continued)

FOREIGN PATENT DOCUMENTS

| CA | 2418157 | 7/2004 |
| CA | 2423148 | 9/2004 |

(Continued)

OTHER PUBLICATIONS

Complaint for Patent Infringement dated Apr. 10, 2013, *CertusView Technologies LLC v. United States Infrastructure Corporation et al.*, Case No. 2:13CV182, USDC Eastern District of Virginia.

(Continued)

*Primary Examiner* — Edward Raymond

(57) ABSTRACT

Locating and/or marking equipment, such as a locate transmitter or locate receiver, a marking device, or a combined locate and marking device, may be communicatively coupled to and/or equipped with a mobile/portable device (e.g., a mobile phone, personal digital assistant or other portable computing device) that provides processing, electronic storage, electronic display, user interface, communication facilities and/or other functionality (e.g., GPS-enabled functionality) for the equipment. A mobile/portable device may be mechanically and/or electronically coupled to the equipment, and may be programmed so as to log and generate electronic records of various information germane to a locate and/or marking operation (e.g., locate information, marking information, and/or landmark information). Such records may be formatted in various manners, processed and/or analyzed on the mobile/portable device, and/or transmitted to another device (e.g., a remote computer/server) for storage, processing and/or analysis. The mobile/portable device also may provide redundant, shared and/or backup functionality for the equipment to enhance robustness.

44 Claims, 47 Drawing Sheets

(51) Int. Cl.
  *B65D 83/20*  (2006.01)
  *G01C 15/02*  (2006.01)

(56) References Cited

U.S. PATENT DOCUMENTS

| | | | |
|---|---|---|---|
| 5,654,638 | A | 8/1997 | Shoemaker |
| 5,734,348 | A | 3/1998 | Aoki et al. |
| 6,211,807 | B1 | 4/2001 | Wilkison |
| 6,343,290 | B1 | 1/2002 | Cossins |
| 6,417,797 | B1 | 7/2002 | Cousins et al. |
| 6,437,561 | B1 | 8/2002 | Bartingale |
| 7,236,863 | B2 | 6/2007 | LaPorte et al. |
| 7,447,509 | B2 | 11/2008 | Cossins |
| 7,469,247 | B2 | 12/2008 | Cossins et al. |
| 7,498,816 | B1 | 3/2009 | Olsson et al. |
| 7,730,095 | B2 | 6/2010 | Vishwanath et al. |
| 7,920,068 | B2 | 4/2011 | Sawyer, Jr. et al. |
| 8,068,789 | B2 | 11/2011 | Bell et al. |
| 8,069,412 | B2 | 11/2011 | Bankston et al. |
| 8,144,058 | B2 | 3/2012 | Sawyer, Jr. et al. |
| 8,473,148 | B2 | 6/2013 | Nielsen et al. |
| 8,480,332 | B2 | 7/2013 | Miller |
| 8,532,341 | B2 | 9/2013 | Nielsen et al. |
| 8,577,707 | B2 | 11/2013 | Nielsen et al. |
| 8,589,201 | B2 | 11/2013 | Nielsen et al. |
| 8,589,202 | B2 | 11/2013 | Nielsen et al. |
| 8,612,148 | B2 | 12/2013 | Nielsen et al. |
| 8,612,271 | B2 | 12/2013 | Nielsen et al. |
| 8,612,276 | B1 | 12/2013 | Nielsen et al. |
| 2002/0047709 | A1 | 4/2002 | Fling |
| 2002/0184235 | A1 | 12/2002 | Young |
| 2002/0190718 | A1 | 12/2002 | Gard et al. |
| 2003/0058164 | A1 | 3/2003 | Zhdanov et al. |
| 2003/0083073 | A1 | 5/2003 | Cossins |
| 2003/0184301 | A1 | 10/2003 | Bosnar |
| 2004/0041892 | A1 | 3/2004 | Yoneyama et al. |
| 2004/0070399 | A1 | 4/2004 | Olsson et al. |
| 2004/0150556 | A1 | 8/2004 | Tucker et al. |
| 2004/0260720 | A1 | 12/2004 | Cossins |
| 2005/0004944 | A1 | 1/2005 | Cossins |
| 2006/0091888 | A1 | 5/2006 | Holman et al. |
| 2006/0109007 | A1 | 5/2006 | Takach |
| 2006/0235741 | A1 | 10/2006 | Deaton et al. |
| 2008/0021863 | A1 | 1/2008 | Evans |
| 2008/0025614 | A1 | 1/2008 | Hintz et al. |
| 2009/0055719 | A1 | 2/2009 | Cossins |
| 2009/0062887 | A1 | 3/2009 | Mass et al. |
| 2009/0089015 | A1 | 4/2009 | Bell et al. |
| 2009/0204625 | A1 | 8/2009 | Chambers et al. |
| 2010/0058983 | A1 | 3/2010 | Daugherty |
| 2010/0272885 | A1* | 10/2010 | Olsson et al. ............. 427/137 |
| 2011/0006772 | A1* | 1/2011 | Olsson et al. ............. 324/326 |
| 2013/0085670 | A1 | 4/2013 | Nielsen et al. |
| 2013/0101180 | A1 | 4/2013 | Nielsen et al. |
| 2013/0103318 | A1 | 4/2013 | Nielsen et al. |
| 2013/0116855 | A1 | 5/2013 | Nielsen et al. |
| 2013/0125042 | A1 | 5/2013 | Nielsen et al. |
| 2013/0135343 | A1 | 5/2013 | Nielsen et al. |
| 2013/0147637 | A1 | 6/2013 | Nielsen et al. |
| 2013/0174072 | A9 | 7/2013 | Nielsen et al. |
| 2013/0186333 | A1 | 7/2013 | Nielsen et al. |
| 2013/0194303 | A1 | 8/2013 | Nielsen et al. |
| 2013/0231984 | A1 | 9/2013 | Nielsen et al. |
| 2013/0233883 | A1 | 9/2013 | Nielsen et al. |
| 2013/0251894 | A1 | 9/2013 | Nielsen et al. |
| 2013/0265138 | A1 | 10/2013 | Nielsen et al. |
| 2013/0287500 | A1 | 10/2013 | Miller |
| 2013/0315449 | A1 | 11/2013 | Nielsen et al. |
| 2014/0022272 | A1 | 1/2014 | Nielsen et al. |
| 2014/0035587 | A1 | 2/2014 | Nielsen et al. |
| 2014/0074970 | A1 | 3/2014 | Nielsen et al. |
| 2014/0122149 | A1 | 5/2014 | Nielsen et al. |

FOREIGN PATENT DOCUMENTS

| | | |
|---|---|---|
| CA | 2574595 | 2/2006 |
| CA | 2632267 | 6/2007 |
| CA | 2636137 | 7/2007 |
| CA | 2643844 | 9/2007 |
| WO | WO02/33443 | 4/2002 |
| WO | WO2008112461 | 9/2008 |

OTHER PUBLICATIONS

Complaint for Patent Infringement dated May 28, 2013, *CertusView Technologies LLC* v. *S&N Locating Services, LLC et al.*, Case No. 1:13CV646, USDC Eastern District of Virginia.
Corrected Notice of Allowability dated Jun. 4, 2013 from U.S. Appl. No. 12/797,243.
Notice of Allowance dated Apr. 9, 2014 from U.S. Appl. No. 13/017,880.
Office Action dated Dec. 20, 2013 from U.S. Appl. No. 13/017,880.
Patent Examination Report dated Aug. 13, 2014 from Australian Application No. 20100282559.
Office Action dated Mar. 5, 2014 from Canadian Application No. 2,692,115.
Office Action dated Apr. 17, 2014 from U.S. Appl. No. 12/818,195.
Office Action dated Mar. 21, 2014 from U.S. Appl. No. 12/818,193.
Notice of Allowance dated Nov. 29, 2013 from U.S. Appl. No. 12/704,087.
Patent Examination Report dated Dec. 9, 2013 from Australian Application No. 2010214099.
Corrected Notice of Allowability dated May 13, 2014 from U.S. Appl. No. 12/704,087.
Office Action dated Jun. 10, 2014 from U.S. Appl. No. 12/701,500.
Office Action dated Jul. 10, 2014 from U.S. Appl. No. 12/818,195.
Office Action dated Jul. 15, 2014 from U.S. Appl. No. 12/818,193.
Notice of Allowance dated May 9, 2014 from U.S. Appl. No. 12/818,198.
Office Action dated Aug. 29, 2013 from Canadian Application No. 2,739,272.
Combined Search and Examination Report dated Sep. 25, 2013 from Application No. GB1314165.0.
Combined Search and Examination Report dated Sep. 25, 2013 from Application No. GB1314159.3.
Combined Search and Examination Report dated Sep. 25, 2013 from Application No. GB1314160.1.
Combined Search and Examination Report dated Sep. 25, 2013 from Application No. GB1314162.7.
Combined Search and Examination Report dated Sep. 24, 2013 from Application No. GB1314164.3.
Office Action dated Oct. 3, 2013 from Canadian Application No. 2,752,071.
Notice of Allowance dated Jul. 8, 2013 from U.S. Appl. No. 13/792,686.
Combined Search and Examination Report dated Jul. 10, 2013 from Application No. GB1310863.4.
Notice of Allowance dated Jul. 18, 2013 from U.S. Appl. No. 13/773,228.
Office Action dated Aug. 6, 2013 from U.S. Appl. No. 12/704,087.
Office Action dated Aug. 6, 2013 from U.S. Appl. No. 12/818,199.
Office Action dated Aug. 13, 2013 from U.S. Appl. No. 12/818,195.
Office Action dated Aug. 9, 2013 from U.S. Appl. No. 12/818,193.
Office Action dated Oct. 28, 2013 from U.S. Appl. No. 12/818,198.
Office Action dated Feb. 7, 2014 from U.S. Appl. No. 12/818,189.
Office Action dated Jul. 7, 2014 from U.S. Appl. No. 13/867,521.
Office Action dated Jul. 10, 2014 from U.S. Appl. No. 12/786,929.
Office Action dated Jun. 10, 2014 from U.S. Appl. No. 12/701,468.
Office Action dated Jul. 8, 2014 from U.S. Appl. No. 12/568,087.
Examination Report dated May 28, 2014 for European Application No. 13177282.4.
Notice of Allowance dated Feb. 26, 2014 from U.S. Appl. No. 13/686,262.
Office Action dated Mar. 25, 2014 from Canadian Application No. 2,771,286.

(56) References Cited

OTHER PUBLICATIONS

Notice of Allowance dated Jan. 14, 2014 from U.S. Appl. No. 12/797,169.
Notice of Allowance dated Dec. 23, 2013 from U.S. Appl. No. 12/364,369.
Office Action dated Jan. 9, 2014 from Canadian Application No. 2,738,968.
Patent Examination Report No. 1 dated Jan. 24, 2014 from Australian Application No. 2012227240.
Combined Search and Examination Report dated Oct. 24, 2013 from GB Application No. 1312313.8.
Corrected Notice of Allowability dated Nov. 22, 2013 from U.S. Appl. No. 12/797,211.
Decision of Final Rejection dated May 7, 2013 from Japanese Application No. 2010-502170.
European Search Report and Opinion dated Nov. 28, 2013 from EP Application No. 10808689.3.
European Search Report dated Sep. 25, 2013 from European Application No. 13177282.4.
Examination Report dated Sep. 4, 2013 from European Application No. 10732529.2.
Examination Reported dated Sep. 4, 2013 from GB Application No. GB1107165.1.
Notice of Allowability dated Jul. 5, 2013 from U.S. Appl. No. 12/701,447.
Notice of Allowability dated Jul. 10, 2013 from U.S. Appl. No. 13/795,337.
Notice of Allowance dated Jun. 17, 2013 from Canadian Application No. 2,750,908.
Notice of Allowance dated Jul. 10, 2013 from U.S. Appl. No. 12/571,411.
Notice of Allowance dated Aug. 1, 2013 from U.S. Appl. No. 12/571,401.
Notice of Allowance dated Aug. 2, 2013 from U.S. Appl. No. 12/797,211.
Notice of Allowance dated Aug. 27, 2013 from U.S. Appl. No. 12/855,977.
Notice of Allowance dated Sep. 17, 2013 from U.S. Appl. No. 12/859,394.
Notice of Allowance dated Sep. 25, 2013 from U.S. Appl. No. 12/364,369.
Notice of Allowance dated Sep. 25, 2013 from U.S. Appl. No. 12/571,408.
Office Action dated Jun. 17, 2013 from U.S. Appl. No. 12/797,262.
Office Action dated Aug. 7, 2013 from Canadian Application No. 2,739,119.
Office Action dated Aug. 7, 2013 from Canadian Application No. 2,739,320.
Office Action dated Sep. 9, 2013 from U.S. Appl. No. 13/867,521.
Office Action dated Sep. 25, 2013 from U.S. Appl. No. 13/686,262.
Office Action dated Oct. 18, 2013 from Chinese Application No. 201080045879.1 with English Translation.
Office Action dated Nov. 5, 2013 from U.S. Appl. No. 12/979,262.
Supplemental Notice of Allowability dated Aug. 1, 2013 from U.S. Appl. No. 12/571,411.
Supplementary European Search Report dated Nov. 7, 2013 from EP Application No. 10810421.7.
Notice of Allowance dated Jul. 23, 2014 from U.S. Appl. No. 13/834,382.
Office Action dated Dec. 30, 2013 from U.S. Appl. No. 13/834,382.
Supplemental Notice of Allowability dated Jul. 21, 2014 from U.S. Appl. No. 13/363,951.
Notice of Allowance dated May 20, 2014 from U.S. Appl. No. 12/363,951.
Patent Examination Report No. 1, Australian Application No. 2010282559, Jun. 11, 2013.
Patent Examination Report No. 1, Australian Application No. 2013204982, Jun. 11, 2013.
Notice of Allowance dated Oct. 7, 2014 from U.S. Appl. No. 13/867,521.
Office Action dated Oct. 6, 2014 from U.S. Appl. No. 12/701,496.
Notice of Allowance dated Oct. 16, 2014 from U.S. Appl. No. 12/568,087.
Office Action dated Sep. 24, 2014 from U.S. Appl. No. 12/701,468.
Office Action dated Aug. 21, 2014 from Taiwan Application No. 097108912.
Corrected Notice of Allowability dated Oct. 10, 2014 from U.S. Appl. No. 13/834,382.
Corrected Notice of Allowability dated Sep. 17, 2014 from U.S. Appl. No. 13/834,382.
Patent Examination Report dated Sep. 8, 2014 from Australian Application No. 2013200160.
Office Action dated Aug. 12, 2014 from Japanese Patent Application No. 2013-185570.
Notice of Allowance dated Oct. 22, 2014 from U.S. Appl. No. 12/818,198.
Office Action dated Aug. 19, 2014 from Canadian Application No. 2,752,071.
Office Action dated Sep. 24, 2014 from U.S. Appl. No. 12/701,500.
Office Action dated Jul. 25, 2014 from Taiwan Patent Application No. 097108911.
Office Action dated Jul. 29, 2014 from U.S. Appl. No. 13/846,120.

* cited by examiner

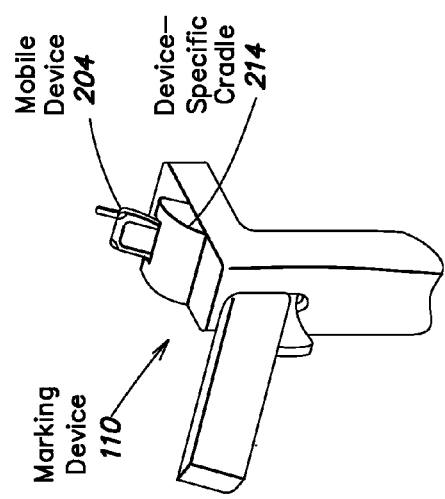
FIG. 26A
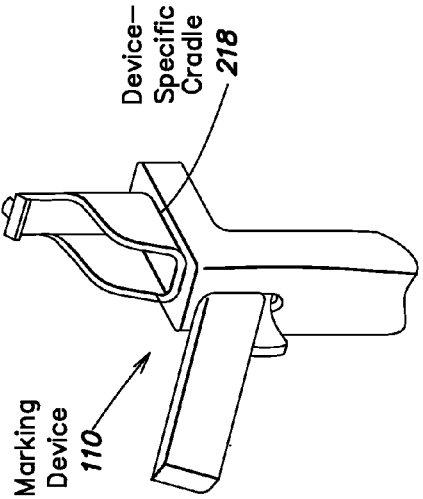
FIG. 26B
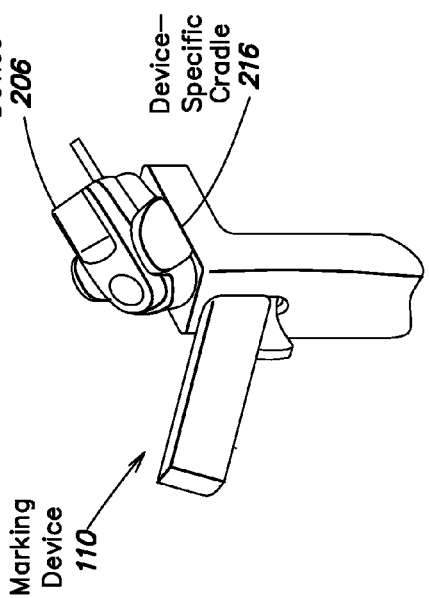
FIG. 26C
FIG. 26D

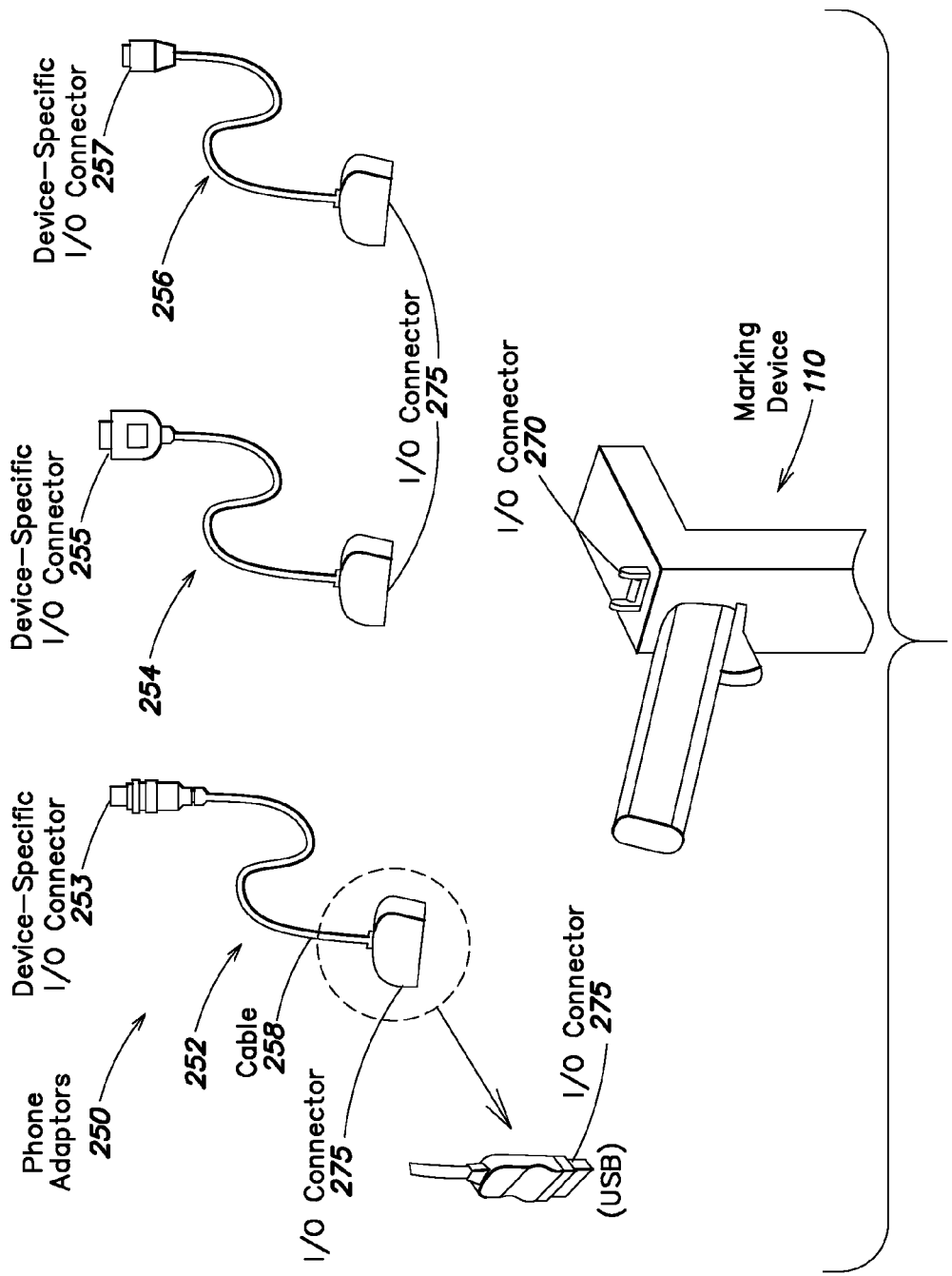

LOCATING EQUIPMENT COMMUNICATIVELY COUPLED TO OR EQUIPPED WITH A MOBILE/PORTABLE DEVICE

CROSS-REFERENCE TO RELATED APPLICATIONS

The application claims the benefit, under 35 U.S.C. §120, as a continuation (CON) of U.S. Non-provisional application Ser. No. 12/854,370, filed Aug. 11, 2010, entitled "Locating Equipment Communicatively Coupled To Or Equipped With A Mobile/Portable Device."

Application Ser. No. 12/854,370 claims a priority benefit, under 35 U.S.C. §119(a), to Canadian application serial no. 2710269, entitled "Locating Equipment Communicatively Coupled To Or Equipped With A Mobile/Portable Device," filed on Aug. 10, 2010.

Application Ser. No. 12/854,370 claims a priority benefit, under 35 U.S.C. §119(e), to U.S. Provisional Application Ser. No. 61/233,105, entitled "Marking Apparatus Employing a Cellular Phone or Personal Digital Assistant for Generating and Electronic Record of a Marking Operation," filed Aug. 11, 2009.

Application Ser. No. 12/854,370 claims a priority benefit, under 35 U.S.C. §119(e) to U.S. Provisional Application Ser. No. 61/291,017, entitled "Locating Equipment Communicatively Coupled to or Equipped with a Mobile/Portable Device," filed Dec. 30, 2009.

Each of the aforementioned applications is hereby incorporated herein by reference in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

A locate operation typically is initiated as a result of an excavator providing an excavation notice to a one-call center. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Once underground facilities implicated by the locate request are identified by a one-call center, the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner of an underground facility), and may also include various other information relevant to the proposed excavation or design (e.g., the name of the excavation company, a name of a property owner or party contracting the excavation company to perform the excavation, etc.). The one-call center sends the ticket to one or more underground facility owners and/or one or more locate service providers (who may be acting as contracted agents of the facility owners) so that they can conduct a locate and marking operation to verify a presence or absence of the underground facilities in the dig area. For example, in some instances, a given underground facility owner may operate its own fleet of locate technicians, in which case the one-call center may send the ticket to the underground facility owner. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. FIG. 1A illustrates a conventional locate device 1500 (indicated by the dashed box) that includes a transmitter 1505 and a locate receiver 1510. The transmitter 1505 is connected, via a connection point 1525, to a target object (in this example, underground facility 1515) located in the ground 1520. The transmitter generates the applied signal 1530, which is coupled to the underground facility via the connection point (e.g., to a tracer wire along the facility), resulting in the generation of a magnetic field 1535. The magnetic field in turn is detected by the locate receiver 1510, which itself may include one or more detection antenna (not shown). The locate receiver 1510 indicates a presence of a facility when it detects electromagnetic fields arising from the applied signal 1530. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 1B and 1C illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 1B and 1C, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 1B shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 1C shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 1B) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Previous efforts at documenting locate operations have focused primarily on locate devices that employ electromagnetic fields to determine the presence of an underground facility. For example, U.S. Pat. No. 5,576,973, naming inventor Alan Haddy and entitled "Apparatus and Method for Obtaining Geographical Positional Data for an Object Located Underground" (hereafter "Haddy"), is directed to a locate device (i.e., a "locator") that receives and stores data from a global positioning system ("GPS") to identify the position of the locate device as an underground object (e.g., a cable) is detected by the locate device. Haddy notes that by recording geographical position data relating to the detected underground object, there is no need to physically mark the location of the underground object on the ground surface, and the recorded position data may be used in the future to re-locate the underground object.

Similarly, U.S. Pat. No. 7,319,387, naming inventors Willson et al. and entitled "GPS Interface for Locating Device" (hereafter "Willson"), is directed to a locate device for locating "position markers," i.e., passive antennas that reflect back RF signals and which are installed along buried utilities. In Willson, a GPS device may be communicatively coupled to the locate device, or alternatively provided as an integrated part of the locate device, to store GPS coordinate data associated with position markers detected by the locate device. Electronic memory is provided in the locate device for storing a data record of the GPS coordinate data, and the data record may be uploaded to a remote computer and used to update a mapping database for utilities.

U.S. Publication No. 2006/0282280, naming inventors Stotz et al. and entitled "Ticket and Data Management" (hereafter "Stotz"), also is directed to a locate device (i.e., a "locator") including a GPS receiver. Upon detection of the presence of a utility line, Stotz' locate device can update ticket data with GPS coordinates for the detected utility line. Once the locate device has updated the ticket data, the reconfigured ticket data may be transmitted to a network.

U.S. Publication No. 2007/0219722, naming inventors Sawyer, Jr. et al. and entitled "System and Method for Collecting and Updating Geographical Data" (hereafter "Sawyer"), is directed to collecting and recording data representative of the location and characteristics of utilities and infrastructure in the field for creating a grid or map. Sawyer employs a field data collection unit including a "locating pole" that is placed on top of or next to a utility to be identified and added to the grid or map. The locating pole includes an antenna coupled to a location determination system, such as a GPS unit, to provide longitudinal and latitudinal coordinates of the utility under or next to the end of the locating pole. The data gathered by the field data collection unit is sent to a server to provide a permanent record that may be used for damage prevention and asset management operations.

SUMMARY

Applicants have recognized and appreciated that uncertainties which may be attendant to locate and marking operations may be significantly reduced by collecting various information particularly relating to the marking operation, and in some cases both the marking operation and the corresponding locate operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

More specifically, Applicants have recognized and appreciated that conventional techniques for using a locate device to detect underground facilities are sometimes tentative and typically iterative in nature, and use of locate devices with GPS capabilities may result in redundant, spurious and/or incomplete geographic location data collection. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter's applied signal). In view of the foregoing, it may be readily appreciated that collecting and logging geographic location information throughout this process may result in excessive and/or imprecise data, or in some instances incomplete relevant data (e.g., in the case of signal loss/broken tracer wire), from which it may be difficult to cull the data that is truly complete and representative of where the underground facility ultimately was detected.

Yet, Applicants have recognized and appreciated that collecting location data, such as GPS data, in connection with use of a locate device may be valuable for reasons other than marking a location of an underground facility. For example, the data may be valuable in monitoring the performance of a technician (e.g., by comparing performance to a known "signature" of a technician's historical performance), mapping areas of poor signal strength, or for other reasons. The data may be processed in various manners of use to various parties, depending on their particular interest in a locate operation. In addition, as described further below, the collection of GPS data with respect to both locate and marking operations, as opposed to locate operations alone, may also provide valuable insight and analysis potential with respect to various aspects (e.g., technician performance, comparison to historical data, etc.) of a locate operation.

Furthermore, Applicants have recognized and appreciated that the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate devices, may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=potable water; orange=telecommunication lines; yellow=gas, oil, steam); in contrast, in conventional locate devices equipped with GPS capabilities as discussed above, there is no apparent automated provision for readily linking GPS information for a detected facility to the type of facility detected.

In view of marking devices configured to collect information relating specifically to marking operations, Applicants have further appreciated that collecting information relating to both locate operations and corresponding marking operations further facilitates ensuring the accuracy of such operations; to this end, Applicants have recognized that various advantages may be obtained via communication and sharing of information between locate devices and marking devices, and/or combining the respective functionalities of such devices into an integrated instrument.

In view of the foregoing, various inventive embodiments disclosed herein relate generally to systems, methods and apparatus for collecting, logging (electronically storing), formatting, processing, and/or electronically analyzing a variety of information relating to both locate operations and marking operations. More specifically, some exemplary embodiments described herein are directed to systems, methods and apparatus for acquiring information relating to both locate operations and marking operations, generating comprehensive electronic records of the acquired information, and storing and/or transmitting one or more electronic records for subsequent access, processing and/or analysis.

One illustrative embodiment of the various concepts discussed herein is directed to a combined locate and marking apparatus configured to perform various functions attendant to both locate and marking operations and configured to generate electronic records of both locate information and marking information relating to these respective operations.

During and/or following collection and/or storage of locate information and/or marking information, data compiled in one or more electronic records of acquired information may be accessed, processed and/or analyzed to provide further information relating to the performance of the locate and marking operation. For example, in other embodiments disclosed herein, data from one or more electronic records of locate information and/or marking information is processed so as to electronically render (visually recreate) various aspects of the locate and/or marking operations (e.g., on a display device associated with the combined locate and marking apparatus or other display device).

In other embodiments, a marking device, a locate device, or a combined locate and marking device (hereafter referred to generally as "locating equipment" or "locate/marking device") may be communicatively coupled to and/or equipped with a hand-size or smaller mobile/portable device, such as a cellular phone or personal digital assistant (PDA), that provides processing, electronic storage, electronic display, user interface, communication facilities, and/or other functionality (e.g., GPS-enabled functionality) for the locating equipment. In some exemplary implementations, the mobile/portable device may provide, via execution of processor-executable instructions or applications on a hardware processor of the mobile/portable device, and/or via retrieval of external instructions, external applications, and/or other external information via a communication interface of the mobile/portable device, essentially all of the processing and related functionality required to operate the equipment. In other implementations the mobile/portable device may only provide some portion of the overall functionality. In yet other implementations, the mobile/portable device may provide redundant, shared and/or backup functionality for the equipment to enhance robustness.

In one exemplary implementation, a mobile/portable device may be mechanically coupled to the locate device, marking device, or combined locate and marking device (e.g., via an appropriate cradle, harness, or other attachment arrangement) or otherwise integrated with the device and communicatively coupled to the device (e.g., via one or more wired or wireless connections), so as to permit one or more electronic signals to be communicated between the mobile/portable device and other components of the locate device, marking device, or combined locate and marking device.

In some exemplary implementations, one or more electronic signals indicative of operation of the locate/marking device may be supplied by one or more components of the locate/marking device to the mobile/portable device. In other aspects, the mobile/portable device may be appropriately programmed so as to log and generate electronic records of various locate information, marking information, and or landmark information, which records may be formatted in various manners, processed and/or analyzed on the mobile/portable device, and/or transmitted to another device (e.g., a remote computer/server) for storage, processing and/or analysis. In one example, one or more pieces of geo-location data (e.g., from a GPS receiver, which may be integrated into the mobile/portable device) are collected and logged on the mobile/portable device per actuation of the locate/marking device (e.g., a trigger-pull of a marking device or a combined locate and marking device to dispense marking material, or a trigger pull of a locate device to acquire magnetic field data or other locate information). A computer-generated image or other visual representation of the locate and/or marking operation may be electronically rendered in a display field of the mobile/portable device based on logged locate information, marking information, and/or landmark information, essentially in real time as the marking operation is conducted, and/or recreated thereafter based on one or more stored electronic records.

In sum, one embodiment of the present invention is directed to a system comprising at least one locate/marking device and a hand-size mobile or portable computing device communicatively coupled to the at least one locate/marking device. In various aspects, the at least one locate/marking device includes a locate transmitter, a locate receiver, a marking device, or a combined locate and marking device. In another aspect, the mobile or portable computing device is mechanically coupled to or integrated with the at least one locate/marking device. In yet another aspect, the mobile or portable computing device includes one or more of at least one first processor, at least one first memory, at least one first communication interface, at least one first user interface, and at least one first location tracking system. In yet another aspect, the at least one locate/marking device includes one or more of at least one second processor, at least one second memory, at least one second communication interface, at least one second user interface, and at least one second location tracking system. In yet other aspects, the mobile or portable device provides essentially all of the processing and related functionality required to operate the at least one locate/marking device, or only provides some portion of the overall functionality required to operate the at least one locate/marking device. In yet another aspect, the mobile or portable device provides redundant, shared and/or backup functionality for the at least one locate/marking device.

Another embodiment is directed to a system for generating and/or logging electronic information relating to a locate operation and/or a marking operation to detect and/or mark on ground, pavement, or other surface a presence or an absence of at least one underground facility. The system comprises at least one of: an actuator to control dispensing of a marking material; at least one receiver antenna to detect a magnetic field from a target object; and at least one input device to provide at least one of locate information, marking information and landmark information. The system further comprises a hand-size mobile or portable computing device including: a memory to store processor-executable instructions; and a processor communicatively coupled to the memory and the at least one of the actuator, the at least one receiver antenna, and the at least one input device, wherein upon execution of the processor-executable instructions by the processor, the processor generates and/or logs the electronic information, based at least in part on at least one of the locate information, the marking information, the landmark information and the detected magnetic field.

Another embodiment is directed to a system for generating and/or logging electronic information relating to a marking operation to mark on ground, pavement, or other surface a presence or an absence of at least one underground facility. The system comprises: an actuator to generate an actuation signal and cause dispensing of a marking material during the marking operation; at least one input device to provide marking information regarding the marking operation; a hand-size mobile or portable computing device including: a memory to store processor-executable instructions; and a processor communicatively coupled to the memory, the at least one input device, and the actuator, wherein upon execution of the processor-executable instructions by the processor, the processor generates the electronic information, based at least in part on the marking information provided by the at least one input device, in response to the actuation signal.

Another embodiment is directed to a system for generating and/or logging electronic information relating to a locate operation to detect a presence or an absence of at least one underground facility. The system comprises: at least one receiver antenna to detect a magnetic field from a target object and provide at least one detection signal; at least one input device to provide locate information regarding the locate operation; a hand-size mobile or portable computing device including: a memory to store processor-executable instructions; and a processor communicatively coupled to the memory, the at least one input device, and the at least one receiver antenna, wherein upon execution of the processor-executable instructions by the processor, the processor generates the electronic information, based at least in part on the locate information provided by the at least one input device and the at least one detection signal.

Another embodiment is directed to an apparatus for generating an electronic record of a marking operation to mark on ground, pavement, or other surface a presence or an absence of at least one underground facility. The apparatus comprises an actuator to dispense a marking material so as to form at least one locate mark on the ground, pavement or other surface to mark the presence or the absence of the at least one underground facility, and at least one input device to provide marking information regarding the marking operation. The apparatus further comprises a computing device including a cellular phone or personal digital assistant (PDA). The computing device includes a memory to store processor-executable instructions and the electronic record of the marking operation, and a processor coupled to the memory, the at least one input device, and the actuator. Upon execution of the processor-executable instructions by the processor, the processor logs in the electronic record an actuation data set including a plurality of actuation event entries for at least one actuation of the actuator, wherein at least one actuation event entry includes at least some of the marking information provided by the at least one input device.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device, used alone or in combination with any other device, for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "complex event processing (CEP)" refers to a software and/or hardware-implemented (e.g., facilitated by a computer system, distributed computer system, computational analysis coded in software, and/or a combination thereof) technique relating to recognizing one or more events, patterns of events, or the absence of an event or pattern of events, within one or more input streams of information and performing one or more actions and/or computations in response to such recognition, in accordance with specified rules, criteria, algorithms, or logic. CEP generally involves detection of relationships between information contained in input streams (which input streams may include indications of previously recognized events), such as causality, membership, timing, event-driven processes, detection of complex patterns of one or more events, event streams processing, event correlation and abstraction, and/or event hierarchies. CEP may complement and contribute to technologies such as, but not limited to, service oriented architecture (SOA), event driven architecture (EDA), and/or business process management (BPM). CEP allows the information contained in the events flowing through all of the layers of a service business, an enterprise information technology infrastructure and/or management operation to be discovered, analyzed, and understood in terms of its impact on management goals and business processes, and acted upon in real time or as a management process.

The following U.S. patents and applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

FIGS. 26A-26D are perspective views of exemplary mobile device-specific cradles integrated into a locate device, a marking device, or a combined locate and marking device according to some embodiments of the present invention;

FIG. 29 is a perspective view of exemplary mobile device-specific adaptors for use with a locate device, a marking device, or a combined locate and marking device according to some embodiments of the present invention;

DETAILED DESCRIPTION

Figure 1A:
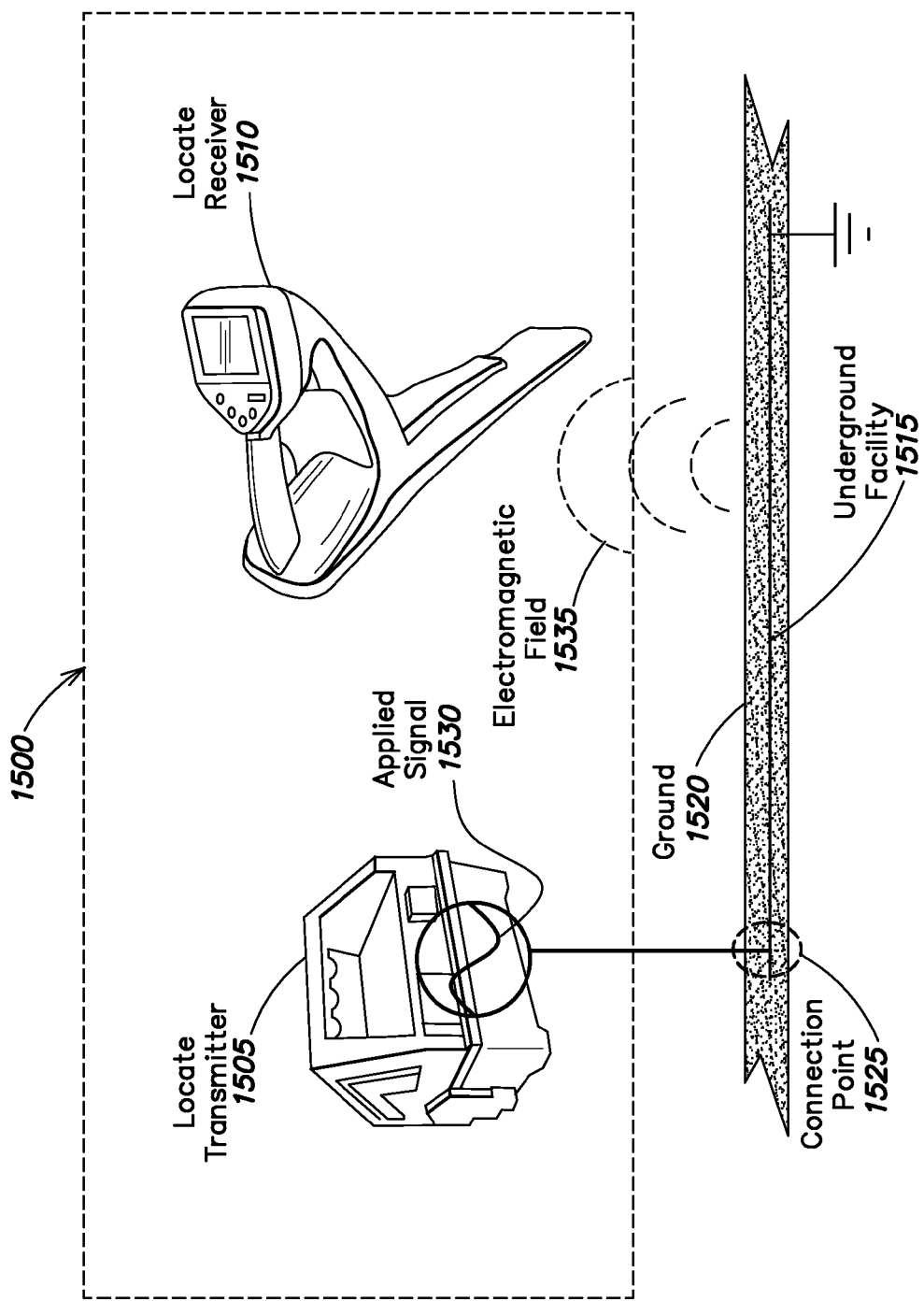
FIG. 1A illustrates a conventional locate instrument set (locate device) including a transmitter and a receiver.

Following below are more detailed descriptions of various concepts related to, and inventive embodiments of, locating equipment communicatively coupled to and/or equipped with a mobile/portable device for generating and/or logging electronic information relating to locate and/or marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Overview

Locate information associated with a locate operation, as well as marking information associated with a marking operation, may respectively and collectively provide valuable insight into the execution of these operations by a technician and the integrity and accuracy of these operations, and further may be useful in assessing subsequent damage to underground facilities or for reducing/mitigating potential damage to facilities, property damage, and/or personal injury.

Accordingly, various embodiments discussed herein relate generally to: 1) marking devices that generate, store and/or transmit electronic records of marking information; 2) locate devices that generate, store and/or transmit electronic records of locate information; 3) locate devices and marking devices that communicate with each other (and optionally with other devices or systems) to share/exchange locate information and marking information; 4) a combined locate and marking apparatus that constitutes an integrated device capable of various functionality germane to respective locate and marking devices, and configured for generating electronic records of both locate information and marking information; and 5) various methods for analyzing and processing locate information and/or marking information, including computer-implemented methods for visually rendering (e.g., in a display field of a display device) various aspects of locate and marking operations.

In other embodiments, a marking device, a locate device, or a combined locate and marking device (hereafter referred to generally as "locating equipment" or "locate/marking device") may be communicatively coupled to and/or equipped with a hand-size or smaller mobile/portable device, such as a cellular phone or personal digital assistant (PDA), that provides processing, electronic storage, electronic display, user interface, communication facilities, and/or other functionality (e.g., GPS-enabled functionality) for the locating equipment. In some exemplary implementations, the mobile/portable device may provide, via execution of processor-executable instructions or applications on a hardware processor of the mobile/portable device, and/or via retrieval of external instructions, external applications, and/or other external information via a communication interface of the mobile/portable device, essentially all of the processing and related functionality required to operate the equipment. In other implementations the mobile/portable device may only provide some portion of the overall functionality. In yet other implementations, the mobile/portable device may provide redundant, shared and/or backup functionality for the equipment to enhance robustness.

In one exemplary implementation, a mobile/portable device may be mechanically coupled to the locate device, marking device, or combined locate and marking device (e.g., via an appropriate cradle, harness, or other attachment arrangement) or otherwise integrated with the device and communicatively coupled to the device (e.g., via one or more wired or wireless connections), so as to permit one or more electronic signals to be communicated between the mobile/portable device and other components of the locate device, marking device, or combined locate and marking device.

In some exemplary implementations, one or more electronic signals indicative of operation of the locating equipment may be supplied by one or more components of the locating equipment to the mobile/portable device. In other aspects, the mobile/portable device may be appropriately programmed so as to log and generate electronic records of various locate information, marking information, and or landmark information, which records may be formatted in various manners, processed and/or analyzed on the mobile/portable device, and/or transmitted to another device (e.g., a remote computer/server) for storage, processing and/or analysis. In one example, one or more pieces of geo-location data (e.g., from a GPS receiver, which may be integrated with the mobile/portable device) are collected and logged on the mobile/portable device per actuation of the locating equipment (e.g., a trigger-pull of a marking device or a combined locate and marking device to dispense marking material, or a trigger pull of a locate device to acquire magnetic field data or other locate information). A computer-generated image or other visual representation of the locate and/or marking operation may be electronically rendered in a display field of the mobile/portable device based on logged locate information, marking information, and/or landmark information, essentially in real time as the marking operation is conducted, and/or recreated thereafter based on one or more stored electronic records.

The sections set forth below in turn provide detailed descriptions of these respective topics.

II. Marking Device for Generating Electronic Records of Marking Operations

Figure 2:
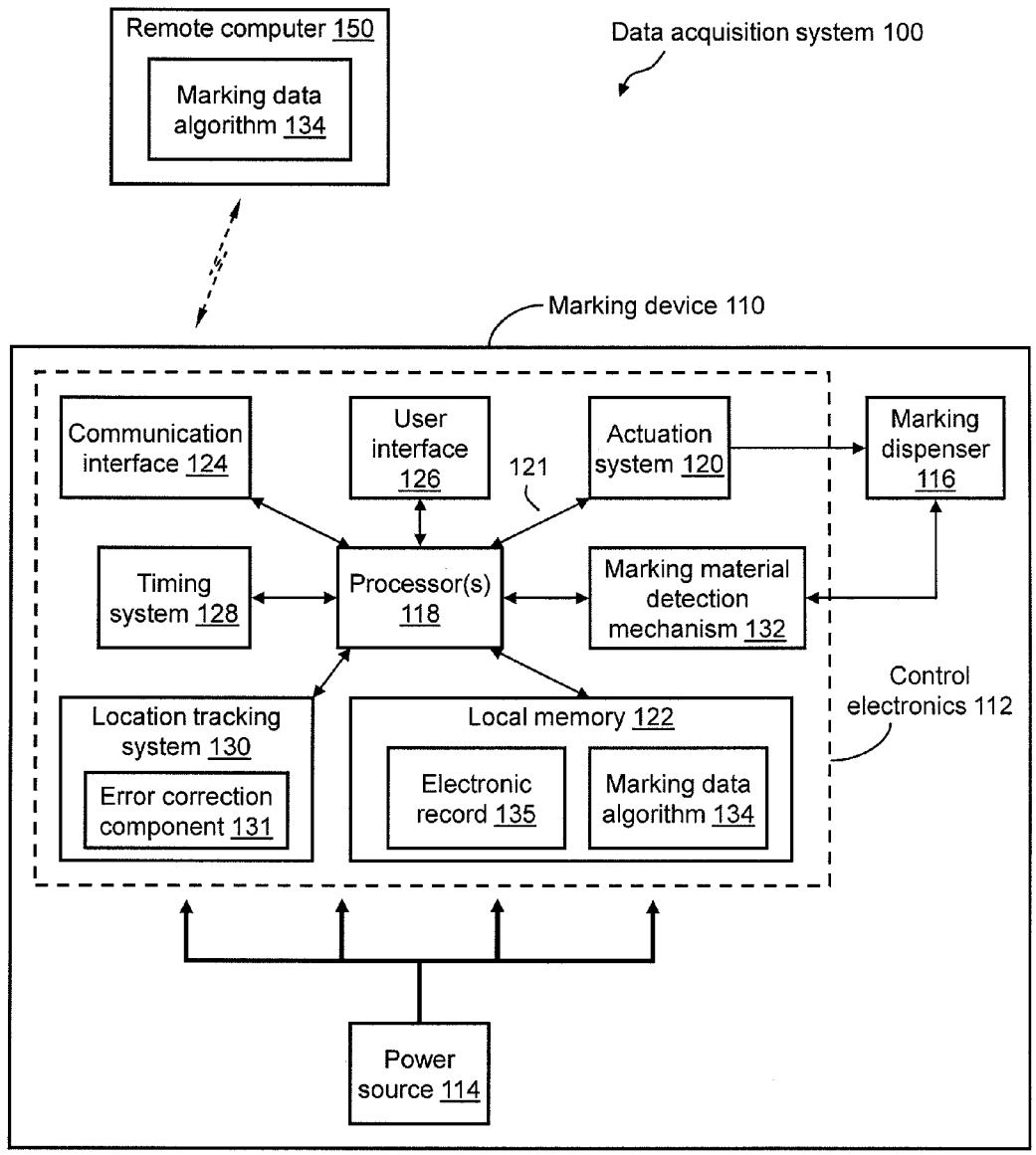
FIG. 2 is a functional block diagram of a data acquisition system according to one embodiment of the present invention for creating electronic records of marking operations based on actuations of a marking device.
Figure 3:
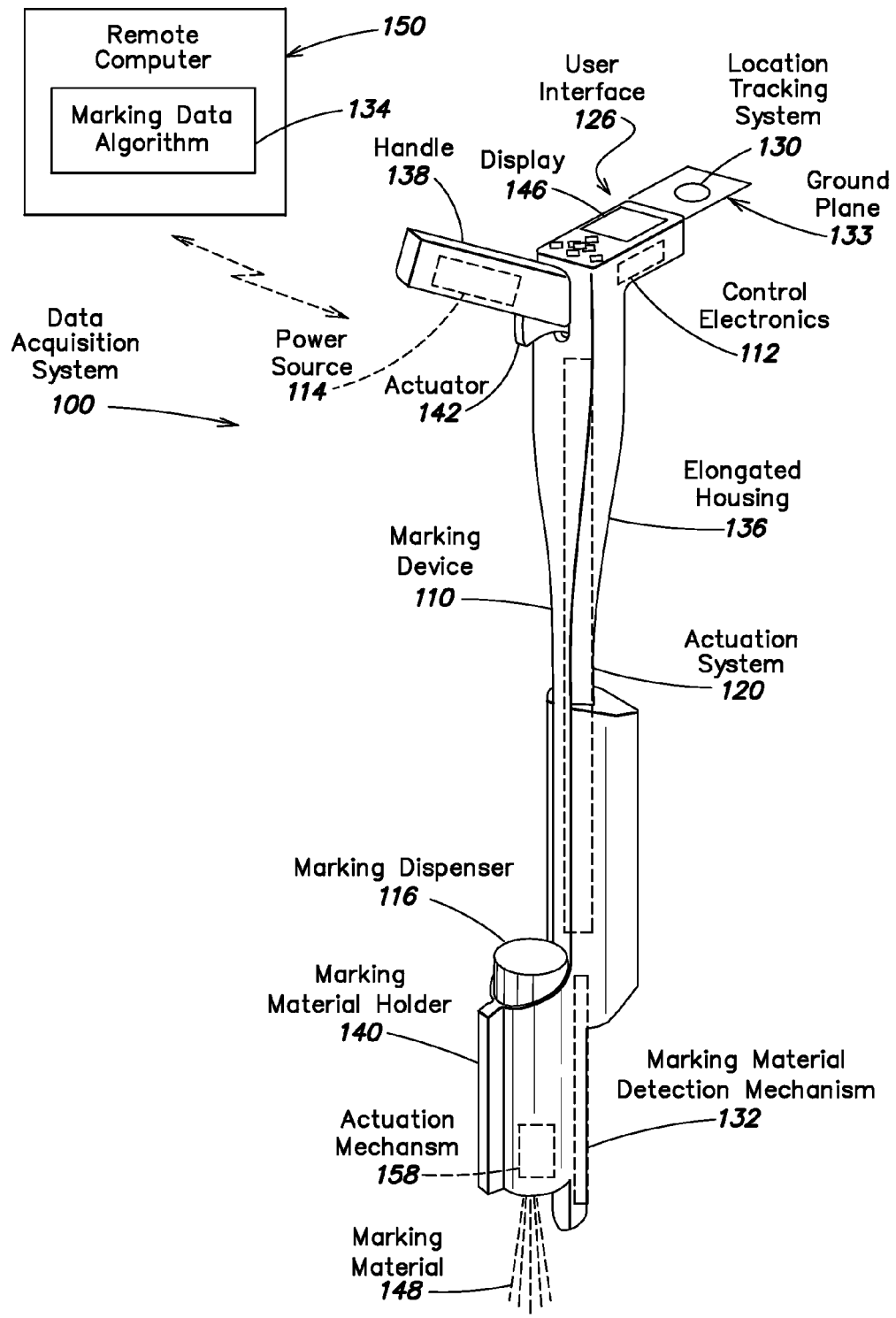
FIG. 3 is a perspective view of the data acquisition system of FIG. 2, illustrating an exemplary marking device according to one embodiment of the present invention.

FIGS. 2 and 3 illustrate a functional block diagram and perspective view, respectively, of one example of a data acquisition system 100, including a marking device 110 and optionally a remote computer 150, according to one embodiment of the present invention. One or both of the marking device 110 and the remote computer 150 of the data acquisition system 100 may be configured to sense one or more actuations of the marking device 110 (e.g., to dispense marking material during a marking operation), and collect information based on one or more actuations of the marking device so as to generate an electronic record. In addition to the discussion below in this section, further details of exemplary marking devices may be found in U.S. non-provisional application Ser. No. 12/703,958, filed Feb. 11, 2010, entitled "Marking Apparatus Having Enhanced Features for Underground Facility Marking Operations, and Associated Methods and Systems," which application is incorporated herein by reference in its entirety.

As shown in FIG. 2, in one embodiment marking device 110 includes control electronics 112, the components of which are powered by a power source 114. Power source 114 may be any power source that is suitable for use in a portable device, such as, but not limited to, one or more rechargeable batteries, one or more non-rechargeable batteries, a solar photovoltaic panel, a standard AC power plug feeding an AC-to-DC converter, and the like.

The marking device 110 is configured to hold a marking dispenser 116, which as shown in FIG. 3 is loaded into a marking material holder 140 of the marking device 110. In one exemplary implementation, the marking dispenser 116 is an aerosol paint canister that contains paint; however, it should be appreciated that the present invention is not limited in this respect, as a marking material dispensed by the marking device 110 may be any material, substance, compound, and/or element, used to mark, signify, and/or indicate. Examples of marking materials may include, but are not limited to, paint, chalk, dye, and/or marking powder.

As also shown in FIG. 2, in one embodiment control electronics 112 of marking device 110 may include, but are not limited to, a processor 118, at least a portion of an actuation system 120 (another portion of which may include one or more mechanical elements), a local memory 122, a communication interface 124, a user interface 126, a timing system 128, and a location tracking system 130.

The processor 118 may be any general-purpose processor, controller, or microcontroller device. Local memory 122 may be any volatile or non-volatile data storage device, such as, but not limited to, a random access memory (RAM) device and a removable memory device (e.g., a universal serial bus (USB) flash drive, a multimedia card (MMC), a secure digital card (SD), a compact flash card (CF), etc.). As discussed further below, the local memory may store a marking data algorithm 134, which may be a set of processor-executable instructions that when executed by the processor 118 causes the processor to control various other components of the marking device 110 so as to generate an electronic record 135 of a marking operation, which record also may be stored in the local memory 122 and/or transmitted in essentially real-time (as it is being generated) or after completion of a marking operation to a remote device (e.g., remote computer 150).

In one exemplary implementation, a Linux-based processing system for embedded handheld and/or wireless devices may be employed in the marking device 110 to implement various components of the control electronics 112. For example, the Fingertip4™ processing system, including a Marvell PXA270 processor and available from InHand Electronics, Inc. (www.inhandelectronics.com/products/fingertip4), may be used. In addition to the PXA270 processor (e.g., serving as the processor 118), the Fingertip4™ includes flash memory and SDRAM (e.g., serving as local memory 122), multiple serial ports, a USB port, and other I/O interfaces (e.g., to facilitate interfacing with one or more input devices and other components of the marking device), supports a variety of wired and wireless interfaces (WiFi, Bluetooth, GPS, Ethernet, any IEEE 802.11 interface, or any other suitable wireless interface) to facilitate implementation of the communication interface 124, and connects to a wide variety of LCD displays (to facilitate implementation of a user interface/display).

Communication interface 124 of marking device 110 may be any wired and/or wireless communication interface by which information may be exchanged between marking device 110 and an external or remote device, such as a remote computing device that is elsewhere in the dig area (i.e., not a part of the marking device 110) or outside the dig area. For example, data that is provided by components of data acquisition system 100 and/or stored in local memory 122 (e.g., one or more electronic records 135) may be transmitted via communication interface 124 to a remote computer, such as remote computer 150, for processing. Examples of wired communication interfaces may include, but are not limited to, USB ports, RS232 connectors, RJ45 connectors, Ethernet, and any combination thereof. Examples of wireless communication interfaces may include, but are not limited to, an Intranet connection, Internet, Bluetooth® technology, Wi-Fi, Wi-Max, IEEE 802.11 technology (e.g., operating at a minimum bandwidth of 54 Mbps, or any other suitable bandwidth), radio frequency (RF), Infrared Data Association (IrDA) compatible protocols, Local Area Networks (LAN), Wide Area Networks (WAN), Shared Wireless Access Protocol (SWAP), any combination thereof, and other types of wireless networking protocols. The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, and/or heart rate.

User interface 126 of marking device 110 may be any mechanism or combination of mechanisms by which a user may operate data acquisition system 100 and by which information that is generated by data acquisition system 100 may be presented to the user. For example, user interface 126 may include, but is not limited to, a display device (including integrated displays and external displays, such as Heads-Up Displays (HUD5)), a touch screen, one or more manual push-buttons, a microphone to provide for audible commands, one or more light-emitting diode (LED) indicators, one or more toggle switches, a keypad, an audio output (e.g., speaker, buzzer, and alarm), and any combination thereof. In one implementation, the user interface 126 includes a "menu/on" button to power up the marking device and provide a menu-driven graphical user interface (GUI) displayed by the display device (e.g., menu items and/or icons displayed on the display device) and navigated by the technician via a joystick or a set of four "up/down/left/right" buttons, as well as a "select/ok" button to take some action pursuant to the selection of a menu item/icon. As described below, the display may also be used in some embodiments of the invention to display information relating to a placement of marking material in a dig area, a location of an underground facility in a dig area, or any other suitable information that may be displayed based on information acquired to create an electronic record 135.

In various embodiments, the one or more interfaces of the marking device 110—including the communication interface 124 and user interface 126—may be used as input devices to receive information to be stored in the memory 122 as part of an electronic record of a marking operation. In some cases, marking information received via the interface(s) (e.g., via the communication interface 124) may include ticket information regarding underground facilities to be marked during a marking operation. As another example, using an interface such as the user interface 126, service-related information may be input, including an identifier for the marking device used by the technician, an identifier for a technician, and/or an identifier for the technician's employer. Alternatively, some or all of the service-related information similarly may be received via the communication interface 124 (and likewise some or all of the ticket information may be received via the user interface 126).

The actuation system 120 of marking device 110 shown in the block diagram of FIG. 2 may include both electrical and mechanical elements according to various embodiments discussed in further detail below, and for purposes of illustration is shown in FIG. 2 as included as part of the control electronics 112. The actuation system 120 may include a mechanical and/or electrical actuator mechanism (e.g., see the actuator 142 shown in FIG. 3) to provide one or more signals or stimuli as an input to the actuation system 120. Upon receiving one or more signals or stimuli (e.g., actuation/triggering by a locate technician or other user), the actuation system 120 causes marking material to be dispensed from marking dispenser 116. In various embodiments, the actuation system 120 may employ any of a variety of mechanical and/or electrical techniques (e.g., one or more switches or other circuit components, a dedicated processor or the processor 118 executing instructions, one or more mechanical elements, various types of transmitters and receivers, or any combination of the foregoing), as would be readily appreciated by those of skill in the relevant arts, to cause the marking dispenser 116 to dispense marking material in response to one or more signals or stimuli. The actuation system 120 also provides one or more output signals in the form of an actuation signal 121 to the processor 118 to indicate one or more actuations of the marking device, in response to which the processor 118 may acquire/collect various marking information and log data into the electronic record 135. Additional details of exemplary actuation system implementations are provided below in connection with FIGS. 3 through 5.

In some embodiments, the actuation system 120 may be configured so as not to cause marking material to be dispensed from marking dispenser 116 in response to one or more signals or stimuli; rather, the actuation system may merely facilitate a logging of data from one or more input devices in response to operation of an actuator/trigger, without necessarily dispensing marking material. In some instances, this may facilitate "simulation" of a marking operation (i.e., simulating the dispensing of marking material) by providing an actuation signal 121 to the processor 118 indicating one or more simulated actuation events, in response to which the processor may cause the logging of various data for creating an electronic record without any marking material actually being dispensed.

Location tracking system 130 of marking device 110 constitutes another type of input device that provides marking information, and may include any device that can determine its geographical location to a certain degree of accuracy. For example, location tracking system 130 may include a global positioning system (GPS) receiver or a global navigation satellite system (GNSS) receiver. A GPS receiver may provide, for example, any standard format data stream, such as a National Marine Electronics Association (NMEA) data stream, or other data formats. An error correction component 131 may be, but is not limited to, any mechanism for improving the accuracy of the geographic information provided by location tracking system 130; for example, error correction component 131 may be an algorithm for correcting any offsets (e.g., due to local disturbances in the atmosphere) in the geo-location data of location tracking system 130. While shown as part of a local location tracking system of the marking device 110, error correction component 131 alternatively may reside at a remote computing device, such as remote computer 150. In other embodiments, location tracking system 130 may include any device or mechanism that may determine location by any other means, such as performing triangulation by use of cellular radiotelephone towers.

In one exemplary implementation, the location tracking system 130 may include an ISM300F2-05-V0005 GPS module available from Inventek Systems, LLC of Westford, Mass. (see www.inventeksys.com/html/ism300f2-c5-v0005.html). The Inventek GPS module includes two UARTs (universal asynchronous receiver/transmitter) for communication with the processor 118, supports both the SIRF Binary and NMEA-0183 protocols (depending on firmware selection), and has an information update rate of 5 Hz. A variety of geographic location information may be requested by the processor 118 and provided by the GPS module to the processor 118 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the location tracking system 130 may provide a wide variety of geographic information as well as timing information (e.g., one or more time stamps) to the processor 118.

In another embodiment, location tracking system 130 may not reside locally on marking device 110. Instead, location tracking system 130 may reside on any on-site computer, which serves as a location reference point, to which the location of marking device 110 may be correlated by any other means, such as, but not limited to, by a triangulation technique between the on-site computer and marking device 110.

With respect to other input devices of the marking device 110 that may provide marking information, the control electronics 112 may also include a timing system 128 having an internal clock (not shown), such as a crystal oscillator device, for processor 118. Additionally, timing system 128 may include a mechanism for registering time with a certain degree of accuracy (e.g., accuracy to the minute, second, or millisecond) and may also include a mechanism for registering the calendar date. In various implementations, the timing system 128 may be capable of registering the time and date using its internal clock, or alternatively timing system 128 may receive its time and date information from the location tracking system 130 (e.g., a GPS system) or from an external timing system, such as a remote computer or network, via communication interface 124. In yet other implementations, a dedicated timing system for providing timing information to be logged in an electronic record 135 may be optional, and timing information for logging into an electronic record may be obtained from the location tracking system 130 (e.g., GPS latitude and longitude coordinates with a corresponding time stamp). Timing information may include, but is not limited to, a period of time, timestamp information, date, and/or elapsed time.

Marking material detection mechanism 132 of the marking device 110 shown in FIG. 2 is another type of input device that provides marking information, and may be any mechanism or mechanisms for determining a presence or absence of a marking dispenser 116 in or otherwise coupled to the marking device 110, as well as determining certain attributes/characteristics of the marking material within marking dispenser 116 when the dispenser is placed in or coupled to the marking device. As shown in FIG. 3, in some embodiments the marking material detection mechanism 132 may be disposed generally in an area proximate to a marking material holder 140 in which a marking dispenser 116 may be placed.

For example, in one embodiment, the marking material detection mechanism 132 may include one or more switch devices (e.g., a make/break single pole/single throw contact switch) disposed at one or more points along the marking material holder 140 and electrically coupled to the processor 118. The switch device(s) may also be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. When the marking dispenser 116 is present in the holder 140, the switch device(s) is in one of two possible states and when there is no marking dispenser the switch device(s) is in another of the two possible states (e.g., the marking dispenser, when present, may depress the switch device(s) so as to make contact and pass the ground/DC voltage to the processor). In this manner, the marking material detection mechanism 132 may provide a signal to the processor indicating the presence or absence of the marking dispenser 116 in the marking device 110.

The marking material detection mechanism 132 also or alternatively may include a barcode reader to read barcode data from a dispenser 116 and/or a radio-frequency identification (RFID) reader for reading information from an RFID tag that is provided on marking dispenser 116. The RFID tag may include, for example, a unique serial number or universal product code (UPC) that corresponds to the brand and/or type of marking material in marking dispenser 116. The type of information that may be encoded within the RFID tag on marking dispenser 116 may include product-specific information for the marking material, but any information of interest may be stored on an RFID tag. For example, user-specific information and/or inventory-related information may be stored on each RFID tag for a marking dispenser 116 to facilitate inventory tracking of marking materials. In particular, an identifier for a technician may be stored on an RFID tag when the technician is provided with a marking dispenser 116, and information relating to weight, amount dispensed, and/or amount remaining may be written to the RFID tag whenever the marking dispenser is used.

In one exemplary implementation, the marking material detection mechanism 132 may include a Micro RWD MIFARE-ICODE RFID reader module available from IB Technology (Eccel Technology Ltd) of Aylesbury, Buckinghamshire, UK (see www.ibtechnology.co.uk/products/icode-.htm). The Micro RWD reader module includes an RS232 communication interface to facilitate communication between the processor 118 and the reader module (e.g., via messages sent as a string of ASCII characters), and supports both reading information from an RFID tag attached to a marking dispenser as well as writing information to an RFID tag attached to the marking dispenser. In one aspect of an exemplary implementation, an antenna constituted by one or more turns of wire (e.g., two turns of awg 26 wire, 6.5 cm in diameter, about 1 uH) is coupled to the Micro RWD reader module and disposed in the marking material holder 140 of the marking device 110 (see FIG. 3), proximate to a marking dispenser 116 when placed in the holder 140, so as to capture close near field signals (e.g., from an RFID tag on the dispenser, within about 2 inches) and exclude far field signals. In another aspect, the Micro RWD reader module may be configured to read RFID tags having an ICODE SLI format (e.g., ISO 15693 ICODE SLI). In yet another aspect, an RFID tag may be affixed to an aerosol paint can serving as the marking dispenser, such that the tag conforms to a plastic cap of the paint can and is disposed at a particular location relative to a notch in the cap (e.g., 90 degrees+/−15 degrees from the notch) that allows access to the spray nozzle of the can and is in a relatively predictable position substantially aligned with the antenna when the paint can is placed in the marking material holder 140. Examples of RFID tags suitable for this purpose are available from BCS Solutions, Inc. (see www-.bcssolutions.com/solutions/rfid) and include, but are not limited to, the HF Bullseye Wet Inlay SLA Round 40.

In yet other embodiments, marking material detection mechanism 132 may alternatively or further be configured to detect properties of marking material as it is dispensed. For example, the marking material detection mechanism may include one or more of an optical sensor, an olfactory sensor, an auditory sensor (e.g., a microphone), a weight sensor, and any combination thereof. For example, in one embodiment an optical sensor in the marking device may be used to identify the composition and/or type of marking material in the marking dispenser by analyzing light reflected by the material as it is dispensed. Similarly, an olfactory sensor may be used to identify one or more characteristics of the marking material based on an odor profile of the material, and an auditory sensor may be used to identify the difference between paint being sprayed from an aerosol can and aerosol without paint being sprayed from a can (e.g., as the dispenser becomes emptied of paint).

In one embodiment, information provided by one or more input devices of the marking device 110 (e.g., the timing system 128, the location tracking system 130, the marking material detection mechanism 132, the user interface 126, the communication interface 124) is acquired and logged (stored in memory) upon actuation of the actuation system 120 (e.g., triggering an actuator). Some embodiments of the invention may additionally or alternatively acquire/log information from one or more input devices at one or more times during or throughout an actuation, such as when a technician is holding a mechanical or electrical actuator for some period of time and moving to dispense marking material in a line (e.g., see FIG. 7). In various aspects of such embodiments, marking information derived from one or more input devices may be collected at a start time of an actuation, at one or more times during an actuation, and in some cases at regular intervals during an actuation (e.g., several times per second, once per second, once every few seconds). Further, some marking information may be collected at an end of an actuation, such as time information that may indicate a duration of an actuation.

Additionally, it should be appreciated that while some marking information may be received via one or more input devices at the start of each marking operation and upon successive actuations of the marking device, in other cases some marking information may be collected by or provided to the marking device once, prior to a marking operation (e.g., on power-up or reset of the marking device, as part of an electronic instruction or dispatch by a locate company, and/or in response to a request/query from a locate technician), and stored in local memory 122 for later incorporation into an electronic record. For example, prior to a given marking operation and one or more actuations of the marking device, ticket information and/or service-related information may have already been received (e.g., via the communication interface 124 and/or user interface 126) and stored in local memory 122. Upon generation of an electronic record of a given marking operation, information previously received via the interface(s) may be retrieved from the local memory (if stored there initially) and entered into an electronic record, in some case together with information collected pursuant to one or more actuations of the marking device. Alternatively, ticket information and/or service-related information may be received via the interface(s) and stored in an entry in the electronic record 135 "directly" in response to one or more actuations of the marking device (e.g., without being first stored in local memory).

In sum, according to embodiments of the present invention, various marking information from one or more input devices, regardless of how or when it is received, may be stored in an electronic record of a marking operation, in which at least some of the marking information is logged pursuant to one or more actuations of the marking device.

In one embodiment, the optional remote computer 150 of the data acquisition system 100 may be a centralized computer, such as a central server of an underground facility locate service provider. In another embodiment, remote computer 150 may be a computer that is at or near the work site (i.e., "on-site"), e.g., a computer that is present in a locate technician's vehicle.

Whether resident and/or executed on either the marking device 110 or the remote computer 150, as noted above the marking data algorithm 134 includes a set of processor-executable instructions (e.g., stored in memory, such as local memory 122 of the marking device) that, when executed by processor 118 of the marking device 110 or another processor, processes information (e.g., various marking information) collected in response to (e.g., during) one or more actuations of the marking device 110, and/or in some cases before or after a given actuation or series of actuations. As also discussed above, according to various embodiments the actuations of marking device 110 may effect both dispensing marking material and logging of marking information, or merely logging of marking information for other purposes (e.g., simulating the dispensing of marking material) without dispensing marking material. In either situation, marking data algorithm 134, when executed by the processor 118, may cause the processor to perform collection, logging/storage (creation of electronic records), and in some instances further processing and analysis of various marking information with respect to marking device actuations. For example, as discussed in further detail below in connection with FIG. 9, the operations of marking data algorithm 134 as effected by the processor 118 may include, but are not limited to, the following:

(1) reading in (acquiring) data that is generated by any component (e.g., one or more input devices); for example, data may be read in that is acquired at a start of a given actuation, throughout the duration of the actuation, at the end of the actuation, before or after the actuation, and any combination thereof;

(2) processing the information that is collected and associating the collected information with respective actuations; for example, any information collected may be parsed/packaged so as to be associated with any one or more actuations of the marking device, irrespective of when the data was actually acquired;

(3) formatting the acquired information, e.g., as multiple time-stamped event entries constituting actuation data sets forming an electronic record, wherein each actuation data set corresponds to a particular actuation; and (4) using respective actuation data sets of an electronic record to visually recreate the marking operation (e.g., render a computer-generated representation in a display field, wherein respective actuation data sets correspond to electronic locate marks).

It should also be appreciated that the marking data algorithm 134 may include one or more adjustable parameters that govern various aspects of the collection and logging of marking information (e.g., the rate at which various marking information is collected from one or more input devices), and that these parameters may be adjusted or set, for example, by an administrator at a remote computer, after which the marking data algorithm is downloaded to the marking device for execution by the processor 118. Alternatively, in other implementations, adjustable parameters of a marking data algorithm already resident on a marking device may in some cases be adjusted remotely via the communication interface, or locally via the user interface.

While the functionality of various components of the marking device 110 was discussed above in connection with FIG. 2, FIG. 3 shows some structural aspects of the marking device 110 according to one embodiment. For example, the marking device 110 may include an elongated housing 136 in which is disposed one or more elements of the actuation system 120, one or more elements of the control electronics 112 and the power source 114. Elongated housing 136 may be hollow or may contain certain cavities or molded compartments for installing any components therein, such as the various components of marking device 110 that are shown in FIG. 2. The elongated housing 136 and other structural elements associated with the housing, as discussed below, may be formed of any rigid, semi-rigid, strong, and lightweight material, such as, but not limited to, molded plastic and aluminum.

Incorporated at a proximal end of elongated housing 136 may be a handle 138, which provides a convenient grip by which the user (e.g., the locate technician) may carry the marking device 110 during use (i.e., the exemplary marking device depicted in FIG. 3 is intended to be a hand-held device). In one implementation, the power source 114 may be provided in the form of a removable battery pack housing one or more rechargeable batteries that are connected in series or parallel in order to provide a DC voltage to marking device 110, and disposed within a compartment in the handle 138. Such an arrangement facilitates use of conventional removable/rechargeable battery packs often employed in a variety of cordless power tools, in which the battery pack similarly is situated in a handle of the tool. It should be appreciated, however, that the power source 114 in the form of a battery pack may be disposed in any of a variety of locations within or coupled to the elongated housing 136.

As also shown in FIG. 3, mounted near handle 138 is user interface 126, which may include a display 146. The display 146 may be a touch screen display to facilitate interaction with a user/technician, and/or the user interface also may include one or more buttons, switches, joysticks, a keyboard, and the like to facilitate entry of information by a user/technician. One or more elements of the control electronics 112 (e.g., the processor 118, memory 122, communication interface 124, and timing system 128) also may be located in the proximal end of the elongated housing in the vicinity of the user interface 126 and display 146. As with the power source 114, it should be appreciated that one or more elements of the control electronics 112 may be disposed in any of a variety of locations within or coupled to the elongated housing 136.

In the embodiment of FIG. 3, the location tracking system 130 similarly may be positioned on the proximal end of the elongated housing 136 to facilitate substantially unobstructed exposure to the atmosphere; in particular, as illustrated in FIG. 3, the location tracking system 130 may be situated on an a ground plane 133 (providing an electrical ground at least at the antenna frequency of the location tracking system, e.g., at approximately 1.5 GHz) that extends from the proximal end of the housing 136 and is approximately parallel to the ground, surface or pavement when the marking device is being normally operated by a technician (so as to reduce signal modulation with subtle movements of the marking device).

As also shown in FIG. 3, incorporated at the distal end of elongated housing 136 is a marking dispenser holder 140 for holding one or more marking dispensers 116 (e.g., an aerosol paint canister). Dispenser 116 may be one or more replaceable dispensers or one or more reusable refillable dispensers (including a fixed reservoir forming a part of the device 110) or any other suitable dispenser. Also situated at the distal end of the housing is the marking material detection mechanism 132 to detect a presence or absence of the marking dispenser 116 in the marking material holder 140, and/or one or more characteristics of the marking material 148, as well as an actuation mechanism 158, which in some implementations may constitute part of the actuation system 120 and be employed to interact with the marking dispenser 116 so as to effect dispensing of the marking material 148.

With respect to the actuation system 120, as shown in FIG. 3, at least a portion of the actuation system 120 is indicated generally along the length of the elongated housing for purposes of illustration. More specifically, however, in various implementations the actuation system 120 may include multiple components disposed in various places in, on or coupled to the marking device 110. For example, in the embodiment of FIG. 3, the actuation system 120 includes an actuator 142, which for example may be a mechanical mechanism provided at the handle 138 in the form of a trigger that is pulled by a finger or hand of an user/technician. The actuation system 120 further includes the actuation mechanism 158 disposed at the distal end of the marking device that is responsive to the actuator 142 to dispense marking material. In general, in various exemplary implementations as discussed in further detail below, the actuation system 120 may employ any of a variety of mechanical and/or electrical techniques to cause the marking dispenser 116 to dispense marking material 148 in response to one or more signals or stimuli. In the embodiment shown in FIG. 3, the signal/stimulus is initially provided to the actuation system via the mechanical actuator 142; i.e., a locate technician or other user triggers (e.g., pulls/depresses) the actuator 142 to provide a signal/stimulus to the actuation system 120, which in turn operates the actuation mechanism 158 to dispense marking material in response to the signal/stimulus.

In response to the signal/stimulus provided by the actuator 142, as discussed above the actuation system may also provide an actuation signal 121 to the processor 118 to indicate an actuation. As discussed in further detail below in connection with FIG. 9, pursuant to the execution by the processor 118 of the marking data algorithm 134, the actuation signal 121 may be used to cause the logging of information that is provided by one or more components of the marking device 110 so as to generate an electronic record of the marking operation.

Figure 1C:
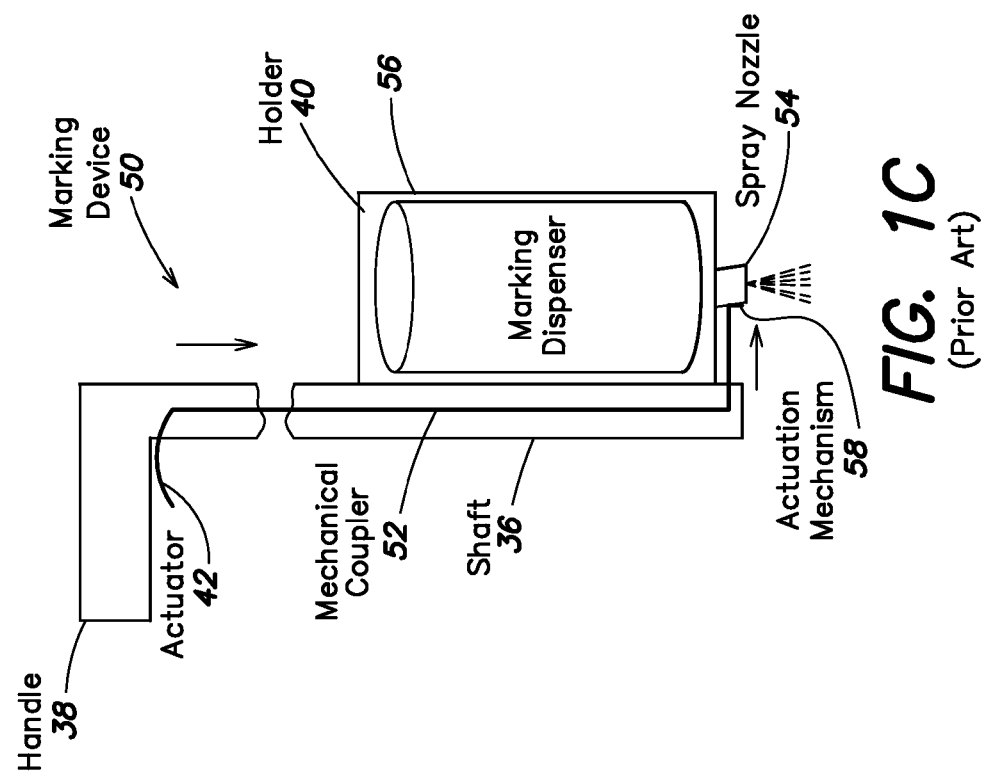
FIGS. 1B and 1C illustrate a conventional marking device in a non-actuated and actuated state, respectively.
Figure 4A:
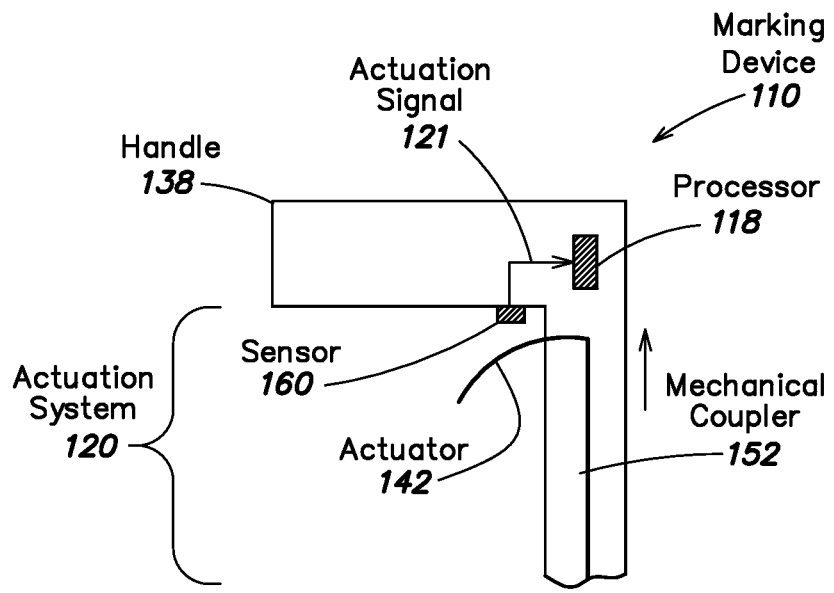
FIGS. 4A and 4B illustrate a portion of an actuation system of the marking device of FIG. 3 according to one embodiment of the present invention.
Figure 4B:
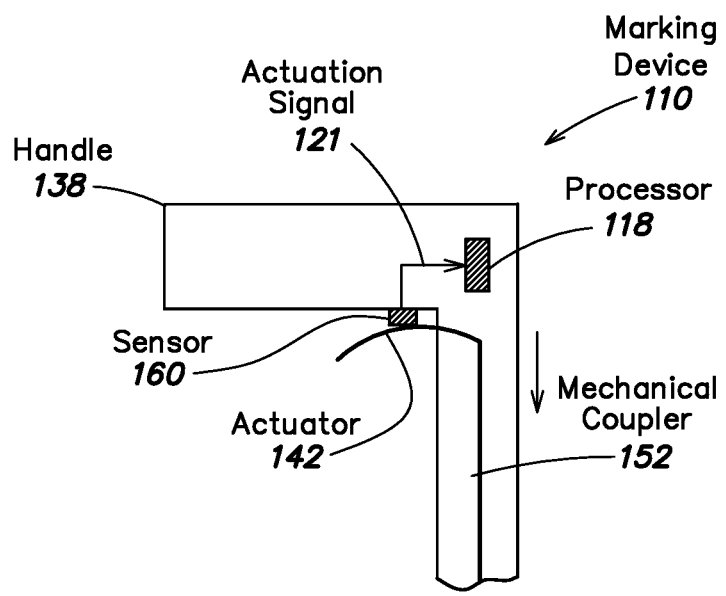

FIGS. 4A and 4B illustrate a portion of the actuation system 120 according to one embodiment of the present invention. FIG. 4A shows the actuator 142 in an un-actuated state, whereas FIG. 4B shows the actuator 142 in an actuated state (in which a signal/stimulus is provided by the actuator). In the example of FIGS. 4A and 4B, the actuator 142 is coupled to a mechanical coupler 152, similar to that shown in FIGS. 1B and 1C, which extends along a length of the elongated housing and is in turn coupled to a mechanical actuation mechanism 158 at the distal end of the housing (not shown in FIGS. 4A and 4B) that ultimately effects dispensing of marking material when the actuator is in the actuated state. The portion of the actuation system 120 shown in FIGS. 4A and 4B also includes a sensor 160 which is configured to provide an actuation signal 121 to the processor 118 to indicate one or both of the respective actuated and un-actuated states of the actuator 142.

In one implementation, the sensor 160 may include a switch device (e.g., a make/break single pole/single throw contact switch) disposed along the handle 138 of the marking device such that, when pulled, the actuator contacts (e.g., depresses) the switch causing a state of the switch to toggle. In another implementation, the sensor 160 may include a switch device such as a reed (magnetic) switch disposed at some point along the length of the elongated housing; in such an implementation, the mechanical coupler 152 may have a magnet disposed along it at an appropriate position relative to the reed switch, such that movement of the mechanical coupler 152 upon actuation of the actuator 142 causes a state of the reed switch to toggle. Electrically, a switch device serving as the sensor 160 may be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. In this manner, the sensor 160 may provide the actuation signal 121 to the processor indicating actuation (and release) of the actuator 142.

Figure 5:
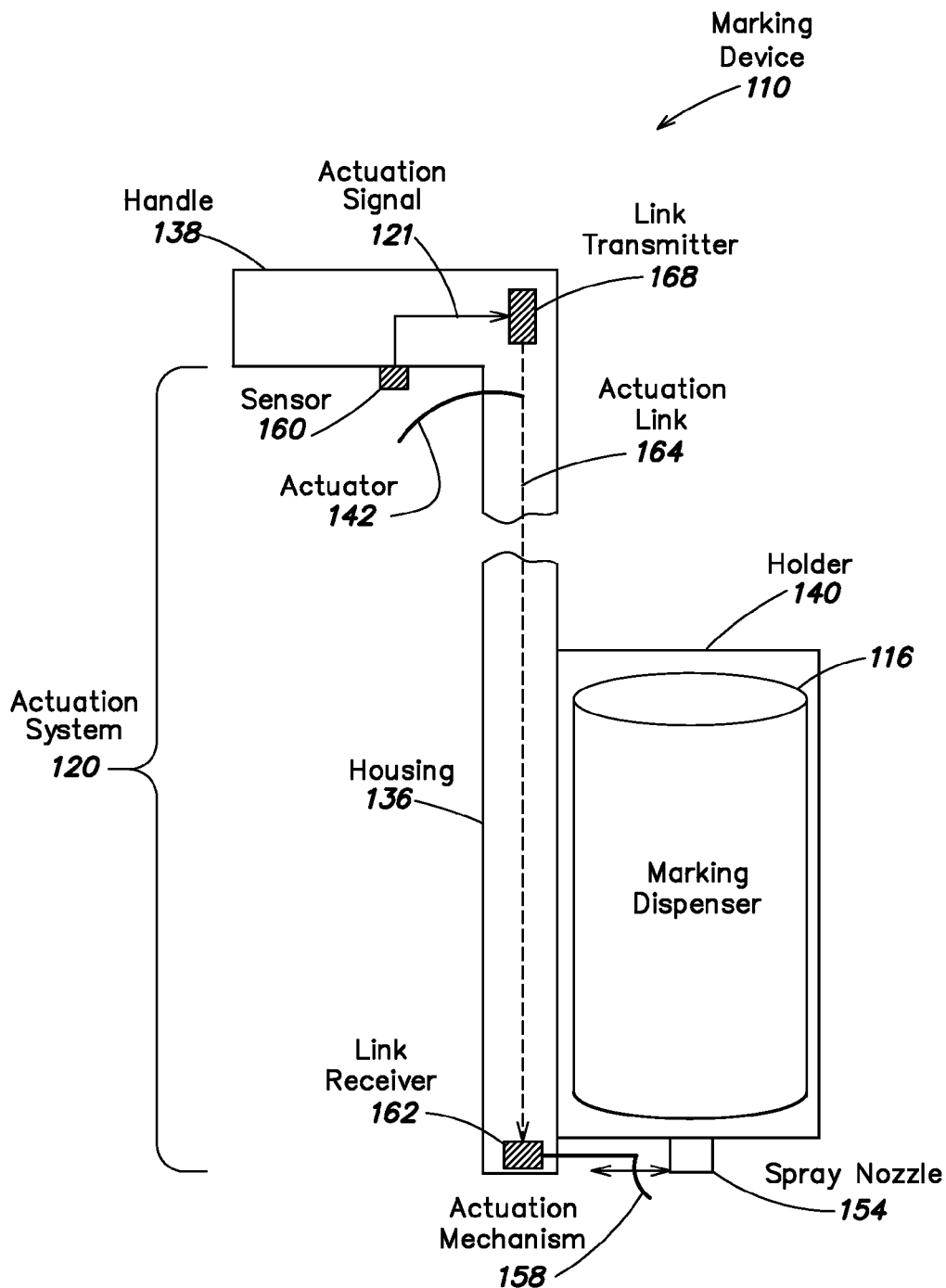
FIG. 5 illustrates various components of an actuation system 120 according to other embodiments of the present invention.

FIG. 5 illustrates various components of an actuation system 120 according to other embodiments of the present invention. Generally speaking, the actuation system 120 may include the actuator 142 and the sensor 160 to detect actuation and release of the actuator 142 (and also provide a corresponding actuation signal 121 representing same to the processor 118). While a "trigger-pull" type of actuator 142 is shown primarily for purposes of illustration in FIG. 5, it should be appreciated that more generally an actuator of the actuation system 120 may be implemented by any form or combination of a lever, switch, program, processor, screen, microphone for capturing audible commands, and the like, as discussed above. For example, in one implementation, a microphone may serve as both the actuator 142 and the sensor 160 shown in FIG. 5 to provide an actuation signal 121 based on audible commands, so as to effect voice-activated actuation of the marking device.

FIG. 5 also shows that the actuation system 120 of this embodiment includes a link transmitter 168 coupled and responsive to the sensor 160 to transmit one or more signals and/or other stimulus via an actuation link 164, and a link receiver 162 to receive the one or more signals and/or other stimulus from the actuation link 164. In response to such signals and/or other stimulus, the link receiver 162 operates the actuation mechanism 158. The link transmitter 168, the link 164, and the link receiver 162 may include one or more electrical and/or mechanical components. For example, the link receiver 162 may include a linear solenoid mechanically coupled to the actuation mechanism 158 and whose movement is responsive to one or more signals and/or stimuli received from the link 164. In various exemplary implementations, the link transmitter 168 and the link 164 simply may include a wire that couples the sensor 160 to the solenoid to activate the solenoid upon changes of state in the actuation signal 121. Alternatively, the transmitter 168 may be an RF transmitter that is activated in response to the actuation signal 121, the link 164 may be a wireless link, and the receiver 162 may include an RF receiver.

Other examples of transmitter/link/receiver combinations include, but are not limited to, an acoustic transmitter/link/ receiver (e.g., a sound wave source that provides a sound wave of a certain tone, duration, and/or amplitude when the actuator is actuated, and a corresponding sound wave detector), an optical transmitter/link/receiver (e.g., a light or laser source that provides an optical signal of a certain wavelength, duration, and/or amplitude when the actuator is actuated, and a corresponding optical detector), a fluid transmitter/link/ receiver (e.g., a fluid system that provides a fluid control output of a certain volume, pressure, and/or duration when the actuator is actuated, and a corresponding fluid sensor for sensing the presence of, for example, a short blast of water of a certain volume, pressure, and/or duration to indicate an actuation; the fluid system may be, for example, a closed-loop system that has a source reservoir at the top of the marking device, a fluid line in proximity with the fluid sensor, a return reservoir for capturing water during the actuation process, and appropriate pressure regulation and ducts for cycling water from the return reservoir back to the source reservoir), and an air transmitter/link/receiver (e.g., an air system that provides an air control output of a certain volume, pressure, and/or duration when the actuator is actuated, and a corresponding air sensor for sensing the presence of, for example, a blast or puff of air of a certain volume, pressure, and/or duration to indicate an actuation).

While not explicitly shown in FIG. 5, in yet other embodiments it should be appreciated that the sensor 160 may be coupled to the processor 118 (to provide the actuation signal 121 representing actuation/release of the actuator), and in turn the processor may provide a signal to the link transmitter 168, such that dispensing of marking material may in part be under the control of the processor 118 executing particular instructions for this purpose. More specifically, while in some implementations dispensing of marking material may be directly responsive to actuation of the actuator (and cease upon release of the actuator), in other implementations dispensing of marking material may be initiated in some manner upon actuation of the actuator, but then continued dispensing of marking material may not necessarily be dictated by continued actuation, or release, of the actuator. Rather, the processor 118 may provide one or more signals or commands to the link transmitter 168 to govern dispensing of marking material in some manner that does not necessarily track each actuation and release of the actuator.

For example, in one implementation the processor 118 may execute instructions such that, once the actuation signal 121 from the sensor 160 indicates actuation of the actuator, the processor 118 provides a signal to the link transmitter 168 that causes dispensing of marking material for some predetermined or user-defined amount of time, irrespective of release of the actuator. Additionally or alternatively, the processor may provide one or more signals to the link transmitter 168 that causes dispensing of marking material for multiple discrete amounts of time with a single actuation (e.g., three bursts of 1 second each per actuation). From the foregoing, it should be generally appreciated that a wide variety of marker sizes and patterns may be generated from the marking device in an automated or semi-automated manner based on processor-based control of the actuation system 120. It should also be appreciated that automated or semi-automated processor-based control of the dispensing of marking material may also govern in some fashion how, how often, and/or what type of marking information is collected and logged to generate an electronic record of a marking operation, as discussed further below in connection with FIG. 9.

Figure 6:
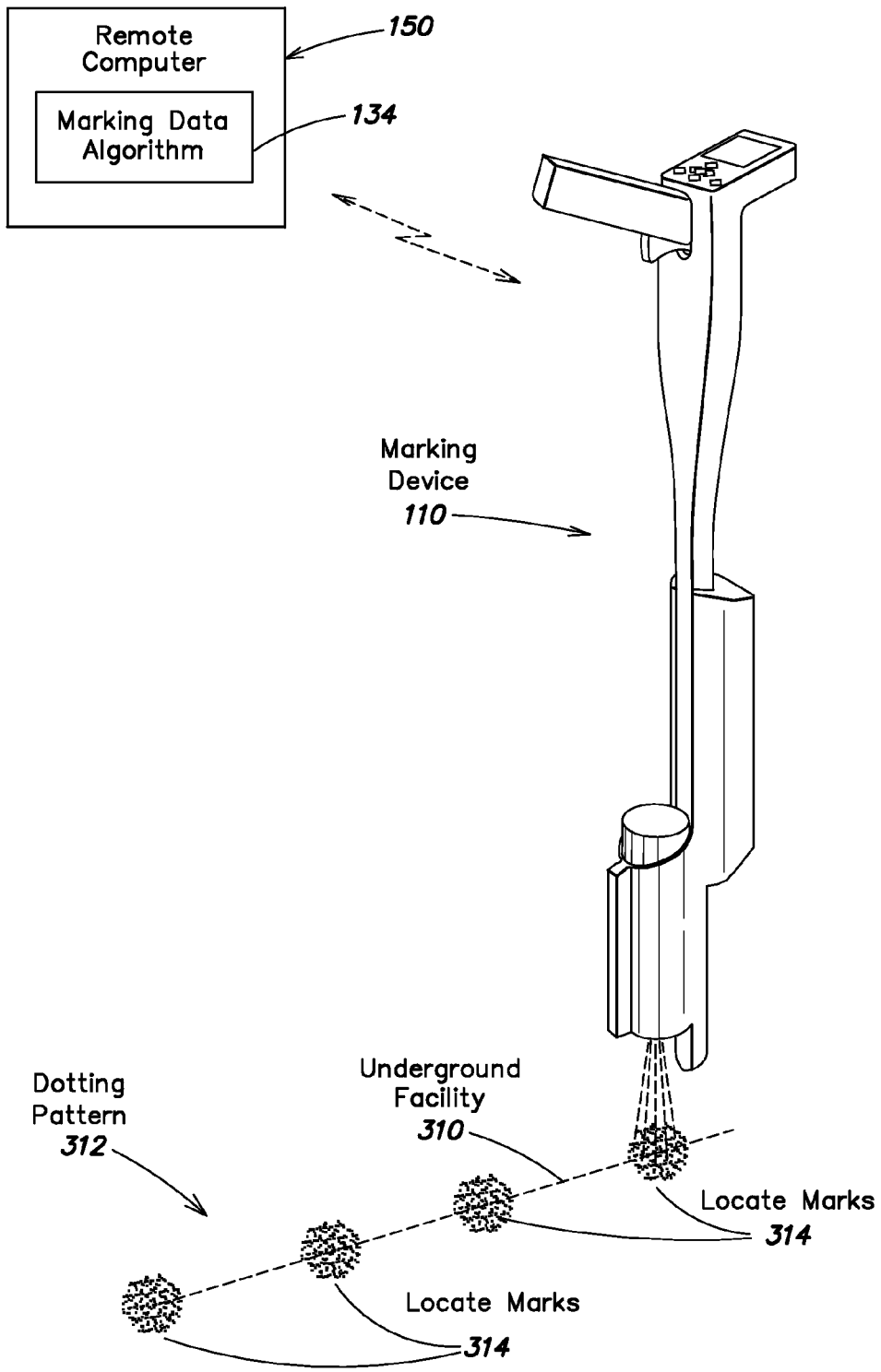
FIG. 6 is a perspective view of an exemplary marking device being used for marking a dotting pattern, according to one embodiment of the present invention.
Figure 7:
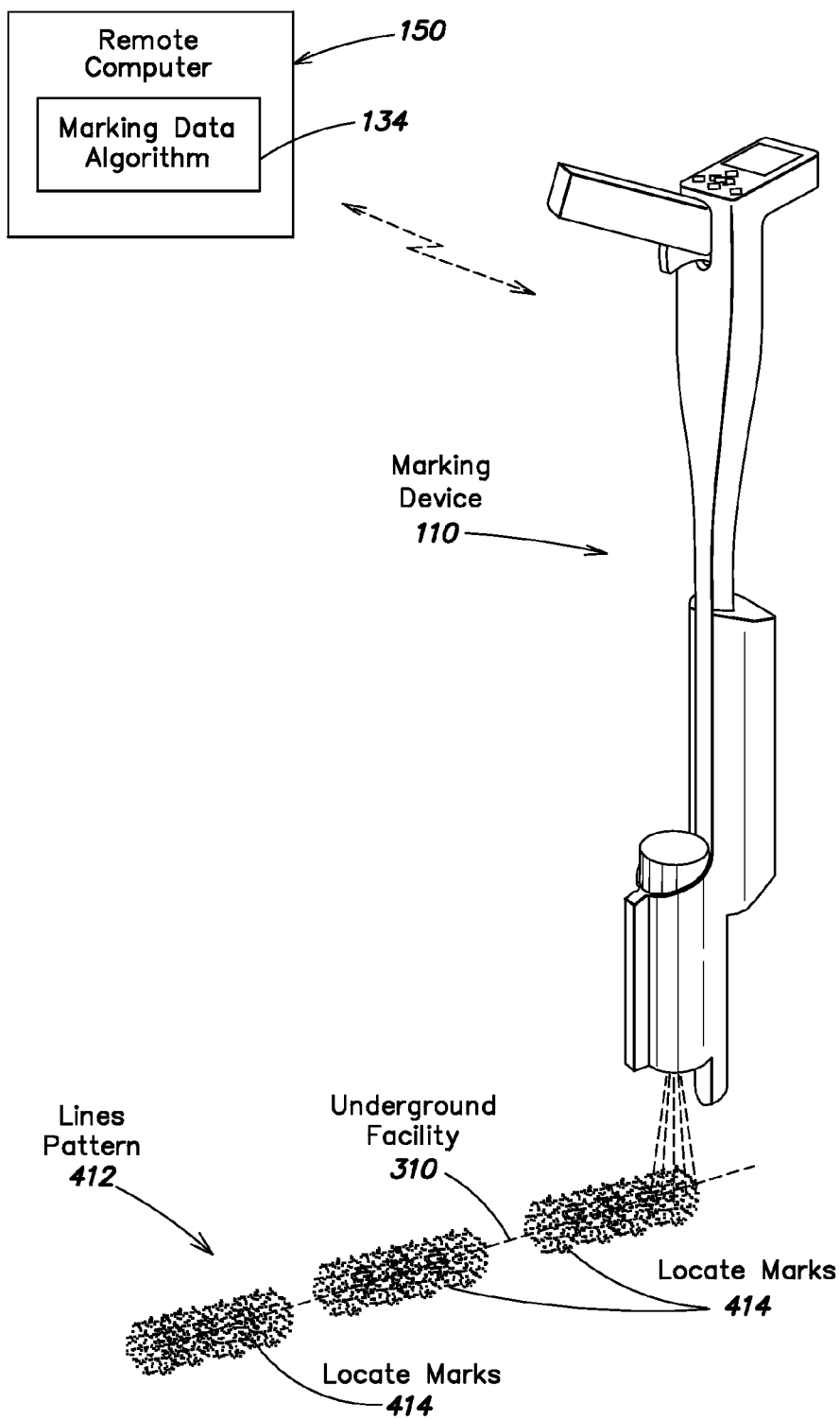
FIG. 7 is a perspective view of an exemplary marking device being used for marking a lines pattern, according to one embodiment of the present invention.

FIGS. 6 and 7 provide examples of how the marking device 110 shown in FIGS. 2 and 3 may be employed by a technician during a marking operation. Referring now to FIG. 6, a perspective view of marking device 110 when in use for marking a "dotting pattern" is presented. In marking operations, a dotting pattern may be utilized to preliminarily and quickly indicate the presence or absence of a target facility during an initial locate of a target facility. By way of example, FIG. 6 shows an underground facility 310, which may be any facility, such as an underground gas line, water pipe, sewer pipe, power line, telephone line, cable television conduit, and the like. FIG. 6 also shows a dotting pattern 312 that is formed by multiple locate marks 314 dispensed via marking device 110. The locate marks 314 of dotting pattern 312 are formed by successive short bursts of marking material (e.g., brief actuations); i.e., each locate mark 314 corresponds to one brief actuation of the marking device 110.

Referring now to FIG. 7, a perspective view of marking device 110 when in use for marking a "lines pattern" is presented. In marking operations, a lines pattern is typically the end product of a marking operation. This pattern extends the dotting pattern (e.g., dotting pattern 312 of FIG. 6) so as to create lines (e.g., a series of dashes) that indicate the presence or absence of an underground facility. These lines subsequently provide important reference marks to an excavator so as to avoid damage to a facility during excavation activities or other disturbances of the ground. By way of example, FIG. 7 shows underground facility 310, which may be any concealed facility, such as an underground gas line, water pipe, sewer pipe, power line, telephone line, cable television conduit, and the like. FIG. 7 also shows a lines pattern 412 that is formed by multiple locate marks 414 dispensed via marking device 110. A characteristic of locate marks 414 of lines pattern 412 is that each locate mark 414 is formed by an extended burst of marking material (e.g., a longer actuation of the marking device) as compared with a dotting pattern. As with the dotting pattern shown in FIG. 6, however, each locate mark 414 of the lines pattern shown in FIG. 7 may correspond to one actuation of marking device 110. In some alternative implementations, as discussed above, a series of locate marks (e.g., all three marks 414) may be automatically generated by one actuation of marking device 110 pursuant to processor-based control of the actuation system.

Figure 8:
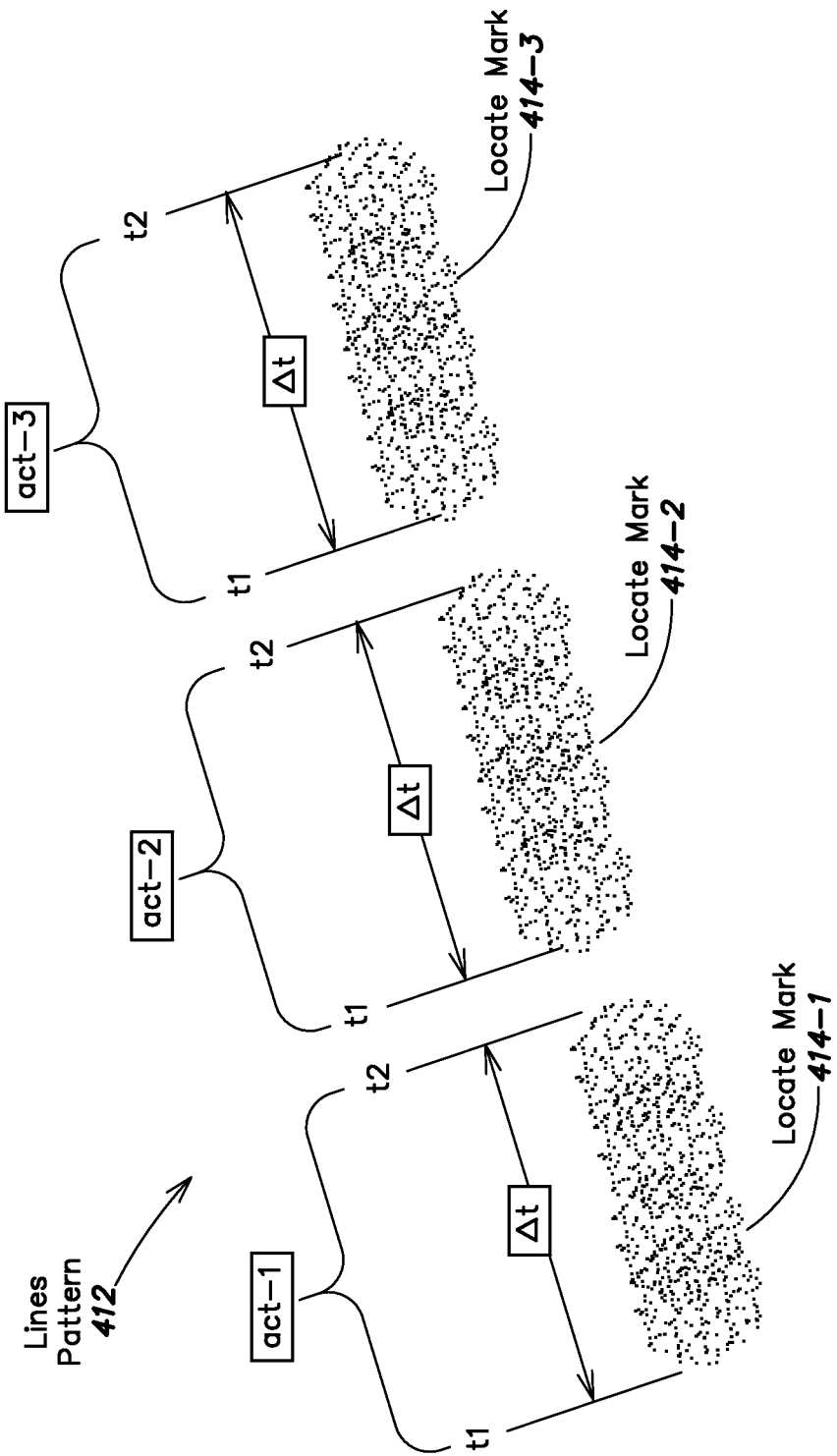
FIG. 8 is a plan view that shows further details of the lines pattern of FIG. 7, in connection with the information acquired for purposes of creating an electronic record according to one embodiment of the present invention.

FIG. 8 illustrates a plan view that shows further details of the lines pattern 412 of FIG. 7. In the example of FIG. 8, each locate mark 414-1, 414-2, and 414-3 corresponds to one actuation ("act") of marking device 110, i.e., locate mark 414-1 corresponds to act-1, locate mark 414-2 corresponds to act-2, and locate mark 414-3 corresponds to act-3. Furthermore, each actuation and its corresponding locate mark 412 has a start time t1, an end time t2, and a duration (Δt). While FIG. 8 shows three locate marks, it should be appreciated that lines pattern 412 may be formed by any number of locate marks.

In one embodiment of the present invention for generating an electronic record of a marking operation, the processor 118 of the marking device 110, executing the marking data algorithm 134, may collect various marking information and generate an electronic record having one or more "actuation data sets" respectively associated with one or more actuations (act-1, act-2, act-3 . . . act-n) and corresponding locate marks, as shown in FIG. 8. Marking information may be collected and entered into such an electronic record at various times relative to the start time t1 and the end time t2 of a given actuation, e.g., at t1 only, at t2 only, at both t1 and t2, at any time(s) between t1 and t2, and/or before or after t1 and t2.

Examples of marking information that generally (but not necessarily) is acquired with respect to t1 and t2 of each actuation, and points between t1 and t2 ("actuation data"), may include, but are not limited to:

(1) timing information: time and date for one or both of t1 and t2 (hereinafter also referred to as "time stamp data"), and/or duration (Δt) of the actuation, which may be provided in some instances by timing system 128; and (2) geographic information: latitude and longitude data from location tracking system 130 (hereinafter also referred to as "geo-location data") (e.g., GPS data may be expressed in degrees, minutes, and seconds (i.e., DDD°, MM', and SS.S"), degrees and decimal minutes (DDD° and MM.MMM'), or decimal degrees (DDD.DDDDD°)).

Examples of marking information that may be acquired before, during or after a given actuation or succession of actuations, and also entered into an electronic record, include, but are not limited to:

(3) marking material information, such as the presence, color, brand and/or type of dispensed marking material or a simulated dispensing of such marking material (i.e., hereinafter also referred to as "product data");

(4) service-related information: identification (ID) number of the locate service provider (e.g., a party/company who dispatches the locate technician, hereinafter also referred to as "service provider ID"); ID number of the user and/or technician (hereinafter also referred to as "user ID"); ID number of the marking device being used for the marking operation (hereinafter also referred to as "device ID"); and (5) ticket information, such as the requesting party, type of facility requested to be marked by the requesting party, and address of the work site/dig area for the marking operation (hereinafter also referred to as "locate request data"). Ticket information also may include a variety of text-based information which may be included in an original locate request ticket, and/or text-based or other information entered in by a technician (e.g., via the user interface 126 and/or display 146) upon initiation of and/or during a marking operation, such as ground type information (e.g., a description of the ground at which marking material is dispensed). Thus, ticket information may be received or derived from a locate request ticket and/or provided by another source, such as entry by a user/technician.

In exemplary methods for generating an electronic record of marking operations according to some embodiments of the invention, as discussed in greater detail below, for a given actuation the processor 118 may request the location tracking system 130 to provide geographic information at one or more times during the actuation (e.g., periodically at regular intervals). Thus, an actuation data set of an electronic record for a given actuation of the marking device may have multiple pieces of geographic information (and associated time stamps) representing the location of the marking device at multiple times during a corresponding actuation. Additionally, for a given actuation, the processor 118 also may request the marking material detection mechanism 132 to provide marking material information as part of the actuation data set. The processor also may include ticket information and service-related information, which may be collected (e.g., via one or more of the user interface 126 and the communication interface 124) before a corresponding actuation, stored in memory 122 and retrieved from the memory for entry into the electronic record upon or during the corresponding actuation, or collected and entered into the electronic record upon or during the corresponding actuation.

While the collection and logging of marking information to generate an electronic record is discussed in some aspects, for purposes of illustration, in terms of actuation data sets (i.e., a set of data that is associated and logged with a corresponding actuation of the marking device), it should be appreciated that various embodiments of the present invention are not limited in this respect. More generally, an electronic record of a marking operation may be generated in any of a variety of manners, have a variety of file formats and/or data structures, and include any of a variety of marking information (some of which may be germane to one or more actuations of the marking device and some of which may be common to multiple actuations or the overall marking operation in general).

Figure 9:
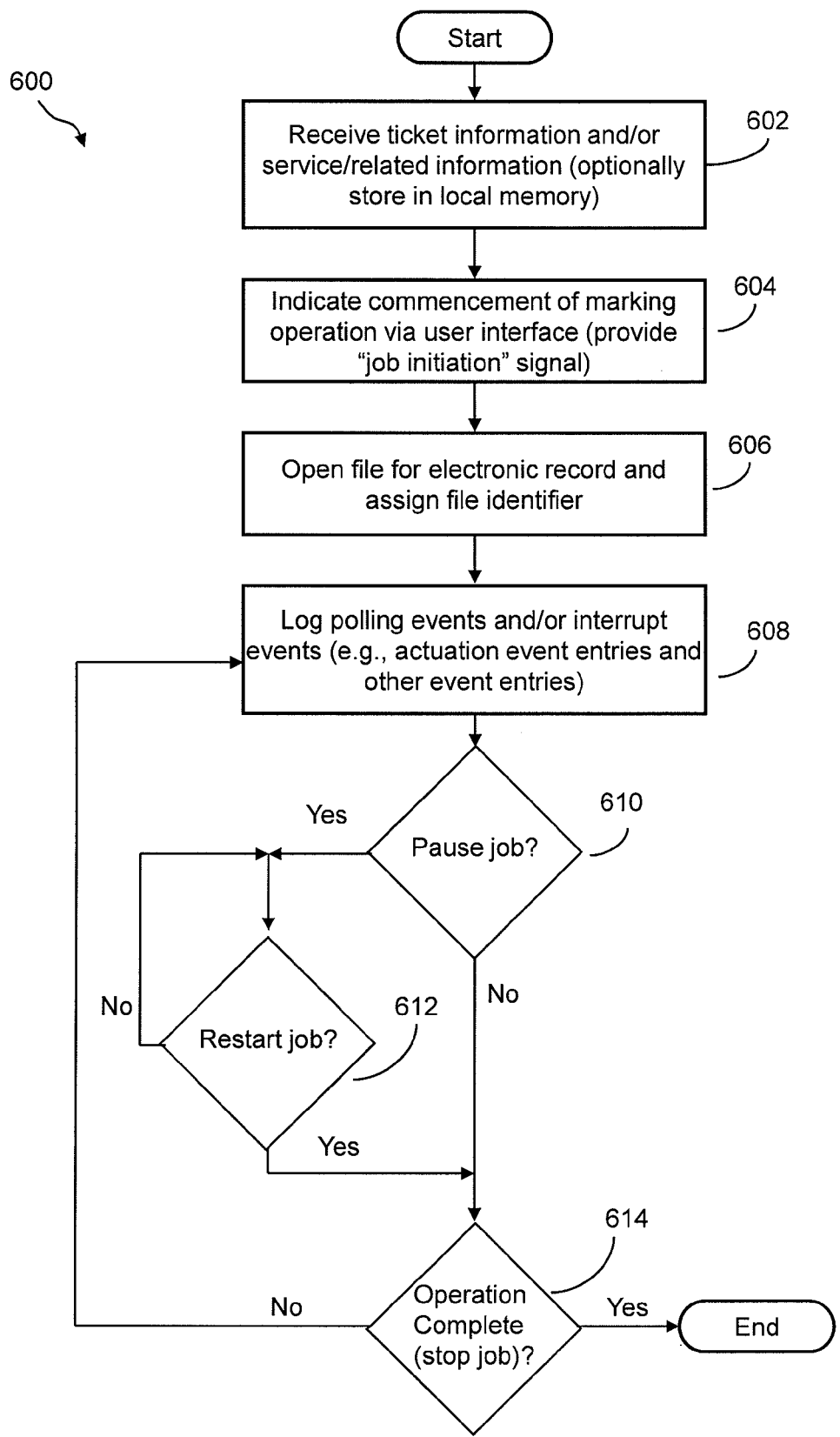
FIG. 9 is a flow diagram of an exemplary method for collecting marking information for generation of an electronic record, according to one embodiment of the present invention.

FIG. 9 is a flow diagram of an exemplary process 600 for collecting marking information during operation of a marking device 110 and generating an electronic record, according to one embodiment of the present invention. It should be appreciated that as various marking information is collected and logged in the process 600, such marking information also may be transmitted from the marking device (e.g., to remote computer 150) to facilitate essentially real-time monitoring of the marking operation, and/or remote generation of an electronic record of the marking operation.

In block 602 of the process 600 shown in FIG. 9, ticket information and/or service-related information may be received (e.g., via one or more of the user interface 126 and the communication interface 124 of marking device 110) and this information optionally may be stored in whole or in part in local memory 122 of the marking device. The ticket information and/or service-related information may be received electronically in any of a variety of formats, and the processor may be configured to appropriately parse the information for subsequent entry into an electronic record.

In some embodiments, the ticket information may be received as part of an electronic locate request ticket, and individual respective pieces of ticket information (e.g., ticket number, work site address information, requesting party, etc.) may be extracted or derived from the electronic locate request ticket. In other embodiments, various aspects of ticket information may be input by a user/technician via the user interface.

For example, in block 602 the process 600 may provide for the entry of any of a variety of text information for inclusion in an electronic record and/or selection by a user/technician (e.g., via the user interface) of various information to be included in an electronic record as part of ticket information (and/or service-related information). One example of such information may relate to a ground type in and around the work site/dig area at which marking material is dispensed as part of the marking operation. In some implementations, a text description of the ground type may be entered and stored as part of the electronic record. In another exemplary implementation, the processor 118 controls the user interface 126 (including display 146) so as to display information to the technician to facilitate such a selection. In particular, a ground type selection submenu may be displayed, including one or more categories of ground types displayed in any of a variety of manners (e.g., as a list of text entries, an arrangement of icons symbolizing respective categories, labeled symbols, etc.). Examples of ground type categories that may be displayed in such a submenu include, but are not limited to: 1) "Pavement;" 2) "Grass;" 3) "Rough/Rocky;" 4) "Dirt;" 5) "Gravel/Sand;" and 6) "Other." More generally, any number and variety of ground type categories may be presented to the technician via the user interface in alphabetically ordered lists, numerically ordered lists, or other types of ordered text-based or symbolic arrangements, for example. In yet another exemplary implementation, the user interface may include a microphone and the processor may be configured to accept and process audible commands, such that a ground type category may be accomplished via voice-activated commands by simply speaking into the microphone.

Similarly, with respect to service-related information, a user/technician may manually enter some aspects of this information via the user interface/display, while other aspects may already be available in other memory locations (e.g., the marking device ID or serial number, a technician ID to which the marking device is assigned or checked-out, etc.) and/or may be received electronically.

While block 602 is illustrated as one element of the process 600, it should be appreciated that respective pieces of information received as input in block 602 may be received at different times and via different interfaces/sources, and thus may occur at different points in the process 600. It should also be appreciated that block 602 is an optional step in the process 600, and that more generally a process for collecting marking information to generate an electronic record need not necessarily include collection of one or both of ticket information and service-related information.

In block 604, the locate technician utilizes the user interface 126 to indicate the initiation of a marking operation. For example, the technician may press a button, operate a joystick, or touch a touch screen display portion of a graphical user interface to commence a marking operation. In response, a "job initiation signal" is provided to the processor 118 (e.g., via a switch closure and a ground or DC level applied to an I/O pin of the processor, or by the user interface providing a signal to the processor) to initiate generation of an electronic record. Alternatively, a remote job initiation signal may be received by the processor via the communication interface from another device, such as the remote computer 150.

In response to the job initiation signal, in block 606 the processor opens a file in the memory 122 in which to store the electronic record 135, and assigns a file identifier to the opened file. In one example, the file identifier assigned to the opened file may be or include one or more of a job number ("job ID") or ticket number derived from the ticket information and/or the service-related information, an identifier for the marking device itself, and an identifier for a remote computer associated with the marking device (e.g., for either remote control operation of the device and/or data uploading/downloading). To this end, if ticket information and/or service-related information is not previously available (e.g., if no information is received in block 602), the technician optionally may be prompted to manually enter (e.g., via a "wizard" or sequence of dialogues germane to obtaining relevant information displayed on the display of the user interface) various elements of ticket information and/or service-related information from which a file identifier may be derived, or provide other information that may be used as a file identifier.

A file opened in block 606 for purposes of storing an electronic record may have any of a variety of formats and include any of a variety of data structures. In one embodiment, the processor initially opens up a "flat file" for collection and logging of marking information to facilitate generation of an electronic record. As known in the art, a flat file is a plain text or mixed text/binary file containing one entry (data record) per line, in which each entry may have multiple fields containing respective values, and wherein the respective values may be separated by delimiters (e.g., commas) or have a fixed length. In one exemplary implementation, the processor 118 logs data into a flat file opened for the electronic record as a succession of time stamped "event entries." Some event entries may be related specifically to actuation and/or logged in response to actuation of the marking device (e.g., the processor 118 receiving an actuation signal 121). Other event entries may be more generally related in some manner to overall operation of the marking device or the marking operation itself, but not necessarily associated with one or more particular actuations (e.g., start/pause/stop marking operation, power/battery status, communication link/network connection status, etc.), and these other event entries may be logged at virtually any time (in some cases irrespective of one or more actuations).

Accordingly, it should be appreciated that in one aspect of this embodiment a flat file for an electronic record may contain a succession of time stamped event entries on respective lines, in which one or more event entries may have multiple delimited fields/values and at least some of the event entries relate to actuation of the marking device. In another aspect, one or more fields/values in a given event entry may specifically indicate in some manner whether or not the event is associated with an actuation of the marking device. In general, an "actuation event entry" constitutes an entry in a file for an electronic record that is in some manner specifically related to, and/or logged in response to or during, actuation of the marking device, and multiple actuation event entries for a given actuation constitute an actuation data set for that actuation. Again, it should be appreciated that a file for an electronic record may include one or more other event entries that may not be particularly associated with an actuation.

In other embodiments, the file for an electronic record may or may not be a flat file, and event entries associated with actuations (actuation event entries) may be somehow identified and differentiated from other event entries that are not associated with an actuation. For example, a file for an electronic record may include a particular data structure or format that segregates or separates in some manner event entries associated with successive actuations from those event entries that are not particularly associated with actuations (and/or may be common to multiple actuations or a group of actuations). In yet other embodiments, as discussed below, marking information may be initially collected and logged in a first file for an electronic record in a first format (e.g., a flat file including a succession of time-stamped event entries as "raw data" for the marking operation) that may be stored and/or transmitted for any of a variety of purposes, and then reformatted and/or reorganized in some manner in one or more subsequent files (e.g., a file having a particular data structure that segregates/separates actuation-related information from other information in different fields/elements of a data structure) for archiving and/or transmission to one or more other devices/processors.

Once a file for an electronic record is opened in block 606, in block 608 the processor can begin collecting and logging various marking information, i.e., logging in the electronic record (and/or transmitting via the communication interface) actuation event entries and/or other event entries. In one exemplary implementation, the processor may be programmed so as to poll one or more input devices and/or other components of the marking device to receive information, either once or multiple times/periodically following the job initiation signal, and log responses to these polls ("polling events") as event entries with associated time stamps. Examples of entries corresponding to polling events that may be logged into the file for the electronic record (and/or transmitted) include, but are not limited to, one or more "power status event entries" including power information associated with the power source 114, one or more "ticket information event entries" including ticket information (e.g., as received from the user interface or the communication interface, retrieved from local memory, etc.), one or more "service-related information event entries" including the service-related information (e.g., as received from the user interface or the communication interface, retrieved from local memory, etc.), and one or more "communication interface event entries" including status information regarding operation of the communication interface (e.g., network communication available/unavailable).

Additionally or alternatively, the processor may be programmed so as to respond to one or more signals designated as "interrupt events" from one or more components of the marking device. Such interrupt events cause logging of information in the electronic record (and/or transmission of information) upon/following the processor detecting the corresponding signal(s). For example, the "job initiation signal" itself may constitute an interrupt event, in response to which the processor 118 not only opens a file for the electronic record but, once the file is opened, the processor may request timing information from the timing system 128 and log into the electronic record a "start job event entry" including a job initiation time stamp associated with receipt of the job initiation signal.

In a similar manner, following commencement of a marking operation, the locate technician may utilize the user interface 126 (e.g., press a button, operate a joy-stick, or touch a touch screen display portion of a graphical user interface) to pause, restart, and/or indicate completion of the marking operation, and these actions may constitute interrupt events. For example, as indicated in block 610 of FIG. 9, a "pause signal" may be provided by the user interface to the processor, in response to which the processor may request timing information from the timing system and log a "pause job event entry" including a pause job time stamp associated with the at least one pause signal. When the technician is ready to continue, as shown in block 612 of FIG. 9 the technician may indicate this via the user interface and a "restart job event entry" similarly may be logged. When the marking operation is deemed by the technician to be completed, as noted in block 614 of FIG. 9 the technician may utilize the user interface so as to provide a "stop signal" to the processor, in response to which the processor may request timing information from the timing system and log a "stop job event entry" including a stop job time stamp associated with the stop signal.

Additionally, the locate technician may utilize the user interface 126 to denote the beginning and end of a marking operation for a particular facility type, and these actions may constitute interrupt events. For example, upon beginning a marking operation for a given facility type, the technician may select "line start" from the user interface, and a corresponding "line start signal" may be provided by the user interface to the processor, in response to which the processor may request timing information from the timing system and log a "line start event entry." Similarly, when the technician wishes to indicate completion of the marking operation for a given facility type, the technician may select "line stop" from the user interface, and a corresponding "line stop signal" may be provided by the user interface to the processor, in response to which the processor may request timing information from the timing system and log a "line stop even entry."

While various events are noted above as examples of "polling events" as opposed to "interrupt events," it should be appreciated that the invention is not limited in these respects, and that the marking data algorithm 134 executed by the processor 118 may be configured in any of a variety manners to designate various functions performed by and/or information provided by various components of the marking device as polling events or interrupt events. For example, the power source 114 may be configured to provide a "low battery signal" to the processor, which when present is treated by the processor as an interrupt event that may be logged by the processor and/or that may cause the processor to take some particular action (e.g., provide an audible/visible alert; disable logging of further data, etc.). In one aspect, absent the "low battery signal," the processor may request status information from the power source once or occasionally as a polling event. Similarly, the communication interface 124 may be configured to provide a "no network connection available signal" to the processor, which when present is treated by the processor as an interrupt event (that is logged and/or causes the processor to take some action), and when not present, the processor may poll the communication interface to request status information as a polling event.

Another example of an interrupt event is given by the actuation signal 121 provided by the actuation system 120 upon actuation of the actuator 142 (i.e., a signal change-of-state indicating a transition from a non-actuated state to an actuated state), in response to which the processor logs one or more actuation event entries in the electronic record. More specifically, in one implementation, the receipt of a non-actuated to actuated transition state of the actuation signal 121 by the processor may cause an initial actuation event entry to be logged as a "start actuation event entry" having an associated time stamp (i.e., a start time for the corresponding actuation) and also cause the processor to subsequently poll one or more input devices for information during the corresponding actuation and until release of the actuator (i.e., subsequent change of state of the actuation signal 121). In this manner, an actuation data set for a given actuation may include multiple actuation event entries.

For example, during actuation of the actuator, the processor may poll the location tracking system 130 so as to receive geographic information, and in turn log one or more "geo-location data event entries" in the actuation data set for the corresponding actuation. As discussed above in connection with FIGS. 2 and 3, in one exemplary implementation the location tracking system is configured to provide geographic information at an information update rate of approximately 5 Hz, and the processor may log respective updates of geographic information provided by the location tracking system at this update rate during an actuation as multiple geo-location data event entries of the actuation data set. It should be appreciated, however, that methods and apparatus according to various embodiments of the present invention are not limited in this respect, and that other geographic information update rates may be employed in various implementations (e.g., update rates of up to approximately 100 Hz), based in part on the particular location tracking system employed. Furthermore, it should be appreciated that in some implementations the geographic information provided by the location tracking system 130 may include one or more longitude coordinates, latitude coordinates, and a corresponding geo-location data time stamp at which a given set of longitude/latitude coordinates are obtained by the location tracking system; accordingly, a given geo-location data event entry in an actuation data set may include a longitude coordinate, a latitude coordinate, and the corresponding geo-location data time stamp.

Similarly, in some implementations, pursuant to an interrupt provided by the actuation signal 121, the processor may subsequently poll one or more of the timing system 128 and the marking material detection mechanism 132 so as to receive timing information and/or marking material information during a corresponding actuation, and in turn log one or more of a "timing event entry," and a "marking material detection event entry" as part of the actuation data set. Any of a variety of marking material information as discussed above may be collected and logged during actuation in response to processor polling of the marking material detection mechanism (e.g., causing an RFID tag reader to read various information from an RFID tag affixed to the marking dispenser).

Additionally, in some implementations, pursuant to an interrupt provided by the actuation signal 121, the processor may subsequently poll one or more of the user interface 126, the communication interface 124, and the local memory 122 to retrieve ticket information and/or service-related information for logging into an actuation data set. As discussed above, in some implementations the receipt/retrieval of ticket information and/or service-related information may be treated as a polling event not necessarily associated with actuations, and this information need not be included in one or more actuation data sets. However, in other implementations it may be desirable to include at least some aspect of ticket information and/or service related information in each actuation data set, notwithstanding the possible redundancy of data content in respective actuation data sets (e.g., see Table 6, discussed further below in connection with FIG. 10).

Another example of an interrupt event is given by a change-of-state of the actuation signal 121 indicating a transition from the actuated state to the non-actuated state, i.e., release of the actuator 142. In response to this event, the processor may request information from the timing system 128 and log an "end actuation event entry" including an end time stamp.

Yet another type of interrupt event causing the processor to log one or more event entries may be provided by the marking material detection mechanism 132 in the form of a signal that indicates whether or not a marking dispenser is contained in or appropriately coupled to the marking device. To this end, as discussed above in connection with FIGS. 2 and 3, the marking material detection mechanism may include a toggle switch that provides a two-state signal to the processor (e.g., dispenser in/dispenser out) as an interrupt. Upon receiving an interrupt indicating a transition from "dispenser out" to "dispenser in," the processor may collect and log this event as a "dispenser in event entry" with a corresponding time stamp, and then request other marking material information relating to the marking material in the dispenser from the marking material detection mechanism. In view of the foregoing, it should be appreciated that in some embodiments, marking material information may not necessarily be collected during one or more actuations of the marking device, but alternatively may be collected only upon a "dispenser in" event being detected. Upon detection of an interrupt event indicating a transition from "dispenser in" to "dispenser out," the processor similarly may collect and log this event as a "dispenser out event entry."

In yet another embodiment, the processor 118, executing marking data algorithm 134, may be configured to repeatedly/regularly poll all available input devices and other components of the marking device (e.g., in a predetermined order, in response to receipt of the job initiation signal) and generate an essentially continuous stream of data packets including marking information received pursuant to these polling events. In one aspect of this embodiment, each data packet of marking information may include a header, one or more flag fields, and one or more information payload fields. For example, in one implementation, the header for each packet may include one or more of a job ID (e.g., ticket identifier), technician ID, device ID (e.g., serial number), packet type ID, and/or a time stamp corresponding to logging of information/generation of the packet. Each packet also may include one or more payload fields for carrying information provided by the polled device(s) or components, and one or more flag fields that are set (or reset) upon occurrence of one or more predetermined interrupt events (e.g., pull/depress actuator, release actuator, marking dispenser in, marking dispenser out, low power, communication link fail, etc.). In this manner, a continuous stream of data may be provided as an output by the processor, in which certain interrupt events, such as an actuation and/or release of the actuator, "tag" certain data packets via an interrupt flag. In yet other aspects of this embodiment, all data packets thusly generated may be stored in the file opened for the electronic record and/or transmitted from the marking device in essentially real time; alternatively, only certain data packets with one or more predetermined flags set may be stored and/or transmitted.

Table 1 below illustrates an example of a portion of the contents of a relatively simple flat file for an electronic record that may be generated by the process 600 of FIG. 9:

TABLE 1

| TIME | LAT | LONG | EVENT | MARKER COLOR |
|---|---|---|---|---|
| 1:23:00.00 PM | −80.3851 | 25.5604 | Spraying | ORANGE |
| 1:23:00.20 PM | −80.3851 | 25.5604 | Spraying | ORANGE |

TABLE 1-continued

| TIME | LAT | LONG | EVENT | MARKER COLOR |
|---|---|---|---|---|
| 1:23:00.40 PM | −80.3851 | 25.5604 | Spraying | ORANGE |
| 1:23:00.60 PM | −80.3851 | 25.5604 | Spraying | ORANGE |
| 1:23:00.80 PM | −80.3851 | 25.5604 | Spraying | ORANGE |
| 1:23:01.00 PM | −80.3851 | 25.5604 | Spraying | ORANGE |
| 1:23:01.20 PM | −80.3851 | 25.5604 | Spraying | ORANGE |
| 1:23:01.40 PM | −80.3851 | 25.56039 | Spraying | ORANGE |
| 1:23:01.60 PM | −80.3851 | 25.56039 | Spraying | ORANGE |
| 1:23:01.80 PM | −80.3851 | 25.5604 | Spraying | ORANGE |
| 1:23:02.00 PM | −80.3851 | 25.5604 | Spraying | ORANGE |

The portion of the file shown in Table 1 corresponds to multiple actuation event entries (one entry per line) collected and logged during an actuation of the marking device. Each entry has a time stamp (e.g., entries are logged at a rate of approximately five events per second) and further includes multiple fields having respective values (e.g., as comma separated values) for latitude and longitude coordinates received from the location tracking device, an event indicator indicating that the device is "Spraying" (the actuator is actuated), and a color of the marking material being dispensed.

As noted above, it should be appreciated that the portion of the file shown in Table 1 is provided primarily for purposes of illustration, and that the format and/or content for respective event entries and the file itself for an electronic record generated by and/or based on the information collection process discussed above in connection with FIG. 9 may have any of a variety of different formats and/or content.

To this point, Tables 2 through 5 below provide examples of various events for which event entries may be logged in a file for an electronic record and/or transmitted by the marking device, exemplary formats for these event entries, and exemplary file formats for files having multiple such entries, according to another embodiment of the present invention.

Job Started/Paused/Restarted/Completed Events: This event entry format provides information about when a marking operation ("job") was started and completed in addition to capturing details about if and when the job was paused and restarted.

TABLE 2

| Format | INFO+JOBS: (DATE) (TIME) (WAND_ID) (JOB_ID) (STATE) <CR><LF> |
|---|---|
| Examples | INFO+JOBS: DATE(2009-04-15) TIME(12:03:44) WAND(2334) JOB(4000) (STARTED) <CR> <LF> INFO+JOBS: DATE(2009-04-15) TIME(12:11:44) WAND(2334) JOB(4000) (PAUSED) <CR> <LF> INFO+JOBS: DATE(2009-04-15) TIME(12:51:44) WAND(2334) JOB(4000) (RESTARTED) <CR> <LF> INFO+JOBS: DATE(2009-04-15) TIME(13:09:44) WAND(2334) JOB(4000) (END) <CR> <LF> |

Actuation State Change Events: For purposes of this event format, the actuator is deemed to have three possible states, i.e., PRESSED, HELD and RELEASED. Marking information from one or more input devices/other components of the marking device is recorded with these events to provide information about the job in progress.

TABLE 3

| Format | INFO+ WPTR: (DATE) (TIME) (GPS data) (PAINT info) (TRIGGER SWITCH STATE) <CR><LF> |
|---|---|
| Examples | INFO+WPTR: DATE(2009-04-15) TIME(12:04:44) GPS($GPGGA,120443,4807.038,N,01131.000,E,1,08, 0.9,545.4,M,46.9,M,,*47) CLR(RED) |

TABLE 3-continued

SWCH(PRESSED)<CR><LF>
INFO+WPTR: DATE(2009-04-15) TIME(12:04:45)
GPS($GPGGA,120445,4807.038,N,01131.000,E,1,08,
0.9,545.4,M,46.9,M,,*47) CLR(RED)
SWCH(HELD)<CR><LF>
INFO+WPTR: DATE(2009-04-15) TIME(12:04:46)
GPS($GPGGA,120446,4807.038,N,01131.000,E,1,08,
0.9,545.4,M,46.9,M,,*47) CLR(RED)
SWCH(RELEASED)<CR><LF>

Marking Device Status Events: The status event collects various marking information and/or information on operating characteristics of the device on a periodic basis while a job is in progress (e.g., pursuant to processor polls).

TABLE 4

| | |
|---|---|
| Format | INFO+STAT: (DATE) (TIME) (GPS data) (PAINT status) (MEMORY used in %) (BATTERY level) <CR><LF> |
| Examples | INFO+STAT: DATE(2009-04-15) TIME(12:04:00) GPS($GPGGA,120400,4807.038,N,01131.000,E,1,08, 0.9,545.4,M,46.9,M,,*47) CLR(RED) MEM(65) BAT(3)<CR><LF> |

Error Events: Should any input device or other component of the marking device encounter a significant error condition, this may be logged as an event. In some cases, the user/technician also may be notified of the error through the user interface 126 (visible alert on display, audible alarm/alert, etc.). Similar event formats may be adopted for warning alerts/events and informational alerts/events.

TABLE 5

| | |
|---|---|
| Format | INFO+ERR: (DATE) (TIME) (GPS data) (PAINT status) (MEMORY used in %) (BATTERY level) <CR><LF> |
| Examples | INFO+ERR: DATE(2009-04-15) TIME(12:04:00) GPS($GPGGA,120400,4807.038,N,01131.000,E,1,08, 0.9,545.4,M,46.9,M,,*47) CLR(RED) MEM(65) BAT(3)<CR><LF> |

With respect to file formats for electronic records including the event entries outlined above in Tables 2 through 5, two exemplary file formats, namely ASCII and XML, are provided below for purposes of illustration. In various implementations, a given marking device may be particularly configured to store and/or transmit electronic records and respective entries therein in either format (or other formats). With respect to identification of files/electronic records, a standard naming scheme/format may be adopted, for example, including an identifier for the remote computer with which the marking device may be communicating ("ServerID"), an identifier for the marking device itself ("WandID"), and an identifier for the marking operation/job ("JobID"), and having the format "ServerID_WandID_Job ID."

ASCII Data Format: This format allows low-level remote processing engines to quickly and easily receive, parse, and react to marking information logged and/or transmitted by the marking device. An example of an electronic record formatted in ASCII based on the event entries outlined in Tables 2 through 5 is as follows:

INFO+JOBS: DATE(2009-04-15) TIME(12:03:44) WAND(2334) JOB(4000) (STARTED) <CR> <LF>
INFO+STAT: DATE(2009-04-15) TIME(12:04:00)
GPS($GPGGA,120400,4807.038,N,01131.000,E,1,08,0.9,545.4,M,46.9,M,,*47 )
CLR(RED) MEM(65) BAT(3)<CR><LF>
INFO+WPTR: DATE(2009-04-15) TIME(12:04:44)
GPS($GPGGA,120443,4807.038,N,01131.000,E,1,08,0.9,545.4,M,46.9,M,,*47 )
CLR(RED) SWCH(PRESSED)<CR><LF>
INFO+WPTR: DATE(2009-04-15) TIME(12:04:45)
GPS($GPGGA,120445,4807.038,N,01131.000,E,1,08,0.9,545.4,M,46.9,M,,*47 )
CLR(RED) SWCH(HELD)<CR><LF>
INFO+WPTR: DATE(2009-04-15) TIME(12:04:46)
GPS($GPGGA,120446,4807.038,N,01131.000,E,1,08,0.9,545.4,M,46.9,M,,*47 )
CLR(RED) SWCH(RELEASED)<CR><LF>
INFO+STAT: DATE(2009-04-15) TIME(12:05:00)
GPS($GPGGA,120500,4807.038,N,01131.000,E,1,08,0.9,545.4,M,46.9,M,,*47 )
CLR(RED) BAT(3)<CR><LF>
INFO+JOBS: DATE(2009-04-15) TIME(12:10:03) WAND(2334) JOB(4000) (PAUSED)<CR> <LF>
INFO+JOBS: DATE(2009-04-15) TIME(13:01:43) WAND(2334) JOB(4000) (RESTARTED)<CR> <LF>
INFO+WPTR: DATE(2009-04-15) TIME(13:01:50)
GPS($GPGGA,130150,4807.038,N,01131.000,E,1,08,0.9,545.4,M,46.9,M,,*47 )
CLR(RED) SWCH(PRESSED)<CR><LF>
INFO+WPTR: DATE(2009-04-15) TIME(13:01:51)
GPS($GPGGA,130151,4807.038,N,01131.000,E,1,08,0.9,545.4,M,46.9,M,,*47 )
CLR(RED) SWCH(RELEASED)<CR><LF>
INFO+JOBS: DATE(2009-04-15) TIME(13:20:30) WAND(2334) JOB(4000) (END)<CR> <LF>

XML Data Format: This format allows transmission of self-describing data elements from the marking device, in some instances reducing processing errors and reducing the risks and effort involved in upgrades and data changes. An example of an electronic record formatted in XML based on the event entries outlined in Tables 2 through 5 is as follows:

```
<WAND ID=2334>
    <JOB ID=4000>
        <ACTIVITY>
            <DATE>2009-04-15</DATE>
            <TIME>12:03:44</TIME>
            <STATUS>Started</STATUS>
        </ACTIVITY>
        <ACTIVITY>
            <DATE>2009-04-15</DATE>
            <TIME>12:04:00</TIME>
            <GPS>($GPGGA, 120400,4807.038,N,01131.000,E,1,08,0.9,545.4,M,46.9,M,,*47</GPS>
            <PAINT>
                <COLOR>Red</COLOR>
                <VALID>True</VALID>
                <SN>2342343243355</SN>
            </PAINT>
            <SWITCH>Pressed</SWITCH>
        </ACTIVITY>
    </JOB>
</WAND>
```

Yet another alternative format for storing and organizing marking information in an electronic record of a marking operation, according to one embodiment of the invention, is shown in Table 6 below. By way of example, Table 6 shows the format and content of three actuation data sets of an electronic record of a marking operation for a given facility, in which each actuation data set includes information associated with multiple actuation event entries logged during a corresponding actuation and resulting locate mark (e.g., act-1, act-2, and act-3), as shown for example in FIG. 8. As discussed above, it should be appreciated that the format and content shown below in Table 6 may constitute an "original" electronic record generated by the processor pursuant to the process 600 shown in FIG. 9, or may be derived from raw data collected and logged pursuant to the process 600 (e.g., as a flat file, an ASCII formatted file, or an XML formatted file) and subsequently reorganized and particularly formatted.

TABLE 6

Example actuation data set for act-1

| | | |
|---|---|---|
| act-1 | Service provider ID | 0482 |
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration ($\Delta t$) | 00:00:00.9 |
| | T1 geo-location data | 2650.9348, N, 08003.5057, W |
| | $1^{st}$ interval location data | 2650.9353, N, 08003.5055, W |
| | $2^{nd}$ interval location data | 2650.9356, N, 08003.5055, W |
| | . | . |
| | . | . |
| | . | . |
| | Nth interval location data | 2650.9246, N, 08003.5240, W |
| | T2 geo-location data | 2650.9255, N, 08003.5236, W |
| | Product data | Color = Red, Brand = ABC, Type/ Batch = 224B-1 |
| | Ground Type | Grass |
| | Other info (text entry) | "thick and wet at time of marking" |
| | Locate request data | Requestor: XYZ Construction Company, Requested service address: 222 Main St, Orlando, FL |

Example actuation data set for act-2

| | | |
|---|---|---|
| act-2 | Service provider ID | 0482 |
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration ($\Delta t$) | 00:00:01.2 |
| | T1 geo-location data | 2650.9256, N, 08003.5234, W |
| | 1st interval location data | 2650.9256, N, 08003.5226, W |
| | $2^{nd}$ interval location data | 2650.9256, N, 08003.5217, W |
| | . | . |
| | . | . |
| | . | . |
| | Nth interval location data | 2650.9260, N, 08003.5199, W |
| | T2 geo-location data | 2650.9266, N, 08003.5196, W |
| | Product data | Color = Red, Brand = ABC, Type/ Batch = 224B-1 |
| | Ground Type | Grass |
| | Other info (text entry) | "thick and wet at time of marking" |
| | Locate request data | Requestor: XYZ Construction Company, Requested service address: 222 Main St, Orlando, FL |

Example actuation data set for act-3

| | | |
|---|---|---|
| act-3 | Service provider ID | 0482 |
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration ($\Delta t$) | 00:00:01.1 |
| | T1 geo-location data | 2650.9273, N, 08003.5193, W |
| | 1st interval location data | 2650.9281, N, 08003.5190, W |
| | $2^{nd}$ interval location data | 2650.9288, N, 08003.5188, W |
| | . | . |
| | . | . |
| | . | . |
| | Nth interval location data | 2650.9321, N, 08003.5177, W |
| | T2 geo-location data | 2650.9325, N, 08003.5176, W |
| | Product data | Color = Red, Brand = ABC, Type/ Batch = 224B-1 |
| | Ground Type | Grass |
| | Other info (text entry) | "thick and wet at time of marking" |
| | Locate request data | Requestor: XYZ Construction Company, Requested service address: 222 Main St, Orlando, FL |

In addition to the information shown in Table 6, a job ID or some other identifier for the electronic record as a whole (e.g., a ticket number), as well as a total number of actuations for a given marking operation (e.g., the total number of actuation data sets in a given electronic record in this embodiment), may be included in the electronic record.

With regard to color information that may be included in any of the event entries and electronic records discussed herein, Table 7 below shows an example of the correlation of marking material color to the type of facility to be marked.

TABLE 7

Correlation of color to facility type

| Marking material color | Facility Type |
|---|---|
| Red | Electric power lines, cables or conduits, and lighting cables |
| Yellow | Gas, oil, steam, petroleum, or other hazardous liquid or gaseous materials |
| Orange | Communications, cable television, alarm or signal lines, cables, or conduits |
| Blue | Water, irrigation, and slurry lines |
| Green | Sewers, storm sewer facilities, or other drain lines |
| White | Proposed excavation |
| Pink | Temporary survey markings |
| Purple | Reclaimed water, irrigation, and slurry lines |
| Black | Mark-out for errant lines |

Figure 10:
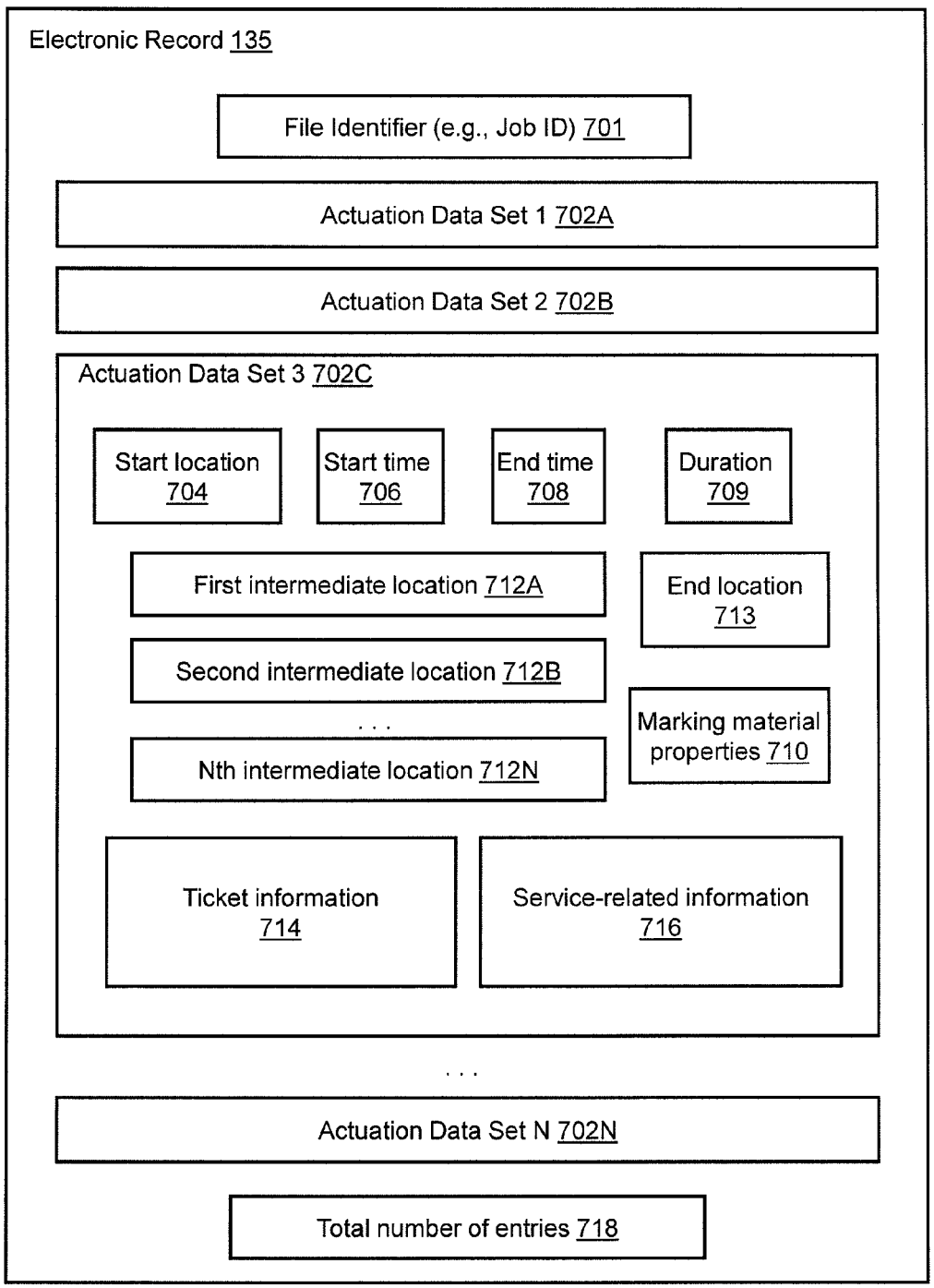
FIG. 10 is a block diagram of an exemplary data structure for an electronic record of a marking operation including information retrieved during one or more actuations of a marking device, according to one embodiment of the present invention.

FIG. 10 illustrates an exemplary data structure for an electronic record 135, according to another embodiment of the present invention, that may be generated by and/or based on information collected during the process 600 discussed above in connection with FIG. 9 and based on the organization of information shown in Table 6 above. As shown in FIG. 10, the record 135 includes a file identifier 701 (e.g., one or more of Job ID, WandID, ServerID, etc.) and a plurality of actuation data sets 1 through N (with reference numbers 702A, 702B, 702C ... 702N), wherein each actuation data set is associated with a corresponding actuation of a marking device. For purposes of the following discussion, FIG. 10 shows additional details of the data structure for actuation data set 3 702C, showing several fields in which data (e.g., actuation event entries) may be entered to constitute the actuation data set. While only the exemplary details of the data structure of actuation data set 3 are shown in the electronic record 135 of FIG. 10, it should be appreciated that multiple actuation data sets of the electronic record 135 may have the same data structure as that shown for actuation data set 3 in FIG. 10.

The data structure of the actuation data set 3 702C of the electronic record 135 shown in FIG. 10 includes a start location field 704 (corresponding to T1 geo-location data shown in Table 2), an end location field 713 (corresponding to T2 geo-location data shown in Table 2), a start time field 706 (corresponding to T1 timestamp data shown in Table 2), an end time field 708 (corresponding to T2 timestamp data shown in Table 2) and a duration field 709 (corresponding to the duration Δt shown in Table 2). Additionally, the data structure for entry 3 702C includes one or more fields 712A, 712B, ... 712N for intermediate location data (corresponding to $1^{st}$ interval location data, $2^{nd}$ interval location data ... Nth interval location data shown in Table 2). Finally, the data structure for the entry 3 702C may include one or more ticket information fields 714 (e.g., corresponding to Locate request data in Table 2) and one or more service-related information fields 716 (e.g., corresponding to Service provider ID, User ID, and Device ID in Table 2).

In addition to one or more actuation data sets corresponding to actuations of a marking device, the electronic record 135 shown in FIG. 10 may include one or more additional elements. For example, FIG. 10 shows an additional element 718 of the electronic record to store the total number of entries in the record. Furthermore, according to another embodiment, various other information that may be common to multiple (or all) actuation data sets of a given electronic record may be stored in one or more additional elements of the electronic record that are not contained within one or more of the actuation data sets themselves. For example, in one alternative implementation, one or more of the ticket information field 714, the service-related information field 716, and the marking material properties field 710, which are shown as part of the data structure for a given actuation data set of the electronic record, may instead be elements of the electronic record that are not included within any one actuation data set (e.g., the information contained in one or more of the ticket information field and the service-related information field may be common to all actuation data sets of a given electronic record).

In yet another embodiment of the present invention, the marking device 110 shown in FIGS. 2 and 3 may be configured (e.g., via particular instructions included in the marking data algorithm 134 executing on the processor 118, and/or various hardware modifications) to operate in multiple different modes so as to collect various information relating not only to a marking operation itself (marking information), but additionally (or alternatively) various information relating to the work site/dig area in which the marking operation is performed. For example, in one implementation, the marking device may be configured to operate in a first "marking mode" which essentially follows various aspects of the process outlined in FIG. 9, and also operate in a second "landmark identification mode" (or more simply "landmark mode"), in which the marking device acquires information relating to one or more environmental landmarks that may be germane to the marking operation (e.g., in and around the work site/dig area and/or generally in the vicinity of the marking operation).

More specifically, in a "marking mode," marking material may be dispensed with respective actuations of the marking device and various information transmitted and/or stored in an electronic record attendant to this process, as discussed above. Alternatively, in a "landmark mode," marking material is not necessarily dispensed with an actuation of the marking device (and in some instances the dispensing of marking material is specifically precluded); instead, a technician positions the marking device proximate to an environmental landmark of interest and, upon actuation, the marking device collects various information about the landmark (hereafter referred to as "landmark information"), which information may include, but is not limited to, geo-location data of an environmental landmark, type of environmental landmark, and a time stamp for any acquired information relating to an environmental landmark.

Figure 11A:
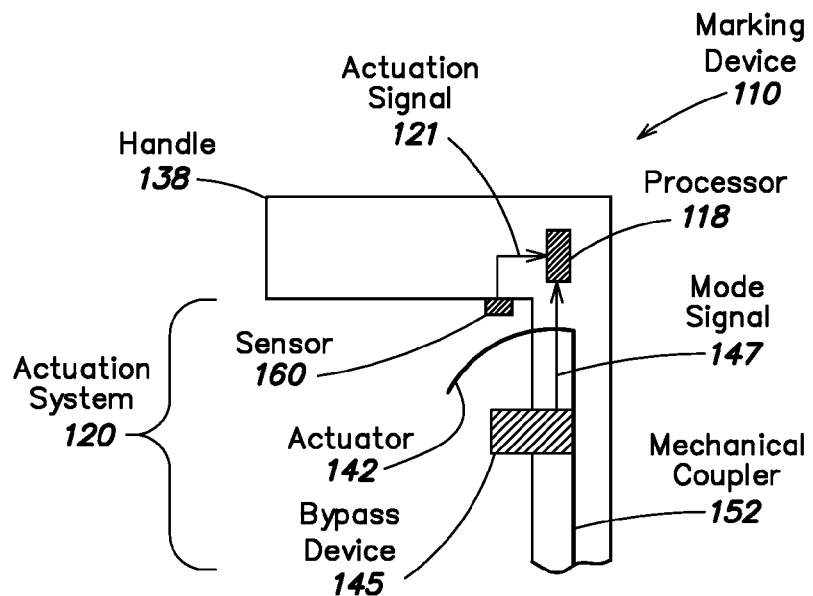
FIGS. 11A and 11B conceptually illustrate a portion of an actuation system of a marking device including a mechanical coupler, in which the marking device has been modified to accommodate a landmark mode, according to one embodiment of the present invention.
Figure 11B:
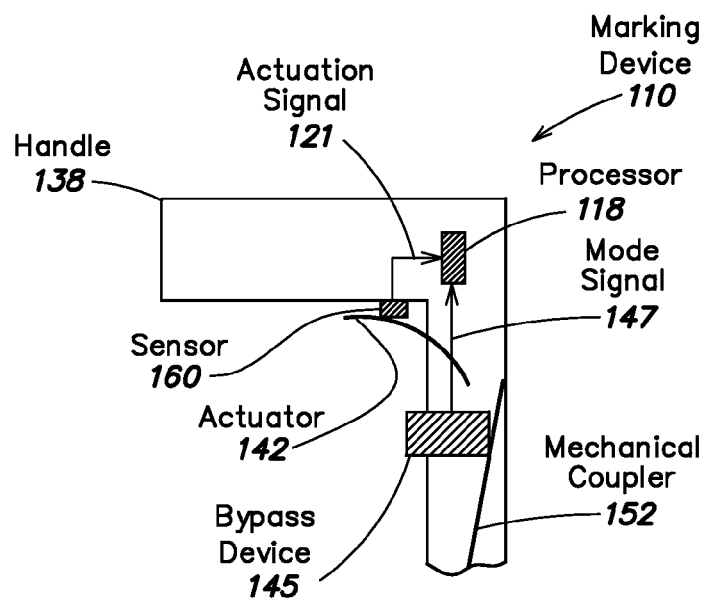

FIGS. 11A and 11B are similar to FIGS. 4A and 4B, and conceptually illustrate a portion of an actuation system 120 including a mechanical coupler 152, in which the marking device 110 has been modified to include a mode selector device so as to accommodate a landmark mode, according to one embodiment of the present invention. In a manner similar to that shown in FIGS. 4A and 4B, FIG. 11A shows the actuator 142 in an un-actuated state, whereas FIG. 11B shows the actuator 142 in an actuated state. In the embodiment of FIGS. 11A and 11B, the modifications are such that, in the landmark mode, the marking device is precluded from dispensing markers or marking material, even though the actuator 142 may be actuated by a user.

More specifically, as shown in FIGS. 11A and 11B, in this embodiment the marking device 110 further includes a mode selector device in the form of a bypass device 145 that is operated so as to impact and deflect the mechanical coupler 152 of the actuation system 120, such that the mechanical coupler 152 fails to cause the dispensing of a marking material upon actuation of the actuator 142. In FIG. 11A, the bypass device is shown in a first state (e.g., released) which allows the marking device to operate in marking mode as described above (i.e., the mechanical coupler is allowed to be displaced essentially vertically with actuation of the actuator 142 and thereby dispense markers). In FIG. 11B, the bypass device is shown in a second state (e.g., depressed) which allows the marking device to operate in landmark mode; in particular, the mechanical coupler 152 is deflected by the bypass device such that upon actuation of the actuator 142, the mechanical coupler 152 is not displaced vertically. In one example, with reference again to FIGS. 1C and 11B, when the mechanical coupler 152 is deflected by the bypass device 145, actuations of the actuator 142 do not effect full essentially up/down vertical movement of the mechanical coupler 152; as a result, the mechanical coupler fails to displace the actuation mechanism, and no pressure is applied to the spray nozzle of a paint dispenser (or dispensing mechanism of other types of marker dispensers). At the same time, however, actuation of the actuator 142 nonetheless provides an actuation signal 121 to the processor 118 (which may provide for logging of an actuation event entry as discussed above).

In various implementations, the bypass device 145 may be a locking and/or spring-loaded switching device (e.g., a press/release locking thumb switch) appropriately positioned along the housing of the marking device (e.g., near or on the handle), wherein the bypass device provides for both deflection of the mechanical coupler as well as opening/closure of electrical contacts so as to provide a mode signal 147 to the processor 118. For example, as shown in FIG. 11A, the first state (released) of the bypass device 145 may include an open contact state and no deflection of the mechanical coupler, whereas the second state shown in FIG. 11B (depressed) may include a closed contact state (e.g., in which the mode signal 147 is provided to the processor 118 as an interrupt event to indicate "landmark mode") when the bypass device deflects the mechanical coupler 152.

In response to the mode signal 147 indicating landmark mode, the processor 118 may request timing information from the timing system and log into an electronic record a "landmark mode event entry" including a landmark mode time stamp associated with the landmark mode signal. Additionally, or alternatively, the processor may respond to the landmark mode signal by taking one or more other actions pursuant to execution of a portion of the marking data algorithm 134 including particular instructions to implement the landmark mode, such as providing for the selection of landmark categories and/or types (via the user interface 126 and menus provided on the display 146), and logging actuation event entries in an electronic record as "landmark event entries." Further details of landmark mode operation of the marking device are discussed below in connection with FIG. 12.

In another exemplary implementation, rather than employing the bypass device 145 shown in FIGS. 11A and 11B as a mode selector device, a marking device configured to implement a landmark mode in which no marker or marking material is dispensed may be modified to include an actuator locking device as a mode selector device to prevent operation of the actuator 142. In essence, such a device would function in a manner similar to a "trigger lock." Like the bypass device, the actuator locking device or "trigger lock" may not only mechanically impede operation of the actuator, but also include electrical switch contacts (opened/closed) so as to provide a mode signal to the processor to indicate a landmark mode when the actuator locking device is engaged to impede actuation. Because such an actuator locking device impedes operation of the actuator, the actuator itself cannot be employed to provide an actuation signal 121 to the processor to facilitate the logging into an electronic record of actuation event entries as "landmark event entries." Accordingly, in implementations involving an actuator locking device, another aspect of the user interface (e.g., a button, switch, portion of the touch screen display, microphone to provide for voice-activation, etc.) is employed to provide a signal to the processor 118 to facilitate logging of an event (e.g., a "landmark event") by the technician. Further details of logging of landmark events are discussed below in connection with FIG. 12.

Yet another exemplary implementation of a marking device modified to operate in landmark mode is based on the general implementation of an actuation system 120 shown in FIG. 5, in which the landmark mode is selected via the user interface 126 and/or display 146 (e.g., menu-driven GUI) rather than via a bypass device or actuator locking device; i.e., some functionality of the user interface itself provides for a mode selector device. With reference again to FIG. 5, dispensing of marking material in this implementation is controlled by a link transmitter 168. As discussed above in connection with FIG. 5, the link transmitter 168 may be responsive to the actuation signal 121 provided by sensor 160 with operation of the actuator 142, for example, or alternatively responsive to a signal provided by the processor 118 (such that dispensing of marking material may in part be under the control of the processor 118 executing particular instructions for this purpose). Accordingly, in this implementation, when a landmark mode is selected via the user interface 126, the marking device may be configured to either dispense marking material (by not impeding any control signals to the link transmitter 168) (e.g., so as to form one or more "landmark locate marks" on or near a target environmental landmark), or not to dispense marking material (by impeding control signals to the link transmitter 168 or otherwise controlling the link transmitter to not dispense marking material). In either case, the actuation signal 121 output by sensor 160 may nonetheless be provided to the processor 118 so as to facilitate logging of an actuation event entry upon actuation of the actuator 142, which in landmark mode may be designated as a "landmark event entry," as discussed further below in connection with FIG. 12.

Figure 12:
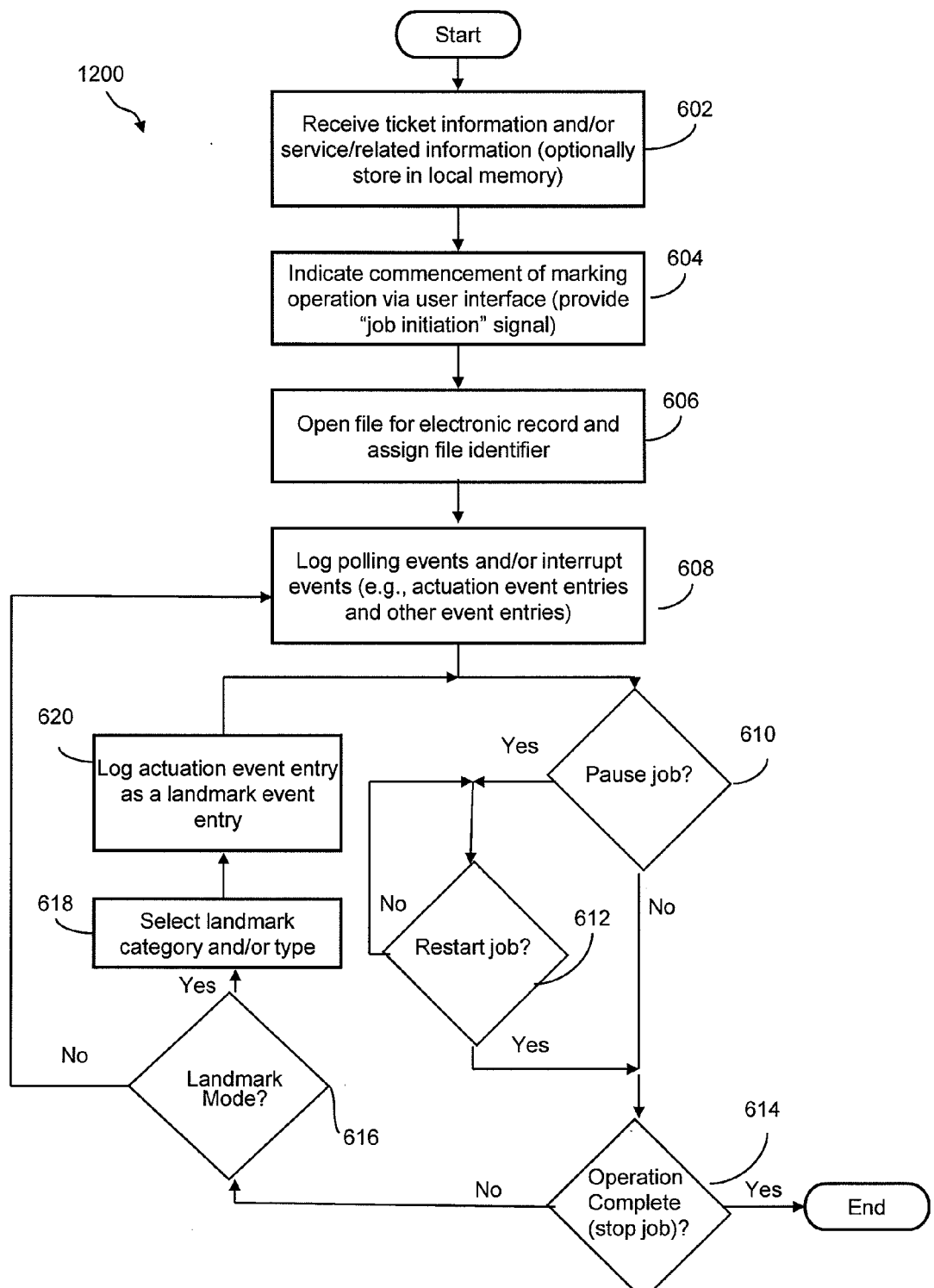
FIG. 12 is a flow diagram of an exemplary method for operating a marking device having a marking mode and a landmark mode so as to collect marking information and/or environmental landmark information, and generate an electronic record of such information, according to one embodiment of the present invention.

FIG. 12 is a flow diagram of an exemplary process 1200, according to one embodiment of the present invention, for operating a marking device having a marking mode and a landmark mode so as to collect marking information and/or environmental landmark information during operation of the marking device, and generate an electronic record of such information. Several aspects of the process 1200 shown in FIG. 12 are substantially similar or identical to those discussed above in connection with FIG. 9; in particular, blocks 602 through 614 are the same in both FIGS. 9 and 12, and the blocks 616, 618, and 620 in FIG. 12 are additional aspects of the process 1200.

In the process 1200 outlined in FIG. 12, following commencement of a marking operation the locate technician may utilize the user interface 126 (e.g., press a button, operate a joy-stick, touch a touch screen display portion of a graphical user interface, speak into a microphone to provide a voice-activated command, etc.) to not only pause, restart, and/or indicate completion of the marking operation, but further to select a landmark mode of operation for the marking device. As noted above in the discussion of FIG. 9, any one or more of these actions may constitute interrupt events. For example, as indicated in block 616 of FIG. 12, if a technician selects "landmark mode" via the user interface, the user interface may provide a "landmark mode signal" to the processor. In response to this signal, the processor may request timing information from the timing system and log a "landmark mode event entry" including a landmark mode time stamp associated with the landmark mode signal. Additionally, or alternatively, the processor may respond to the landmark mode signal by taking one or more other actions pursuant to execution of a portion of the marking data algorithm 134 including particular instructions to implement the landmark mode (as discussed above, the landmark mode may be entered in alternative implementations via a mode signal provided to the processor 118 by a bypass device or an actuator locking device serving as a mode selector device).

Table 8 below provides an example of content and format for a mode select event entry that may be logged in a file for an electronic record and/or transmitted by the marking device. The example mode select event entry shown below in Table 8 follows a similar format to that used for the event entry examples provided in Tables 2-5 above.

TABLE 8

| | |
|---|---|
| Format | INFO+MODE: (DATE) (TIME) (WAND_ID) (JOB_ID) (MODE) <CR><LF> |
| Examples | INFO+MODE: DATE(2009-04-15) TIME(12:03:44) WAND(2334) JOB(4000) (LANDMARK) <CR> <LF> |

In the process outlined in FIG. 12, subsequent to selection of the landmark mode, as noted in block 618 the process may provide for the selection of a particular category and/or type of landmark for which information is to be collected. To this end, in one implementation the processor 118 controls the user interface 126 (including display 146) so as to display information to the technician to facilitate such a selection. In particular, a landmark selection submenu may be displayed, including one or more categories of landmarks displayed in any of a variety of manners (e.g., as a list of text entries, an arrangement of icons symbolizing respective categories, labeled symbols, etc.). Examples of landmark categories that may be displayed in such a submenu include, but are not limited to: 1) "Natural Gas;" 2) "Water/Sewer;" 3) "Power Line;" 4) "Phone Line;" 5) "CATV Line;" and 6) "Other."

Upon selection via the user interface of one of the landmark categories displayed on the submenu, the processor may control the user interface so as to display yet another submenu indicating various types of landmarks that fall within the selected category, so as to facilitate selection of a particular type of landmark for which information is to be collected. Examples of types of landmarks that may be displayed and available for selection via the user interface, for each of the above identified categories, include, but are not limited to:

Natural Gas: 1) Service Meter; 2) Manifold; 3) Test Station; 4) Regulator Station; 5) Vent/Vent stack; 6) Valve; 7) Trace Wire; 8) Anode; 9) Branch Service; 10) Capped Service; 11) Compressor Station; 12) Farm Tap; 13) Service Regulator; 14) Service Line; 15) Service Riser; 16) Shut Off Valve; 17) Tee; 18) Valve Box; 19) Transmission Pipeline; 20) Main/Distribution Main; 21) Offset; 22) Low Pressure; 23) Medium Pressure; 24) High Pressure Water/Sewer: 1) Transmission Main; 2) Water Main; 3) Manhole; 4) Valve; 5) Clean out; 6) Sewer Lateral; 7) Water Meter; 8) Storm Sewer 9) Sanitary Sewer; 10) Pump Station; 11) Tap; 12) Faucet; 13) Fire Hydrant; 14) Tracer Wire Power Line: 1) Pole; 2) Anchor; 3) Transformer; 4) Manhole; 5) Handhole; 6) Street light; 7) Electrical Riser; 8) Primary; 9) Secondary; 10) Switch; 11) Fused Switch; 12) Circuit Breaker; 13) Duct; 14) Power Plant; 15) Transmission Substation; 16) Power Substation; 17) Service Line; 18) Meter; 19) Pedestal; 20) Switch Gear; 21) Switch Cabinet; 22) Buried Transformer; 23) Riser; 24) Red Top Tracer Phone Line: 1) Pole; 2) Anchor; 3) Manhole; 4) Handhole; 5) Subscriber Line Carrier; 6) Digital Loop Carrier; 7) Remote Terminal; 8) Cross Box; 9) Continual environment Vault; 10) Fiber Optics; 11) Encapsulated Plant; 12) Building Terminal; 13) Terminal; 14) Aerial; 15) Buried; 16) Underground; 17) Duct Run; 18) Central Office; 19) Buried Joint; 20) Splice CATV Line: 1) Pole; 2) Anchor; 3) Headend; 4) Manhole; 5) Handhole; 6) Transmitter; 7) Fiber Transmitter; 8) Receiver; 9) Fiber Receiver; 10) HUB Location; 11) Power Supply/Inserter; 12) Fiber Node; 13) Amplifier; 14) Ped; 15) Dog House; 16) Subscriber Service Line; 17) Trunk Station; 18) Trunk Line Amplifier; 19) AC Power Supply Pedestal Other: various natural, architectural, or infrastructure-related landmarks, such as buildings, curbs, "tagged" curbs (intentionally marked curbs that are likely to survive excavation, to serve as points of reference to validate marking operations), streets, driveways, property boundaries, trees and other landscape elements, termination points of abandoned facilities, etc.

While the foregoing discussion of landmark categories and types provides one construct in which a wide variety of landmarks are made available for selection by the technician, it should be appreciated that in other implementations, options for landmark selection may be presented in different manners. For example, a more succinct list of landmark types may be presented to the technician to facilitate easy selection (e.g., a more limited set of about a dozen more common landmark types that might be encountered in the field, such as "telephone pole," "fire hydrant," "meter," "manhole," "curb," etc.). More generally, any number and variety of landmark types may be presented to the technician via the user interface in alphabetically ordered lists, numerically ordered lists, or other types of ordered text-based or symbolic arrangements, for example.

In another exemplary implementation, the categories and/or types of landmarks made available for selection via the user interface may be based at least in part on a type of facility being marked when the marking device was in a marking mode prior to selection of the landmark mode. For example, consider a technician using the marking device in the marking mode and in the process of marking a power line. In one implementation, upon switching to landmark mode, the user is first presented with selection options for landmark category and/or type that are more closely related to a power line (e.g., a more limited subset of option types including "pole," "transformer," "pedestal," etc.). In one aspect, the technician may nonetheless still have the option to select other categories and/or types of landmarks, but as a default the technician is first presented with options related to the type of facility last being marked. In another aspect, the selection options for landmark category and/or type may be specifically and intentionally limited to those options that are most germane to the type of facility last being marked in the previous marking mode (i.e., immediately prior to entry into the landmark mode).

In yet another exemplary implementation, the user interface may include a microphone and the processor may be configured to accept and process audible commands, such that landmark category and/or type selection may be accomplished via voice-activated commands. For example, once landmark mode is selected, the technician may select a particular landmark category or type by simply speaking into the microphone (e.g., "telephone pole," "fire hydrant," "meter," "manhole," "curb," etc.).

In addition to, or as an alternative to, selection of landmark category and/or type, block 618 may provide for the entry of any of a variety of text information for inclusion as part of the landmark information in an electronic record. For example, in some exemplary implementations, via the user interface and/or display the technician may enter text-based information relating to an environmental landmark (e.g., as an offset to another topological, architectural, or infrastructure feature in proximity to the environmental landmark—"telephone pole 5 ft. from back of curb"). Additionally, in a manner similar to landmark type selection, the user interface/display may provide for menu-driven selection via a GUI of predetermined options for additional text-based information to be included as part of the landmark information (e.g., a set of "stock" text messages for selection to be included as part of landmark information).

Following selection of landmark category and/or type in block 618 of the process 1200 shown in FIG. 12, and/or entry/section of any text-based information in block 618 of the process 1200 shown in FIG. 12, in block 620 actuations of the actuator 142 in landmark mode cause the processor to collect various "landmark information" with each actuation, which information is logged in an electronic record as a "landmark event entry" (rather than an actuation event entry, as noted in Table 3 above). Furthermore, as noted above, the processor 118 and/or the link transmitter 168 of the actuation system 120 may be particularly configured to either dispense or not dispense marking material upon actuations in landmark mode. Essentially, in landmark mode, the technician positions the marking device proximate to a selected category/type of landmark and actuates the actuator to acquire various information relating to the landmark (e.g., geo-location data, type, time stamp).

In general, the processor may be configured to communicate with (e.g., poll) any of a variety of input devices to collect landmark information to be logged in an electronic record. As discussed above in connection with the marking mode (refer again to FIG. 2), such information may be acquired from any of a variety of input devices including, but not limited to, the location tracking system 130, the timing system 128, the communications interface 124 (e.g., a USB port or other port), the user interface 126, and the local memory 122.

In particular, any data that is available from the location tracking system (e.g., any information available in various NMEA data messages, such as coordinated universal time, date, latitude, north/south indicator, longitude, east/west indicator, number and identification of satellites used in the position solution, number and identification of GPS satellites in view and their elevation, azimuth and SNR values, dilution of precision values) may be collected as landmark information and logged in an electronic record as part of a landmark event entry. Additionally, information collected from the user interface in the form of a text entry by the technician may be included in a landmark event entry; for example, in one implementation, upon actuation of the actuator, the processor may prompt the technician via the display of the user interface to enter text notes, if desired (e.g., the technician may describe an offset of a target environmental landmark from an architectural, topographical, or infrastructure feature to compliment geographic information provided by the location tracking system), and this textual information may serve as landmark information. In view of the foregoing, it should be appreciated that "landmark information" may include a wide variety of information components including, but not limited to, one or more of geographical information (e.g., from the location tracking system), timing information (e.g., from the location tracking system and/or the timing system), landmark category and/or type information (e.g., selected or entered via the user interface), textual information (e.g., entered via the user interface), or other information (e.g., received from the local memory and/or the communications interface).

Table 9 below provides an example of content and format for a landmark event entry that may be logged in a file for an electronic record and/or transmitted by the marking device when in landmark mode. The example landmark event entry shown below in Table 9 also follows a similar format to that used for the event entry examples provided in Tables 2-5 above.

TABLE 9

| | |
|---|---|
| Format | INFO+LMRK: (DATE) (TIME) (GPS data) (CATEGORY, TYPE)(TEXT) <CR><LF> |
| Examples | INFO+LMRK: DATE(2009-04-15) TIME(12:04:44) GPS($GPGGA,120443,4807.038,N,01131.000,E,1,08, 0.9,545.4,M,46.9,M,,*47) LMRK(3, 12) ("Panel mounted rear wall of shed")<CR><LF> |

In the example landmark event entry given in Table 9, the landmark information includes a time stamp (e.g., DATE and TIME), geographical information (e.g., GPS data), category/type information, and text-based information for an environmental landmark. The notation LMRK (3,12) in the example denotes a category 3, type 12 landmark which, in the exemplary listings provided above, corresponds to "Power Line," "Circuit Breaker." It should be appreciated that the event entry shown in Table 9 is provided primarily for purposes of illustration, and that a variety of other or additional landmark information may be included in landmark event entries, as noted above.

As with the event entry examples provided in Tables 2-5 above, the exemplary format for a mode select and landmark event entry as shown in Tables 8 and 9 may be included in either an ASCII and XML file format for an electronic record that is stored and/or transmitted by the marking device (in which a particular naming scheme/format may be adopted to identify files/electronic records, such as "ServerID_WandID_Job ID"). It should also be appreciated that an electronic record generated by a multi-mode marking device in some instances may include a mixture of actuation event entries and landmark event entries, actuation event entries without any landmark event entries, and landmark event entries without any actuation event entries.

Yet another alternative format for storing and organizing landmark information in an electronic record, according to one embodiment of the invention, is shown in Tables 10 and 11 below. By way of example, Table 10 shows the format and content of an electronic record entry for a utility pole, which includes one geo-location data point, and Table 11 shows the format and content of an electronic record entry for a pedestal, which includes four geo-location data points (i.e., one for each corner of the pedestal). It should be appreciated that the format and content shown below in Tables 10 and 11 is provided primarily for purposes of illustration and, as noted above, a variety of format and content may be included in an electronic record entry for landmark information. The examples provided in Tables 10 and 11 may constitute an "original" electronic record generated by the processor pursuant to the process 1200 shown in FIG. 12, or may be derived from raw data collected and logged pursuant to the process 1200 (e.g., as a flat file, an ASCII formatted file, or an XML formatted file) and subsequently reorganized and particularly formatted. It should also be appreciated that the examples provided in Tables 10 and 11 illustrate that landmark information may be included in an electronic record together with one or both of ticket information and service-related information, as discussed above in connection with electronic records including various marking information.

TABLE 10

Example record of data acquired for a utility pole while in landmark identification mode of operation

| Record #1 | Service provider ID | 0482 |
|---|---|---|
| | User ID | 4815 |
| | Device ID | 7362 |
| | Type of EL | Type = utility pole |
| | timestamp data | 12-Jul-2008; 09:35:17.5 |
| | geo-location data | 2650.9256, N, 08003.5234, W |
| | Other info (text entry) | "5 ft. from back of curb" |
| | Locate request data | Requestor: XYZ Construction Company, Requested service address: 222 Main St, Orlando, FL |

TABLE 11

Example record of data acquired for a pedestal while in landmark identification mode of operation

| Record #2 | Service provider ID | 0482 |
|---|---|---|
| | User ID | 4815 |
| | Device ID | 7362 |
| | Type of EL | Type = pedestal |
| | timestamp data | 12-Jul-2008; 09:35:17.5 |
| | geo-location data | 2650.9256, N, 08003.5234, W |
| | Type of EL | Type = pedestal |
| | timestamp data | 12-Jul-2008; 09:35:21.2 |
| | geo-location data | 2650.9256, N, 08003.5226, W |
| | Type of EL | Type = pedestal |
| | timestamp data | 12-Jul-2008; 09:35:26.7 |
| | geo-location data | 2650.9288, N, 08003.5188, W |
| | Type of EL | Type = pedestal |
| | timestamp data | 12-Jul-2008; 09:35:33.5 |
| | geo-location data | 2650.9321, N, 08003.5177, W |
| | Other info (text entry) | "7 ft from pavement edge" |
| | Locate request data | Requestor: XYZ Construction Company, Requested service address: 222 Main St, Orlando, FL |

Figure 13:
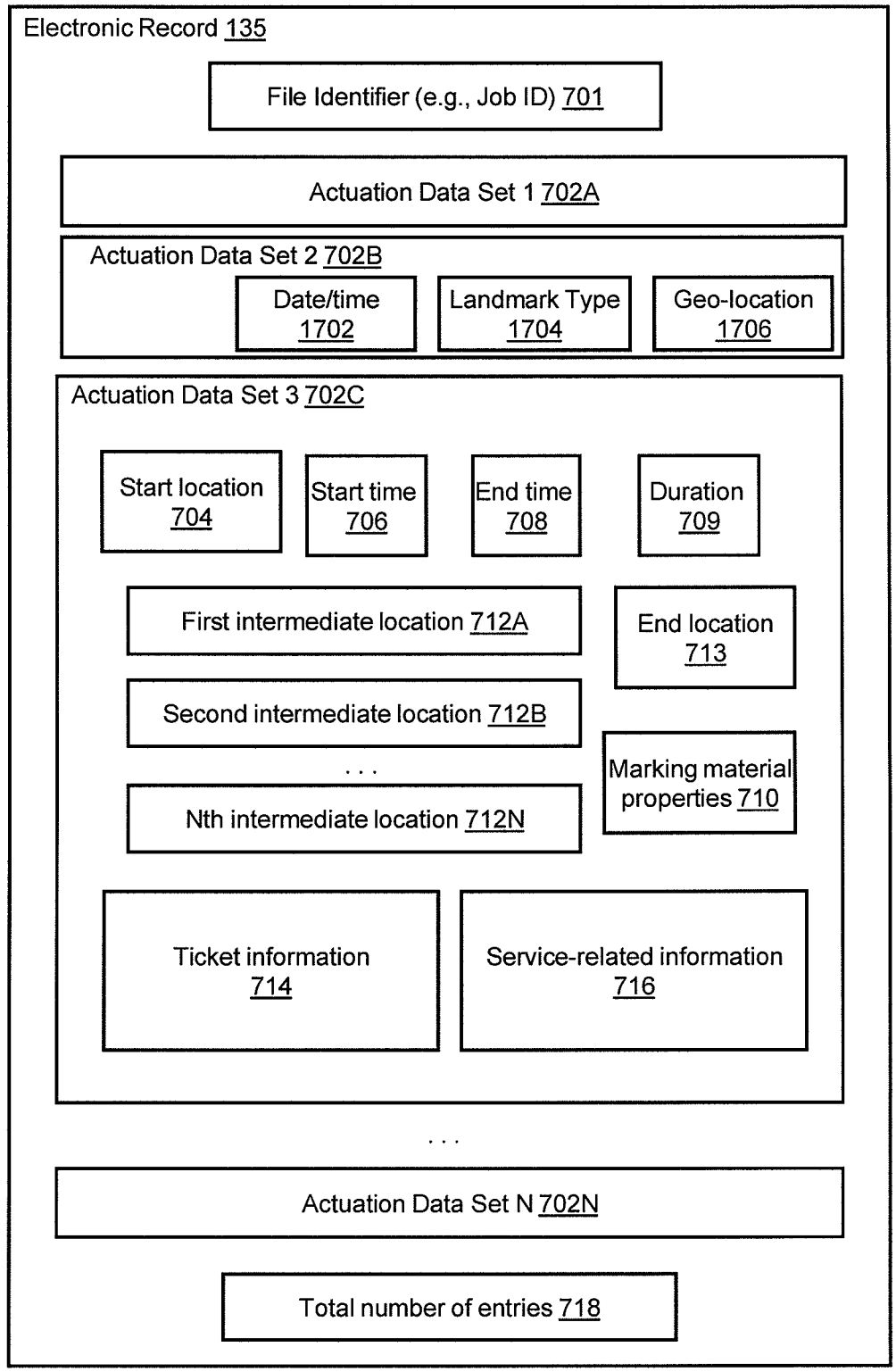
FIG. 13 is a block diagram of an exemplary data structure for an electronic record of a marking operation including both marking information and landmark information retrieved during actuations of a marking device, according to one embodiment of the present invention.

FIG. 13 is a block diagram similar to FIG. 10 and illustrates an exemplary data structure for an electronic record 135 that includes both marking information and landmark information (i.e., that may be generated by and/or based on information collected during the process 1200 discussed above in connection with FIG. 12 and based on the organization of information shown in Tables 9 and 10 above). Like the exemplary electronic record shown in FIG. 10, the record 135 in FIG. 13 includes a file identifier 701 (e.g., one or more of Job ID, WandID, ServerID, etc.) and a plurality of actuation data sets 1 through N (with reference numbers 702A, 702B, 702C . . . 702N), wherein each actuation data set is associated with a corresponding actuation of a marking device. In FIG. 13, also as in FIG. 10, additional details of the data structure for actuation data set 3 702C are shown, relating to marking information collected in marking mode. However, unlike FIG. 10, FIG. 13 shows that the actuation data set 2 702B relates to landmark information acquired pursuant to an actuation in landmark mode; in particular, the actuation data set 2 702B includes a date/time field 1702, a type field 1704, and a geo-location field 1706 corresponding to a landmark event entry.

In other respects, the data structure in FIG. 13 is similar to that shown in FIG. 10. For example, various other information that may be common to multiple (or all) actuation data sets of a given electronic record may be stored in one or more additional elements of the electronic record that are not contained within one or more of the actuation data sets themselves (e.g., one or more of the ticket information field 714, the service-related information field 716, and the marking material properties field 710, which are shown as part of the data structure for a given actuation data set of the electronic record, may instead be elements of the electronic record that are common to all actuation data sets of a given electronic record).

Once an actuation of the marking device in landmark mode has been logged as a landmark event entry, the process 1200 shown in FIG. 12 returns to block 610. At this point, the technician is provided (via the user interface/display) with the options of pausing the job (block 610), restarting the job if previously paused (block 612), stopping the job and indicating completion (block 614) or selecting landmark mode again (block 616) for the next actuation. If the technician selects none of these options, the process returns to block 608, at which point further polling and/or interrupt events are logged (i.e., an actuation event entry capturing marking information is logged with the next actuation of the actuator), as discussed above in connection with FIG. 9. Accordingly, after an actuation in landmark mode, in one exemplary implementation the marking device defaults back to the marking mode, unless and until the technician selects the landmark mode again for a subsequent actuation.

In an alternative implementation not shown in FIG. 12, following actuation of the marking device in landmark mode, the processor may control the user interface/display to provide an option to the technician to exit landmark mode (rather than automatically presenting the options of pause job, restart job, stop job, or landmark mode). In this manner, the marking device remains in landmark mode for subsequent actuations until the technician makes a menu selection to exit landmark mode, at which point the process 1200 returns to block 610.

In yet another embodiment, the processor 118, executing marking data algorithm 134 in landmark mode, may be configured to generate an essentially continuous stream of data packets representing various event entries logged by the marking device (e.g., as shown above in Tables 2-9). As discussed above in connection with the marking mode, each data packet may include a header, one or more flag fields, and one or more information payload fields. To accommodate both a marking mode and a landmark mode, one flag field may be set or reset upon selection of the landmark mode so as to identify the contents of any information payload field in the data packet as landmark information as opposed to marking information. Similarly, as discussed above, one or more other flag fields may be set (or reset) upon occurrence of one or more predetermined interrupt events (e.g., pull/depress actuator, release actuator, marking dispenser in, marking dispenser out, low power, communication link fail, etc.). In this manner, a continuous stream of data may be provided as an output by the processor, in which certain interrupt events, such as an actuation and/or release of the actuator, "tag" certain data packets via an interrupt flag, and certain data packets also may be tagged as generated in marking mode or landmark mode. In yet other aspects of this embodiment, all data packets thusly generated may be stored in the file opened for the electronic record and/or transmitted from the marking device in essentially real time; alternatively, only certain data packets with one or more predetermined flags set may be stored and/or transmitted.

Thus, in landmark identification mode, a locate technician may employ an appropriately configured marking device to capture the types and locations of environmental landmarks of interest that are present at the work site and/or in the general environs of a dig area. While in landmark mode, the locate technician may approach a certain environmental landmark, then select the type of the environmental landmark via user interface, position the marking device (e.g., place the tip of marking device) proximate to the target environmental landmark, and then actuate the marking device. In doing so, the marking device logs in an electronic record landmark information including, for example, the type of the target environmental landmark, the geo-location of the target environmental landmark, and a time stamp in an electronic record. The locate technician may move from one environmental landmark to the next until information about all environmental landmarks of interest has been captured. Additionally, one or more data points (e.g., "landmark event entries") may be captured for any given environmental landmark.

III. Locate Device for Generating Electronic Records of Locate Operations

Other embodiments of the present invention relate to locate devices, the collection of "locate information" associated with a locate operation, and generation of an electronic record of such locate information. With reference again to FIG. 1A, as discussed above a locate device (or so-called "locate set") may include at least one transmitter and a locate receiver. In one embodiment of the present invention, one or both of a locate transmitter and a locate receiver may be particularly configured, according to various concepts discussed above in connection with marking devices and other concepts discussed in further detail below, to acquire locate information relating to a locate operation, generate an electronic record of the acquired locate information, and store, transmit, analyze or otherwise process the acquired locate information.

Further description of features and functionality of a locate device that may be included, in whole or in part, in a locate device of the present invention can be found in the co-pending U.S. patent application entitled, "Locate Apparatus having Enhanced Features for Underground Facility Locate Operations, and Associated Methods and Systems" filed on Feb. 11, 2010 and assigned Ser. No. 12/704,087. This co-pending application is incorporated herein by reference.

Various types of locate information may be generated during, or otherwise associated with, the use of a locate set to perform a locate operation. For example, locate information related to the use of the transmitter may include, but is not limited to, information about the applied signal power, the applied signal frequency, the possible or available signal frequencies (e.g., if the locate transmitter has more than one frequency available), the presence, magnitude, and type of noise (e.g., distortion) on the applied signal (e.g., a signal-to-noise ratio), the location of the transmitter, the mode of operation (e.g., conductive or inductive) and therefore the manner in which connection is made to the target object (e.g., direct connection or inductive clamp), an identification of the transmitter unit (e.g., serial number), make and model of the transmitter unit, information about how the transmitter unit is grounded (if at all), and an indication of whether a sufficient electrical connection has been made to the target object (e.g., some transmitters produce a "continuity signal" indicative of the quality of the connection between the transmitter and the target object). Locate information related to the use of the locate receiver may include, but is not limited to, an identification of the locate receiver (e.g., a serial number), the mode of operation of the locate receiver (e.g., peak mode v. null mode, as well as active v. passive mode), the frequency to which the locate receiver is tuned, the gain of the locate receiver, the frequency of a detected magnetic field, the amplitude/strength of a detected magnetic field, the electrical current of the detected signal, the location of the locate receiver, and a depth measurement taken by the locate receiver (which may be used, for example, as additional information regarding a target object). In addition, locate information relating to the locate operation itself may include, but is not limited to, information about the target object, the location of the locate site, the party requesting the locate, the party performing the locate, and whether any locate operations have previously been performed for this site.

Information about a tracer wire may also be included in locate information. For example, information about the material of a tracer wire may be collected (e.g., input verbally or textually by a technician), which may indicate a type of underground facility (e.g., aluminum may indicate cable, tin/steel may indicate phone, and copper/stainless steel may indicate gas, among others). The wire gauge of the tracer wire, as well as the condition of the tracer wire (e.g., intact, corroded, etc.) may also be visually determined by a locate technician and recorded verbally, textually, or in any other manner. Moreover, whether the tracer wire is broken may be visually detected and noted as part of locate information. Similarly, whether a service line is properly bonded to a main may be useful locate information. Furthermore, information about the type of sheathing for the tracer wire may be included as part of locate information. Other types of information may also be considered locate information, as these are non-limiting examples.

According to some aspects of the invention, locate information relating to a locate set, and/or locate operation more generally, may be recorded, transmitted, and/or processed, for example, to enable evaluation of the performance of the locate technician, evaluation of the operation of the locate equipment, reconstruction of the actions taken by the locate technician during the locate operation, and/or to facilitate comparison of collected data to historical data. In one exemplary embodiment, a locate receiver is configured to store and/or transmit locate information relating to a locate set and/or a locate operation, and in some implementations generate an electronic record of at least some of the locate information. Examples of locate-related information that may be logged into an electronic record may include any of the types of information described above or any suitable combinations of information of interest, and generally may include, but are not limited to:

timing information (e.g., one or more time stamps) associated with one or more events occurring during a given locate operation;

geographic information (e.g., one or more geographic coordinates) associated with one or more events of a locate operation (in some instances, the geographic information may be accompanied by timing information, such as a time stamp, for each acquisition of geographic information); and/or geographic diagnostics information (e.g., GPS diagnostics information, such as, but not limited to, the quality of a GPS signal, the number of satellites in view of the GPS receiver, etc.);

service-related information: one or more identifiers for the locate technician performing the locate operation, the locate contractor (service provider) dispatching the locate technician, and/or the party requesting the locate operation;

ticket information: information relating to one or more facilities to be located, location information (e.g., an address, geo-coordinates, and/or text description) relating to the work site and/or dig area in which the locate and marking operation is performed, ground type information (e.g., a description of the ground at which the locate is performed), excavator information, other text-based information, etc.

target object information: information about the target object (e.g., facility) to be located, such as the type of object, expected depth of object, etc.;

locate performance information: information entered, detected and/or sensed as part of performing the locate operation, such as ground type in the area of the locate operation (e.g., grass, pavement, etc., which could also or alternatively be indicated in ticket information), magnetic field strength and frequency, electric current magnitude, depth of the located object, the mode of operation of the locate receiver (e.g., peak v. null detection modes), the gain of the locate receiver, etc. With respect to locate receivers, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" (or "magnetic field strength") refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate operations;

locate receiver information: information about the locate receiver, such as identification of the locate receiver (e.g., serial number), make and model of the locate receiver, mode of operation, battery level, etc.; and transmitter information: information about any transmitter and transmitter signal (also referred to herein as an applied signal) utilized for the locate operation, such as transmitter type, identification of the transmitter (e.g., serial number), make and model of the transmitter, mode of operation (e.g., inductive and conductive), battery level, connection type, electrical ground type, electrical ground position, moisture content of physical ground to which electrical ground contact is made, pH of physical ground, applied signal frequency, available signal frequencies, transmitter power, whether a continuity indication is provided for the applied signal, etc.;

tracer wire information: information about a tracer wire provided along the underground facility, such as tracer wire material (e.g., aluminum, tin/steel, copper/stainless steel, etc.), gauge of the tracer wire, condition of the tracer wire (e.g., whether intact, broken, corroded, etc.), etc.;

environmental information: information derived from one or more environmental sensors associated with the locate device, examples of which sensors include, but are not limited to, temperature sensors, humidity sensors, light sensors, altitude sensors, image capture devices and audio recorders, as well as information that may be manually entered (e.g., by a technician) relating to environmental conditions (e.g., ground type in the area of the locate operation, which could also or alternatively be indicated in ticket information);

operational information: information derived from one or more operational sensors associated with the locate device, examples of which sensors include, but are not limited to, operational temperature sensors, a compass, an inclinometer, one or more accelerometers, a yaw rate sensor, a proximity sensor, a pressure sensor, one or more device health sensors, image capture devices, and audio devices; and Device health information: information about the status of one or more components of a locate device, such as battery status, WiFi connectivity status, GPS receiver status (e.g., GPS signal strength/quality, number of satellites in view), etc.

One or more electronic records based on the locate information described above, or any other locate-related information, may be generated, logged/stored in local memory 1634 of the locate receiver, formatted in any of a variety of manners (as discussed above in connection with the marking device), saved as any of a variety of file types having any of a variety of data structures, processed and/or analyzed at the locate receiver itself, and/or transmitted to another device (for example, to a computer or, in those embodiments in which multiple locate receivers are used to complete a same locate operation, to another locate receiver) for storage, processing and/or analysis.

Figure 14:
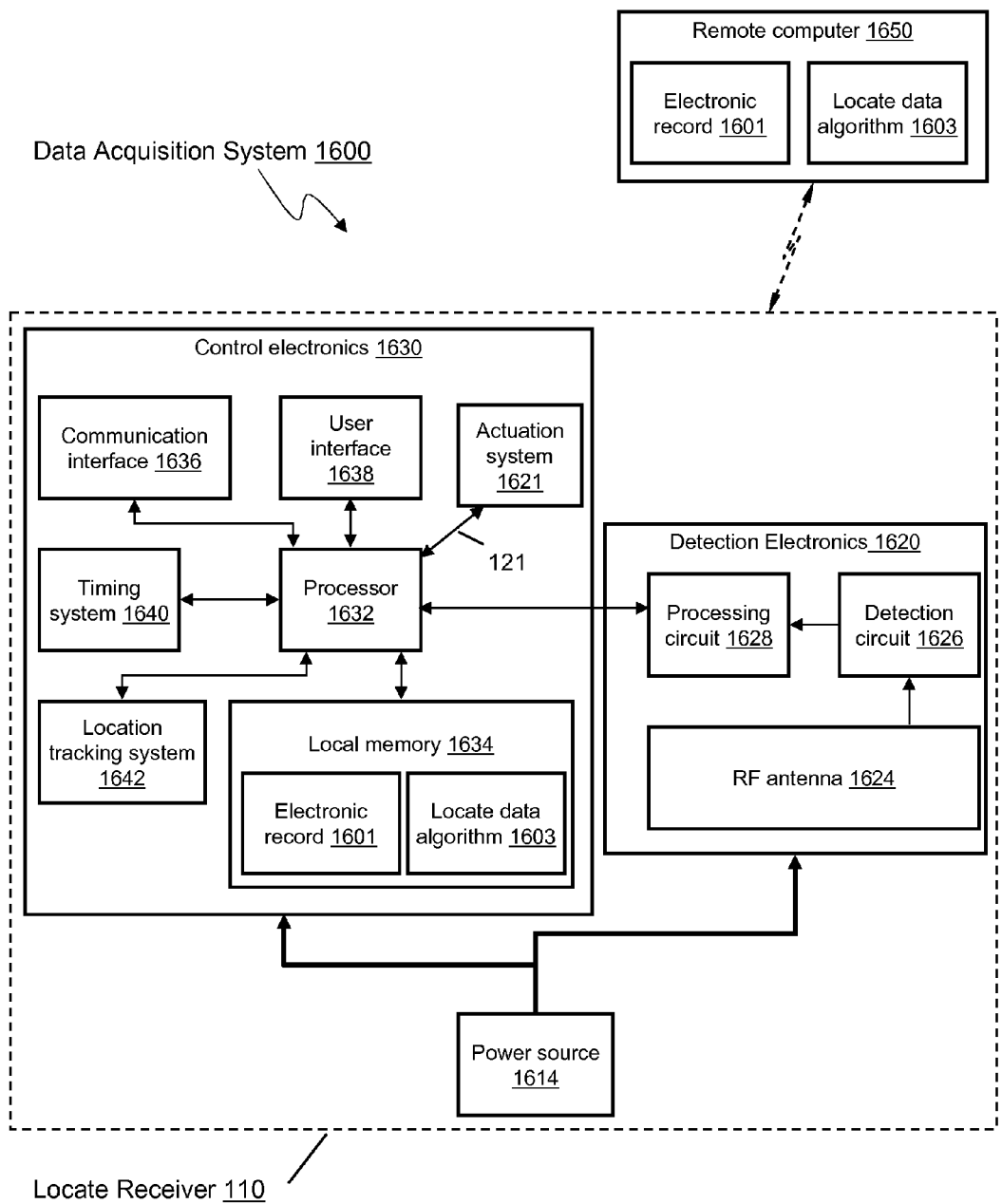
FIGS. 14 and 15 illustrate a functional block diagram and perspective view, respectively, of a data acquisition system including a locate receiver, according to one embodiment of the present invention.
Figure 15:
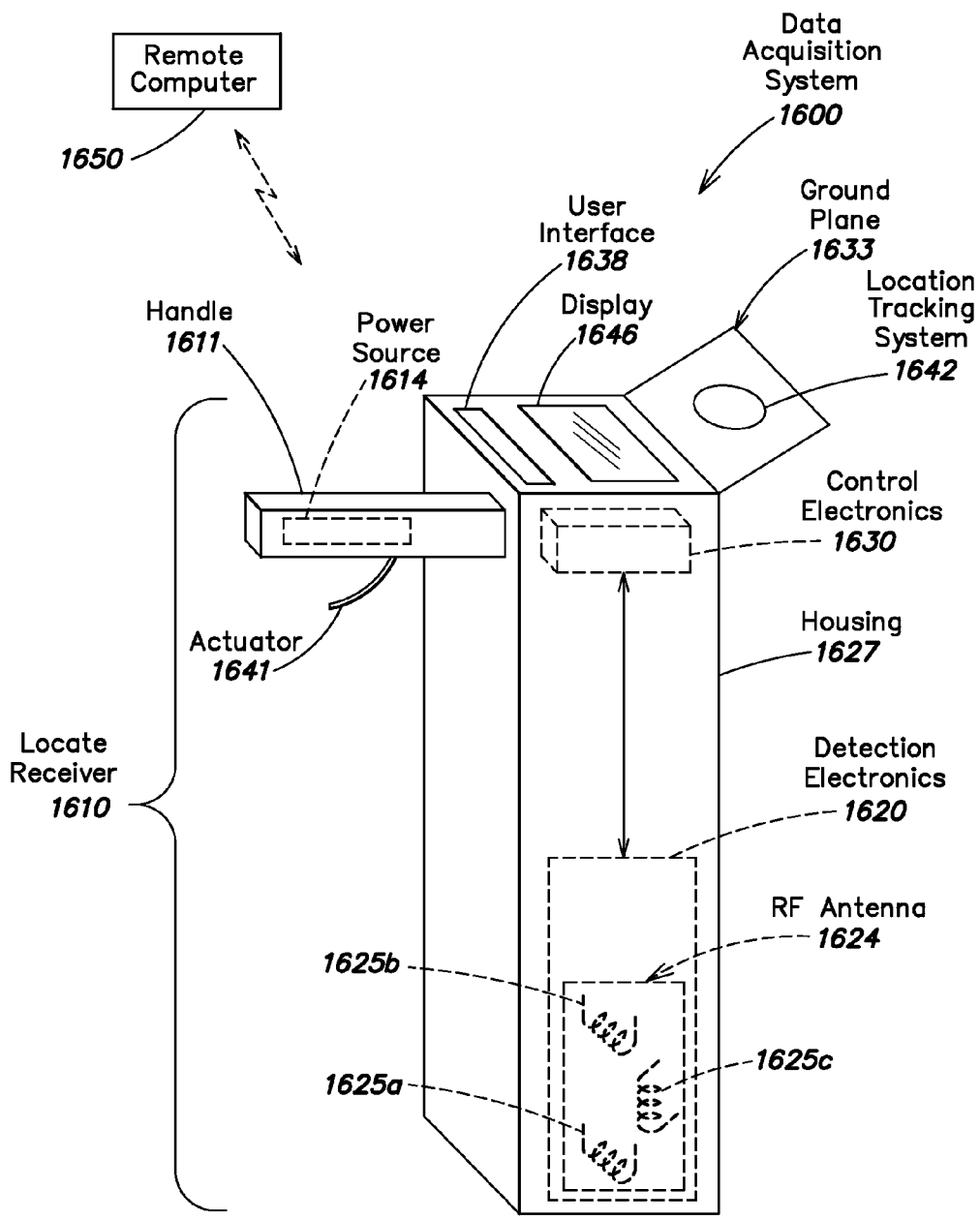

FIGS. 14 and 15 illustrate a functional block diagram and perspective view, respectively, of one example of a data acquisition system 1600 including a locate receiver 1610 and optionally a remote computer 1650, according to one embodiment of the present invention. As shown, the locate receiver 1610 comprises detection electronics 1620, control electronics 1630, and a power source 1614 configured to power the detection electronics 1620 and the control electronics 1630. The detection electronics 1620 comprise an RF antenna 1624, a detection circuit 1626, and a processing circuit 1628. The control electronics 1630 comprise a processor 1632 coupled to a local memory 1634, a communication interface 1636, a user interface 1638, a timing system 1640, a location tracking system 1642, and an actuation system 1621.

Some of the components illustrated in FIG. 14 are similarly named to some components in FIG. 2 relating to a marking device. According to some embodiments, one or more of the components appearing in FIG. 14 may be the same as, or substantially similar to, components in FIG. 2. For example, in some embodiments one or more of the following components appearing in FIGS. 2 and 14 may be the same as, or substantially similar to, each other (and therefore may function in the same or a substantially similar manner): power source 114 and power source 1614; remote computer 150 and remote computer 1650; communication interface 124 and communication interface 1636; user interface 126 and user interface 1638; timing system 128 and timing system 1640; location tracking system 130 and location tracking system 1642; processor 118 and processor 1632; local memory 122 and local memory 1634; actuation system 120 and actuation system 1621. With respect to actuation system 1621, it should be appreciated that there is no marker dispensed by the locate receiver 1610 shown in FIG. 14, but the actuation system 1621 may nonetheless initiate or control logging of data in a manner similar to that discussed above in connection with the marking device 110, including taking of a depth measurement or performance of some other function of the locate receiver 1610, as described further below.

As shown in FIGS. 14 and 55, the locate receiver 1610 further includes detection electronics 1620, which provides another example of an input device that may provide location information to the processor 1632. In exemplary implementations, the detection electronics 1620 in turn includes an RF antenna 1624, a detection circuit 1626, and a processing circuit 1628. Each of these components is explained in greater detail further below.

In some embodiments, a user may commence a locate operation with the locate receiver by inputting various information to the locate receiver, and/or selecting various operating options, via the user interface. As a non-limiting example, the user may select from various menu options (using the user interface and display as a menu-driven GUI), and or manually enter via the user interface, the type of target object/facility to be located, the address of the locate operation, the ground type (e.g., grass, pavement, etc.), whether or not a separate transmitter is being used, the mode of the locate receiver (e.g., Peak v. Null), whether the locate receiver is being operated in landmark mode or not (described further below), or any other information of interest to a locate operation.

In one exemplary implementation, the user may first power on the locate receiver and log on, for example by entering a user ID. The user may then navigate through a menu on a touch screen of the user interface to select the target object to be located, for example selecting from among a list of options (e.g., including facility types such as gas, sewer, cable, and phone, etc.). Similarly, the user may then navigate through a menu to select the ground type in the area of the locate operation (e.g., selecting from a list of options including grass, pavement, dirt, etc.). The user may then similarly select or input the frequency of any applied signal provided by a transmitter, for example using a keypad of the user interface or a menu-driven GUI. It should be provided that these examples of user actions are non-limiting, and furthermore that in some embodiments one or more of the pieces of information listed may be detected automatically and not be input/selected by the user.

Once the target object/facility type and any other relevant or desired information is input and/or selected by the technician, and the applied signal from the transmitter is coupled to the target object, the locate receiver may be used in a variety of manners by the technician for a locate operation, in which the technician generally positions (e.g., sweeps) the locate receiver over an area in which they expect to detect an underground facility. More specifically, the technician positions the locate receiver such that the RF antenna 1624 (which may include more than one antenna, as described further below) may receive/detect a magnetic field emitted by the target object (see underground facility 1515 in FIG. 1A).

In some embodiments, the locate receiver 1610 is capable of operating in a null mode (e.g., capable of detecting a null signal when positioned over an object (e.g., facility) emitting a magnetic field), such that RF antenna 1624 may comprise a null detection antenna. Alternatively, the locate receiver 1610 is capable of operating in a peak detection mode (e.g., capable of detecting a peak signal when over an object (e.g., facility) emitting a magnetic field), and the RF antenna 1624 comprises two peak detection antennae, which may be positioned substantially parallel to each other but at different positions within the locate receiver (e.g., at different heights). In some embodiments, the locate receiver 1610 is capable of operating in both peak detection and null detection modes, and the RF antenna 1624 may comprise three antennae, e.g., one null detection antenna and two peak detection antennae. However, RF antenna 1624 may comprise any other number, type, and orientation of antennae, as the locate receivers described herein are not limited in these respects.

The RF antenna 1624 may be coupled to the detection circuit 1626 such that the signal(s) received/detected by the RF antenna 1624 may be provided to the detection circuit 1626 as an output signal of the RF antenna. The output signal of the RF antenna may be any frequency detectable by the antenna, and in some embodiments may be between approximately 512 Hz and 1 MHz, although these non-limiting frequencies are provided primarily for purposes of illustration. As mentioned, the output signal of the RF antenna 1624, which in some embodiments is an analog signal, may be provided to detection circuit 1626, which may perform various functions. For example, the detection circuit 1626 may perform various "front-end" operations on the output signal of RF antenna 1624, such as filtering, buffering, frequency shifting or modulation, and/or pre-amplifying the output signal. Furthermore, the detection circuit 1626 may perform additional functions, such as amplifying and/or digitizing the output signal provided by RF antenna 1624. It should be appreciated, however, that the types of functions described as being performed by detection circuit 1626 are non-limiting examples, and that other functions may additionally or alternatively be performed.

After detection circuit 1626 has operated on the signal from RF antenna 1624 (e.g., by filtering, buffering, amplifying, and/or digitizing, among other possible operations), it may provide a signal to processing circuit 1628. The processing circuit 1628 may process the signal(s) provided by detection circuit 1626 in any suitable manner to determine any information of interest. For example, according to one embodiment, the processing circuit 1628 may process the signal(s) from detection circuit 1626 to determine a magnetic field strength of a magnetic field detected by RF antenna 1624. The processing circuit 1628 may process the signal(s) from detection circuit 1626 to determine an amplitude and/or direction of the electrical current creating the magnetic field(s) detected by RF antenna 1624. Processing circuit 1628 may perform operations to calculate, for example, the depth and location of the target facility based on the electromagnetic fields detected by RF antenna 1624. Processing circuit 1628 may be an analog circuit or a digital microprocessor, or any other suitable processing component for performing one or more of the operations described above, or any other operations of interest with respect to signals detected by RF antenna 1624. Also, it should be appreciated that processing circuit 1628 and processor 1632 (described in further detail below) may be a single processor in some embodiments, as the illustration of them as distinct in FIG. 14 is only one non-limiting example.

Processor 1632 of control electronics 1630 may be any suitable processor for controlling and/or coordinating operation of the detection electronics 1620 and/or control electronics 1630. For example, the processor 1632 may be any general-purpose processor, controller, or microcontroller device. In some embodiments, processor 1632 controls logging of data (e.g., locate information) from the processing circuit 1628, timing system 1640, and/or location tracking system 1642 to the local memory 1634. The manner in which such data may be logged to the local memory 1634 may depend on the type of data being logged, as the operation of locate receiver 1610 is not limited in this respect.

For example, data from timing system 1640 and/or location tracking system 1642 may be automatically logged continuously or periodically to the local memory 1634, may be logged in response to one or more types of events (e.g., may be logged automatically when a particular event occurs), and/or may be logged at any suitable times. In particular, in one implementation, logging may occur at periodic intervals during performance of a locate operation, such as every second, every five seconds, every minute, or at any other suitable time interval. According to another embodiment, timing information and/or geographic information from timing system 1640 and location tracking system 1642, respectively, may be logged in response to particular types of events, such as detecting an underground facility or detecting the absence of an underground facility. Such events may be identified by signals output by processing circuit 1628 to processor 1632. As a non-limiting example, timing information and/or geographic information may be logged when a characteristic (e.g., magnetic field strength) of a signal detected by RF antenna 1624 is greater than a particular threshold value, which may be indicated by a signal output from processing circuit 1628 to processor 1632, and which occurrence may be indicative of the presence of an underground facility. Similarly, in some embodiments time timing information and/or geographic information may be logged when a signal detected by RF antenna 1624 has a magnitude above a first threshold and the gain of the locate receiver 1610 is above a second threshold. It should be appreciated that various combinations of detected signals detected by locate receiver 1610 may be used to trigger logging of information (e.g., timing information and/or geographic information) to local memory. It should also be appreciated that any information available from the location tracking system 1642 (e.g., any information available in various NMEA data messages, such as coordinated universal time, date, latitude, north/south indicator, longitude, east/west indicator, number and identification of satellites used in the position solution, number and identification of GPS satellites in view and their elevation, azimuth and SNR values, dilution of precision values) may be included in geographic information constituting all or a portion of logged locate information.

In some embodiments, alternatively or in addition to "automatic" logging of locate information based on some condition or event, a user of the locate receiver 1610 may "manually" trigger logging of timing information, geographic information, and/or any other data associated with a locate operation or locate receiver (locate information), for example by manipulating a control (e.g., button, knob, joystick) of the user interface 1638, or by actuating an actuator 1641 (e.g., a trigger-pull mechanism similar to the actuator 142 of the marking device 110 shown in FIG. 3) integrated or otherwise associated with the locate receiver (as shown in FIG. 15), which may be part of the actuation system 1621 and which may cause a signal to be sent to the processor 1632 to initiate logging of locate information. For example, according to some embodiments a user may initiate the locate receiver 1610 taking a depth measurement by depressing a pushbutton of the user interface 1638, or pulling/squeezing the actuator 1641, which may also trigger the logging of timing information and/or geographic information from timing system 1640 and location tracking system 1642. The depth measurement data, time data, and/or location data may then be logged in an electronic record in local memory 1634.

It should be appreciated that while the foregoing discussion focuses on logging locate information to local memory 1634, the locate information may also, or alternatively, be transmitted to remote computer 1650 via communication interface 1636. As with logging locate information to local memory 1634, the transmission of locate information to remote computer 1650 may be performed continuously, periodically in response to one or more types of events, in response to user input or actuation of an actuator, or in any other suitable manner.

As discussed above in connection with the marking device 110, in yet another embodiment, the processor 1632 of the locate receiver 1610 may be configured to continuously collect various available locate information (e.g., repeatedly/regularly poll all available input devices and other components of the locate receiver) and generate an essentially continuous stream of data packets including locate information. In one aspect of this embodiment, each data packet of locate information may include a header, one or more flag fields, and one or more information payload fields. For example, in one implementation, the header for each packet may include one or more of a job ID (e.g., ticket identifier), technician ID, device ID (e.g., serial number), packet type ID, and/or a time stamp corresponding to logging of information/generation of the packet. Each packet also may include one or more payload fields for carrying information provided by the polled device(s) or components of the locate receiver, and one or more flag fields that are set (or reset) upon occurrence of one or more predetermined interrupt events (e.g., signal strength from receiver antenna exceeding a predetermined threshold, low power, communication link fail, etc.). In this manner, a continuous stream of data may be provided as an output by the processor, in which certain interrupt events, such as an actuation and/or release of an actuator, or other event-based logging of locate information, "tag" certain data packets via an interrupt flag. In yet other aspects of this embodiment, all data packets thusly generated may be stored in the file opened for the electronic record and/or transmitted from the locate device in essentially real time; alternatively, only certain data packets with one or more predetermined flags set may be stored and/or transmitted.

As with those embodiments relating to a marking device previously described in section II of this application, various "locate event entries" including locate information corresponding to different events relating to use and operation of one or more locate devices may be logged in a file for an electronic record and/or transmitted by the locate device(s) described herein. A process for collecting and logging locate information during operation of a locate receiver 1610 may be a process similar to that described above in connection with a marking operation and shown in FIG. 12. Various exemplary formats for these locate event entries are now described, although it should be appreciated that various other entries and formats are possible, as those shown and described below are provided primarily for purposes of illustration.

While the collection and logging of locate information to generate an electronic record is discussed in some aspects, for purposes of illustration, in terms of actuation data sets (i.e., a set of data that is associated and logged with a corresponding actuation of the locate receiver), it should be appreciated that various embodiments of the present invention are not limited in this respect. More generally, an electronic record of a locate operation may be generated in any of a variety of manners, have a variety of file formats and/or data structures, and include any of a variety of locate information.

Table 12 below illustrates an example of a portion of the contents of a relatively simple flat file for an electronic record that may be generated during a locate operation using a process like that illustrated in FIG. 12:

TABLE 12

| TIME | LAT | LONG | EVENT | FACILITY TYPE |
|---|---|---|---|---|
| 1:23:00.00 PM | −80.3851 | 25.5604 | Detection | ORANGE |
| 1:23:00.20 PM | −80.3851 | 25.5604 | Detection | ORANGE |
| 1:23:00.40 PM | −80.3851 | 25.5604 | Detection | ORANGE |
| 1:23:00.60 PM | −80.3851 | 25.5604 | Detection | ORANGE |
| 1:23:00.80 PM | −80.3851 | 25.5604 | Detection | ORANGE |
| 1:23:01.00 PM | −80.3851 | 25.5604 | Detection | ORANGE |
| 1:23:01.20 PM | −80.3851 | 25.5604 | Detection | ORANGE |
| 1:23:01.40 PM | −80.3851 | 25.56039 | Detection | ORANGE |
| 1:23:01.60 PM | −80.3851 | 25.56039 | Detection | ORANGE |
| 1:23:01.80 PM | −80.3851 | 25.5604 | Detection | ORANGE |
| 1:23:02.00 PM | −80.3851 | 25.5604 | Detection | ORANGE |

The portion of the file shown in Table 12 corresponds to multiple locate signal event entries indicating detection of a facility (one entry per line). Each entry has a time stamp (e.g., entries are logged at a rate of approximately five events per second) and further includes multiple fields having respective values (e.g., as comma separated values) for latitude and longitude coordinates received from the location tracking device, an event indicator indicating that the locate receiver is detecting ("Detection"), and a color code indicating the type of facility detected (e.g., as established by the American Public Works Association and shown in Table 7).

As noted above, it should be appreciated that the portion of the file shown in Table 12 is provided primarily for purposes of illustration, and that the format and/or content for respective event entries and the file itself for an electronic record generated by and/or based on the information collection process may have any of a variety of different formats and/or content.

To this point, Tables 13 through 16 below provide examples of various events for which event entries may be logged in a file for an electronic record and/or transmitted by the locate receiver, exemplary formats for these event entries, and exemplary file formats for files having multiple such entries, according to another embodiment of the present invention.

Job Started/Paused/Restarted/Completed Events: As with the marking devices described above, one event entry format for a locate receiver according to an embodiment of the present invention provides information about when a locate operation ("job") was started and completed in addition to capturing details about if and when the job was paused and restarted. Such an entry may substantially take the form of the analogous entry in Table 2, understanding that the "WAND_ID" portion of the entry may be replaced by a "LOCATE_RECEIVER_ID" portion.

Actuation Events: As has been described, according to at least one embodiment of the present invention, a locate receiver may be operated to collect and/or transmit locate information upon actuation by a user. Table 13 illustrates an example of an entry relating to the actuation event. Locate information from one or more input devices/other components of the locate device may be recorded upon actuation to provide information about the job in progress. The facility type information may be entered/selected by a user as described previously, and may be recorded in the event, for example, according to the color-coding scheme of Table 7.

TABLE 13

| Format | INFO+ LCTR: (DATE) (TIME) (GPS data) (FACILITY TYPE) (GROUND TYPE) (MAGNETIC FIELD STRENGTH AS % OF FULL SCALE info) (DETECTED SIGNAL FREQUENCY) (GAIN) <CR><LF> |
|---|---|

TABLE 13-continued

| Examples | INFO+LCTR: DATE(2009-04-15) TIME(12:04:44) GPS($GPGGA,120443,4807.038,N,01131.000,E,1, 08,0.9,545.4,M,46.9,M,,*47) FACILITY TYPE (YELLOW) GROUND TYPE (PAVEMENT) STRENGTH(80) FREQUENCY(512) GAIN (10) <CR><LF> INFO+LCTR: DATE(2009-04-15) TIME(12:04:45) GPS($GPGGA,120445,4807.038,N,01131.000,E,1,08, 0.9,545.4,M,46.9,M,,*47) FACILITY TYPE (YELLOW) GROUND TYPE (GRASS) STRENGTH(81) FREQUENCY (512) GAIN (10) <CR><LF> INFO+LCTR: DATE(2009-04-15) TIME(12:04:46) GPS($GPGGA,120446,4807.038,N,01131.000,E,1,08, 0.9,545.4,M,46.9,M,,*47) FACILITY TYPE (YELLOW) GROUND TYPE (DIRT) STRENGTH(80) FREQUENCY(512) GAIN (11) <CR><LF> |
|---|---|

Locate Device Status Events: The status event of a locate device collects various locate-related information and/or information on operating characteristics of the locate device on a periodic basis while a job is in progress (e.g., pursuant to processor polls). The entry may be similar to that illustrated in Table 4 for marking devices, although the information may relate to the locate aspect of a job. An example is shown below in Table 14. In the non-limiting example, the entries include information about the mode of the locate receiver (e.g., peak v. null). It should be appreciated, however, that other information may additionally or alternatively be included in the event entry.

TABLE 14

| Format | INFO+LCTSTAT: (DATE) (TIME) (GPS data) (MODE status) (MEMORY used in %) (BATTERY level) <CR><LF> |
|---|---|
| Examples | INFO+LCTSTAT: DATE(2009-04-15) TIME(12:04:00) GPS($GPGGA,120400,4807.038,N,01131.000,E,1,08, 0.9,545.4,M,46.9,M,,*47) MODE(PEAK) MEM(65) BAT(3)<CR><LF> |

Error Events: As with the discussion of Table 5 in the context of a marking device, one or more types of error events may be logged in association with a locate device. The errors may correspond to a malfunction of a locate receiver and/or any input device, or any other errors of interest. In some cases, the user/technician also may be notified of the error through the user interface 1638 or display 1646 (visible alert on display, audible alarm/alert, etc.). Similar event formats may be adopted for warning alerts/events and informational alerts/events. An error event entry may take substantially the same form as that shown in Table 15.

TABLE 15

| Format | INFO+ERR: (DATE) (TIME) (GPS data) (MEMORY used in %) (BATTERY level) <CR><LF> |
|---|---|
| Examples | INFO+ERR: DATE(2009-04-15) TIME(12:04:00) GPS($GPGGA,120400,4807.038,N,01131.000,E,1,08, 0.9,545.4,M,46.9,M,,*47) MEM(65) BAT(3)<CR><LF> |

It should be appreciated that the event types described above and the logged location information shown in the corresponding tables are provided primarily for purposes of illustration, and are not limiting. Thus, events of various other types and with various other information may be logged into an electronic record.

Table 16, shown below, lists another example of the contents of an electronic record of locate information that may be generated and stored and/or transmitted relating to operation of a locate receiver, according to one non-limiting embodiment. The electronic record shown in Table 16 includes a record number (record #1001), an identification of the service provider, an identification of the user (i.e., the locate technician operating the locate receiver), and an identification of the locate receiver. The mode of operation of the locate receiver (e.g., peak) may also be included. Timing information (timestamp data) from a timing system of the locate receiver and geographic information from a location tracking system of the locate receiver may also be included. The signal strength and signal frequency entries of the electronic record indicate characteristics of a signal (e.g., a magnetic field) detected by the locate receiver, for example emitted from an underground facility. The signal strength is listed in the example of Table 16 as a percentage of the maximum detectable by the locate receiver, although it should be appreciated that other units of measurement may alternatively be used. The gain entry indicates the gain setting of the locate receiver. The electronic record also includes an entry for the depth of the facility targeted, as may be determined by taking a depth measurement using a locate receiver (e.g., by calculating a difference in magnetic field strength detected by two different antennae at two different locations within a locate receiver), and for the facility type (e.g., gas, electric, etc.) and ground type in the area of the locate operation. The electronic record of Table 16 also includes the address of the locate operation and the party requesting the locate operation. Lastly, Table 16 includes information about the remaining battery life of the locate receiver for those embodiments that include a battery.

TABLE 16

Example Electronic Record For Locate Receiver

| Record # 1001 | Service provider ID | 0482 |
|---|---|---|
| | User ID | 4815 |
| | Receiver ID | 7362 |
| | Receiver mode | Mode = Peak |
| | Timestamp data | 12-Jul-2008; 09:35:15 |
| | Geo-location data | 2650.9348, N, 08003.5057, W |
| | Signal strength (% of maximum) | 85% |
| | Gain | 45 |
| | Signal frequency | 1 kHz |
| | Facility depth | 3.4 meters |
| | Facility type | Gas (yellow) |
| | Ground type | Pavement |
| | Battery strength data | 85% |
| | Locate request data | Requestor = XYZ Construction Company, Requested service address = 222 Main St, Orlando, FL |

It should be appreciated that Table 16 represents only one non-limiting example of an electronic record of locate information which may be generated in accordance with the operation of a locate receiver, according to one embodiment. In particular, a single electronic record of locate information collected in connection with operation of a locate receiver may include multiple entries of a given data type. For example, while Table 16 illustrates an electronic record including a single GPS data point, it should be appreciated that multiple GPS data points may be taken and stored within a single electronic record. The multiple GPS data points may be taken in response to a single actuation event (e.g., single actuator pull by a technician), in response to multiple actuation events (e.g., multiple actuator pulls by a technician), or in other manners. Thus, multiple pieces of data may be collected for an electronic record of a locate operation, and it should be appreciated that any single electronic record may include multiple entries, for example as shown above with respect to Table 16.

As discussed above in connection with the marking device shown in FIGS. 2 and 3, a file for an electronic record of locate information may have any of a variety of formats and include any of a variety of data structures. For example, such a file may be a flat file including a succession of time stamped "locate event entries" of various locate information, for example as shown in Tables 12-16 (logged automatically as a result of one or more particular conditions, e.g., exceeded thresholds for various signals, or manually as a result of user actuation of the locate receiver), or a differently formatted file (e.g., an ASCII file, a CSV file, an XML file), including files having a data structure that segregates or separates in some manner the locate information into multiple different fields. Examples of ASCII and XML file formats are described above in connection with the collecting and logging of information by a marking device.

FIG. 15 illustrates a non-limiting perspective view of the locate receiver 1610, providing one example of a physical configuration of the components according to one embodiment. It should be appreciated, however, that other configurations are possible and that the various aspects described herein as relating to locate receivers are not limited to any particular configuration of components.

As shown, the locate receiver 1610 may comprise a housing 1627, to which at least some of the components of the locate receiver 1610 are mechanically coupled (e.g., affixed, housed within, etc.). As shown, the RF antenna 1624 of detection electronics 1620 may be mechanically coupled to the housing (e.g., supported inside the housing), and in this non-limiting example includes three antennae, 1625a-1625c. Antennae 1625a and 1625b may be configured to operate as peak detection antenna, while antenna 1625c may be configured to operate as a null detection antenna. In some embodiments, the antennae 1625a and 1625b may be oriented substantially parallel to each other, and in some embodiments are oriented at approximately 90 degrees relative to antenna 1625c. Again, it should be appreciated that the number, type, and orientation of the antennae of locate receiver 1610 are not limited to that shown in FIGS. 14 and 15. In addition, the control electronics 1630 may be disposed within the housing 1627, and may be coupled to the detection electronics 1620 by one or more wired or wireless connections.

As illustrated in FIG. 15, some of the components of the locate receiver 1610 may be positioned externally on the housing 1627. For example, the location tracking system 1642 (e.g., in the form of a GPS receiver) may be mounted on an electrical ground plane 1633 mechanically coupled to the housing 1627. The user interface 1638 may be located externally on the housing 1627, and, as mentioned previously, may include one or more buttons, switches, knobs, a touch screen, or other user selection items. A display 1646 may also be included on an outer surface of the housing 1627, to display information to a user.

In the non-limiting example of FIG. 15, the housing 1627 includes a handle 1611, by which a user may hold the locate receiver 1610. In some embodiments, the power source 1614 may be located within the handle, although other configurations are also possible.

As with the marking devices described above, some aspects of the invention provide a locate device (e.g., locate receiver) that may be configured (e.g., via particular instructions executing on the processor 1632) to operate in multiple different modes to collect various information relating not only to a locate operation (locate information), but additionally or alternatively various information relating to the work site/dig areas in which the locate operation is performed. For example, in one implementation, the locate receiver may be configured to operate in a first "locate mode" which essentially follows various aspects of the operation of the locate receiver 1610 described herein, and also may be configured to operate in a second "landmark identification mode," like that described previously in connection with a marking device. When switched into the landmark mode, the locate receiver may stop detecting a magnetic field, e.g., the RF antenna of the locate receiver may be temporarily disabled in some embodiments. In other embodiments, the locate receiver may continue to operate and the landmark mode may represent additional functionality added to the locate receiver functionality.

According to those aspects of the invention providing a locate device (e.g., locate receiver) configurable to operate in both a locate mode and a landmark mode, the landmark mode may be substantially the same as the landmark mode previously described herein. For example, the landmark mode of a locate receiver may be used to collect the same types of landmark information described previously with respect to marking devices having a landmark mode, such as any of the types of information illustrated and described with respect to Tables 8-11, or any other suitable information.

The locate receiver may have any suitable components/circuitry allowing for operation in both a landmark mode and a locate receiver mode. For example, the locate receiver may include a bypass device similar to that described with respect to a marking device including landmark functionality, in which the bypass device may bypass the operation of the locate receiver functioning to detect a target object. Alternatively, a user may select the landmark mode of the locate receiver from a user interface, analogous to that previously described in the context of a marking device having landmark functionality.

Thus, it should be appreciated that the landmark functionality previously described with respect to a marking device may be suitably applied in the context of a locate receiver, according to some embodiments.

IV. Communication Between Locate Devices and Marking Devices

Some embodiments of the present invention relate to a data acquisition system comprising a locate device communicatively coupled to a marking device. The locate device may be substantially the same as those described herein relating to various embodiments of the present invention, and the marking device may be substantially the same as those described herein relating to various embodiments of the present invention. The locate device and marking device may communicate with each other to exchange information relating to their respective uses during a locate and marking operation. In one embodiment, at least one of the locate device and marking device may be further communicatively coupled to an external device (e.g., a computing device) to receive data from and/or transmit data to the external device.

In certain embodiments, communication between a locate and marking device may be through an intermediary, e.g., a remote computer or a portable electronic device, rather than directly between a locate device and a marking device. A remote computer or portable electronic device may serve as a hub for one or more locate devices and/or one or more marking devices. The remote computer or portable electronic device may be in communication with a local area network or wide area network, e.g., the worldwide web.

Figure 16:
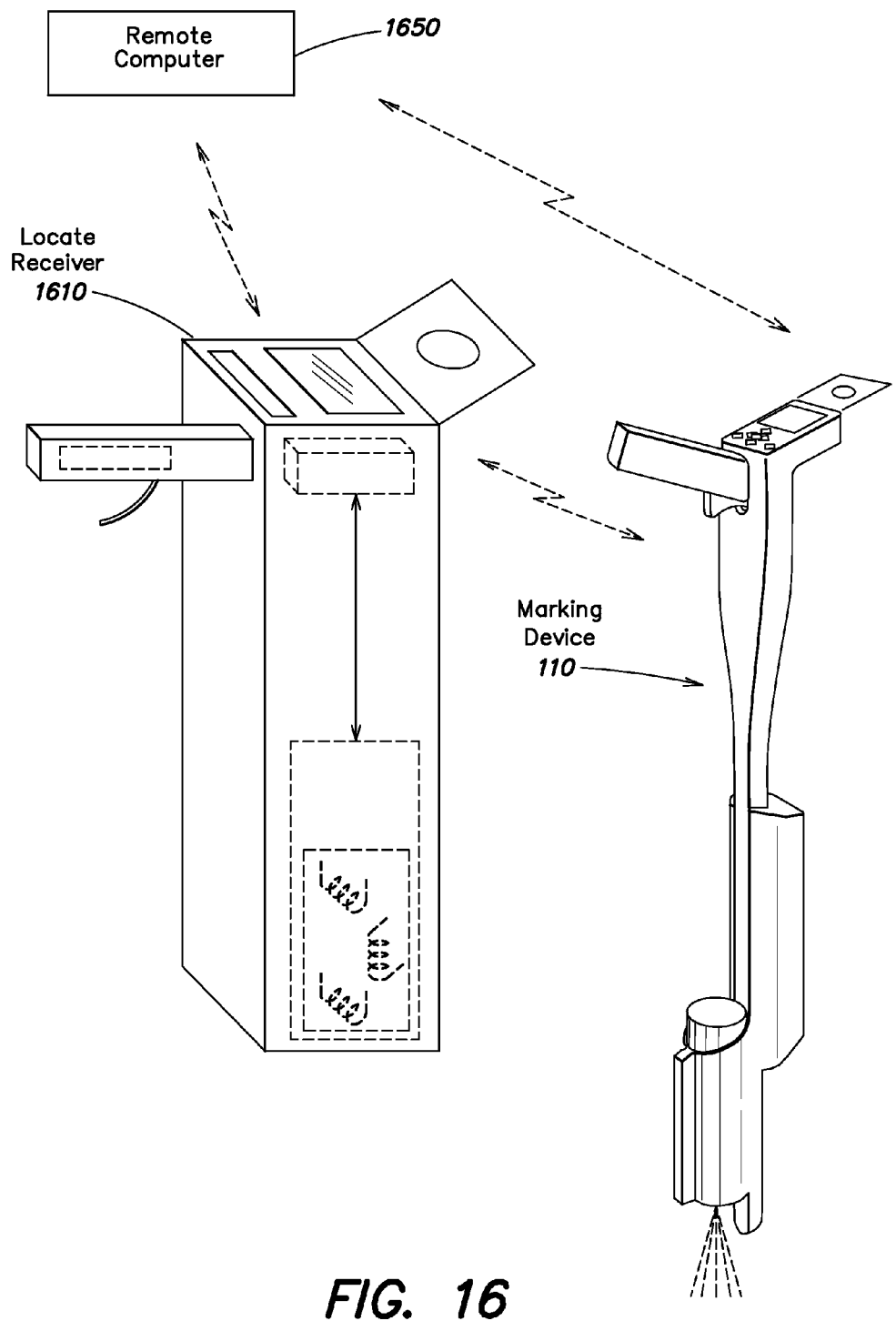
FIG. 16 illustrates a data acquisition system comprising a locate receiver communicatively coupled to a marking device, according to one embodiment of the present invention.

FIG. 16 illustrates an example of a data acquisition system including a locate receiver 1610, a marking device 110, and optionally a remote computer 1650, according to one embodiment of the present invention. These devices may communicate with each other, via a wired or wireless link, and one or both may communicate (via a wired or wireless link) with remote computer 1650 or any other suitable external device. According to one embodiment, the locate receiver 1610 and marking device 110 may be used together during a same locate and marking operation. For example, a technician may carry both devices, using the locate receiver 1610 to locate a target object (e.g., an underground facility) and the marking device 110 to mark the location of the target object once detected. Each of locate receiver 1610 and marking device 110 may operate in substantially the same manner as previously described herein, including with respect to logging and/or transmitting information (e.g., locate information, marking information, and/or landmark information).

Communication between the locate receiver 1610 and the marking device 110 may proceed under any suitable protocol, such as via any of the communication interfaces and protocols described above in connection with a marking device, and may include any suitable information, as the embodiments described herein relating to a locate device communicatively coupled to a marking device are not limited in this respect. According to one embodiment, one of the locate device and marking device may receive one or more event entries or one or more electronic records generated by the other device. The receiving device may then combine the received event entries/electronic records with event entries/electronic records it has generated, and store and/or transmit the combined data. Event entries and/or electronic records from different devices may be combined based on a common key (e.g., a common timestamp, a common job ID, any combination of information, such as date, time and location, or any other suitable key) or in any other manner.

As a non-limiting example, the locate receiver may generate a locate event entry of the format illustrated in Table 14. The locate event entry may be transmitted to the marking device, which itself may have generated a marking actuation event entry of the type illustrated in Table 3. The marking device may combine the locate event entry from the locate receiver with the marking actuation event entry it has generated if, for example the two records share some common "key," i.e., means of identifying, relating and/or associating the respective event entries/records from different devices. Examples of common keys may include, but are not limited to, a common job ID, device ID's that are recognized as a working pair of "partnered" locate receivers and marking devices (discussed further below), common file names or file extensions for electronic records, a common timestamp (an exact match may not be required in all embodiments, but rather time within some suitable tolerance may suffice), a common geographic location (e.g., one or more GPS coordinates for a present location of the respective devices), and information derived from any other entry or combination of entries from the respective devices. The combined, or compiled, electronic record, may then be stored in local memory of marking device 110 and/or transmitted to remote computer 1650.

It should be appreciated that the above-described example is not limiting, and is provided primarily for purposes of illustration. For example, the respective roles of the locate receiver and marking device may be reversed in some embodiments. Alternatively, both devices may receive data from the other of the two devices, and may store and/or transmit the data.

In one embodiment, a locate receiver may be "partnered" with a particular marking device such that the locate receiver and marking device are recognized as communicatively paired for purposes of exchanging and/or sharing information. In one aspect, partnered devices may be identified by linking/associating their respective device IDs (e.g., manufacturer serial numbers, assigned IDs, etc.) in the local memory of one or both devices, and/or in an external database accessible to both devices (e.g., stored in the remote computer 150). The linking of two such devices may be based on a number of factors/conditions, examples of which include, but are not limited to, a locate receiver and a marking device being assigned/checked-out to the same technician, and/or commonly docked together/assigned to the same vehicle).

In another embodiment, a locate receiver and/or a marking device may not necessarily be configured to communicate with a particular partner (e.g., designated a priori), but rather one or both of the devices may be configured to communicate with any other locate or marking device within a given area (e.g., within 10 meters, as one non-limiting example). To this end, in one exemplary implementation, a locate receiver and/or marking device may poll for devices within some area when turned on (e.g., may broadcast messages to look for partners based on some criterion/criteria, and/or look for wireless communication signals, such as Bluetooth signals, of sufficient strength). Other scenarios are also possible, as the embodiments described herein relating to locate receivers communicatively coupled to marking devices are not limited to the manner in which the devices communicate or identify one another for communication.

The data may be transmitted between the locate receiver and marking device at any suitable times, such as periodically, upon user actuation, or in other suitable manner. Also, it should be appreciated that the locate receiver and marking device need not be used together in all embodiments. For example, the two devices may be used on different days, or at any other time relative to each other, and may exchange information at any suitable time. Thus, the various aspects described herein relating to a locate receiver communicatively coupled to a marking device are not limited in these respects.

V. Combined Locate and Marking Device

Yet other embodiments of the present invention are directed to a combined locate and marking device (also referred to herein as a "combination locate and marking device" or "combined locate and marking apparatus"). The combined locate and marking device may function as both a locate receiver for locating objects (e.g., underground facilities) and a marking device, as discussed herein in the preceding sections.

According to one aspect of such embodiments, a combination locate and marking device is provided which is configured to collect, store, transmit to an external device and/or analyze/process any of the data types described previously herein (locate information, marking information, and/or landmark information), any combination of such data types, or any other information of relevance to the operation of the combined locate and marking device.

Figure 17:
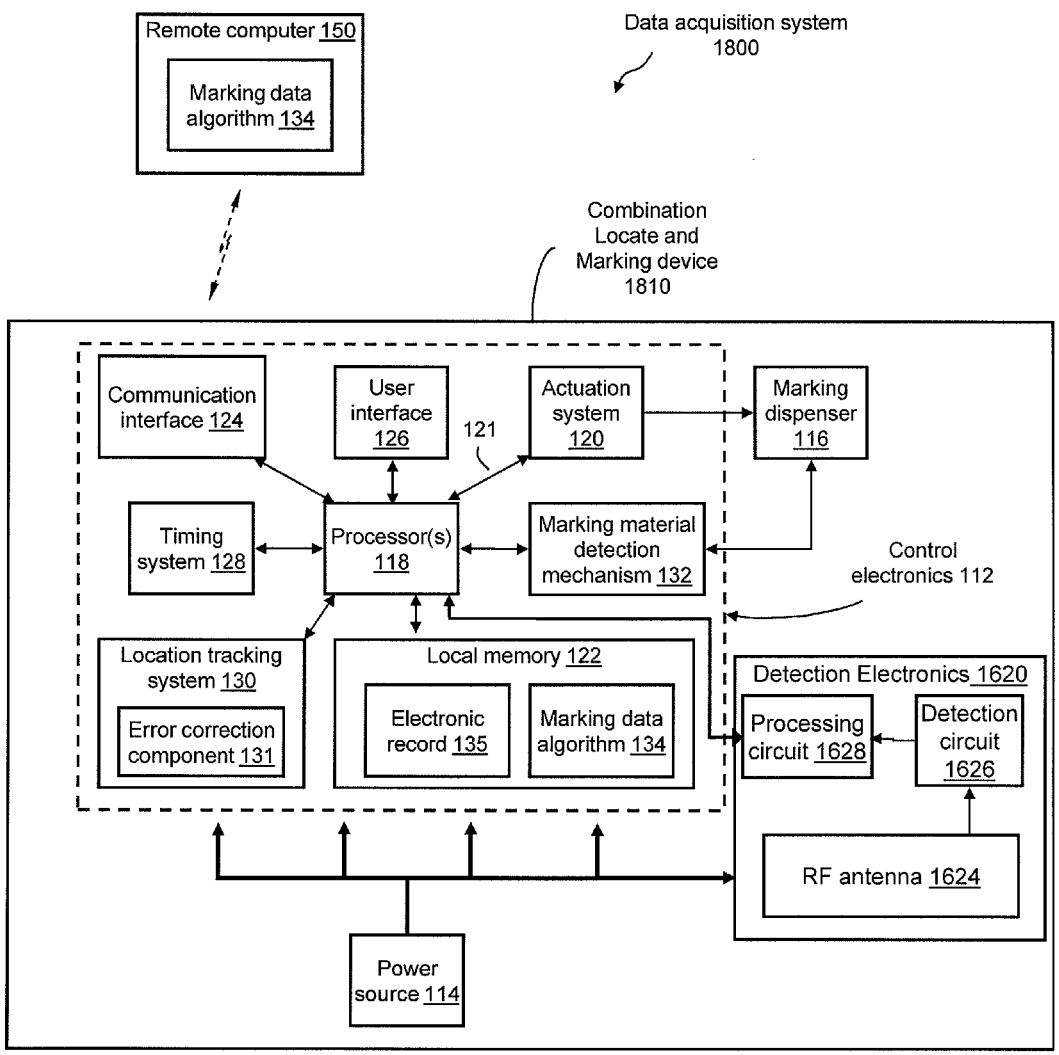
FIGS. 17 and 18 illustrate a functional block diagram and a perspective view, respectively, of a data acquisition system including a combination locate and marking device, according to one embodiment of the present invention.
Figure 18:
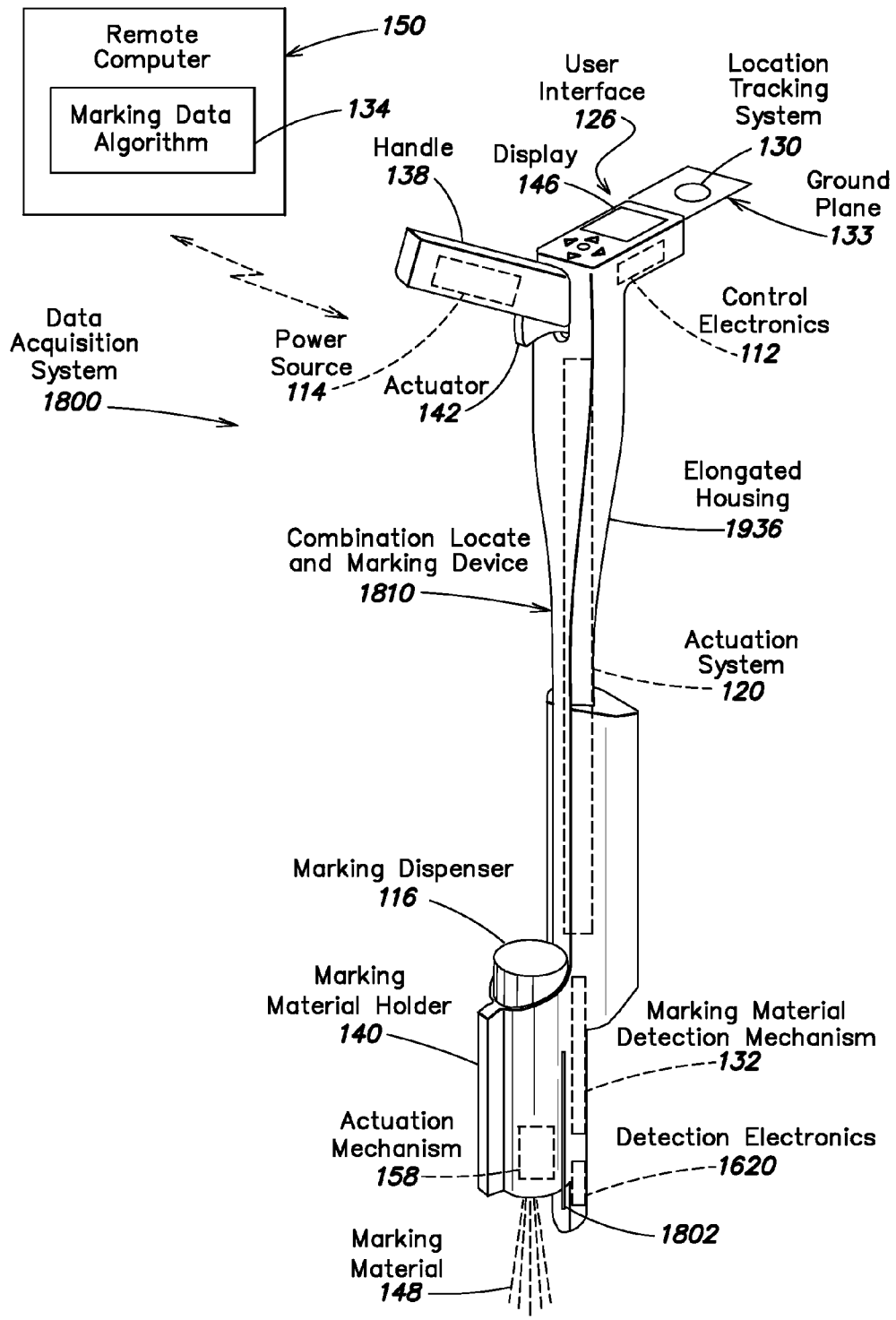

FIGS. 17 and 18 illustrate a functional block diagram and a perspective view, respectively, of a data acquisition system including a combination locate and marking device, according to one non-limiting embodiment. As shown in FIG. 17, the data acquisition system 1800 comprises combination locate and marking device 1810 and (optionally) remote computer 150. It should be appreciated that many of the components illustrated in FIG. 17 have been previously shown and/or described with respect to FIGS. 2 and 14, and that a detailed description of such components is not repeated here, as they may operate in the same, or a substantially similar, manner to that previously described. It should be appreciated that the illustrated control electronics for this non-limiting embodiment of a combination locate and marking device are control electronics 112, previously described with respect to a marking device. However, the functionality of the control electronics 1630 as discussed in connection with FIG. 14 may be realized by the control electronics 112 in this non-limiting embodiment; similarly, the processor 118 in the embodiment of FIG. 17 may perform the functionality previously described with respect to both the processor 118 of FIG. 2 and the processor 1632 of FIG. 14.

The operation of the components of combination locate and marking device 1810 may be coordinated in various manners. As has been described previously herein, the detection electronics may operate to detect the presence or absence of a target object, such as an underground facility. The marking-related components (e.g., actuation system 120, marking dispenser 116, etc.) may be used in connection with dispensing a marking material, for example to mark the location of an underground facility once detected. In practice, the two activities (detecting a target object and marking a location of the target object) may not coincide temporally. Rather, a locate technician may scan an area one or more times to detect the presence of the target object, or may have to scan over a large area to determine the extent of the target object, utilizing the locate receiver functionality of the combination locate and marking device. In some embodiments, the locate technician may operate the combination locate and marking device to dispense a marking material after the target object is detected, or in some instances intermittently while detecting the target object (e.g., while following the length of an underground facility). Thus, various schemes may be employed to coordinate the object detection functionality and the marking functionality.

According to some embodiments, the object detection functionality and the marking functionality may operate at separate times. For example, in one such embodiment, the combination locate and marking device may separately operate in a detection mode and a marking mode, and a user (e.g., locate technician) may select which mode to use, for example by selecting the mode from the user interface. In such an embodiment, the user may operate the combination locate and marking device as a locate receiver until the target object is detected, and then may switch modes to a marking mode, in which the user may operate the combination locate and marking device to dispense marking material. In another such embodiment, the combination locate and marking device may operate substantially continuously as a locate receiver until the user actuates the actuation system 120, at which time the locate receiver functionality may automatically be suspended and the combination locate and marking device may shift to a marking mode for dispensing marking material. Other manners of coordinating the functionality of a combination locate and marking device are also possible, as those manners explicitly listed herein are provided primarily for purposes of illustration.

In addition, as described further below, a combination locate and marking device is further configurable to operate in a landmark mode, according to one embodiment of the present invention. In some such embodiments, the landmark mode may be a distinct mode which may selected by the user, much like the above-described selection of the object detection functionality and the marking functionality. However, other manners in which the combination device may be placed into a landmark mode of operation are also possible.

It should be appreciated from the foregoing discussion that locate information generated in connection with the object detection functionality of a combination locate and marking device may not coincide temporally with the generation of marking information associated with the marking functionality of the combination locate and marking device. The logging and/or transmission of locate and/or marking information generated by a combination locate and marking device may be coordinated in various manners, and the aspects of the invention relating to combination locate and marking devices are not limited to any particular manner of logging and/or transmitting such information. Table 17 illustrates some exemplary schemes for coordinating logging and/or transmission of information relating to both the locate and marking functionality of a combination locate and marking device. It should be appreciated that the examples of Table 17 are not exhaustive, and that other schemes are also possible.

TABLE 17

Schemes for Logging and/or Transmitting Information from Combined Locate and Marking Device

| Locate Information | Marking Information |
|---|---|
| Continuous | Actuation-based |
| Periodic | Periodic |
| Periodic | Actuation-based |
| Periodic | Event-response |
| Actuation-based | Periodic |
| Actuation-based | Actuation-based |
| Actuation-based | Event-response |

According to one embodiment, locate information generated in connection with the locate receiver functionality of combination locate and marking device 1810 may be logged and/or transmitted continuously. For example, object detection-related information such as the detected magnetic field strength (expressed, for example, as a percentage of the maximum detectable magnetic field strength), the magnitude of the electrical current creating the detected magnetic field, and the location of the combination locate and marking device may be logged continuously to local memory 122, for example in one or more electronic records in the local memory 122. According to one such embodiment, information relating to any marking performed with the combination locate and marking device (e.g., marking material information, position of the combination locate and marking device, duration of actuation, etc.) may be logged upon actuation of the actuation system 120.

According to another embodiment, locate information generated in connection with the locate receiver functionality of combination locate and marking device 1810 may be logged and/or transmitted periodically (e.g., at least every two seconds, every five seconds, or at any other suitable intervals). For example, the locate information may be logged in local memory 122 and/or transmitted to remote computer 150 via communication interface 124 every five seconds, every ten seconds, every thirty seconds, every minute, every five minutes, or at any other time interval. According to one such embodiment, marking information relating to any marking performed with the combination locate and marking device (e.g., marking material information, position of the combination locate and marking device, duration of actuation, etc.) may be logged upon actuation of the actuation system 120.

According to another embodiment, locate information generated in connection with the locate receiver functionality of combination locate and marking device 1810 may be logged in response to an event. The event may be the detection of an underground facility, for example as indicated by detection of a magnetic field magnitude above a threshold value, may be the detection of the absence of an underground facility, may be the taking of a depth measurement, or may be any other event of interest. As but one example, information relating to magnetic field strength, detected electrical current magnitude, geographical location of the combination locate and marking device, and timing information may be automatically logged into an electronic record in local memory 122 upon detection by RF antenna 1624 of a magnetic field magnitude exceeding a threshold value. Other events, however, may additionally or alternatively be used to trigger logging of locate information related to the locate receiver functionality.

In some such embodiments in which locate information relating to the locate receiver functionality is logged and/or transmitted in response to detection of an event of interest, marking material may be automatically dispensed in response to detection of the event and marking information about the marking functionality may be automatically logged into the local memory 122, for example in combination with the electronic record(s) relating to the locate receiver functionality or in one or more separate electronic records. In others of such embodiments in which locate information relating to the locate functionality is logged and/or transmitted in response to detection of an event of interest, marking material may be dispensed only upon actuation by a user (e.g., a locate technician), and marking information relating to the marking functionality may be logged in local memory 122 and/or transmitted to remote computer 150 via communication interface 124 upon actuation of the actuation system 120. In some embodiments, the actuation system may be disabled until the one or more types of events (e.g., detection of a magnetic field of suitable magnitude, detection of the presence of an applied signal from a transmitter, etc.) occurs, at which time the actuation system may be enabled and a user may choose whether or not to actuate the system.

In yet other embodiments, locate information relating to the locate receiver functionality of the combination locate and marking device and marking information relating to the marking functionality are both logged in local memory and/or transmitted (e.g., to a remote computer) upon actuation of the actuation system 120. In some embodiments, both types of information are logged and/or transmitted for a same actuation of the actuation system 120. In other embodiments, separate actuations are used to log and/or transmit locate information relating to the locate receiver functionality and marking information relating to the marking functionality, which in some embodiments may depend at least partially on whether the combination device is in a locate mode or a marking mode of operation.

While various schemes have been described by which information relating to both the locate receiver functionality and the marking functionality of combination locate and marking device may be logged and/or transmitted, it should be appreciated that other schemes are also possible. The various aspects described herein relating to a combination locate and marking device are not limited to any particular manner of coordinating logging and/or transmission of information relating to the operation of the device.

According to those embodiments of the invention relating to a combination locate and marking device, various events may be logged for one or more of the locate, marking, and landmark functionality (described further below). For example, events according to Tables 2-5 for the marking functionality may be logged. Events according to Tables 12-13 for the locate functionality may be generated. Other event types are also possible, as it should be appreciated that those explicitly described herein are primarily for purposes of illustration and are not limiting of the types of events that may be logged. For example, an event may be logged corresponding to a mode selection between a locate mode, a marking mode, and a landmark mode of a combination locate and marking device, in those embodiments in which such a device may be operated in the three described modes. Table 18 below provides an example of content and format for a mode select event entry that may be logged in a file for an electronic record and/or transmitted by the combination locate and marking device. The example mode select event entry shown below in Table 18 follows a similar format to that used for the event entry examples provided in Tables 2-5 and 8 above. It should be appreciated that other types of events may also or alternatively be logged, and that the examples described herein are provided primarily for purposes of illustration.

TABLE 18

| | |
|---|---|
| Format | INFO+CMBMODE: (DATE) (TIME) (WAND_ID) (JOB_ID) (MODE) <CR><LF> |
| Examples | INFO+CMBMODE: DATE(2009-04-15) TIME(12:03:44) WAND(2334) JOB(4000) MODE (LOCATE) <CR> <LF> INFO+CMBMODE: DATE(2009-04-15) TIME(12:10:32) WAND(2334) JOB(4000) MODE (MARKING) <CR> <LF> INFO+CMBMODE: DATE(2009-04-15) TIME(12:11:12) WAND(2334) JOB(4000) MODE (LANDMARK) <CR> <LF> |

As discussed above in connection with both marking devices and locate devices, in yet another embodiment, the processor of a combination locate and marking device may be configured to generate an essentially continuous stream of data packets representing various event entries logged by the device. In particular, each data packet may include a header, one or more flag fields, and one or more information payload fields. To accommodate one or more of a locate mode, a marking mode and a landmark mode, one or more flag fields may be set or reset upon selection of the respective modes so as to identify the contents of any information payload field in the data packet as one of locate information, marking information, and landmark information. Similarly, as discussed above, one or more other flag fields may be set (or reset) upon occurrence of one or more predetermined interrupt events (e.g., pull/depress actuator, release actuator, marking dispenser in, marking dispenser out, logging of locate receiver based on signal strength or other event, low power, communication link fail, etc.). In this manner, a continuous stream of data may be provided as an output by the processor, in which certain interrupt events, such as an actuation and/or release of the actuator, "tag" certain data packets via an interrupt flag, and certain data packets also may be tagged as generated in a particular operating mode. In yet other aspects of this embodiment, all data packets thusly generated may be stored in the file opened for the electronic record and/or transmitted from the device in essentially real time; alternatively, only certain data packets with one or more predetermined flags set may be stored and/or transmitted.

Table 19 below illustrates one non-limiting example of four electronic records that may be stored in the local memory 122 of the combination locate and marking device 1810, each corresponding, for example, to a separate actuation event of actuation system 120. It should be appreciated, however, that these are merely examples, and that various alternative electronic records may be generated according to the aspects of the invention, for example reflecting different types of information associated with operation of a combination locate and marking device.

Each of the four records of Table 19 includes general information not limited to either the locate receiver functionality or marking functionality of the combination device, such as an identification of the service provider (Service provided ID), an identification of the user (User ID), an identification of the device (Device ID), and information about the requestor of the locate operation and the requested address (Locate request data). In addition, an entry describing the mode of data collection (e.g., Manual) for the device is also collected, which may indicate that information is logged into the record(s) upon actuation of the actuation system 120. Information about the actuation itself, such as the time of actuation (Timestamp data), actuation duration, and geographical location at the start, during, and/or at and end of the actuation may also be included. The electronic records also include information relating to the locate receiver functionality of the combination locate and marking device, including the receiver detection mode (i.e., PEAK in Table 19), the strength of a detected signal, the gain of the receiver, and the frequency of the detected signal. Information relating to a depth measurement (Facility depth) is also included, as is information about the marking material to be dispensed by the combination locate and marking device. Information about the remaining battery life of the device may also be included, in those embodiments in which the combination device includes a battery. Again, it should be appreciated that Table 19 is an illustration of one electronic record that may be generated in association with operation of a combination locate and marking device, and that other forms of electronic records are also possible.

TABLE 19

Electronic Record for Combination Locate and Marking Device

| | | |
|---|---|---|
| Record # 1001 | Service provider ID | 0482 |
| | User ID | 4815 |
| | Device ID | 7362 |
| | Device mode | Mode = MANUAL |
| | Timestamp data | 12-Jul-2008; 09:35:15 |
| | Actuation duration | 0.5 sec |
| | Start actuation location data | 2650.9348, N, 08003.5057, W |
| | End actuation location data | 2650.9353, N, 08003.5055, W |
| | Locate mode | Mode = PEAK |
| | Signal strength (% of maximum) | 85% |
| | Gain | 45 |
| | Signal frequency | 1 kHz |
| | Facility depth | 3.4 meters |
| | Marking material data | Color = RED, Brand = ABC |
| | Battery strength data | 85% |
| | Ground type | Pavement |
| | Other info (text entry) | "excavator on site for consult" |
| | Locate request data | Requestor = XYZ Construction Company, Requested service address = 222 Main St, Orlando, FL |
| Record # 1002 | Service provider ID | 0482 |
| | User ID | 4815 |
| | Device ID | 7362 |
| | Device mode | Mode = MANUAL |
| | Timestamp data | 12-Jul-2008; 09:35:18 |
| | Actuation duration | 0.4 sec |
| | Start actuation location data | 2650.9256, N, 08003.5234, W |
| | End actuation location data | 2650.9256, N, 08003.5226, W |
| | Locate mode | Mode = PEAK |
| | Signal strength (% of maximum) | 85% |
| | Gain | 45 |
| | Signal frequency | 1 kHz |
| | Facility depth | 3.4 meters |
| | Marking material data | Color = RED, Brand = ABC |
| | Battery strength data | 84% |
| | Ground Type | Pavement |
| | Other info (text entry) | "excavator on site for consult" |
| | Locate request data | Requestor = XYZ Construction |

TABLE 19-continued

Electronic Record for Combination Locate and Marking Device

| | | |
|---|---|---|
| Record #1003 | Service provider ID | Company, Requested service address = 222 Main St, Orlando, FL<br>0482 |
| | User ID | 4815 |
| | Device ID | 7362 |
| | Device mode | Mode = MANUAL |
| | Timestamp data | 12-Jul-2008; 09:35:21 |
| | Trigger pull duration | 0.5 sec |
| | Start actuation location data | 2650.9273, N, 08003.5193, W |
| | End actuation location data | 2650.9281, N, 08003.5190, W |
| | Locate mode | Mode = PEAK |
| | Signal strength (% of maximum) | 85% |
| | Gain | 45 |
| | Signal frequency | 1 kHz |
| | Facility depth | 3.4 meters |
| | Marking material data | Color = RED, Brand = ABC |
| | Battery strength data | 83% |
| | Ground type | Pavement |
| | Other info (text entry) | "excavator on site for consult" |
| | Locate request data | Requestor = XYZ Construction Company, Requested service address = 222 Main St, Orlando, FL |
| Record #1004 | Service provider ID | 0482 |
| | User ID | 4815 |
| | Device ID | 7362 |
| | Device mode | Mode = MANUAL |
| | Timestamp data | 12-Jul-2008; 09:35:25 |
| | Actuation (actuation) duration | 0.5 sec |
| | Start actuation location data | 2650.9321, N, 08003.5177, W |
| | End actuation location data | 2650.9325, N, 08003.5176, W |
| | Locate mode | Mode = PEAK |
| | Signal strength (% of maximum) | 85% |
| | Gain | 45 |
| | Signal frequency | 1 kHz |
| | Facility depth | 3.4 meters |
| | Marking material data | Color = RED, Brand = ABC |
| | Battery strength data | 83% |
| | Ground type | Pavement |
| | Other info (text entry) | "excavator on site for consult" |
| | Locate request data | Requestor = XYZ Construction Company, Requested service address = 222 Main St, Orlando, FL |

As discussed above in connection with the marking device shown in FIGS. 2 and 3 and the locate device shown in FIGS. 14 and 15, a file for an electronic record of combined locate information and marking information may have any of a variety of formats and include any of a variety of data structures. For example, such a file may be a flat file including a succession of time stamped "event entries" of various locate information (logged automatically as a result of one or more particular conditions, e.g., exceeded thresholds for various signals, or manually as a result of user actuation of the combined device), marking information (e.g., logged as a result of user actuation of the combined device), and/or landmark information, or a differently formatted file (e.g., an ASCII file, a CSV file, an XML file, etc.), as well as files having a data structure that segregates or separates in some manner the locate, marking, and/or landmark information into multiple different fields.

Information generated in association with the locate functionality of a combination locate and marking device may be logged and/or transmitted with information associated with the marking functionality of the device in any suitable manner. In one embodiment, information generated in association with the locate functionality may be logged and/or transmitted in separate electronic records from information generated in association with the marking functionality. The separate records may be independent in some embodiments, with no coordination between them. In an alternative embodiment, electronic records generated in association with the locate functionality may be coordinated with electronic records generated in association with the marking functionality, for example by appending one record to another, or by providing linking information, such as a pointer, identifying the separate records as being relevant to each other. In one non-limiting embodiment, a combination locate and marking device may be operated in a manner such that it is expected that locate information will be collected preceding the collection of marking information (for example, one after the other), and separate electronic files for the locate and marking operation may be grouped by grouping a locate-related file with a subsequent marking-related file.

In yet other embodiments, such as that described with respect to Table 19 above, information associated with the locate functionality may be logged and/or transmitted in a single file including information associated with the marking functionality. The information may be identified as belonging in a single record, in one non-limiting embodiment, using any common key, such as a common timestamp, a common geographic location (e.g., GPS coordinates), a common job ID, any combination of information, or any other common key. Thus, even in those embodiments in which locate information and marking information are not generated at substantially the same time (e.g., when a mode change is used to switch from locate functionality to marking functionality), the information may be coordinated and compiled using a common key.

The information logged and/or transmitted by combination locate and marking device 1810 may be used for various applications. For example, the information may be used to monitor progress and/or operation of the user, to monitor operation of the device itself, to reconstruct the user's actions at a later time and date, and/or to compare to historical information. Various examples of computer-assisted visual rendering of locate information and/or marking information are discussed below in section VI.

FIG. 18 illustrates a perspective view of a non-limiting example of a combination locate and marking device, according to one embodiment. Some of the components illustrated are also shown in FIG. 3 and have been previously described with respect to that figure. The elongated housing 1936 in FIG. 18 may be similar to elongated housing 136 of FIG. 3, with some of the illustrated components being mechanically coupled to (e.g., affixed to, disposed within, etc.) the elongated housing. The elongated housing 1936 may be formed of any rigid, semi-rigid, strong, and lightweight material, such as, but not limited to, molded plastic and aluminum, or any other suitable material(s). The actuation system 120 may be the same as that previously shown and described with respect to FIGS. 4A, 4B, and 5, or may be any other suitable actuation system.

The detection electronics 1620 are illustrated as being positioned toward the tip of the combination locate and marking device 1810. It should, however, be appreciated that the detection electronics, which as shown in FIG. 17 comprises multiple components, may be arranged in a more distributed fashion relative to the elongated housing 1936. For example, the RF antenna 1624 (which, again, may include any number of antennae) may be positioned toward the tip of combination locate and marking device 1810, while the detection circuit 1626 and processing circuit 1628 may be positioned at other locations, for example near control electronics 112, or at any other suitable location. It should also be appreciated that electrical connection between two or more of the electrical components illustrated in FIG. 18 may be made in any suitable manner, for example by wired interconnections, as appropriate.

According to one embodiment, one or more components of the detection electronics 1620, such as the RF antenna, may be electrically shielded from other components of the combination locate and marking device 1810, for example to prevent the other components from interfering with the detection of magnetic field by the RF antenna. As an example, a shield plate 1802 (e.g., made of metal or any other suitable shielding material) may be positioned suitably to shield one or more components of the detection electronics 1620, for example by positioning the shield plate between the detection electronics and the actuation mechanism 158 in FIG. 18. Other configurations are also possible, and not all embodiments of a combination locate and marking device are limited to having a shield plate for electrically shielding the detection electronics 1620.

The display 146 of the combination locate and marking device 1810 may be used to display various information of interest to a user. For example, information about a detected magnetic field strength, a detected signal frequency, a mode of operation, or a depth measurement may be displayed. Similarly, information about marking material (e.g., color, brand, amount remaining in a marking material dispenser, etc.) may also be displayed to the user. In some embodiments, the display may be a touch screen display, although other display types are also possible, as discussed above in connection with previously described embodiments.

Figure 19:
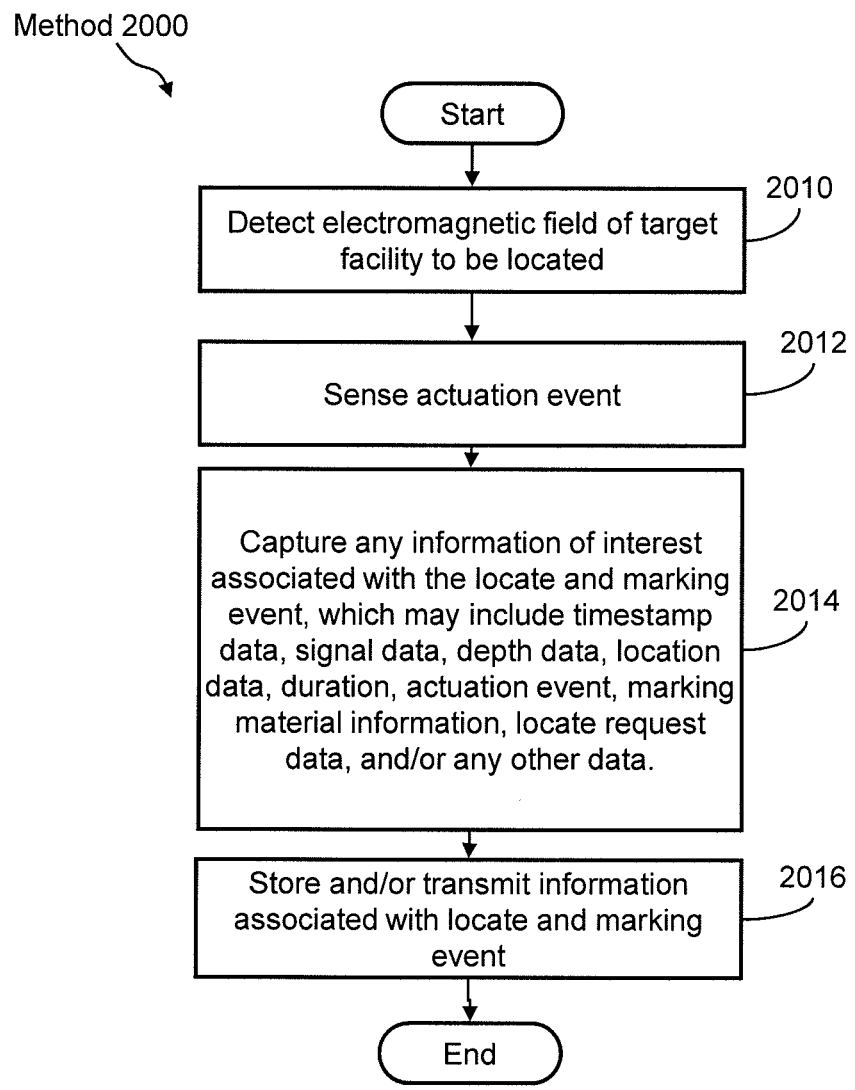
FIGS. 19 and 20 illustrate two non-limiting illustrative methods, according to embodiments of the present invention, which may employ a combination locate and marking device as described herein.
Figure 20:
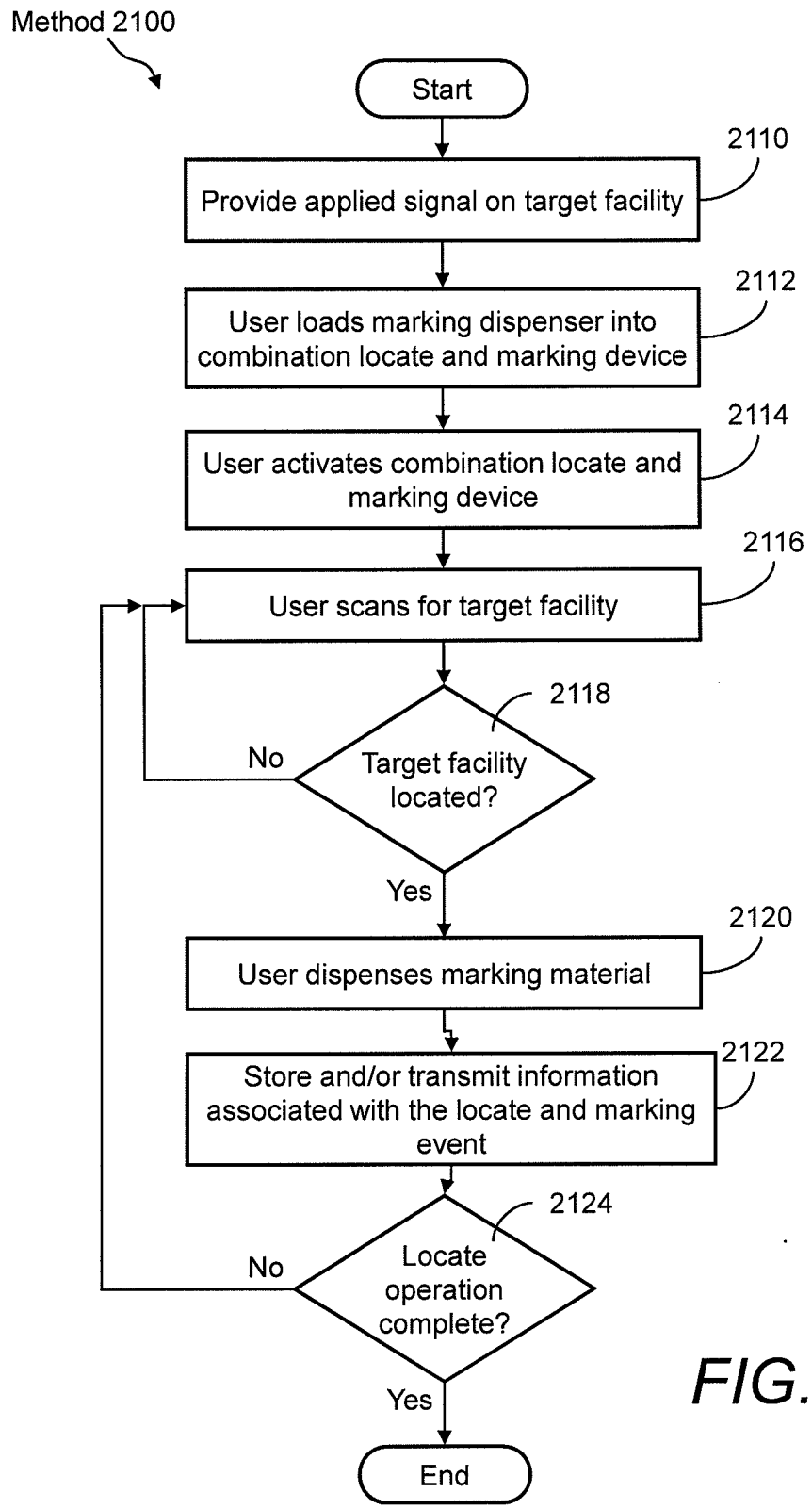

FIGS. 19 and 20 illustrate two non-limiting illustrative methods which may employ a combination locate and marking device as described herein, such as combination locate and marking device 1810. It should be appreciated that the ordering of the acts of methods 2000 and 2100 is not limiting, as the respective acts shown may be performed in various orders.

Referring to method 2000 of FIG. 19, in act 2010 the electromagnetic field of the target facility to be located is detected by the combination locate and marking device 1810. More specifically, the detection electronics 1620 of the combination locate and marking device may detect, for example, an electromagnetic field emitted by a facility. The detection circuit 1626 may receive, amplify, and filter signals from RF antenna 1624. Further, the signals may be digitized in detection circuit 1626 and passed to processing circuit 1628, which may perform operations to calculate depth and location of the target facility based on the electromagnetic fields that are detected by RF antenna 1624. The output that is generated by processing circuit 1628 may then be displayed to the user via user interface 126 and/or stored in local memory 122.

In act 2012, an actuation event of an actuator of the combination locate and marking device is sensed. In act 2014, any information of interest associated with the combination locate and marking event is captured in response to sensing the actuation event. For example, any of the information shown in Table 19 may be captured, or any other information of interest associated with the combination locate and marking device.

In act 2016, information associated with the combined locate and marking event, including the information captured at block 2014, may be stored and/or transmitted in real time or non-real time to a remote computer and/or network.

Referring to FIG. 20, the method 2100 begins at block 2110, in which an applied signal is provided on the target facility to be located. For example, referring to FIG. 1A, locate transmitter 1505 may be coupled to a target facility and send an applied signal along the target facility. In other embodiments, the applied signal may be an alternating current (AC) signal already present on the target facility (e.g., if the target facility is a power line) or may be a signal from locate transmitter 1505 that is conductively or inductively coupled to a tracer wire along the length of a passive facility, such as a sewer or gas line.

In act 2112, the user loads the marking dispenser into the combination locate and marking device. For example, the user of combination locate and marking device 1810 loads marking dispenser 116 into marking material holder 140, as shown in FIG. 18.

In act 2114, the user activates (i.e., powers on) the combination locate and marking device by the actuation of, for example, a manual pushbutton or toggle switch of user interface 126, or in any other suitable manner. As a result, power from power source 114 is delivered to the active components of combination locate and marking device.

In act 2116, the user performs a scan with the combination locate and marking device to detect the presence and/or absence of a target facility. For example, the user may sweep the combination locate and marking device over the ground. The signal strength of any detected electromagnetic field may be presented to the user via the user interface. The user interface may include, for example, a visual display of the signal strength (e.g., display numerical readings of signal strength, display a variable length bar that corresponds to signal strength, etc.) and/or an audible tone that varies in pitch and/or amplitude with signal strength.

In act 2118, it is determined whether the target facility is located, for example based upon the strength of any electromagnetic field detected in act 2116. If the target facility is located, method 2100 proceeds to act 2120, at which the user dispenses marking material, for example by actuating an actuator of the combination locate and marking device. Conversely, if the target facility is not located, method 2100 returns to act 2116.

In act 2122, information associated with the locate operation may be stored locally and/or transmitted to an external system or device. For example, data, such as the data shown in Table 9, may be stored in local memory and/or transmitted in real time or non-real time to a remote computer and/or network via a communication link of the combination locate and marking device.

In act 2124, a determination is made whether the locate and marking operation is complete, for example based on instructions provided with the locate request. If the locate operation is complete, method 2100 ends. If the locate operation is not complete, method 2100 returns to act 2116.

According to one embodiment of the present invention, a combination locate and marking device may be configurable to operate in a landmark mode, substantially the same as the landmark mode described previously herein in connection with marking devices and with locate receivers. The combination locate and marking device may include any components and circuitry suitable to allow for operation in a landmark mode, such as the bypass components, actuation locking components, and/or user interface components previously described with respect to a marking device providing landmark functionality, or any other suitable components and circuitry. Similarly, the types of information collected and the manner of operation of a combination locate and marking device exhibiting landmark functionality may be substantially the same as that previously described with respect to marking devices having landmark functionality.

VI. Computer-Generated Visual Representations of Locate and Marking Operations With reference to the marking device illustrated in FIGS. 2 and 3, the locate device illustrated in FIGS. 14 and 15, the data acquisition system of FIG. 16, or the combined locate and marking device illustrated in FIGS. 17 and 18, in yet another embodiment the processor associated with any of these devices (and/or one or more remote computers 150) may additionally process various locate information, marking information and/or landmark information, provided in real time from one or more of these devices and/or stored in one or more electronic records, and control a display device (e.g., display 146 of marking device 110 or combined locate and marking device 1810, or display 1646 of locate receiver 1610, or some other display device such as a display on a remote computer) to render a computer-generated visual representation of locate information, marking information and/or landmark information. Such a visual representation may be used, for example, to provide immediate feedback to the locate technician, provide essentially real-time feedback to a supervisor monitoring the technician from a remote location, provide a visual record of the locate information, marking information and/or landmark information (e.g., for archiving purposes, once one or more electronic records are generated), and/or to verify the quality (e.g., accuracy and completeness) of work performed during the locate and/or marking operation. It should be appreciated that in various exemplary implementations of a computer-generated visual representation according to the present invention, any one or combination of locate information, marking information and landmark information may be visually rendered in a display field.

In various aspects of this embodiment, a visual representation may be static in that all available information is presented in a display field at one time after collection of the information (e.g., completion of the locate and/or marking operation and generation of an electronic record); alternatively, the visual representation may be dynamic in that information representing successive actuations of a locate device, a marking device or a combined locate and marking device, or automatic logging of data in a locate device, is displayed in essentially real-time as it is collected, or may be displayed after collection (e.g., generation of an electronic record) in a time-sequenced animation that "recreates" the collection of information (e.g., recreates the locate and/or marking operation) on the time scale in which it was originally acquired.

In other aspects, the relative positions of GPS-identified events/objects noted in an electronic record including one or more of locate information, marking information and landmark information may be displayed (e.g., based on geo-location data and some appropriate scale of an available display field of display 146) to provide a visual representation. A visual representation may also be rendered in one or more particular colors corresponding to one or more particular underground facilities located and/or marked (e.g., see Table 7).

In one exemplary implementation relating to marking operations, such a visual representation may include one "electronic locate mark" displayed in a display field for each actuation/dispensing action of a marking device or combined locate and marking device, such that there is essentially a one-to-one correspondence between electronic locate marks and physical locate marks for a given underground facility marked during a marking operation. Alternatively, in another exemplary implementation of such a visual representation for a marking operation, an essentially continuous solid line (or other line type) may be displayed in a display field to represent a given underground facility marked during a marking operation.

In another aspect of data processing for computer-aided visual rendering, the processor may process the geo-location data in electronic records from a locate device, a marking device and/or a combined locate and marking device so as to filter, average, interpolate and/or otherwise "smooth" data (e.g., so as to provide "cleaner" visual renderings and/or connect successive locate marks represented by respective actuation data sets of an electronic record); alternatively, "raw data" provided by a given device may be utilized for the visual representation. In yet another aspect of this embodiment, visual representations of multiple locate and/or marking operations for different underground facilities within the same work site/dig area may be generated in the same display field of a display device so as to provide a composite visual representation, in which different underground facilities may be uniquely identified in some manner (e.g., by different line types and/or different colors), and one or more environmental landmarks in and/or around the work site/dig area may be identified using a variety of displayed identifiers (e.g., icons, symbols, marks, shapes, etc.).

In the following discussion, a process for generating a visual representation in a display field based on information in an electronic record is described for illustrative purposes based on marking information and/or landmark information contained in an electronic record (as acquired using a marking device or a combined locate and marking device). However, it should be appreciated that the general concepts outlined below in connection with visual renderings may be applied similarly to locate information contained in one or more electronic records generated by a locate device or a combined locate and marking device, as well as landmark information contained in one or more electronic records generated by a locate device.

Figure 21:
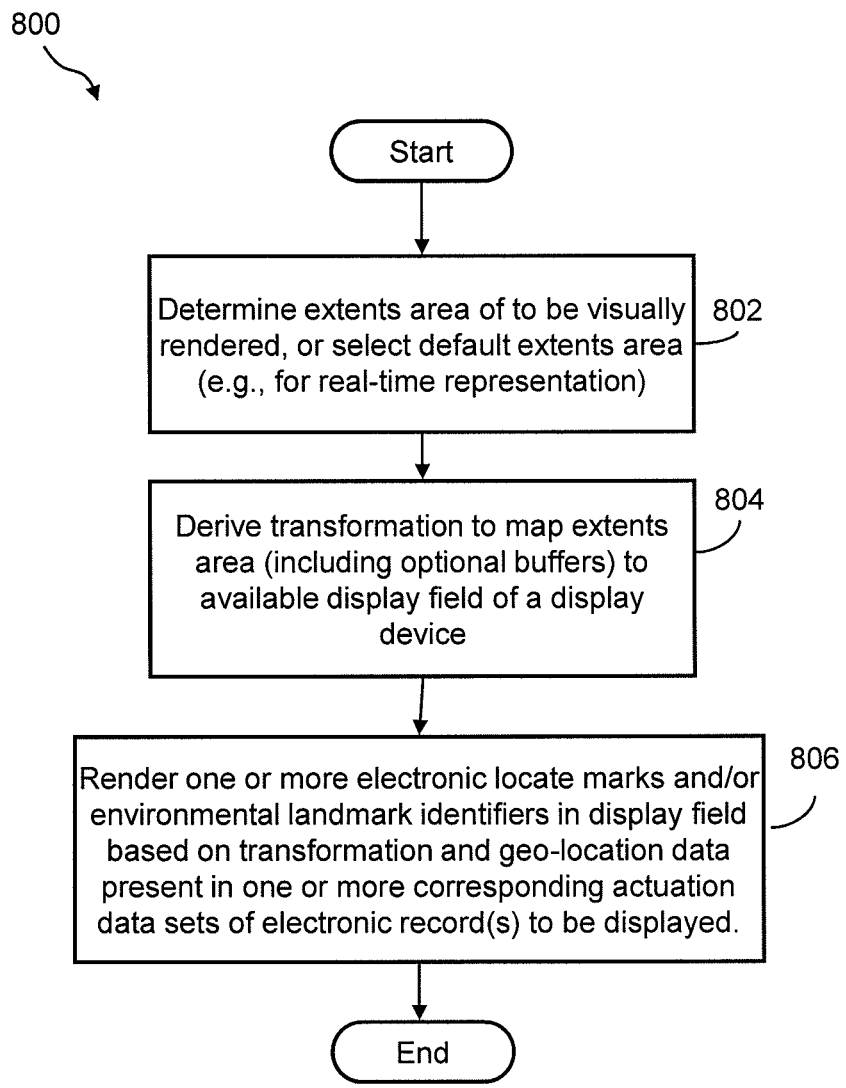
FIG. 21 is a flow diagram of an exemplary method for displaying a visual representation of a marking operation in a display field having a predetermined scale, according to one embodiment of the present invention.

FIG. 21 illustrates a flow chart for a process 800 according to one embodiment of the present invention for generating a visual representation of a marking operation based on an electronic record and/or essentially real-time information transmission from the marking device 110. As noted above, the process 800 may result from the execution of various embodiments of the marking data algorithm 134 on the processor 118 of the marking device 110 or the combined locate and marking device 1810 (to render the visual representation on the display 146), or by one or more other remote computers (to render the visual representation on one or more other display devices).

In block 802 of the process 800, if an electronic record has already been generated for the marking operation in which one or more underground facilities are marked and/or environmental landmark information is acquired, the record is examined to determine the geographic extents of the locate marks and/or environmental landmarks to be visually rendered on a display device. In particular, the processor 118 may review the geo-location data of all actuation data sets of the electronic record to determine (e.g., based on the respective latitude and longitude coordinates of the available geo-location data) the maximum extents of the marking operation to be visually rendered.

The maximum extents of the marking operation may be determined in any of a variety of manners according to different exemplary implementations. For example, in one exemplary implementation, in block 802 the processor 118 may determine the centroid of all electronic locate marks and/or environmental landmarks represented by respective actuation data sets of the electronic record to be displayed.

The processor then determines the geographic extent of the collection of electronic locate marks and/or environmental landmarks by determining one or more latitude/longitude coordinate pairs from the available data having a greatest distance from the centroid. In one example, the processor may determine a single farthest point from the centroid, and a distance between this farthest point and the centroid serves as a radius of a circle that provides an "extents area circle." In another example, the "farthest opposing corners" of a rectangle around the centroid may be determined by assigning the centroid as the origin of a reference coordinate system, and finding the coordinate pairs in opposing quadrants of the coordinate system having a greatest distance from the centroid (e.g., the +LAT/+LONG and −LAT/−LONG coordinate pairs at a greatest distance from the origin) to provide an "extents area rectangle." Other types of polygons and closed shapes (ovals) may be employed to provide an extents area for the marking operation to be displayed.

Alternatively, if an electronic record has not been previously generated and information received in essentially real-time from the marking device or the combined locate and marking device is to be displayed in a display field, a default extents area may be selected in advance based on any of a variety of criteria. For example, address and/or site description information provided in a ticket pursuant to which the marking operation is performed may provide a basis on which an extents area for the marking operation may be estimated a priori. Similarly, as discussed further below in connection with FIG. 24, an available digital image of the work site/dig area may be employed to determine or estimate an initial extents area for the marking operation.

In block 804, the extents area of the marking operation to be visually rendered is then mapped to an available display field of a display device, using any appropriate scaling factor as necessary, to ensure that all of the geo-location data in the electronic record fits within the display field. For example, in one exemplary implementation, a transformation may be derived using information relating to the available display field (e.g., a reference coordinate system using an appropriate scale for a given display field of a display device) to map data points within the extents area to the available display field. In another aspect of this example, a buffer area around the extents area may be added to provide one or more suitable margins for the displayed visual representation, and/or to accommodate different shapes of extents areas to the available display field of the display device, and an appropriate transformation may be derived based on this optional additional buffer area.

Once a transformation is derived to map the marking operation extents area to the available display field of a display device, in block 806 one or more electronic locate marks and/or one or more identifiers (e.g., icons, symbols, marks, shapes, etc.) is/are rendered in the display field based on applying the transformation to the geo-location data present in the data set of one or more corresponding actuation data sets of the electronic record. In one exemplary implementation, one electronic locate mark is rendered in the display field for each actuation data set of an electronic record. With reference again to Table 6 and FIG. 10, in one embodiment each actuation data set includes at least T1 geo-location data for a start of an actuation of a marking device and one or more other pieces of geo-location data during actuation. Using multiple pieces of geo-location data per actuation data set, an electronic locate mark may be rendered as a line in the display field (e.g., so as to visually represent one of the physical locate marks 414-1, 414-2 or 414-3 shown in FIG. 8). In another exemplary implementation, an electronic locate mark may be rendered for each geo-location data in a given entry, such that multiple electronic locate marks correspond to one actuation (e.g., a series of dots electronically rendered to graphically represent a line-type physical locate mark). In one aspect, as discussed above, a given electronic locate mark may be rendered in a particular color and/or line type to represent a type of underground facility represented by the mark (e.g., as indicated by marking material information included in the electronic record).

Figure 22:
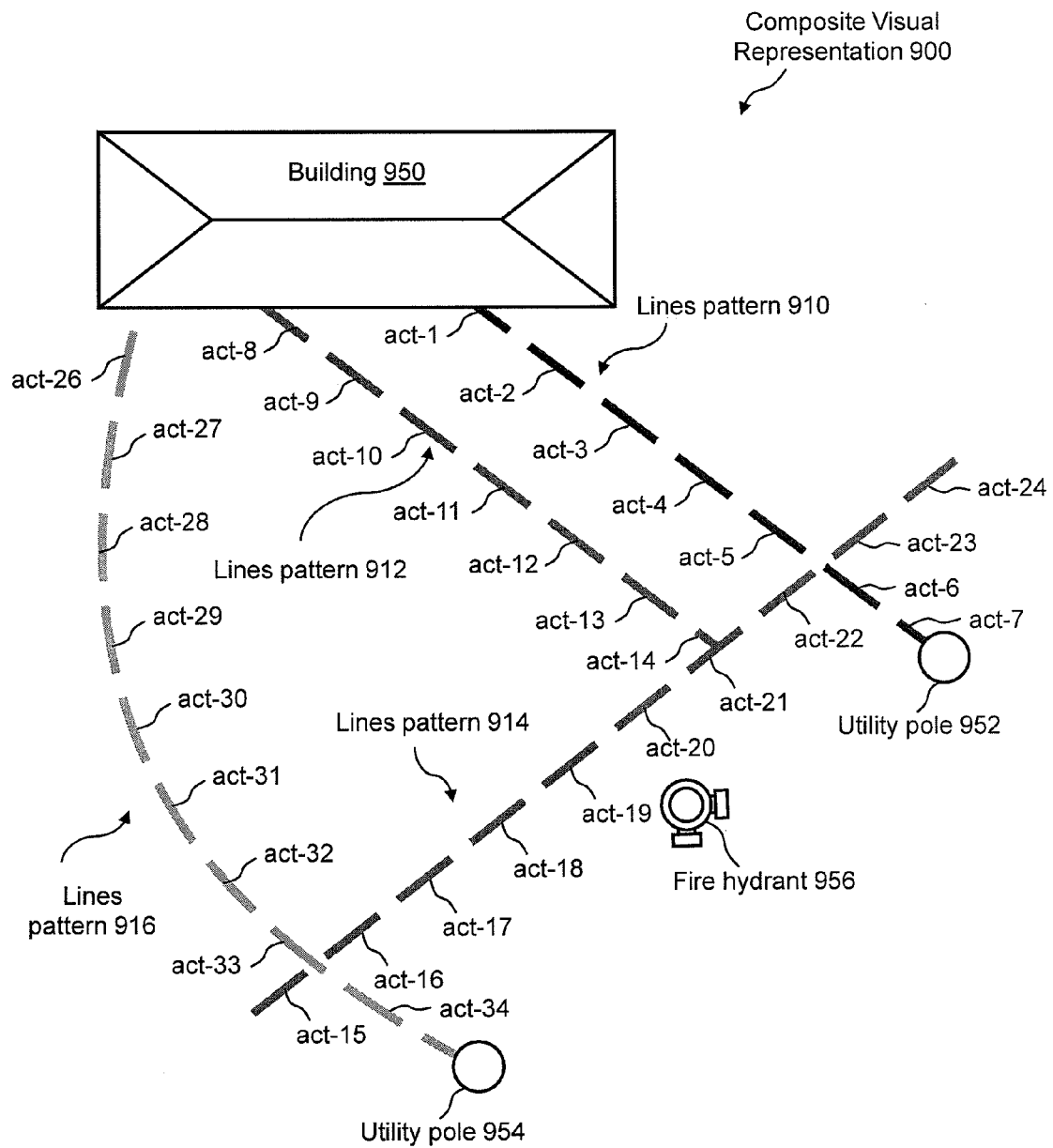
FIG. 22 is an example of a visual representation showing electronic locate marks based on collected data corresponding to respective actuations of a marking device or a combined locate and marking device during marking operations, according to one embodiment of the present invention.

FIG. 22 illustrates a plan view of an exemplary composite visual representation 900 that "electronically recreates" a marking operation for various underground facilities and environmental landmarks present in a work site/dig area, based for example on the process 800 discussed above. In particular, FIG. 22 illustrates a number of electronic locate marks corresponding to actuations of a marking device whose relative positions in the display field are derived from actuation data sets of the electronic record, as discussed above. In the example of FIG. 22, act-1 through act-7 form a lines pattern 910 representing a first marked underground facility, act-8 through act-14 form a lines pattern 912 representing a second marked underground facility, act-15 through act-24 form a lines pattern 914 representing a third marked underground facility, and act-26 through act-34 form a lines pattern 916 representing a fourth marked underground facility. FIG. 22 also includes identifiers for various environmental landmarks disposed in proximity to the electronic locate marks; in particular, a building 950 is shown in the top portion of FIG. 22, whereas two utility poles 952 and 954, as well as a fire hydrant 956, are shown in the bottom portion of FIG. 22.

Figure 23:
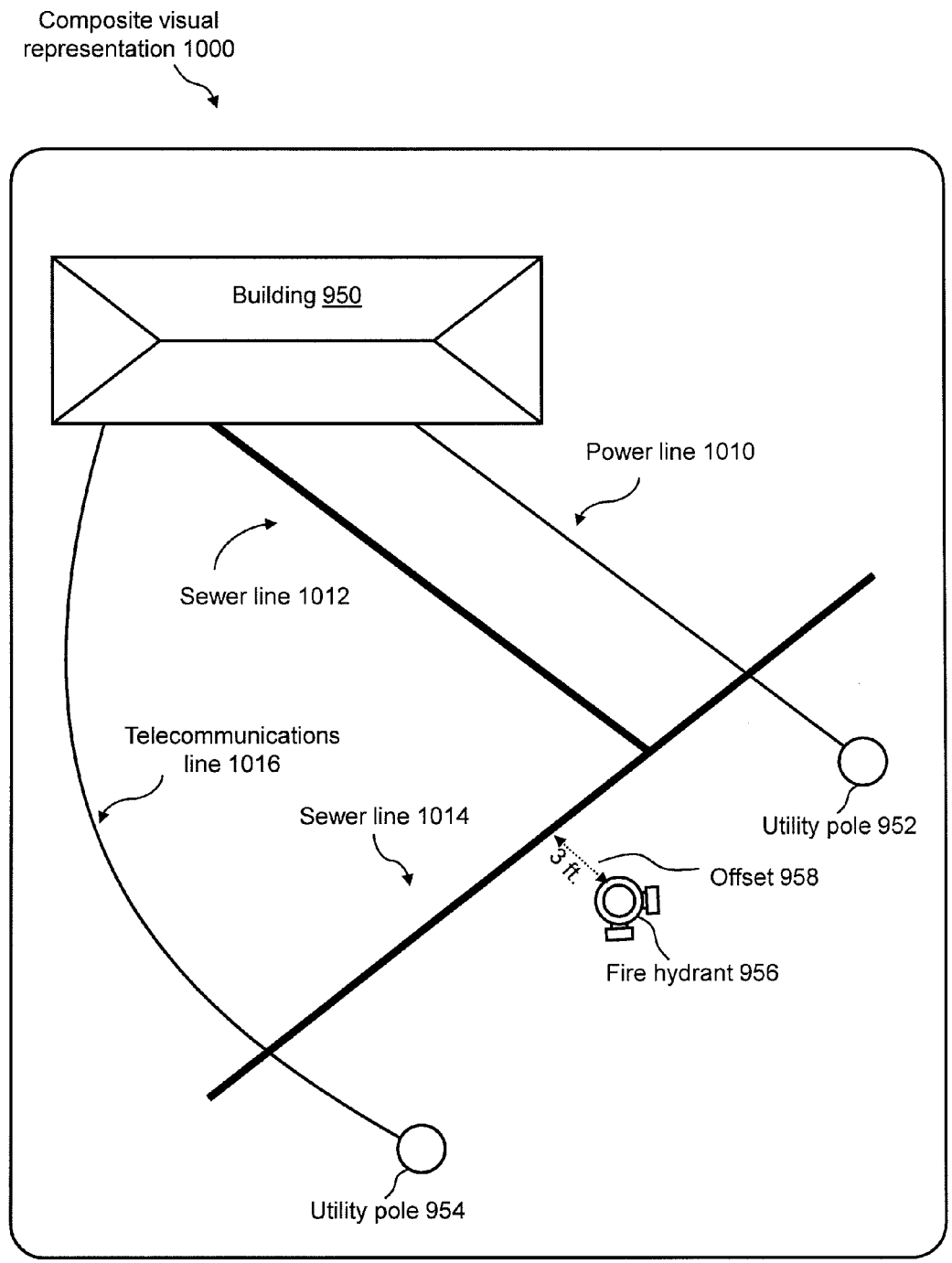
FIG. 23 is an example of another visual representation of marking operations, according to one embodiment of the present invention.

As noted above, while in one embodiment there may be a one-to-one correspondence between electronic locate marks rendered in a single or composite visual representation and physical locate marks placed in a dig area during a marking operation, or there may be multiple electronic locate marks for a corresponding physical locate mark, in yet other embodiments a single or composite visual representation may provide a variety of other indicators/digital representations of marked underground facilities in a computer-generated visual rendering. For example, FIG. 23 illustrates another example of a composite visual representation 1000 based on the same electronic record used to generate the composite visual representation 900 of FIG. 22, in which continuous lines are used to indicate the respective marking operations. To this end, in one exemplary implementation, an additional step may be included in the process 800 shown in FIG. 21, in which the processor may process the marking geo-location data in an electronic record by filtering, averaging, interpolating and/or otherwise "smoothing" the data so as to connect successive discrete locate marks represented by the respective actuation data sets of the electronic record and thereby provide a substantially smooth continuous line for display.

Similarly, filtering, averaging, interpolating, processing and/or otherwise smoothing of data may be applied to landmark information captured in landmark event entries. For example, multiple event entries logged for a particular environmental landmark (e.g., the four corners of a pedestal) may be processed so as to provide a single point in a display field at which to display a symbol, icon or other identifier for an environmental landmark. Such processing may include, for example, selecting any one of multiple geo-location coordinates captured in multiple event entries as representative of the landmark location, calculating a centroid of all points represented by captured coordinates, "pre-filtering" a collection of coordinates to eliminate significant "outliers" and subsequently determining a centroid of the remaining coordinates, etc.

In the example of FIG. 23, as also noted above, different underground facility types may be indicated in different color lines, and the different colors/facility types may be derived from the electronic record (e.g., based on the correlations provided in Table 7). Furthermore, in other aspects, text indicators may be included in the visual representation, and/or other types of coding may be used (different line styles such as patterns, width, bold, etc.; a succession of symbols or other graphic icons, etc.) to indicate different facility types, and/or some other aspect of a given facility (e.g., the material used for a particular pipe, conduit, cable, sheathing; the diameter of a particular pipe, conduit, cable; offsets to one or more environmental landmarks, etc.). By way of example, FIG. 23 indicates that the four underground facilities in the composite visual representation correspond to a power line 1010 (which may be rendered in the color red), a first sewer line 1012 (which may be rendered in the color green), a second sewer line 1014 (which also may be rendered in the color green), and a telecommunications line 1016 (which may be rendered in the color orange). An exemplary composite visual representation may include additional textual, numeric and/or graphic elements to provide other information available in the electronic record for the marking operations (e.g., timestamp information, ID information, coordinates for location information, offset indications, etc.). For example, in FIG. 23 an offset 958 of 3 feet is indicated between the fire hydrant 956 and the sewer line 1014.

In some marking operations, a technician may use the marking device not only to mark an underground facility's placement/path relative to the ground, pavement or other surface, but also to "annotate" the marking operation in some fashion. For example, in some instances a technician actually "writes" with the marking device (e.g., by actuating the marking device to dispense paint) to provide text annotations, offset indications, arrows, other symbols, and the like on the ground, pavement or other surface. Accordingly, the electronic record for a marking operation may include one or more actuation data sets corresponding to actuations in which the technician was "writing" to annotate the marking operation in some fashion rather than marking the path of an underground facilities. In some cases, providing such technician annotations on a visual representation of a marking operation may be desirable; however, in other instances such annotations may provide erratic markings on a visual representation, in which case additional processing of geo-location data or other information in the electronic record (e.g., filtering, averaging, interpolating and/or otherwise "smoothing" the data) may be employed.

Figure 24:
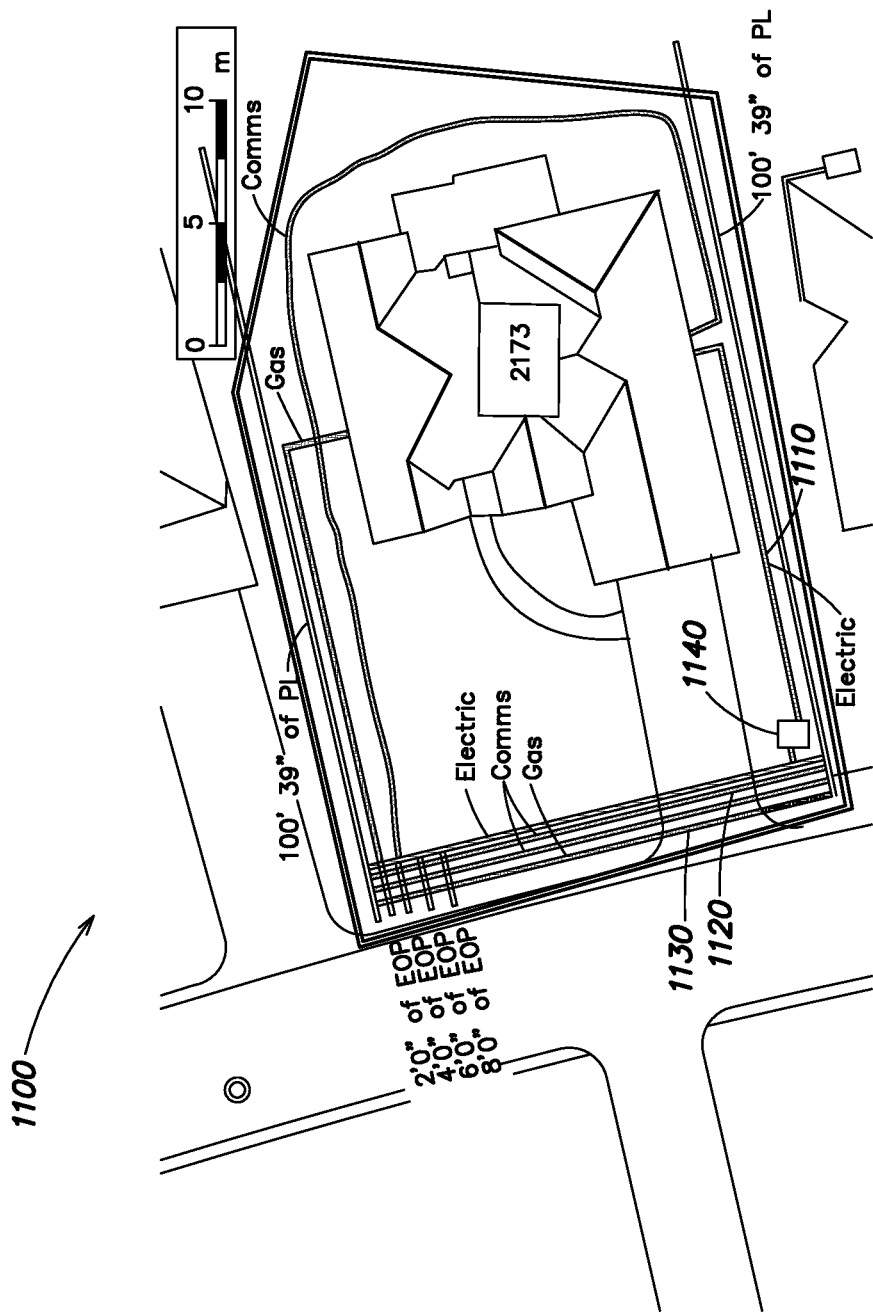
FIG. 24 is an example of another visual representation of marking operations, according to another embodiment of the present invention, in which electronic locate marks are overlaid on a digital image of a work site/dig area.

In yet another embodiment, a single or composite visual representation of a marking operation, including one or both of marking information and landmark information, may rendered on a display device together with a digital image representative of at least a portion of a dig area at a work site, such that one or more electronic locate marks and/or one or more identifiers for environmental landmarks appear in appropriate relative positions overlaid on the displayed digital image. FIG. 24 illustrates yet another example of a composite visual representation 1100, albeit based on an electronic record different than that used to generate the visual representations of FIGS. 18 and 19, in which continuous lines are used to indicate the respective different underground facilities marked, and these lines are overlaid on a digital image of a dig area, together with identifiers for environmental landmarks. It should be appreciated that although continuous lines representing underground facilities are depicted on a digital image in FIG. 24, in other embodiments discrete electronic locate marks corresponding to successive actuations of a marking device (or multiple discrete electronic locate marks per actuation) may be overlaid on a digital image of the dig area.

In the embodiment of FIG. 24, a number of different image sources and image types may be employed to provide the digital image on which a visual representation of a marking operation may be overlaid. For purposes of the present disclosure, such a digital image (also referred to herein as an "input image") may be any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information").

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML);

Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image); and An image, such as any of the above image types, that includes one or more dig area indicators, or "virtual white lines," that provide one or more indications of or graphically delimit a dig area, as described in U.S. patent application Ser. No. 12/366,853, incorporated by reference herein. The virtual white lines may include lines, drawing shapes, shades, symbols, coordinates, data sets, or other indicators that are added to an image, and may assist a locate technician in the performance of a locate operation by identifying the area of interest, i.e., the dig area. In this manner, a searchable electronic record according to the concepts disclosed herein may be generated based on a previously marked-up input image on which the dig area is indicated.

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

As noted above, in some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

Based on the foregoing, a digital image may be displayed in an available display field of a display device either before or after electronic locate marks and/or identifiers for environmental landmarks are displayed in the available display field. For example, in one implementation, after the block 806 in FIG. 21, all or a portion of the digital image may be mapped to the available display field based on any relevant geographic information accompanying the digital image (e.g., GPS coordinates to which the image is indexed). Alternatively, the digital image may be mapped first to the available display field of the display device depending on appropriate scaling and/or transformation parameters as would be readily appreciated by one of ordinary skill in the art, and thereafter one or more electronic locate marks and/or one or more identifiers for environmental landmarks similarly may be mapped to the available display field in appropriate positions relative to the underlying digital image. In the example of FIG. 24, a first visual representation of a gas line 1130 is depicted, a second visual representation of a communication line 1120 is depicted, and a third visual representation of an electric line 1110 is depicted on an aerial image of a residential dig area for purposes of illustration. As discussed above in connection with other embodiments, these visual representations may be displayed in different colors and/or line types to denote different types of underground facilities and/or various attributes of a given facility. As also illustrated in FIG. 24, other types of markings may be included as part of the displayed image, including environmental landmarks such as junction boxes or transformers 1140, streets, property boundaries, tie-downs (reference lines between marked facilities and environmental landmarks and/or property boundaries) and their associated dimensions, and one or more text boxes 2173 (e.g., to indicate an address of the work site over the residence), and the like.

As noted earlier, it should be appreciated that the general concepts outlined above in connection with visual renderings may be applied similarly to locate information contained in event entries and/or one or more electronic records generated by a locate device or a combined locate and marking device. For example, in addition to, or alternatively to, one or both of marking information and landmark information, an electronic representation of locate information (e.g., geo-location data relating to detection of one or more underground facilities) may be visually rendered in a display field, including overlaying such an electronic representation on a digital (input) image. In this manner, a comprehensive visual representation of activity relating to a locate and marking operation may be generated. In various exemplary implementations, locate information may be filtered, interpolated, smoothed or otherwise processed, as discussed above in connection with marking information and landmark information. Additionally, locate information and marking information, if displayed together, may be differentiated in a display field in any of a variety of manners (e.g., different line types, symbols or patterns; different colors or shades of related colors; artificially offset from each other in the display field if marking information and locate information overlap or are sufficiently close to each other in some instances, etc.) to allow for visual perception of both locate information and marking information.

Figure 25:
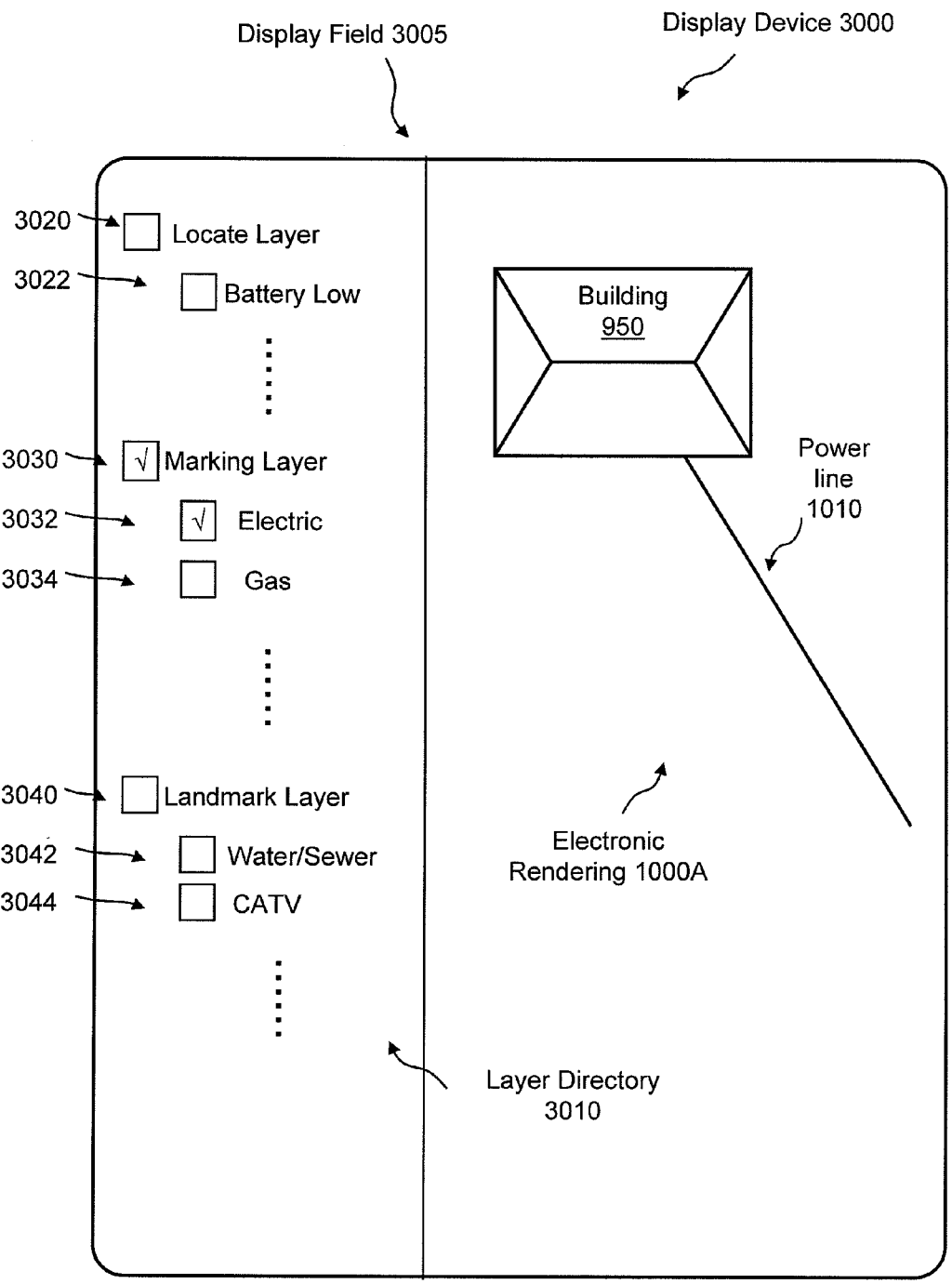
FIG. 25 shows a generic display device having a display field in which one or more display layers and/or sub-layers of locate information, marking information and/or landmark information may be selectively enabled or disabled for display, according to one embodiment of the present invention.

To this end, in one embodiment, each of locate information, marking information and landmark information, if present in a computer-aided visual rendering, as well as any constituent information forming part of the locate information, marking information and landmark information, may be displayed as separate "layers" of the visual rendering, such that a viewer of the visual rendering may turn on and turn off displayed information based on a categorization of the displayed information. FIG. 25 shows a generic display device 3000 having a display field 3005 with exemplary content for purposes of explaining some concepts germane to display layers, according to one embodiment. For example, all locate information may be categorized generally under one layer designation 3020 ("locate layer"), and independently enabled or disabled for display (e.g., hidden) accordingly. Similarly, all marking information may be categorized generally under another layer designation 3030 ("marking layer") and independently enabled or disabled for display accordingly, and all landmark information may be categorized generally under yet another layer designation 3040 ("landmark layer") and independently enabled or disabled for display accordingly. Respective layers may be enabled or disabled for display in any of a variety of manners; for example, in one implementation, a "layer directory" or "layer legend" pane 3010 may be included in the display field 3005 (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "marking layer," different facility types that may have been marked during a marking operation (and indicated in the marking information by color, for example) may be categorized under different sub-layer designations (e.g., designation 3032 for "marking layer—electric;" designation 3034 for "marking layer—gas;" etc.); in this manner, a viewer may be able to hide only the electric marking information while viewing the gas marking information, or vice versa, in addition to having the option to view or hide all marking information. As shown in the example of FIG. 25, of the locate, marking and landmark layers, only the marking layer is enabled for display and, amongst the illustrated sub-layer designations, only the electric sub-layer of the marking layer is enabled for display. Accordingly, using the exemplary composite visual representation 1000 shown in FIG. 23 as a baseline for purposes of illustration, only the power line 1010 appears in the electronic rendering 1000A shown in FIG. 25 as a constituent element of the electric sub-layer of the marking layer. Sub-layer designations similarly may be employed for the locate information and the landmark information (e.g., designation 3042 for "landmark layer—water/sewer;" designation 3044 for "landmark layer—CATV"). Virtually any characteristic of the information available for display may serve to categorize the information for purposes of display layers or sub-layers; for example, a locate sub-layer designation 3022 of "locate layer—battery low" may be employed to specifically enable or disable for display any data points in the locate information that were collected when locate status information indicated a low battery condition (and, as a result, possibly suspect data).

Various examples of visual representations such as those illustrated in FIGS. 22-25 may be used for various purposes, including, but not limited to:

(1) The display may be viewed by the technician for substantially immediate feedback of his/her work performed, which can be compared against the ticket information to ensure that the full scope of the current locate and marking operation has been completed satisfactorily.

(2) The display may be viewed by a supervisor (using remote computer 150 that is receiving the data) as substantially immediate feedback of work performed by the technician, which again can be compared against the ticket information to ensure that the full scope of the current locate and marking operation has been completed satisfactorily. When the supervisor is viewing the locate and marking operation in real time, he/she may contact the technician in real time in the event that the work is unsatisfactory;

(3) The display may be viewed by a quality control supervisor (using remote computer 150 that has received the data) as feedback of work performed by the technician, which again can be compared against the ticket information to ensure that the full scope of the current locate and marking operation has been completed satisfactorily. By viewing the operation, the quality control supervisor may dispatch a quality control technician or other personnel in the event that there is the operation is unsatisfactory, and (4) The display may be viewed by a training supervisor as feedback of work performed by the technician, which can be used to assess employee performance and direct training activities.

VII. Marking Devices, Locate Devices, or Combined Locate and Marking Devices Communicatively Coupled to a Mobile/Portable Device In another embodiment, a marking device, a locate device, or a combined marking and locate device (also collectively referred to herein as "locate/marking device") according to the present invention may be equipped with or otherwise communicatively coupled to a mobile/portable device (hereafter a "mobile device"), such as a cellular phone or personal digital assistant (PDA), that provides processing, electronic storage, electronic display, user interface, communication facilities and/or other functionality for the locating equipment. Communicative coupling of a mobile device with locate/marking devices may allow the intelligence and/or various functionality of the mobile device to be used in place of, or in addition to, an onboard processor and/or other onboard components (e.g., such as those included in control electronics 112 or control electronics 1630).

More specifically, in some embodiments a mobile device may be employed to implement the various functionality discussed above in connection with the processor 118, the memory 122, the communication interface 124, the power source 114, the user interface 126 (including the display 146), and in some instances the timing system 128 and/or the location tracking system 130 of an exemplary marking device, and the corresponding components of a locate device and/or a combined locate and marking device. To this end, the mobile device itself may include one or more of a processor, memory, communication interface, power source, user interface, timing system and/or location tracking system (e.g., to facilitate GPS-enabled functionality). In some exemplary implementations, the mobile device may provide essentially all of the processing and related functionality required to operate the locating equipment, while in other implementations the mobile device may only provide some portion of the overall functionality (e.g., a GPS-enabled mobile device may be employed primarily for obtaining geo-location data, but not necessarily relied on substantively for processing power and/or memory). In certain instances, sensors on a mobile device may be used to collect information about a locate and/or marking operation.

In yet other implementations, the mobile device may provide redundant, shared and/or backup functionality for the locating equipment to enhance robustness and improve confidence in a locate and/or marking operation. For example, even though a locate/marking device may include one or more of a processor, memory, communication interface, power source, user interface, timing system and/or location tracking system, a mobile device communicatively coupled to or otherwise integrated with the locate/marking device may include one or more corresponding components to provide redundant, shared and/or backup components and functionality. Examples of enhanced robustness provided by redundant components and/or functionality of a mobile device include, but are not limited to: providing for data comparison to establish data integrity (e.g., validation of geo-location data by comparing data obtained by a location tracking system in the locate/marking device to geo-location data provided by a mobile device equipped with its own location tracking system); calibration of various parameters; power for various components (e.g., a first power source of the locate/marking device may be used to power/recharge a second power source of the mobile device, or vice versa); backup memory storage; backup communication interfaces; support for multiple different communication protocols, communication channels, and/or communication media.

In one embodiment, all sensor functionality and processor functionality for a marking device may be provided by the mobile device only. For example, a mobile device such as a smart phone may be attached to a mechanical marking wand to yield an intelligent marking device that can collect marking information and generate a data record of a marking operation. Such an embodiment is described below. In various exemplary implementations, the functionality provided by the mobile device may be due at least in part to processor-executable instructions or other applications executing on one or more hardware processors of the mobile device; alternatively, or in addition to local execution of instructions/applications, the mobile device may retrieve external instructions, external applications and or other external information, via one or more communication interfaces, to provide functionality that facilitates operation of the locate/marking device.

Examples of mobile devices, such as cellular phones/PDAs, that are suitable for purposes of embodiments using such mobile devices in connection with locate/marking devices include, but are not limited to, various models of the Apple iPhone (e.g., iPhone 3G S), various models of Blackberry® PDAs, various models of Windows® mobile phones by different manufacturers, and various Android-based devices ("Android" is a mobile operating system running on the Linux kernel; it was initially developed by Google and later the Open Handset Alliance and allows developers to write managed code in the Java language, controlling the device via Google-developed Java libraries) available from a variety of conventional mobile device suppliers (e.g., Motorola, Samsung, Sony-Ericsson). In various embodiments, the mobile or portable device is a hand-size device, e.g., easily held in a user's hand.

In various examples, a mobile device may be mechanically and/or electronically coupled to a locate/marking device via an appropriate cradle or dock, or otherwise integrated with or communicatively coupled to the locate/marking device, so as to permit one or more electronic signals to be communicated between the mobile device and one or more components of the locate/marking device (e.g., one or more signals indicative of operation of the locate/marking device may be supplied to the mobile device). In some implementations, a cradle may be appropriately configured such that one or more of a power connector and an I/O connector on the mobile device engage with one or more complimentary connectors on the cradle upon insertion/engagement of the mobile device in the cradle. The one or more complimentary connectors on the cradle in turn may be coupled to various signals provided by the locate/marking device (e.g., in the example of a marking device, the actuation signal 121 from the actuation system, one or more signals provided by the marking material detection mechanism, etc., may be coupled to one or more I/O pins of the mobile device connector via the cradle). Additionally, in some embodiments the cradle and/or the locate/marking device itself may include a battery pack and/or any other power source for supplying power to and/or for assisting the battery of the mobile device while the mobile device is docked to the locate/marking device. In one example, the local power pack may be used to prolong the battery life of the mobile device.

Various methods and apparatus for communicatively coupling mobile devices to locate/marking devices in accordance with the present disclosure may allow different brands and/or types of mobile devices to be physically secured to and/or electrically coupled to a particular piece of locating equipment, marking equipment, or combination locate and marking device. In various implementations, a cradle integrated into a locate/marking device may be mobile device-specific; i.e., the cradle may be particularly configured such that the size and/or connector positions are appropriate for a particular brand/model of mobile device. Alternatively, a universal cradle with an adjustable size and/or adjustable connector locations (e.g., sliding connectors along one or more sides of the cradle that may be mechanically locked in place) may be coupled to the locate/marking device so as to accommodate a variety of different mobile devices. In other examples, a cradle or other docking arrangement may not require electrical connections integrated therein, and one or more signals provided by the locate/marking device may be communicated to the mobile device, and vice-versa, via one or more wired connections (e.g., a cable or wire) or a wireless connection (e.g., a Bluetooth® connection). In yet other examples, the mobile device need not be physically secured to the locate/marking device, but may be communicatively coupled to the locate/marking device via one or more wired and/or wireless connections.

FIGS. 26A through 26D illustrate perspective views of examples of mobile device-specific cradles 212-218 that may be integrated with (e.g., installed on) locate/marking devices according to some embodiments. For purposes of the following discussion, a marking device 110 is illustrated in the figures as an exemplary locate/marking device with which the mobile/portable device may be coupled/integrated; however, it should be appreciated that the concepts discussed below apply similarly to locate devices and combined locate and marking devices. Furthermore, as noted above, it should be appreciated that in some implementations various components and/or functionality of the control electronics of the locate/marking device (e.g., the control electronics 112 of the marking device shown in FIG. 2 or the combined locate and marking device shown in FIG. 17, the control electronics 1630 of the locate device shown in FIG. 14) may be provided, in whole or in part, by the mobile device engaged in the cradles 212-218.

In some implementations, device specific cradles may be used to secure a mobile device to a locate/marking device. The device specific cradles may be designed to each have a common mechanical fastening feature that permits each specific cradle to be fastened securely to a common mating feature on a locate/marking device. The device specific cradles may be provided in a variety of shapes, where a particular shape is designed to have a receptacle for securely attaching a particular style mobile device to the specific cradle. Device-specific cradles 212-218 may each be configured for holding a particular type of mobile device. For example, one device specific cradle may provide a receptacle into which an Apple iPhone® may be attached, while another device specific cradle may provide a receptacle into which a Motorola Droid X device may be attached. The mobile device may be any mobile device that has at least a processing unit and a communication interface, and preferably a user interface mechanism. Examples of mobile devices include, but are not limited to, any of a wide variety of mobile phones, personal digital assistants (PDA), and/or any other personal communication and/or media devices, such as the iPod® Touch device, or Motorola Droid devices.

In FIGS. 26A through 26D, each device-specific cradle may be associated with a certain brand and/or style of mobile device. For example, device-specific cradle 212 of FIG. 26A may be particularly configured for holding a certain type of mobile device 202; device-specific cradle 214 of FIG. 26B may be particularly configured for holding a different type of mobile device 204; and device-specific cradle 216 of FIG. 26C may be particularly configured for holding yet another type of mobile device 206. Once a mobile device is inserted in its corresponding device-specific cradle on the piece of locating equipment, its processing capabilities, user interface capabilities, communication capabilities, data storage capabilities, and/or any other capabilities may be used in combination with other components of the locate/marking device to perform various locate and/or marking functions discussed elsewhere herein.

Each device-specific cradle may or may not be electrically coupled to one or more other components of the locating equipment (e.g., for the marking device 110, the actuation system 120, the marking material detection mechanism 132, etc.). In some embodiments, each device-specific cradle may include an input/output (I/O) connector for electrically connecting to its corresponding mobile device when the mobile device is secured within its device-specific cradle. Alternatively, a wireless communication link or a communication cable may be provided between the locate/marking device and the mobile device that is secured within its device-specific cradle.

In some implementations, physical electrical coupling between a mobile device and a locate/marking device may be for power only. For example, a power source on a locate/marking device may provide power to the mobile device through a power cable. Information may be exchanged between a mobile device and a locate/marking device wirelessly. In some implementations of locate/marking devices, power only may be provided from a power source on the locate/marking device, e.g. a large rechargeable battery, and no electronic information may be exchanged between the mobile device and the locate/marking device.

Figure 27B:
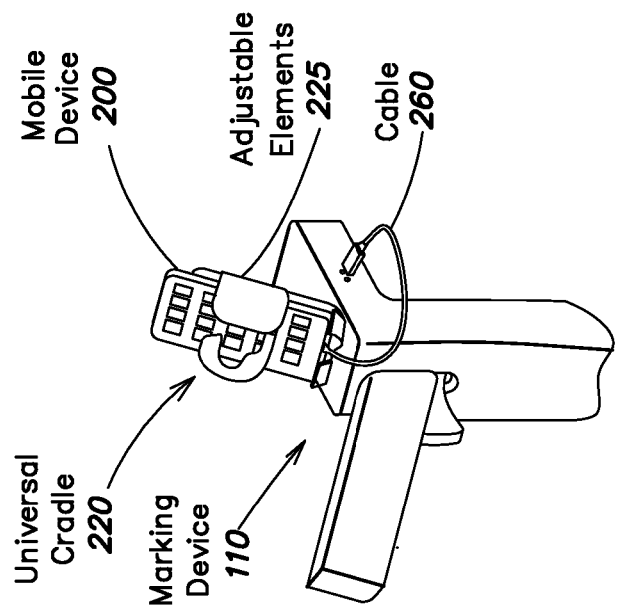
FIGS. 27A and 27B are perspective views of an exemplary mobile device universal cradle integrated into a locate device, a marking device, or a combined locate and marking device according to some embodiments of the present invention.
Figure 27A:
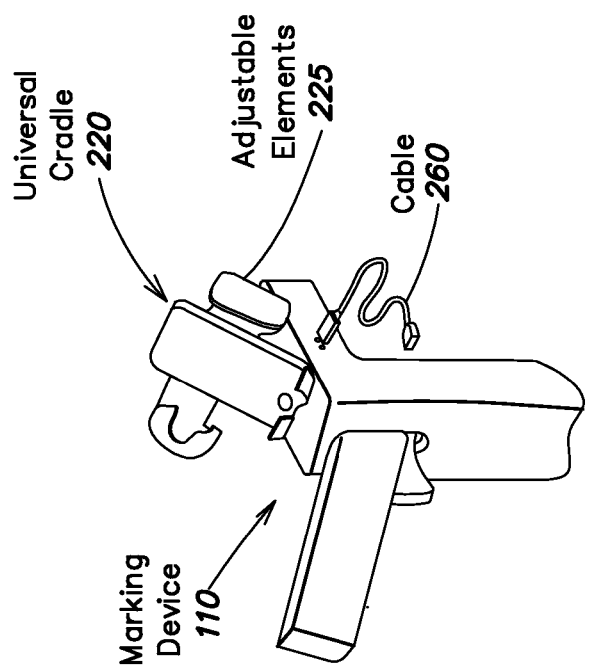

FIGS. 27A and 27B illustrate perspective views of an example of a mobile device universal cradle 220 that may be integrated with (e.g., installed on) a locate/marking device. Universal cradle 220 may include adjustable elements 225 that allow substantially any size, brand, and/or style of mobile device to be secured therein. Because the locations and types of I/O connectors on mobile devices may differ from one brand and/or style of mobile device to another, in one aspect a locate/marking device having a universal cradle 220 may utilize a cable, such as cable 260, to facilitate the electrical connection between the locate/marking device and the mobile device. The cable may be particularly configured to provide an electrical connection between an I/O connector type of the locate/marking device and a device-specific I/O connector type of the mobile device. In one example, cable 260 may include a standard universal serial bus (USB) connector at one end for connecting the cable 260 to the locate/marking device and a device-specific connector at the opposite end for connecting the cable 260 to mobile device 200.

FIG. 27A shows an empty universal cradle 220, without a mobile device secured therein. FIG. 27B shows universal cradle 220 with a mobile device (e.g., mobile device 200) secured therein by, for example, adjustable elements 225 being squeezed against the sides of mobile device 200. FIG. 27B also shows cable 260 plugged into mobile device 200, such that the locate/marking device and mobile device 200 are electrically connected.

In some embodiments, any mobile device-specific cradles and/or universal cradles provided in connection with locating equipment may be removable, replaceable and/or exchangeable. For example, the mobile device-specific cradles 212-218 and/or universal cradles 220 may be removed from the piece of locate/marking device and then reattached as desired.

Figure 28B:
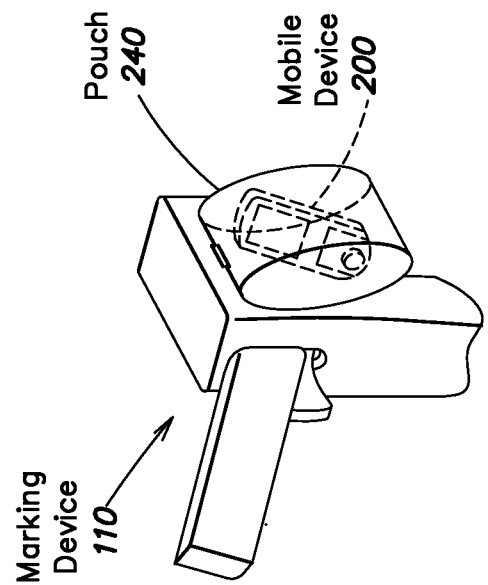
FIGS. 28A and 28B are perspective views of an exemplary slot, pocket, and/or pouch in a locate device, a marking device, or combined locate and marking device for holding a mobile device according to some embodiments of the present invention.
Figure 28A:
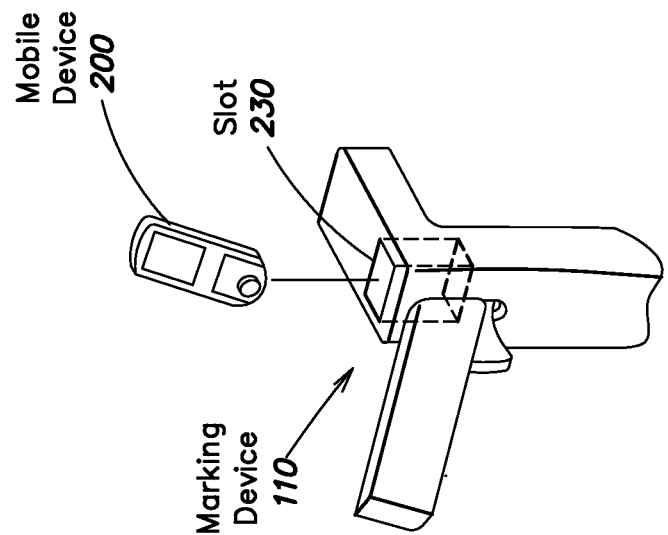

In other embodiments, a mobile device may be docked to a locate/marking device through mechanisms requiring less external hardware to be attached to the locate/marking device. For example, FIGS. 28A and 28B illustrate perspective views of a slot, pocket, and/or pouch in a locate/marking device for holding mobile devices. In some implementations, hook-and-loop fastening material may be used to attach a mobile device in a pouch to a locate/marking device. In one example, FIG. 28A shows a slot 230 integrated into marking device 110 into which a mobile device, such as mobile device 200, may be inserted. An electrical connection (not shown) may be integrated into a portion of slot 230 (e.g., along one or more sides and/or the bottom of slot 230) for connecting to mobile device 200. In another example, FIG. 28B shows a pouch 240 that is secured, for example, to the side of the locate/marking device. A mobile device, such as mobile device 200, may be inserted into pouch 240. Pouch 240 may be sealable by, for example, a ziplock type of seal. A cable (not shown), such as cable 260 of FIGS. 27A and 27B, may be allowed to pass through the walls or through the seal of pouch 240 for providing an electrical connection between the locate/marking device and mobile device 200.

Any mobile device used in connection with a locate/marking device, and optionally the locate/marking device itself, may include a communication interface. For example, the communication interfaces of the mobile device and the locate/marking device may be any wired and/or wireless communication interface by which information may be exchanged. Examples of wired communication interfaces may include, but are not limited to, USB ports, RS232 connectors, RJ45 connectors, Ethernet, and any combinations thereof. Examples of wireless communication protocols may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols including proprietary protocols. Wireless communication may be carried out through RF transceivers installed in the locate/marking device and mobile device. A communication interface may be established between a mobile device and locate/marking device (e.g., using necessary hardware and protocols) to permit exchange of data and operational commands. For example, data collected during a locate and/or marking operation may be communicated to the mobile device. Commands to control a locate device may be entered using the mobile device and communicated to the locate device.

When a cable, such as cable 260, is to be used to facilitate a connection between a mobile device and a locate/marking device, as for example in FIGS. 27A through 27B and FIG. 28B, the cable may be particularly configured to provide a connection between the I/O connector type of the locate/marking device and the device-specific I/O connector type of the mobile device. For example, the cable may be in the form of a phone adaptor, with one end configured to connect to the I/O connector of the locate/marking device, and the other end configured to connect to the I/O connector of a specific type of mobile device. FIG. 29 illustrates perspective views of examples of device-specific phone adaptors 250 for use in facilitating wired communication with a locate/marking device.

Locate/marking devices (such as marking device 110) may include a standard I/O connector 270 into which any phone adaptor 250 may be plugged. For example, each phone adaptor 250, such as phone adaptor 252, 254, or 256, may include a standard I/O connector 275 that is the counterpart to I/O connector 270 of the locate/marking device. For example, if I/O connector 270 of the locate/marking device is a male I/O connector, I/O connector 275 of phone adaptors 250 can be a corresponding female I/O connector. Likewise, if I/O connector 270 of the locate/marking device is a female I/O connector, I/O connector 275 of phone adaptors 250 can be a corresponding male I/O connector.

In a specific example, phone adaptor 250 may be a USB-based adaptor; i.e., I/O connector 270 on the locate/marking device, may be a standard USB port and I/O connector 275 of phone adaptor 250 may be a USB connector. Cable 260 of FIGS. 27-A and 27-B is an example of a USB-based phone adaptor 250.

At the other end of phone adaptor 250, an I/O connector may be particularly configured to connect with a certain type of mobile device. For example, phone adaptor 250 may include a device-specific I/O connector 253 for connecting to a certain brand and/or style of mobile device (not shown). Phone adaptor 254 may include a device-specific I/O connector 255 for connecting to a different brand and/or style of mobile device (not shown). Phone adaptor 256 may include a device-specific I/O connector 257 for connecting to a yet another brand and/or style of mobile device (not shown).

When wired communications are used, data exchange may be implemented using one or more pins on a selected data cable connector. Data exchange may be in accordance with specifications established by a manufacturer of a mobile device. For example, a data and power connector for most Android-based devices typically is a standard micro USB connector, and data may be exchange over two or more pins or wires of the USB connector. Connectors for other cellular phone/PDAs noted above may have various proprietary formats/pin layouts. An exemplary pin layout for an Apple iPhone® is given in Table 20.

TABLE 20

| Pin | Signal | Description |
| --- | --- | --- |
| 1 | GND | Ground (−), internaly connected with Pin 2 on iPod motherboard |
| 2 | GND | Audio & Video ground (−), internaly connected with Pin 2 on iPod motherboard |
| 3 | Right | Line Out - R (+) (Audio output, right channel) |
| 4 | Left | Line Out - L(+) (Audio output, left channel) |
| 5 | Right In | Line In - R (+) |
| 6 | Left In | Line In - L (+) |
| 8 | Video Out | Composite video output (only when slideshow active on iPod Photo) |
| 9 | S-Video Chrominance output | for iPod Color, Photo only |
| 10 | S-Video Luminance output | for iPod Color, Photo only |
| 11 | GND | Serial GND |
| 12 | Tx | ipod sending line, Serial TxD |
| 13 | Rx | ipod receiving line, Serial RxD |
| 14 | RSVD | Reserved |
| 15 | GND | Ground (−), internaly connected with pin 16 on iPod motherboard |
| 16 | GND | USB GND (−), internaly connected with pin 15 on iPod motherboard |
| 17 | RSVD | Reserved |
| 18 | 3.3 V | 3.3 V Power (+) Stepped up to provide +5 VDC to USB on iPod Camera Connector. If iPod is put to sleep while Camera Connector is present, +5 VDC at this pin slowly drains back to 0 VDC. |
| 19, 20 | +12 V | Firewire Power 12 VDC (+) |
| 21 | Accessory Indicator/Serial enable | Different resistances indicate accessory type: 1 kOhm - iPod docking station, beeps when connected 10 kOhm - Takes some iPods into photo import mode 68 kOhm - makes iPhone 3g send audio through line-out without any messages 500 kOhm - related to serial communication/used to enable serial communications Used in Dension Ice Link Plus car interface 1 MOhm - Belkin auto adaptor, iPod shuts down automatically when power disconnected Connecting pin 21 to ground with a 1 MOhm resistor does stop the ipod when power (i.e. Firewire-12 V) is cut. Looks to be that when this pin is grounded it closes a switch so that on loss of power the Ipod shuts off. Dock has the same Resister. |
| 22 | TPA (−) | FireWire Data TPA (−) |
| 23 | 5 VDC (+) | USB Power 5 VDC (+) |
| 24 | TPA (+) | FireWire Data TPA (+) |
| 25 | Data (−) | USB Data (−) |
| 26 | TPB (−) | FireWire Data TPB (−) |
| 27 | Data (+) | USB Data (+) Pins 25 and 27 may be used in different manner. To force the iPod 5G to charge in any case, when "USB Power 5 VDC" (pin 23) is fed, 25 must be connected to 5 V through a 10 kOhm resistor, and 27 must be connected to the Ground (for example: pin 1) with a 10 kOhm resistor. iPod 5G can also be forced to charge by attaching the data + and the data − pins to the 5 v via a 10k Ohm resistor (BOTH PINS) and connecting pin 16 to the 5 v (ground). (Confirmed working with iPod 5G 20 GB) |

TABLE 20-continued

| Pin | Signal | Description |
|---|---|---|
| | | To charge an iPhone 3G/iPod Touch 2nd gen, usb data− (25) should be at 2.8 v, usb data+(27) should be at 2.0 v. This can be done with a few simple resistors: 33k to +5 v (23) and 22k to gnd(16) to obtain 2 v and 33k to +5 v and 47k to gnd to obtain 2.8 v. This is a "notification" to the iphone that it is connected to the external charger and may drain amps from the usb. |
| 28 | TPB (+) | FireWire Data TPB (+) |
| 29, 30 | GND | FireWire Ground (−) |

The pins 1-30 for the iPhone listed in Table 20 may be accessed through a dock connector or multi-pin cable connector. As can be seen from Table 20, data may be exchanged over pins 3, 4, 8-10, 12, 13, 22, 24-28. In some implementations, data exchange may be carried out over one or more available interfaces, e.g., USB or USB and FireWire for the iPhone.

Figure 30:
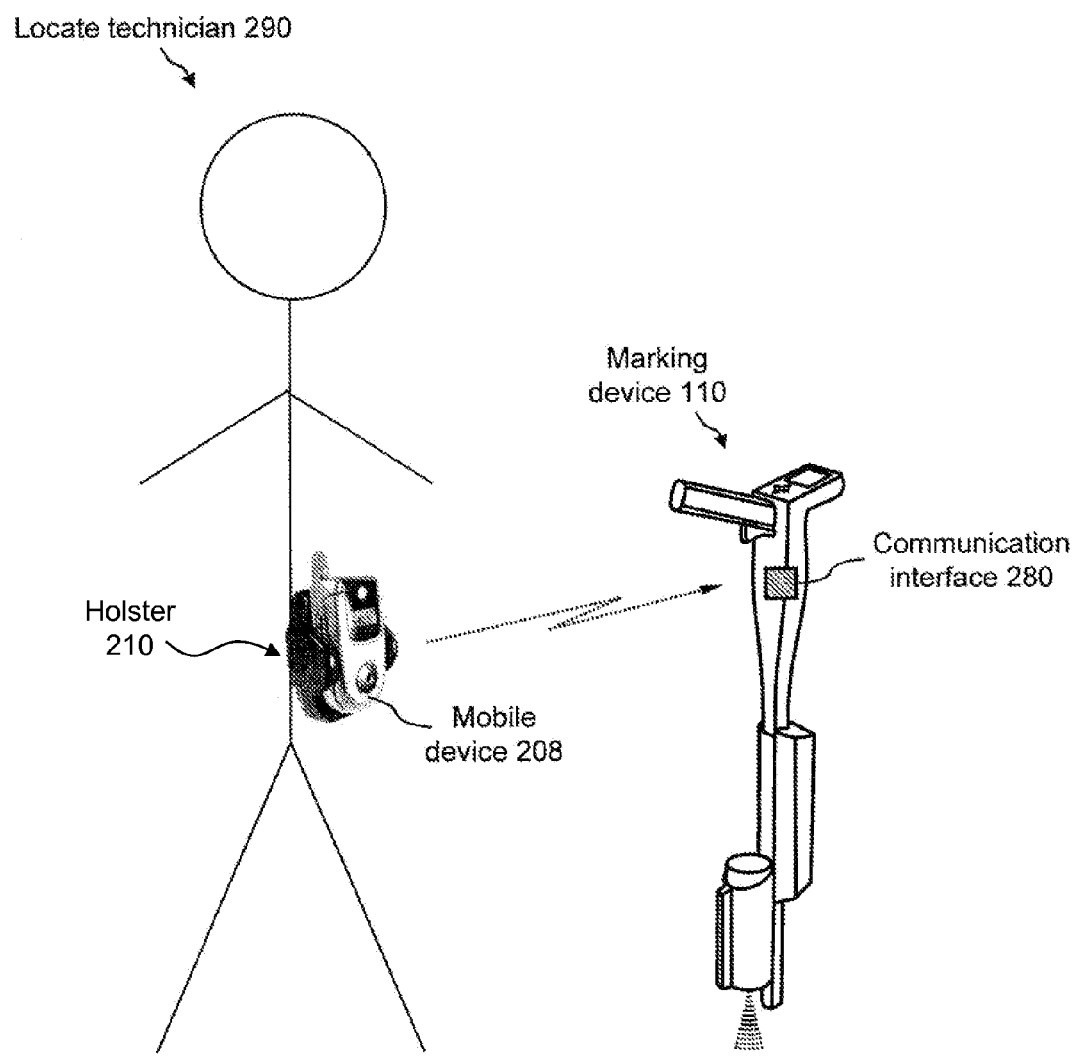
FIG. 30 is a perspective view of a user-worn mobile device in communication with a locate device, a marking device, and/or a combined locate and marking device according to some embodiments of the present invention.

In some embodiments, wired communication may be complemented or replaced altogether with any of various forms of wireless communication between a mobile device and a locate/marking device. For example, FIG. 30 illustrates a user-worn mobile device that is in communication with a locate/marking device. The locate/marking device may include a communication interface 280, which may be any wired and/or wireless communication interface, as described above. FIG. 30 also shows a locate technician 290 having a belt-worn mobile device, such as mobile device 208. That is, mobile device 208 may be installed in a standard belt-worn holster 210. In this example, mobile device 208 may communicate with the locate/marking device via, for example, Wi-Fi communication, such as Bluetooth® communication. In various implementations, the control electronics of the locate/marking device may or may not include processor, memory and/or user-interface components; if any of these are included, similar components of the mobile device 208 nonetheless may provide advantageous redundancy (e.g., for convenience of the technician 290).

In operation, a mobile device may support communication between two or more devices. As an example, during a locate and/or marking operation, a mobile device may be adapted to support communication between a locate/marking device and a remote computer. The remote computer may be at the locate site or at a central office. Communication between the mobile device and remote computer may be, for example, via a WiFi connection. Such an embodiment can provide substantially real-time monitoring and/or assistance by a remote person for a locate and/or marking operation. For example, if a locate technician encounters difficulty in finding a facility, a remote person may check historical records and provide real-time guidance to the technician based on the technician's location at the site. As another example, a technician inaccurately marking a facility may be detected in real-time by a remote person (e.g., by sounding or displaying an alarm signal at the remote computer), and the technician can be immediately advised of the error.

It should be understood that the foregoing figures and descriptions illustrate non-limiting examples, and any suitable mechanism may be used for securing a mobile device to a locate/marking device and for establishing a communication link. Additionally, any mechanism for holding a mobile device may be ruggedized and/or weatherproofed.

As mentioned above, once a mobile device is installed in universal cradle 220 on the locate/marking device, the mobile device's processing capabilities, user interface capabilities, communication capabilities, data storage capabilities, sensor capabilities, and/or any other capabilities may be used in combination with, or in place of, other components of the locate/marking device to perform various functions discussed elsewhere herein. The system may be adapted such that a technician operating the locate/marking device uses only the user interface of the mobile device, in some embodiments. Additionally, the locate/marking device-mobile device system may include enhancements to the user interface and/or other operational features in connection with a variety of sensors that may be integrated and/or communicatively coupled to the system, for example, as described in co-pending U.S. Non-provisional application Ser. No. 12/703,958, entitled "Marking Apparatus Having Enhanced Features for Underground Facility Marking Operations, and Associated Methods and Systems," filed Feb. 11, 2010, and in co-pending U.S. Non-provisional application Ser. No. 12/704,087, entitled "Locate Apparatus Having Enhanced Features for Underground Facility Locate Operations, and Associated Methods and Systems," filed on Feb. 11, 2010, both of which are incorporated by reference.

As noted above, in some implementations, the mobile device may provide essentially all of the processing and related functionality required to operate the locate/marking device, or only provide some portion of the overall functionality; also, the mobile device may provide redundant, shared and/or backup functionality for the locate/marking device to enhance robustness. As an example and with reference again to FIGS. 2 and 3, a mobile device used in connection with a marking device 110 in accordance with the present disclosure may be appropriately programmed with the marking data algorithm 134 so as to log and generate electronic records of various marking information, which records may be formatted in various manners, processed and/or analyzed on the mobile device, and/or transmitted to another device (e.g., a remote computer/server) for storage, processing and/or analysis.

In one example, one or more pieces of geo-location data (e.g., from a GPS receiver, which may be integrated with the mobile device) may be collected and logged on the mobile device per actuation of a marking device (e.g., a trigger-pull to dispense marking material) in response to receipt by the mobile device of the actuation signal 121. Additionally, information provided by marking material detection mechanism 132 may be communicated to the mobile device, either upon actuation or otherwise. Furthermore, a computer-generated image or other visual representation of the marking operation, as discussed above, may be electronically rendered in a display field of the mobile device based on logged marking information, essentially in real time as the marking operation is conducted, and/or recreated thereafter based on one or more stored electronic records. A real-time image of the marking operation may also be rendered on a remote computer in communication with the mobile device.

Various examples of marking data algorithms according to the concepts discussed herein may be available as "applications" that may be downloaded to the mobile device and selectable/operable from the user interface of the mobile device, such that the mobile device may also be used for other (more conventional) functions (e.g., telephone calls, email, web access/browsing, etc.) in addition to specific functionality pursuant to execution of a marking data algorithm when used in connection with the marking device. The foregoing concepts apply similarly to a locate device or a combined locate and marking device with which a mobile device is communicatively coupled and/or integrated.

Additional mobile device applications may also be useful for locate and/or marking operations. For example, a color identification application using image recognition may be in operation on the mobile device to determine the color of marking material dispensed during a marking operation as well as determine a type of surface on which the marking material is dispensed. As another example, a product-identification application may be in operation on the mobile device (e.g., by imaging a bar code on a paint can) to identify the color of paint to be dispensed for marking a facility. Further, a velocity application may be in operation on the mobile device to monitor a speed at which marking material is dispensed or at which locate information is obtained.

VIII. Environmental and Operation Sensors, and Information Derived Therefrom

According to another aspect of the present invention, a mobile device 200 and/or locate/marking device includes one or more environmental and/or operational sensors, which constitute additional examples of input devices from which locate and/or marking information may be derived. In particular, one or more environmental sensors associated with a mobile device 200 and/or locate/marking device may provide a variety of environmental information in connection with use of the locate/marking device; similarly, one or more operational sensors associated with the mobile device 200 and/or locate/marking device may provide a variety of operational information in connection with use of the locate/marking device. One or both of such environmental information and operational information may constitute all or a portion of locate and/or marking information and may be employed in any of the manners described above in connection with locate and/or marking information. In particular, environmental information and/or operational information may be logged/stored in local memory of a mobile device 200 and/or locate/marking device, transferred to and stored in internet accessible memory, formatted in various manners, processed and/or analyzed at the mobile device 200 itself and/or locate/marking device itself, and/or transmitted to another device (e.g., a remote computer/server, an internet storage site, cellular telephone, personal digital assistant (PDA), etc.) for storage, processing and/or analysis.

As used herein, environmental sensors are those which sense some condition of the environment in which the locate/marking device is present, but need not sense a condition of the locate/marking device itself. Examples of environmental conditions which may be sensed include, but are not limited to, temperature, humidity, light, and altitude, among others. Environmental sensors may be included with the locate/marking device or the mobile device 200 for one or more of various reasons. For example, information provided by one or more of the environmental sensors may be used to assess whether a locate and/or marking operation was or is being performed in suitable environmental conditions (e.g., within accepted environmental tolerances). Additionally or alternatively, information provided by one or more environmental sensors may be used to interact with the technician operating the locate/marking device, for example by issuing a notification or warning signal to the technician if the sensed environmental condition is outside of an acceptable range (i.e., out of tolerance). Also, the information from the environmental sensor(s) may trigger an action or alteration of the locate/marking device, such as activating, enabling or disabling a particular component of the locate/marking device. Additionally or alternatively, information provided by one or more environmental sensors may augment other information collected by the locate/marking device, such as any of the types of information described above as being collected by a locate/marking device according to various embodiments herein. In some instances, information from two or more of the environmental sensors may be used in combination, examples of which are described in detail below.

As used herein, operational sensors are those which sense some operating condition of the locate/marking device. Examples of such conditions include, but are not limited to, the angle of inclination of the locate/marking device, the direction or heading of the locate/marking device, a pressure applied to the locate/marking device, and/or some characteristic of motion of the locate/marking device (e.g., the speed at which the locate/marking device is moving, the acceleration of the locate/marking device, etc.), among others. Operational sensors may be included with the locate/marking device for one or more of various reasons. For example, information provided by one or more of the operational sensors may be used to assess whether a locate/marking device was or is operating appropriately during a locate and/or marking operation or whether the locate/marking device was or is being operated (e.g., both electronically and/or physically manipulated) appropriately by the technician (e.g., within accepted tolerances or according to protocols). Additionally or alternatively, information from one or more operational sensors may be used to detect patterns of operation of the technician, such as technician "signatures" in using/manipulating the locate/marking device (e.g., characteristic movements unique to the technician). Additionally or alternatively, information from one or more operational sensors may be used to interact with the technician, for example by issuing a notification or warning signal to the technician in response to the detected operational characteristic falling outside of an acceptable range. Also, the information from the operational sensor(s) may trigger an action or alteration of the locate/marking device, such as activating, enabling or disabling a particular component of the locate/marking device. Additionally or alternatively, information provided by one or more operational sensors may augment other information collected by the locate/marking device, such as any of the types of information previously described herein in connection with other embodiments. Other uses of data provided by one or more operational sensors are also possible and contemplated in the various aspects described herein. In some instances, information from two or more operational sensors may be used in combination, examples of which are described below. Furthermore, information from one or more operational sensors may be used in combination with information from one or more environmental sensors, as also described further below.

It should be appreciated that some of the sensors described herein may be considered both environmental and operational sensors, either because the sensor senses both an environmental condition and an operating condition of the locate/marking device (i.e., the sensor senses more than one condition) or because a single condition sensed by the sensor may be considered both an environmental condition and an operating condition. For example, an image capture device may be considered both an environmental sensor (e.g., the image capture device may capture an image of the surrounding environment) and an operational sensor (e.g., the image capture device may capture an image of some action the technician has taken, for example, an image of the manner in which the technician is holding the locate/marking device). Furthermore, the operation of a sensor may change over time. For example, a sensor may be configured at one time to measure an internal operating temperature and at a different time to measure an outside ambient temperature. Thus, it should be appreciated that while the sensors described below are categorized generally as being either environmental or operational for purposes of illustrating some exemplary implementations, the categories are not mutually exclusive, and such categorization is not limiting unless otherwise stated.

Environmental and operation sensors utilized in a locate and/or marking operation may be physically located on a locate/marking device as well as, or alternatively, on/in a mobile device 200 coupled to a locate/marking device. In some implementations, sensor data from both a locate/marking device and mobile device 200 may be recorded during a locate and/or marking operation. In some embodiments, only sensor data from a mobile device 200 may be recorded. In some implementations, sensors may be mounted only on the locate/marking device 3100 and be communicatively coupled to the mobile device 200 (e.g., accelerometers and/or gyroscopes may be mounted on the located/marking device and data provided to the mobile device 200).

Figure 31A:
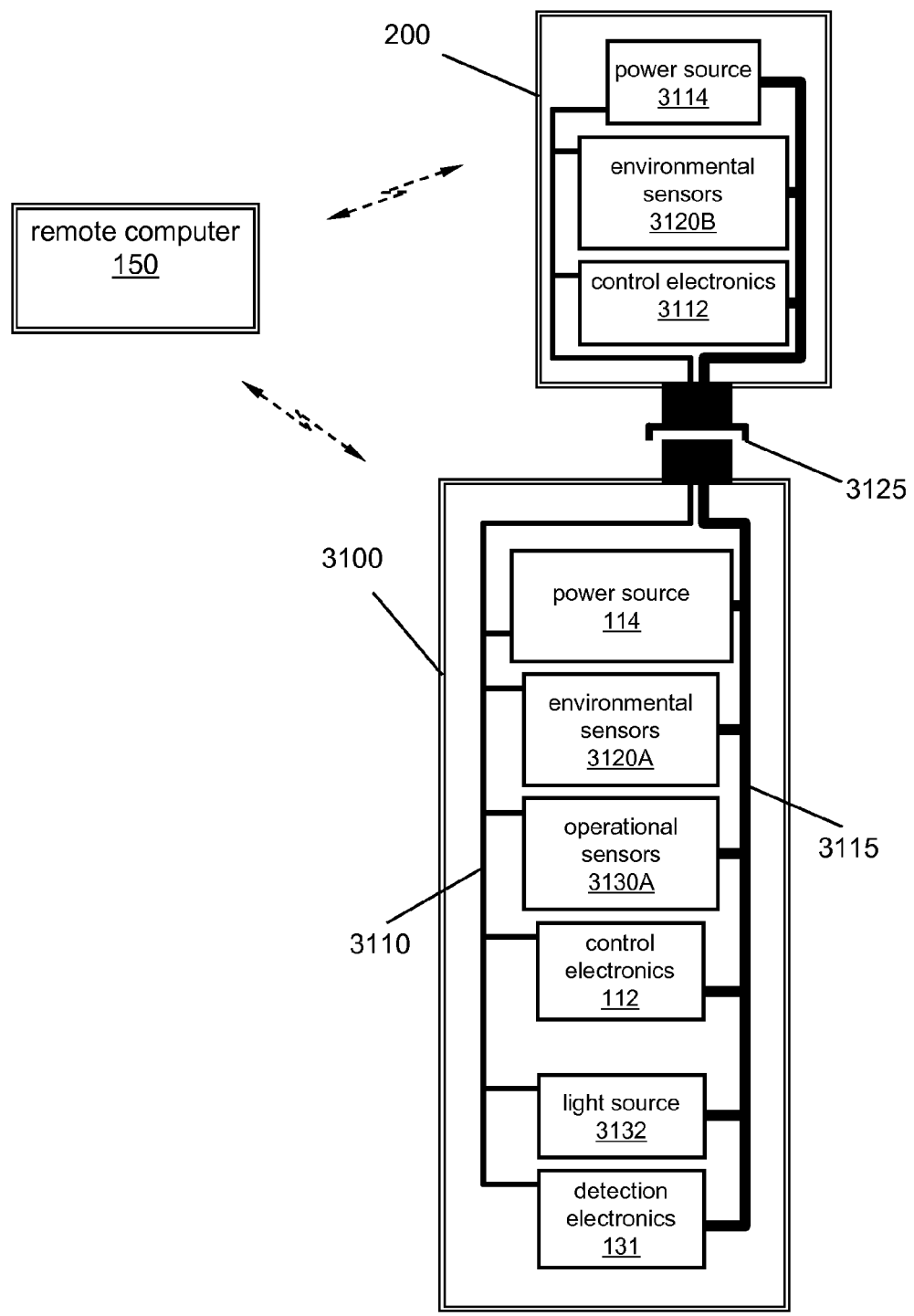
FIG. 31A-31C represent functional block diagrams of a locate/marking device communicatively coupled to a mobile device, according to some embodiments of the present invention.
Figure 31B:
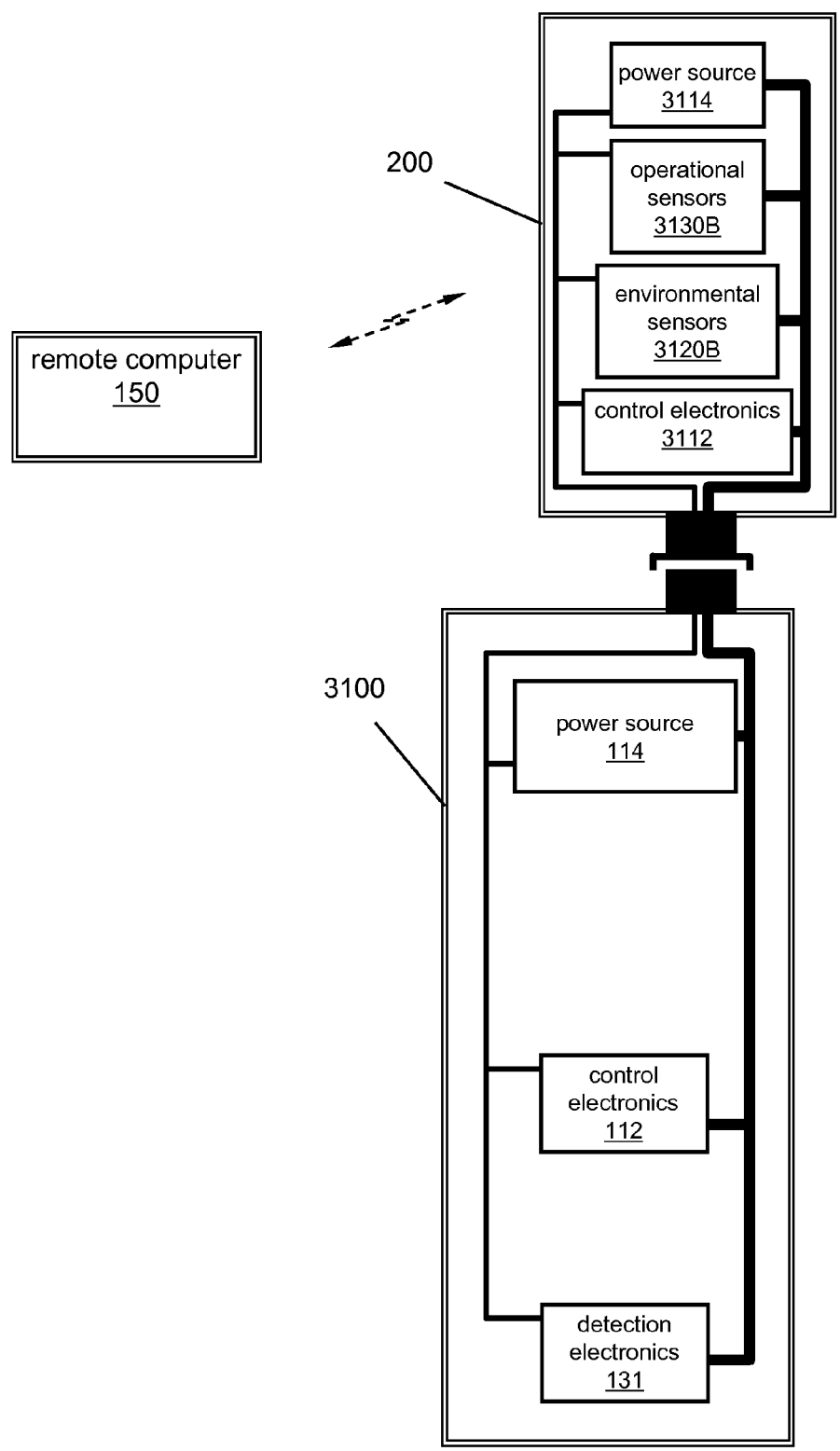
Figure 31C:
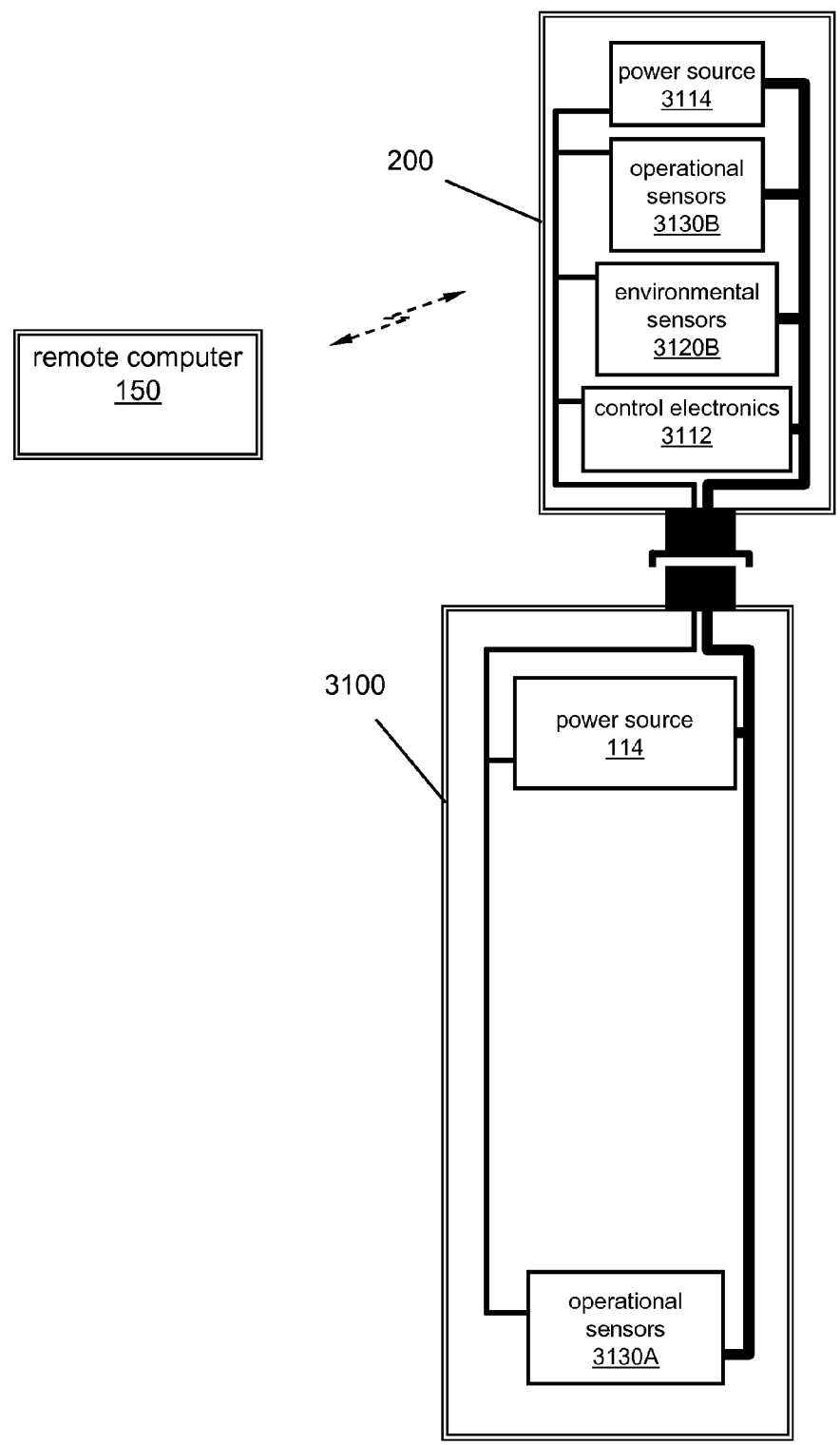

FIGS. 31A-31C represent functional block diagrams of a locate/marking device 3100 communicatively coupled to a mobile device 200 according to various embodiments of the invention. The block diagrams are for illustrative purposes only and show how various electronic components (e.g., operational and environmental sensors, control electronics, power sources) of the system may be distributed among the devices. The figures also show that remote communication may, in some embodiment, be established between a remote computer 150 and both a mobile device 200 and a locate/marking device 3100 (FIG. 31A), or, in alternative embodiments, be established between a remote computer 150 and only the mobile device 200 (FIGS. 31B and 31C).

FIG. 31A is a functional block diagram of a data acquisition system including a locate/marking device 3100 communicatively coupled to a mobile device 200 in any manner of coupling described above, according to one embodiment of the present invention. As previously mentioned, the locate/marking device 3100 may include environmental sensors 3120A and/or operational sensors 3130A. As shown in FIG. 31A, the data acquisition system (i.e., the coupled locate/marking device and mobile device) may be in communication with a remote computer 150 via the mobile device 200 and/or the locate/marking device 3100. In the illustrated embodiment, the locate/marking device 3100 comprises control electronics 112, power source 114, and detection electronics 131, all of which also have been described above in connection with other embodiments. The locate/marking device 3100 also comprises a light source 3132, and one or both of environmental sensors 3120A and operational sensors 3130A. The components of the locate/marking device may receive power from the power source 114 via a power line 3110. The components of the locate/marking device may receive and/or provide data over a communication bus 3115. Additionally, power and data may be shared, provided to, and/or received from the mobile device 200 through communication link 3125, which may be wired or wireless as described above. It should be appreciated that while both environmental sensors 3120A and operational sensors 3130A are shown in the locate/marking device 3100, locate/marking devices according to other embodiments contemplated by the present disclosure need not necessarily include either or both environmental sensors and operational sensors.

As depicted in FIG. 31A, the mobile device may comprise control electronics 3112, environmental sensors 3120B and a power source 3114. The mobile device may additionally include operational sensors in some implementations, as depicted in FIG. 31B.

FIGS. 31B and 31C show embodiments in which fewer components are located on the locate/marking device. In some implementations, operational sensors 3130B and environmental sensors 3120B located on the mobile device may be utilized for a locate and/or marking operation. Accordingly, the locate/marking device 3100 may comprise a power source 114, control electronics, and detection electronics 131 (e.g., detection electronics for a locate device or combined locate and marking device). In yet other embodiments, the locate/marking device 3100 may comprise only operational sensors 3130A and a power source 114 as shown in FIG. 31C. In some implementations, the locate/marking device may include only a power source (e.g., a large rechargeable battery to extend operation of the mobile device 200), or the locate/marking device may include only operational sensors that receive power from power source 3114 of the mobile device 200.

With respect to environmental sensors, non-limiting examples of suitable environmental sensors include a temperature sensor (e.g., one or more of an ambient temperature sensor and a surface temperature sensor (e.g., a temperature sensor for sensing a temperature of a surface toward which the locate/marking device is pointed or oriented)), a humidity sensor, a light sensor, an altitude sensor, an image capture device (e.g., a camera), and an audio recorder or acoustic sensor. This list is not exhaustive, however, as other types of environmental sensors may be included as appropriate to sense various environmental conditions of interest.

Figure 32:
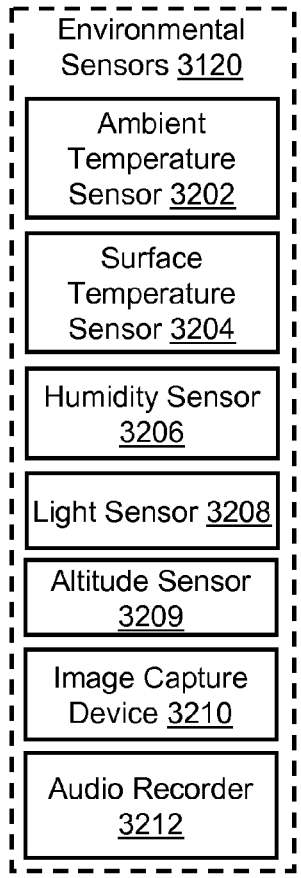
FIG. 32 is a block diagram showing details of the environmental sensors, according to one embodiment of the present invention.

FIG. 32 is a block diagram showing details of the environmental sensors 3120A, 3120B (collectively 3120) shown in FIG. 31A, according to one embodiment of the present invention, that may be located on the locate/marking device 3100 and/or the mobile device 200. In FIG. 32, the illustrated environmental sensors 3120 include an ambient temperature sensor 3202, a surface temperature sensor 3204, a humidity sensor 3206, a light sensor 3208, an altitude sensor 3209, an image capture device 3210, and an audio recorder 3212. Additional or alternative environmental sensors may be included, and one or more of the illustrated environmental sensors may be omitted, in some embodiments. The environmental sensors may be coupled to the processor 118 of control electronics 112, and/or to a processor of control electronics 3112 of the mobile device, to receive control signals from the processor(s) and/or to provide their respective outputs (e.g., signals, data, information) to the processor(s), and, as described further below, may operate in one of various suitable manners. Information provided by any of the environmental sensors may be stored in local memory 122 of control electronics 112 and/or in memory located on the mobile device 200, for example as an electronic record, as described below. Information provided by any of the environmental sensors may be in addition or alternatively transmitted to an external device, such as the remote computer 150, remote storage, etc., for embodiments in which the mobile device 200 or locate/marking device 3100 is in communication with a remote computer 150 or external device or network.

The ambient temperature sensor 3202 may be configured to sense the ambient temperature in the vicinity of the locate/marking device 3100. The ambient temperature may be a useful piece of information, for example in determining whether the temperature is adverse to performance of the locate operation, which may occur when the temperature is too hot or too cold. For example, in some embodiments, it may be preferable to operate the locate/marking device only within a predetermined ambient temperature range between 20° F. and 110° F., although other ranges are possible. In addition, as described further below, the ambient temperature may be useful in combination with one or more other types of environmentally sensed inputs, such as humidity, in evaluating the conditions in which a locate operation is performed.

The ambient temperature sensor may be any suitable temperature sensor, such as an infrared sensor, and may be an analog or digital temperature sensor that utilizes one or more thermistors, as the various aspects described herein relating to a locate/marking device including an ambient temperature sensor are not limited to using any particular type of temperature sensor. According to one embodiment, the temperature sensor may be part of a combined temperature and humidity sensor, such as the HS-2000V from Precon of Memphis, Tenn. In some embodiments, the ambient temperature sensor may be suitable to operate between −40° F. and 125° F., or over any other suitable range, which in some embodiments may encompass the expected temperatures to which the locate/marking device 3100 may be exposed during normal operation.

The surface temperature sensor 3204 may be configured to sense the temperature of the surface toward which the locate/marking device is pointing or oriented (e.g., the ground under the locate/marking device). The temperature of the surface may be useful information for various reasons. Thus, as a non-limiting example, information from the surface temperature sensor 3204 may be used to assess whether the locate and/or marking operation was or is being performed in such recommended temperature conditions.

The surface temperature sensor 3204 may be any suitable type of sensor for determining surface temperature, such as an infrared temperature sensor or any other suitable type of temperature sensor. In some embodiments, the surface temperature sensor may be configured to operate across a range of temperatures encompassing all expected surface temperatures to be encountered during normal operation of the locate/marking device. For example, in one embodiment the surface temperature sensor may operate between −40° F. and 125° F., although other temperature ranges are also possible.

The humidity sensor 3206 may be configured to sense the humidity of the environment in which the locate/marking device 3100 is used, and in some embodiments may provide a relative humidity measurement (e.g., 0% to 100% humidity). Such information may be useful alone or in combination with other information in determining whether, for example, the environment is too humid for performance of the locate and/or marking operation. The humidity information provided by humidity sensor 3206 may be used to assess whether a locate and/or marking operation was or is being performed within acceptable humidity tolerances. The humidity sensor may be any suitable type of humidity sensor, as the type is not limiting. According to one embodiment, the humidity sensor may be part of a combined temperature and humidity sensor, such as the HS-2000V from Precon of Memphis, Tenn.

The sensing of temperature and humidity conditions can be more particularly important for marking operations in which paint is dispensed onto the surface to be marked. High humidity, and/or low or high temperatures can result in poor adhesion of marking paint to the surface to be marked.

The light sensor 3208 may be configured to sense the intensity, flux, or illuminance of ambient light in the vicinity of the locate/marking device 3100. Such information may be useful, for example, to assess whether a locate and/or marking operation was or is being performed in suitable lighting conditions (e.g., whether there was sufficient light to allow for accurate performance of a locate and/or marking operation, whether the area surrounding the locate and/or marking operation is sufficiently lit to ensure worker safety, etc.). The light sensor 3208 may be any suitable type of light sensor. In one embodiment, the light sensor is a cadmium sulfide (CdS) photocell, which is a photoresistor device whose resistance decreases with increasing incident light intensity. Such a device may provide a resistance or voltage measurement as its output indicative of measured flux. However, other types of light sensors may alternatively be used, e.g., any suitable photodiode commercially available. One non-limiting example of a suitable photocell is the PDV-P5001 from Advanced Photonix, Inc. of Ann Arbor, Mich.

The units output by the light sensor may depend on whether the light sensor is sensing light intensity, light flux, or illuminance. For example, the output may be in candela for light intensity, lumen for flux, or lux for illuminance. According to one embodiment, target values for illuminance for accurate performance of a marking operation may be between approximately 1,000 lux and 100,000 lux, although other ranges may be appropriate based on a particular location and type of locate and/or marking operation being performed. According to one embodiment, the output may be converted to a percentage between 0% and 100%, for example in which 0% corresponds to darkness and 100% corresponds to full sunlight. Other outputs may alternatively be produced.

In some implementations, the output from temperature, humidity or light sensors may be displayed visually on a display of the locate/marking device 3100 or mobile device 200 in the form of a meter (e.g., a needle deflection or an bar scale deflection). An acceptable range of operation may be indicated on the display also so that the user may determine immediately whether a deflection of a needle or bar scale falls within an acceptable operating range.

According to one embodiment, the locate/marking device further comprises a light source 3132, such as a flashlight or light emitting diode (LED) torch. The light source 3132 may be activated manually (e.g., by the technician) or may be coupled to the light sensor 3208 (e.g., directly coupled or coupled through one or more components, such as processor 118) and activated automatically in response to the light sensor sensing an unsatisfactorily low lighting condition (e.g., by receiving a signal from the processor 118 of control electronics 112 or 3112 or by directly receiving an output signal of the light sensor). The threshold light level for such automatic activation may be any suitable level, non-limiting examples of which include any level at which the technician may have difficulty seeing and therefore performing the locate and/or marking operation, and any predetermined level below which technician safety may be comprised. Information about such activation of the light source (e.g., the occurrence of the activation, the time of activation, the duration, etc.) may be stored in local memory 122, memory of the mobile device 200, and/or transmitted to an external device, such as the remote computer 150.

The altitude sensor 3209 may be configured to measure the altitude of the locate/marking device 3100, and may be any suitable type of altitude sensor for doing so. The altitude at which a locate and/or marking operation is performed may impact the performance of the locate and/or marking operation and worker safety, among other considerations. Thus, information about the altitude may be useful for a variety of reasons. The output of the altitude sensor 3209 may be in any suitable units, and in some embodiments provides an altitude with respect to sea level. For example, the altitude sensor may provide an altitude in meters, miles, feet, or any other suitable units.

The image capture device 3210 may be positioned on the locate/marking device to capture an image of the environment surrounding the locate/marking device 3100 or may be configured or configurable in any suitable manner to capture any type of image of interest. According to one embodiment, a technician may be meant to take a picture of a job site and/or of an environmental landmark at the job site. Thus, inclusion of an image capture device 3210 in the locate/marking device 3100 may facilitate compliance with such protocols.

The image capture device 3210 may be capable of taking still images, video images, or both, as the various aspects described herein relating to locate/marking devices including an image capture device are not limited in this respect. Thus, the image capture device 3210 may be any suitable type of image capture device, and in some embodiments may be a type that is suitable for use in a portable device, such as, but not limited to, the types of digital cameras that may be installed in portable phones, wide angle digital cameras, 360 degree digital cameras, infrared (IR) cameras, and the like. In some implementations, a wide angle lens and automatic zoom may be utilized to maximize the coverage area of each image. In various embodiments, an image capture device 3210 is incorporated on the mobile device 200.

The output of the image capture device may include various information. The output may include all or part of a captured image. Additionally or alternatively, the output may include information about the settings and/or operation of the image capture device, such as any one or more of resolution, frame rate (for video images), flash status (i.e., flash used or not used), image size, video sequence duration, zoom setting, etc.

In those embodiments in which the image capture device is a digital device, the images may be stored in local memory 122, memory of the mobile device 200, and/or transmitted to an external device, such as the remote computer 150. The images may be in any proprietary or standard image file format (e.g., JPEG, TIFF, BMP, etc.). Furthermore, the images may be associated with a specific job, a geographic position, and an exact time, in some embodiments, for example by flagging the image based on the time at which it was taken, the location at which it was taken, and/or the job during which it was taken. In one embodiment, each captured image may be cached and transmitted with all other captured data from one or more other sensors/input devices.

The environmental sensors 3120 may further comprise an audio recorder 3212, which may be used to capture audio input from a technician and/or from the environment (e.g., sounds in the vicinity of the locate/marking device). Thus, in one embodiment, the technician may, for example, dictate notes relating to the performance of the locate and/or marking operation, such as describing visible landmarks in the area of the locate and/or marking operation, notes about performance of the locate/marking device, or any other notes which may be relevant to performance of a locate and/or marking operation. In one embodiment, the audio recorder may record sounds from the environment, such as passing cars, planes, etc. Such recordings may be useful, for example, in assessing whether a technician was at the intended location of the locate and/or marking operation. For example, if a passing train is evident from the recording and the intended location is not near a train track, the recording may provide evidence that the technician was in the wrong location.

The audio recorder 3212 may be an analog or digital device or devices. For example, in one embodiment the audio recorder 3212 may be an analog recorder configured to receive an analog input signal (e.g., from a microphone) and store the analog signal. According to another embodiment, the audio recorder 3212 may be a digital audio recorder, including any suitable combination of components for receiving an analog signal (e.g., from a microphone), converting the analog signal to a digital signal, performing any suitable digital signal processing (e.g., filtering, amplifying, converting to text, etc.) and storing the digital information. According to one embodiment, the audio recorder may include a dedicated digital audio processor to perform those functions recited or any other suitable functions. It should be appreciated from the foregoing that a microphone (not shown in FIG. 31A-C) may be associated with the audio recorder 3212 to provide the audio input to the audio recorder.

According to one embodiment, for example in which a technician may dictate notes, the audio processing of the audio input may include performing speech recognition (e.g., speech to text generation). Such functionality may be provided by suitable speech recognition software executing on a dedicated audio processor, or in any other suitable manner. Any generated text may be, for example, displayed on a display of the locate/marking device 3100 or a display of the mobile device 200, or may be stored for later display on a separate device.

The recordings provided by the audio recorder 3212 may be stored in a dedicated audio memory, in local memory 122 of control electronic 112, in memory of the mobile device 200, and/or transmitted to an external device, such as the remote computer 150. In those embodiments in which the audio recorder is a digital audio recorder, the audio files may be in any standard or proprietary audio file format (e.g., WAV, MP3, etc.).

Although not illustrated in FIG. 32, the communication interface 124 provided by control electronics 112, or a communication interface of the mobile device 200, may also serve as or enable another environmental sensor. According to one embodiment, the locate/marking device may be internet enabled and information may be received via the communication interface over the internet. According to one embodiment, information about an environmental condition may be received via the communication interface. For example, temperature information or humidity information, among others, may be received over the internet via communication interface. In such instances, the received temperature or humidity information may augment any temperature and humidity information collected by a temperature and humidity sensor of the locate/marking device, or may replace such information, such that in some embodiments the locate/marking device may not include a physical temperature or humidity sensor. Thus, it should be appreciated that a communication interface of the locate/marking device 3100 or of the mobile device 200 may serve as a "virtual sensor" by receiving environmental information of interest, not being limited to temperature and humidity.

It should be appreciated from the foregoing, as well as the further discussion below, that environmental information may be collected for various purposes. According to one embodiment, the environmental information may be useful for assessing a locate/marking device or locate and/or marking operation. According to another embodiment, the environmental information may be useful for assessing the conditions in which marking material is being dispensed. As previously explained, locate and/or marking operations may involve the use of a locate/marking device to detect a facility location and a marking device to mark the facility location, for example by dispensing a marking material. The environmental information sensed by the environmental sensors 3120 may be useful for assessing the conditions in which marking material is being dispensed in those situations in which a marking device is being used in connection with the locate/marking device. Some marking materials (e.g., paint), for example, may have preferred temperature ranges and humidity levels, among other conditions, in which they may be dispensed. Thus, environmental information may facilitate determination of whether a marking material was or is being dispensed in suitable environmental conditions.

As explained above, another type of input device which may be included with a locate/marking device (and/or locate transmitter) is an operational sensor. Thus, according to one aspect of the present invention and as shown in FIGS. 31A and 31C, the locate/marking device 3100 may include one or more operational sensors 3130A for sensing one or more operating conditions or characteristics of the locate/marking device.

Figure 33:
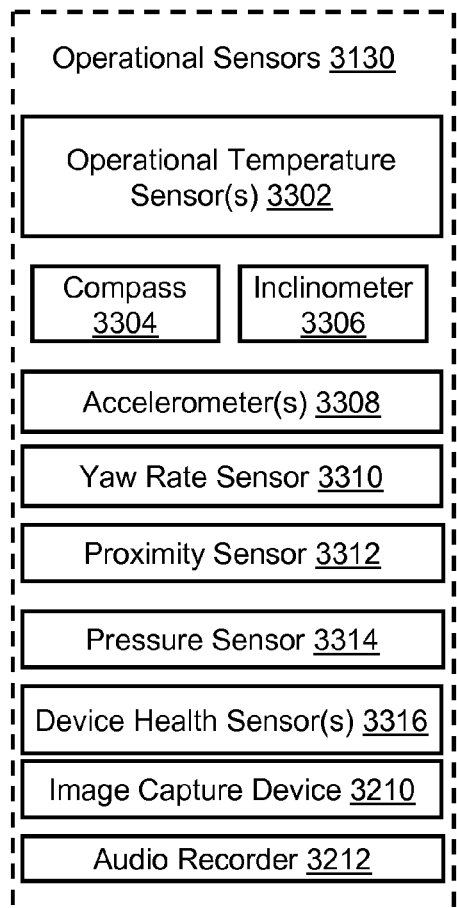
FIG. 33 is a block diagram showing details of the operational sensors, according to one embodiment of the present invention.

FIG. 33 is a block diagram showing details of the operational sensors 3130A, 3130B (collectively 3130) shown in FIGS. 31A and 31B that may be incorporated on a locate/marking device and/or mobile device 200, according to one embodiment of the present invention. The illustrated exemplary operational sensors 3130 include, but are not limited to, one or more temperature sensors 3302, a compass 3304, an inclinometer 3306, one or more accelerometers 3308, a yaw rate sensor 3310, a proximity sensor 3312, a pressure sensor 3314, one or more device health sensors 3316, the image capture device 3210, and the audio recorder 3212. Additional or alternative operational sensors may be included, and one or more of the illustrated operational sensors may be omitted, in some embodiments. The operational sensors may be coupled to the processor 118 of control electronics 112 and/or to a processor of the mobile device to receive control signals from the processor(s) and/or to provide their respective outputs to the processor(s), and, as described further below, may operate in one of various suitable manners. Information provided by any of the operational sensors may be stored in local memory 122 of control electronics 112 and/or in memory of the mobile device 200, for example in an electronic record, described below. Information provided by any of the operational sensors may be alternatively or additionally transmitted to an external device, such as the remote computer 150, remote storage, etc., for embodiments in which at least one of the locate/marking device 3100 and mobile device 200 is in communication with the remote computer, an external device, or a network.

One or more operational temperature sensors 3302 may be configured to sense any temperature of interest with respect to the locate/marking device 3100. For example, it may be desirable in some embodiments to monitor the temperature of the processing circuitry of the locate/marking device 3100, such as the temperature of the processor 118 of control electronics 112. Alternatively, it may be desirable in some embodiments to monitor the temperature of other components of the locate/marking device 3100, for example, the temperature of one of the other operational sensors 3130. Thus, it should be appreciated that a plurality of operational temperature sensors 3302 may be included and arranged to sense any operating temperatures of interest of the locate/marking device 3100. In this manner, the operating temperatures of one or more components of the locate/marking device 3100 may be monitored and an alert or notification may be generated (e.g., by the control electronics) and provided to the technician if one of the operating temperatures is determined to be outside of an acceptable tolerance, for example if a component is overheating. Alternatively, the temperature from one or more operational temperature sensors 3302 may be used to calibrate or compensate data or signals provided by any one of the other sensors which may have a temperature-dependent output.

The temperature sensor(s) 3302 may be any suitable temperature sensor, such as a temperature-dependent variable resistor, or any other type of temperature sensor suitable for measuring the temperature of the components of interest of the locate/marking device. The temperature sensor 3302 may be configured to operate over any suitable temperature range of interest, which in one embodiment may be from −40 F to 125 F, although other temperature ranges may be employed in other embodiments.

The compass 3304 may be configured to determine the direction in which the locate/marking device 3100 is facing, and therefore may be positioned at one of various suitable locations. For example, according to one embodiment, the compass 3304 may be positioned toward the top of the locate/marking device 3100, and aligned such that the compass identifies the direction toward which the front of the locate/marking device points (i.e., the direction in which the locate/marking device faces when held by the technician). The heading information provided by the compass 3304 may be provided in degrees or in any other suitable units, and may be provided relative to a reference direction (e.g., relative to true North). According to one embodiment, the compass may be initially calibrated to true North, such that subsequent heading readings may be relative to true North.

The heading information provided by the compass 3304 may be useful to determine a direction in which the technician moves during a locate and/or marking operation. Such information may be particularly useful in instances in which the location tracking system 130 does not provide a signal or a sufficiently accurate signal to monitor the technician's movements. The compass 3304 may be any suitable type of compass, including analog or digital, and may provide any suitable readout. According to one embodiment, the compass 3304 is a digital compass, which provides a heading of the locate/marking device 3100. According to one embodiment, the compass may include one or more gyroscopes. According to one embodiment, the compass 3304 is an OS4000-T solid state tilt compensated nano compass available from OceanServer Technology, Inc. of Fall River, Mass.

The inclinometer 3306 may be any suitable inclinometer configurable to measure an angle of inclination of the locate/marking device 3100. According to one embodiment, the inclinometer may provide an angle with respect to ground. According to one embodiment, the inclinometer may be a multi-axis digital device and may sense angles with respect to horizontal and/or vertical planes. The inclinometer may provide a voltage as an output signal, indicative of the angle of inclination. According to some embodiments, the inclinometer may have an output range spanning +/−30 degrees (e.g., with respect to ground), although other ranges may alternatively be provided by some inclinometers.

The inclinometer 3306 may be positioned toward the top of the locate/marking device, for example, near where the technician may hold the locate/marking device during use. Alternatively, according to another embodiment, the inclinometer may be positioned substantially near the tip of the locate/marking device (i.e., the end of the locate/marking device held proximate the ground when the locate/marking device is in use). Other locations for the inclinometer with respect to the locate/marking device are also possible.

The information provided by the inclinometer may be useful for one or more of various purposes. For example, according to one embodiment, the information about the angle of the locate/marking device may be useful in determining whether the technician is appropriately using the locate/marking device (e.g., for determining whether the locate/marking device is being held at a suitable angle relative to the surface (e.g., the ground) under which a facility is disposed or onto which marking material is to be dispensed), and in some instances may therefore be used to disable part of the locate/marking device (e.g., detection electronics 131, or marking actuation) if the technician is holding the locate/marking device at an inappropriate angle. According to another embodiment, as described in further detail below in connection with FIG. 35, the information about the angle of the locate/marking device may be used to determine the location of one point of the locate/marking device relative to a second point of the locate/marking device (e.g., for use in determining the relative positioning of the tip of the locate/marking device compared to the top of the locate/marking device).

One or more accelerometers 3308 may be configured to sense the acceleration of the locate/marking device 3100 and may provide an output in terms of g-force or in any other suitable units. Such information may be useful, for example, in assessing whether a technician is appropriately using (e.g., physically moving or manipulating) the locate/marking device 3100. For example, there may be predetermined acceptable acceleration ranges associated with normal operation of the locate/marking device (e.g., associated with the typical sweeping motion of a locate receiver as the technician scans for a buried facility), and therefore the accelerometer(s) 3308 may provide information which may be used to assess whether a technician is operating the locate/marking device 3100 within those acceptable ranges. In addition, any acceleration data provided by the accelerometer(s) may be integrated to obtain velocity data and/or integrated twice to obtain data about distance traveled (e.g., via appropriate functionality included in the locate data algorithm 137 or other algorithm executed by the processor 118, or by an application in operation on the mobile device 200), either of which integration results may be useful for a variety of reasons.

The accelerometer(s) 3308 may be any suitable accelerometer for sensing the acceleration of the locate/marking device and may provide any suitable outputs. According to one embodiment, the accelerometer may be a 3-axis accelerometer, providing an indication of the acceleration of the locate/marking device along three orthogonal axes. The output of each axis may be a frequency (e.g., in Hz) or may be converted to units of g. For example, in one embodiment the accelerometer may be a 3-axis accelerometer that outputs a signal ranging from 0.5 Hz-550 Hz for the z-axis, from 0.5 Hz-1600 Hz for the x-axis, and from 0.5 Hz-1600 Hz for the y-axis. Again, the accelerometer may alternatively provide an output in terms of g or any other suitable units. In one exemplary implementation, an accelerometer may be an ADXL 330KCPZ-RL accelerometer available from Analog Devices of Norwood, Mass. In some exemplary implementations, the accelerometer may output acceleration data, whereas in other implementations the accelerometer may output velocity data along each of the three axes, as well as the orientation of the accelerometer.

In addition to providing acceleration data, an accelerometer may be operated as an inclinometer according to known techniques (see, e.g., description at http://www.tilt-china.com/uploadPDF/How_to_use_an_accelerometer_as_an_inclinometer.pdf, viewed on Jan. 27, 2010 and prepared by Shanghai Vigor Technology Development Co.). Thus, according to one embodiment of the present invention, a locate/marking device may include an accelerometer configured to function as an inclinometer and therefore provide a measure of inclination of the locate/marking device.

Furthermore, as explained in greater detail below, the locate/marking device 3100 may comprise a plurality of accelerometers located at different positions with respect to the locate/marking device. Information from such accelerometers may be useful, for example, in assessing the relative motion of one portion (e.g., the tip) of the locate/marking device with respect to a second portion (e.g., the top) of the locate/marking device, for example using the techniques described in U.S. Patent Application Publication 2008-0255795-A1, published Oct. 16, 2008, which is hereby incorporated herein by reference in its entirety. According to one such non-limiting embodiment, one accelerometer may be positioned near the tip of the locate/marking device and a second accelerometer may be positioned near the top of the locate/marking device. Both may be 3-axis accelerometers. Such an arrangement may also be used to determine the location of the tip of the locate/marking device relative to the location of the top of the locate/marking device, as explained below in connection with FIG. 35.

Additionally, the data output by one or both accelerometers may be used to monitor for out-of-tolerance operation of the locate/marking device, such as improper manipulation of the locate/marking device by the technician. For example, acceleration data from either accelerometer may be indicative of whether the locate/marking device is being swung, thrown, or dropped, among other things. For example, acceleration values from either accelerometer above some threshold value for a sufficient duration (e.g., for one second or greater, or any other suitable duration) may be indicative of the locate/marking device being thrown or dropped. The threshold value of acceleration indicative of such behavior may be different for the two accelerometers. Similarly, detection of acceleration values deviating from an expected or target pattern may be indicative of misuse of the locate/marking device. In response to detecting such manipulation of the locate/marking device, various actions may be taken, such as generating an alert, logging an event, disabling the actuation system and/or detection electronics 131 of the locate/marking device.

Moreover, a locate/marking device may be provided with two accelerometers to monitor whether the locate/marking device is being held in a satisfactory manner during use. For example, it may be preferable for a locate/marking device to be maintained at a substantially perpendicular angle relative to ground as a technician is locating or marking, even when the technician is moving (e.g., sweeping or swinging) the locate/marking device. It should be appreciated that when operated in such a manner, the top of the locate/marking device and the tip of the locate/marking device may exhibit similar acceleration characteristics (e.g., peaks in acceleration at the same time (e.g., at the same points of a swinging motion), minimum values of acceleration at the same time (e.g., at the same points of a swinging motion), etc.) By positioning an accelerometer toward the tip of the locate/marking device and another toward the top of the locate/marking device, the resulting acceleration data may be indicative of whether the technician is holding the locate/marking device perpendicular to ground or otherwise properly manipulating the locate/marking device. Other uses for multiple accelerometers on a locate/marking device are also possible, and the examples listed above are non-limiting.

The operational sensors 3130 may further comprise a yaw rate sensor 3310, which may be configured to sense the yaw rate (i.e., a twisting motion) of the locate/marking device. The yaw rate sensor may be any suitable yaw rate sensor and may provide its output in any suitable units, for example in degrees per second (degrees/sec). One non-limiting example of a suitable yaw rate sensor is an ADXRS610BBGZ-RL gyro sensor from Analog Devices of Norwood, Mass. According to another embodiment, a yaw rate measurement may be provided by some types of compasses, such that a combination compass and yaw rate sensor may be used. The yaw rate sensor may be positioned at any suitable location on the locate/marking device to detect yaw rate.

The proximity sensor 3312 may be configured to measure the distance from any point of interest of the locate/marking device 3100 to a point of interest in its surroundings. For example, in one embodiment, the proximity sensor 3312 may be positioned at the tip of the locate/marking device, and may be oriented to determine the distance between the tip of the locate/marking device and any surface (e.g., a target surface) of interest, such as the ground, a landmark, a wall, etc. Alternatively, in one embodiment, the proximity sensor may be positioned toward the top of the locate/marking device and oriented to determine a distance between the top of the locate/marking device and the target surface (e.g., ground). Other configurations are also possible.

Information about the distance from the locate/marking device to any surrounding surface may be useful for one of various reasons. For example, such information may be useful in assessing whether a technician is properly operating the locate/marking device. As a non-limiting example, there may be predetermined acceptable distances between the locate/marking device and the surface under which a facility is located when scanning for the facility or onto which marking material is to be dispensed. As an example, it may be preferable in some embodiments to hold the locate/marking device between one and twelve inches from the surface. The proximity sensor may be used to determine whether the technician is maintaining the locate/marking device at an acceptable distance from the surface. Alternatively, according to another embodiment, and as described in greater detail below, the distance of a portion of the locate/marking device from the ground may be useful in determining the distance between two points of the locate/marking device.

The proximity sensor 3312 may be any suitable type of proximity sensor (e.g., any commercially available proximity sensor), including an analog or digital device. In one embodiment, proximity sensor 3312 may be a Sharp GP2D120 short range IR distance sensor from Sharp Electronics Corporation (Mahwah, N.J.) and is able to take a substantially continuous distance reading and return a corresponding analog voltage with a range of about 1.6 inches to about 12 inches. Such a proximity sensor may be suitable, for example, when the sensor is used to sense the distance from the tip of the locate/marking device to the ground, since such a distance may typically be less than about 12 inches. According to another embodiment, the proximity sensor may be a sonar device. Other types of proximity sensors may also be suitably used.

The pressure sensor 3314 may be configured to sense any pressure of interest with respect to the locate/marking device. For example, according to one embodiment it may be desirable to detect the pressure applied to a handle of the locate/marking device (e.g., handle 138 in FIG. 5), for instance to determine whether a technician is holding the locate/marking device and, if so, whether it is being held appropriately. Accordingly, a pressure sensor may be positioned in the handle of the locate/marking device in one non-limiting embodiment and configured to detect the pressure applied to the handle. According to another embodiment, it may be desirable to determine the pressure applied to an actuation system of the locate/marking device, for example if the actuation system is a trigger (e.g., actuator 142 in FIG. 18). Accordingly, a pressure sensor may be configured to determine the pressure applied to the trigger or other actuation mechanism in those embodiments in which the locate/marking device includes such a trigger or actuation mechanism. According to one embodiment, the locate/marking device may include multiple pressure sensors, for example one for determining the pressure applied to a handle of the locate/marking device and one for determining a pressure applied to an actuation system of the locate/marking device. However, any number of pressure sensors may be included, and they may be configured to sense any pressure of interest with respect to the locate/marking device. The pressure sensor 3314 may be any suitable type of pressure sensor for detecting the pressure of interest.

The locate/marking device may further include device health monitoring capability. Characteristics of the health of the locate/marking device which may be the subject of monitoring include, but are not limited to, battery life, battery drain level, battery charging capacity, wireless signal strength (in those embodiments in which the locate/marking device has wireless capabilities), network connectivity, operating temperature, available memory, and the status of any one or more input devices of the locate/marking device, such as an accelerometer, location tracking system (e.g., GPS receiver), image capture device, light sensor, etc. To this end, the locate/marking device may include hardware and/or software configured to serve the health monitoring purpose.

According to one embodiment, the locate/marking device may include a processor (e.g., processor 118 of control electronics 112, or a processor of mobile device 200) configured to run a device health software program or application to process the inputs from one or more operational sensors, such as operational temperature sensor 3302, to assess whether those inputs indicate the locate/marking device is operating appropriately. According to another embodiment, the locate/marking device may include dedicated device health hardware, such as device health sensor 3316, which may provide data that is processed by a device health software program (for example, executing on processor 118) to assess the health of the locate/marking device. Non-limiting examples of device health sensor 3316 include a voltmeter and an ammeter, among others.

In one embodiment, data provided by the device health sensor 3316 may indicate that a low battery condition is present during the locate and/or marking operation and, thus, it may be determined that the operations of the locate/marking device are not reliable. Other device conditions, such as wireless signal strength (e.g., in those embodiments in which the locate/marking device 3100 and/or mobile device 200 is/are wirelessly coupled to an external device, such as remote computer 150), available memory, temperature of one or more components of the locate/marking device, power connection of one or more components of the locate/marking device, or other conditions of the locate/marking device may be monitored by a device health sensor. Thus, it should be appreciated that a locate/marking device according to the embodiments described herein may include any suitable number of device health sensors for monitoring a desired number of device conditions.

According to one embodiment, a record or message may be created based on operation of the device health sensor. For example, a record or message may be created including a device ID (e.g., of the locate/marking device) and the current state of certain device components, such as input devices (e.g., environmental and operational sensors). The record or message may also or alternatively include an identification of any resource utilization that is nearing a specified threshold (e.g., memory nearing capacity). Thus, it should be appreciated that various conditions may be monitored under the rubric of monitoring the health of the locate/marking device, and various actions taken in response to such monitoring.

The operational sensors 3130 may further comprise the image capture device 3210. As previously mentioned, the image capture device 3210 may be considered an operational sensor, for example, if and when configured to capture an image relating to the operation of the locate/marking device 3100.

Furthermore, the operational sensors 3130 may comprise an audio recorder or acoustic sensor, similar to or the same as audio recorder 3212, and therefore shown as audio recorder 3212 in FIG. 33. For example, the locate/marking device may include multiple audio recorders, with one or more operating as an environmental sensor (e.g., recording acoustic input from the environment) and one or more operating as operational sensors (e.g., recording acoustic input relating to operation of one or more components of the locate/marking device). According to one embodiment, a microphone associated with the audio recorder is positioned to detect sound emitted by a component of interest of the locate/marking device. For example, a microphone may be located near the marking dispenser 116 to detect when marking material is dispensed. The audio input may also be stored by the audio recorder and processed in any suitable manner.

As previously described, the audio recorder may be any suitable audio recorder, including a digital audio recorder or analog audio recorder, for example of any of the types previously described. In one embodiment, the audio recorder may comprise a dedicated PIC processor. In those embodiments in which the locate/marking device includes two or more audio recorders (e.g., one operating an as environmental sensor and another operating as an operational sensor), the audio recorders may share any suitable combination of circuitry. For example, multiple audio recorders may share a same digital signal processor (e.g., a dedicated audio signal processor). A separate microphone may be associated with each audio recorder, or a microphone may be shared between two or more audio recorders. Thus, it should be appreciated that the exact configuration and components of audio recorders according to the various embodiments described herein are not limiting.

The audio files produced by an audio recorder operating as an operational sensor may be stored locally in dedicated audio memory, in local memory 122 of control electronics 112, in memory of the mobile device 200, and/or transmitted to an external device, such as the remote computer 150.

In any of the embodiments illustrated in FIG. 31A-C, any one or more of the environmental sensors 3120 illustrated in FIG. 32 and/or operational sensors 3130 illustrated in FIG. 33 may be operated in any suitable manner, including continuously, periodically, and/or in response to an event or trigger (e.g., one or more actuations of the locate/marking device), or in any other suitable manner. For example, one or more of the environmental sensors 3120 and/or operational sensors 3130 may operate continuously during performance of a locate and/or marking operation. In particular, the ambient temperature sensor may output a substantially continuous data stream indicative of the sensed ambient temperature. Similarly, the surface temperature sensor, humidity sensor, and light sensor may output substantially continuous data streams indicative of the respective sensed conditions. The inclinometer, compass, accelerometer, yaw rate sensor, proximity sensor, pressure sensor, and device health sensor may also output substantially continuous data streams indicative of the sensed operation. The image capture device 3210 may record a video sequence continuously during the locate and/or marking operation, and the audio recorder 3212 may continuously record any audio input during performance of the locate and/or marking operation.

Alternatively, one or more of the environmental sensors 3120 and/or operational sensors 3130 may be operated and/or polled periodically, with the resulting output data being logged and/or transmitted periodically. For example, the ambient temperature sensor may provide an output signal indicative of the sensed ambient temperature every second, every five seconds, every ten seconds, every minute, every ten minutes, or at any other suitable time interval. Similarly, the surface temperature sensor, humidity sensor, light sensor, operational temperature sensor(s), inclinometer, compass, accelerometer(s), yaw rate sensor, proximity sensor, pressure sensor, and device health sensor(s) may output data at periodic intervals. The image capture device may capture a still image or a video sequence of any desired duration at periodic intervals. The audio recorder may capture audio of any desired duration at periodic intervals. It should be appreciated that in some embodiments one or more of the environmental sensors 3120 and/or operational sensors 3130 may themselves operate so as to provide output information in an essentially continuous fashion, but only be read or polled (e.g., by processor 118 or the processor of the mobile device 200) on some discrete or periodic basis. Accordingly, output signals or data provided by one or more sensors may be acquired, logged into local memory, and/or transmitted to an external device in any of a variety of manners.

According to another embodiment, one or more of the environmental sensors 3120 and/or operational sensors 3130 may operate, be read discretely, and/or be polled, and therefore the corresponding data may be logged and/or transmitted, in response to actuation of the actuation system 120 of the locate/marking device. For example, actuation of the actuation system 120 may trigger collection of magnetic field data and simultaneously may trigger recording of a sensed ambient temperature from ambient temperature sensor 3202. The remaining environmental sensors 3120 and/or operational sensors 3130 may be operated, read and/or polled in a similar manner.

In one embodiment, one or more of the environmental sensors 3120 and/or operational sensors 3130 may be activated, read discretely, and/or polled by the technician irrespective of whether the actuation system 120 is actuated. For example, the technician may activate, read, and/or poll one or more of the environmental sensors by depressing a selection button corresponding to the environmental sensor(s), by choosing a selection button or menu option from a user interface of the locate/marking device (in those embodiments in which the locate/marking device includes a user interface) or from a user interface of the mobile device 200, or in any other suitable manner. The operational sensors may operate similarly.

Thus, it should be appreciated that the operation of sensors, and reading and/or logging and/or transmitting of data from the environmental sensors 3120 and operational sensors 3130, is not limited to any particular manner or time, but rather that various suitable schemes are contemplated. Also, it should be appreciated that in those embodiments in which a locate/marking device comprises multiple sensors, the sensors need not operate in the same manner as each other. For example, one or more of the sensors may operate periodically while one or more may only provide their data output in response to actuation of the locate/marking device actuation system. In one embodiment, a plurality of the sensors may provide their data outputs periodically, but at different rates. As an example, the accelerometers and yaw rate sensor of the locate/marking device may output their data at relatively high frequencies, such as in the kHz range, MHz range, or higher. The temperature sensors, humidity sensor, and light sensor may output their data at relatively lower frequencies, such as approximately 1 Hz or sub-Hz frequencies, for example because those quantities may not change as rapidly as the quantities measured by the accelerometers and the yaw rate sensor. Other operating schemes are also possible.

According to one embodiment, the output data from the sensors is only read and stored upon actuation of the actuation system 120, even though the sensors may update their outputs at the above-indicated frequencies or any other suitable frequencies. Upon such actuation, data from any one or more of the sensors may be read out and stored in memory. The stored data may therefore represent the values present at the sensors at the time of actuation. In this manner, data values output by the sensors when the trigger is not actuated may not be stored in some instances, but rather may be updated by the subsequent data value from the sensor. In this manner, only the most recent data from the sensors may be stored upon actuation. Other operating schemes are also possible.

Any data that is generated by any of the environmental or operational sensors, or a portion thereof, may be provided to a processor 118 of the locate/marking device 3100 or a processor of the mobile device 200 in any suitable form and manner, such that it is recognizable by the receiving processor. In some instances the data may be preprocessed (e.g., preliminarily processed by an analog-to-digital converter, filters, a digital signal processor, etc.) prior to being handled by the processor 118 or processor of the mobile device. In some implementations, raw data from one or more sensors may be formed into packets, e.g., by a microcontroller, prior to transmission to processor 118 or to mobile device 200. In some embodiments, the processor 118 may form received sensor data into packets for transmission to the mobile device 200 or to a remote computer 150. Similarly, the mobile device may form received sensor data into packets for transmission to the locate/marking device 3100 or to the remote computer 150. As described herein, data from any of the sensors may be obtained for processing on a periodic basis, e.g., as a result of periodic polling of a sensor, or on an aperiodic basis, e.g., as a result of an intermittent actuation of a function of the locate/marking device or intermittent polling by a user.

A non-limiting example of a data packet that may be provided to a processor of the locate/marking device or the mobile device 200, or formed by either processor for subsequent transmission, may comprise a header, a flag field, and a payload. Each of the header, flag field, and payload may comprise a fixed number of bits. Alternatively, some of the data portions may have a fixed number of bits, whereas other portions may be non-fixed and include stop bits. The header may include, for example, any one of or a combination of identification information identifying a locate/marking device or mobile device, a sensor identification, a job site or job identification number, a marking technician, a company or any other identification information of interest. Other information relevant to a locate and/or marking operation may be included in the header. The header may additionally or alternatively include any required header information for conforming to a particular communication protocol implemented by the locate/marking device or mobile device. The payload may include any one of or a combination of timing data, acceleration data, and GPS data, among other things. In some implementations, data packets may be parsed based on sensor type. For example, accelerometer data packets are formed containing accelerometer data only in the payload. The flag field may be set by actuation of an actuator. Thus, data packets generated during actuation of the actuator (which may, in at least some embodiments, correspond to dispensing of marking material) may be differentiated from data packets generated at other times during operation based on the status of the flag field, which in some embodiments may be a single bit field with a value of "1" when the actuator is actuated and a value of "0" when the actuator is not, though other forms of flag fields are also possible. In some embodiments, storage and/or processing of data packets may depend on the value(s) of the flag field. For example, in one embodiment only data packets having the flag field set (i.e., a value of "1") are stored locally and/or transmitted from the locate/marking device 3100 or mobile device 200. Other schemes are possible, however. Furthermore, other forms and contents of data packets are possible.

As mentioned previously, environmental information and/or operational information output by any one or more environmental sensors and operational sensors of the locate/marking device or mobile device 200 (e.g., of the environmental sensors 3120 and/or operational sensors 3130) may be used for one or more of various purposes, some of which have been previously described. Examples of such purposes include assessing whether a locate and/or marking operation was or is being performed within environmental and/or operational tolerances, interacting with the technician and/or controlling/altering operation of the locate/marking device, and augmenting data records/files.

To this end, the various environmental information and/or operational information provided by various sensors may be organized and handled as data in various formats, and in some implementations may be organized in terms of events and corresponding event entries formatted according to a particular protocol, for example as discussed above in connection with Tables 2-5 and Tables 13-15. Event entries similar to these and including various environmental and/or operational information may be generated by the locate/marking device at some point once information has been read/acquired from environmental and/or operational sensors, the event entries themselves (or any information contained therein) may be logged in a file for an electronic record and stored in memory of the locate/marking device or mobile device, and/or the event entries themselves (or any information contained therein) may be transmitted by the locate/marking device (e.g., to remote computer 150).

In some implementations, environmental information and/or operational information may be contained within one or more event entries corresponding to an actuation of the locate/marking device, such that the environmental information and/or the operational information is part of an actuation data set. Table 21 below illustrates a modification of an event entry originally depicted in Table 13 above, in which environmental information and operational information is included as part of the data formatted in an actuation event entry, according to one example. The information for acceleration may include three values for each axis of each accelerometer. One value for a particular axis may be a raw value, the second value for a particular axis may be a high-pass filtered value, and the third value may be a low-pass filtered value. Data values are only shown for one of the two accelerometers listed. Locate information from one or more input devices/other components of the locate/marking device is recorded with these events to provide information about the job in progress.

The contents of an information field for a particular piece of environmental information and/or operational information in an event entry may have any of a number of forms; for example, the content may be strictly numeric (e.g., according to some predetermined scale/units of measure for the numeric information), alphanumeric (e.g., 78F), text (e.g., YES), symbolic (e.g., Y or N to indicate "yes" or "no," or some other symbol to provide an indication, such as ! to indicate sensor failure or no sensor information available), or referential in nature (e.g., a filename, pointer or other link to provide an indication of where relevant information relating to the particular environmental and/or operational condition may be found).

TABLE 21

| Format | INFO+ LCTR: (DATE) (TIME) (GPS data) (FACILITY TYPE) (GROUND TYPE) (MAGNETIC FIELD STRENGTH AS % OF FULL SCALE info) (DETECTED SIGNAL FREQUENCY) (GAIN) (AMB TEMP info) (SURF TEMP info) (HUM info) (LIGHT info) (ALTITUDE info) (IMAGE info) (AUDIO info) (OP TEMP info) (COMPASS info) (INCL info) (ACC1 info) (ACC2 info) (YAW info) (PROX info) (DH1 info) (DH2 info) <CR><LF> |
|---|---|
| Examples | INFO+LCTR: DATE(2009-04-15) TIME(12:04:44)<br>GPS($GPGGA,120443,4807.038,N,01131.000,E,1,08,0.9,545.4,M,46.9,M,,*47)<br>FACILITY TYPE (YELLOW) GROUND TYPE (PAVEMENT) STRENGTH(80)<br>FREQUENCY(512) GAIN (10) AMB TEMP(73F) SURF TEMP(78F) HUM(32)<br>LIGHT(1500) ALT(200) IMAGE(Y) AUDIO(Y) OP TEMP(97F) COMPASS(243)<br>INCL(-20) ACC1_x_raw(.287) ACC1_x_high(.283) ACC1_x_low(.275)<br>ACC1_y_raw(.385) ACC1_y_high(.382) ACC1_y_low(.381) ACC1_z_raw(.153)<br>ACC1_z_high(.150) ACC1_z_low(.145) (ACC2(!) YAW(!) PROX(15) DH1(67) DH2(!)<br><CR><LF><br>INFO+LCTR: DATE(2009-04-15) TIME(12:04:45)<br>GPS($GPGGA,120445,4807.038,N,01131.000,E,1,08,0.9,545.4,M,46.9,M,,*47)<br>FACILITY TYPE (YELLOW) GROUND TYPE (GRASS) STRENGTH(81)<br>FREQUENCY (512) GAIN (10) AMB TEMP(73F) SURF TEMP(78F) HUM(31)<br>LIGHT(1500) ALT(200) IMAGE(Y) AUDIO(Y) OP TEMP(97F) COMPASS(243)<br>INCL(-20) ACC1_x_raw(.285) ACC1_x_high(.280) ACC1_x_low(.275)<br>ACC1_y_raw(.385) ACC1_y_high(.385) ACC1_y_low(.380) ACC1_z_raw(.156)<br>ACC1_z_high(.150) ACC1_z_low(.145) ACC2(!) YAW(!) PROX(14) DH1(67) DH2(!)<br><CR><LF><br>INFO+LCTR: DATE(2009-04-15) TIME(12:04:46)<br>GPS($GPGGA,120446,4807.038,N,01131.000,E,1,08,0.9,545.4,M,46.9,M,,*47)<br>FACILITY TYPE (YELLOW) GROUND TYPE (DIRT) STRENGTH(80)<br>FREQUENCY(512) GAIN (11) AMB TEMP(73F) SURF TEMP(78F) HUM(31)<br>LIGHT(1500) ALT(200) IMAGE(Y) AUDIO(Y) OP TEMP(97F) COMPASS(243)<br>INCL(-20) ACC1_x_raw(.285) ACC1_x_high(.380) ACC1_x_low(.275)<br>ACC1_y_raw(.385) ACC1_y_high(.382) ACC1_y_low(.390) ACC1_z_raw(.155)<br>ACC1_z_high(.150) ACC1_z_low(.147) ACC2(!) YAW(!) PROX(15) DH1(67) DH2(!)<br><CR><LF> |

In other implementations, one or both of environmental information and/or operational information may be formatted in one or more particular event entries generated specifically to provide such information, in a manner that is not necessarily related to actuation of the locate/marking device. For example, such "sensor read events" may be generated as the result of the processor reading one or more environmental and/or operational sensors one or more times while a job is in progress (e.g., on a periodic basis pursuant to processor polls). Table 22 below provides an example of such a sensor read event entry.

TABLE 22

| Format | INFO+SENSOR: (DATE) (TIME) (AMB TEMP info) (SURF TEMP info) (HUM info) (LIGHT info) (IMAGE info) (AUDIO info) (OP TEMP info) (COMPASS info) (INCL info) (ACC1 info) (ACC2 info) (YAW info) (PROX info) (PRESSURE info) (DH1 info) (DH2 info) <CR><LF> |
|---|---|

TABLE 22-continued

| Examples | INFO+SENSOR: DATE(2009-04-15) TIME(12:04:45)<br>AMB TEMP(73F) SURF TEMP(78F) HUM(31)<br>LIGHT(1500) IMAGE(Y) AUDIO(Y) OP TEMP(97F)<br>COMPASS(243) INCL(-40) ACC1(.285) ACC2(!) YAW(!)<br>PROX(15) PRESSURE (54) DH1(67) DH2(!)<CR><LF> |
|---|---|

With respect to file formats for electronic records including event entries or information derived therefrom, as discussed above any number of file formats may be employed (e.g., ASCII, CSV, XML).

Figure 34:
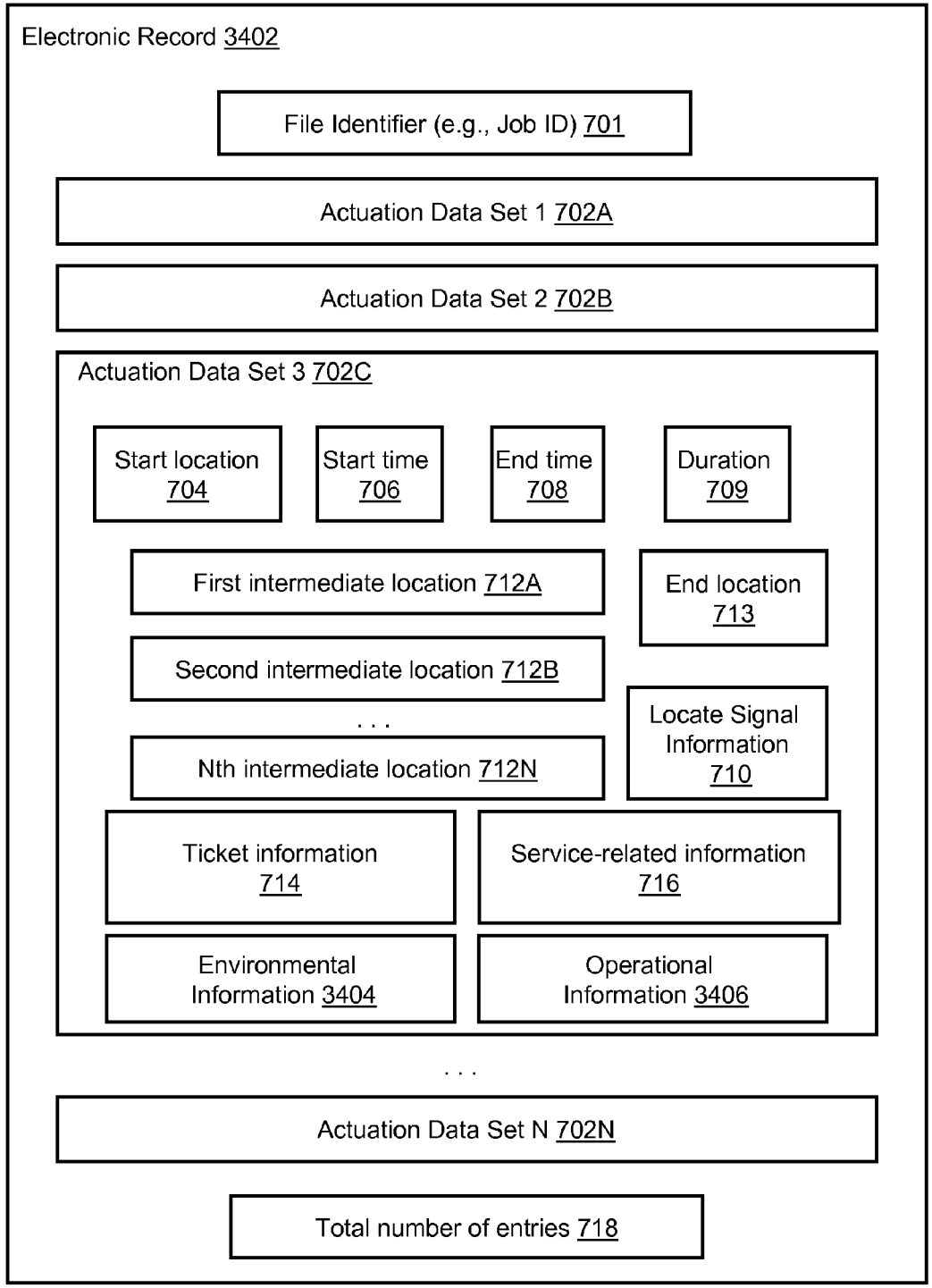
FIG. 34 is a block diagram of an exemplary data structure of an electronic record that may be generated as a result of a locate and/or marking operation; the record may include information received from environmental sensors and operational sensors of the locate receiver, according to one embodiment of the present invention.

FIG. 34 illustrates an electronic record 3402, similar to the electronic record 135 previously described in connection with FIGS. 10 and 13, which may be generated by a locate/marking device 3100, stored in local memory 122 of the locate/marking device, stored in memory of the mobile device 200, and/or transmitted in whole or part to a remote computer 150, according to one embodiment. Some or all of the information provided in the electronic record 3402 may be derived from an event entry generated by the locate/marking device and/or the mobile device 200 (e.g., an event entry is generated and then parsed to provide information in various fields of an electronic record), or the information contained in the electronic record 3402 may be provided in another manner pursuant to the concepts disclosed herein (e.g., sensor information may be acquired directly from one or more sensors, and acquired information may be stored in the electronic record without necessarily generating an event entry). In addition to the information elements shown previously in FIGS. 10 and 13, the electronic record 3402 may further include one or both of environmental information 3404 and operational information 3406. While both types of information are shown for simplicity in FIG. 34, it should be appreciated that an electronic record according to various embodiments need not include both environmental information and operational information.

The exemplary electronic record 3402 shown in FIG. 34 may be used to evaluate performance of a locate and/or marking operation, for example, by reviewing information in the actuation data set 702C, the ticket information 714, service-related information 716, the environmental information 3404 and/or the operational information 3406. It should be appreciated that the electronic record 3402 includes some information that assumes that the locate/marking device 3100 includes the timing system 128 and the location tracking system 130, such as the timing and location information shown in the electronic record.

Table 23 provides an example of a data record that may be generated by a locate/marking device 3100 communicatively coupled to a mobile device 200 upon actuation of the actuation system. Each shown "act" corresponds to a separate actuation. As shown, the data record may include information about the service provider identification, the user (technician) identification, the locate/marking device identification, the receiver mode, a timestamp (for example, provided by a timing system such as timing system 128), geo-location data, signal strength data, gain of the locate/marking device, signal frequency data, facility depth data, facility type data, ground type data, locate request data, and information relating to the environmental sensors 3120. This example relates more particularly to a locate operation and is provided for purposes of illustration. The example is not limiting, as many different forms of data records may be generated based on the operation of the locate/marking device 3100.

TABLE 23

Example record of data acquired by locate/marking device 3100 upon actuation

| | | |
|---|---|---|
| Record # act-1 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:15.2 |
| | Geo-location data | 2650.9348, N, 08003.5057, W |
| | Signal strength (% of maximum) | 85 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Ambient temperature (° F.) | 75 |
| | Surface temperature (° F.) | 80 |
| | Humidity (%) | 85 |
| | Illuminance (lux) | 15000 |
| | Altitude (meters) | 200 |
| | Image captured (Y/N) | Y |
| | Audio captured (Y/N) | N |
| Record # act-2 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:17.5 |
| | Geo-location data | 2650.9448, N, 08203.5057, W |
| | Signal strength (% of maximum) | 83 |
| | Gain | 45 |
| | Signal frequency (kHz) | 1 |
| | Facility depth (meters) | 3.3 |
| | Facility type | Gas (yellow) |
| | Ground type | Pavement |
| | Locate request data | Requestor: XYZ Construction Company, Requested service address: 222 Main St, Orlando, FL |
| | Ambient temperature (° F.) | 75 |
| | Surface temperature (° F.) | 80 |
| | Humidity (%) | 84 |
| | Illuminance (lux) | 15500 |
| | Altitude (meters) | 200 |
| | Image captured (Y/N) | Y |
| | Audio captured (Y/N) | N |
| Record # act-3 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:18.7 |
| | Geo-location data | 2650.9358, N, 08003.5067, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Ambient temperature (° F.) | 74 |
| | Surface temperature (° F.) | 81 |
| | Humidity (%) | 85 |
| | Illuminance (lux) | 15200 |
| | Altitude (meters) | 200 |
| | Image captured (Y/N) | Y |
| | Audio captured (Y/N) | N |

In a manner similar to Table 23, Table 24 provides another example of a data record that may be generated by locate/marking device 3100 upon actuation of the actuation system. Each shown "act" corresponds to a separate actuation. As shown, the data record may include information about the service provider identification, the user (technician) identification, the locate/marking device identification, the receiver mode, a timestamp (for example, provided by a timing system such as timing system 128), geo-location data, signal strength data, gain of the locate/marking device, signal frequency data, facility depth data, facility type data, ground type data, locate request data, and information relating to the operational sensors 3130. The location tracking system 130 provides the geo-location data. The temperature sensor(s) 3302 provides the temperature data. The compass 3304 provides the heading. The inclinometer 3306 provides the inclination. The accelerometer(s) 3308 provides the acceleration, and in this embodiment is a 3-axis accelerometer. The yaw rate sensor 3310 provides the yaw rate. The proximity sensor 3312 provides the distance, which may represent the distance from the tip of the locate/marking device to the ground, in one non-limiting embodiment. The pressure sensor 3314 provides the pressure measurement. This example is provided for purposes of illustration, and is not limiting, as many different forms of data records may be generated based on the operation of the locate/marking device 3100.

TABLE 24

Example record of data acquired by locate/marking device 3100 upon actuation

| | | |
|---|---|---|
| Record # act-1 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:15.2 |
| | Geo-location data | 2650.9256, N, 08003.5234, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 243 |
| | Inclination (degrees) | 25 |
| | Acceleration (g) (x-axis) | 0.75 |
| | Acceleration (g) (y-axis) | 1.20 |
| | Acceleration (g) (z-axis) | 0.90 |
| | Yaw rate (degrees/sec) | 10 |
| | Distance (cm) | 15 |
| | Pressure (pounds/in$^2$) | 45 |
| | Image captured (Y/N) | Y |
| | Audio captured (Y/N) | N |
| Record # act-2 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:17.5 |
| | Geo-location data | 2650.9256, N, 09003.5234, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 243 |
| | Inclination (degrees) | 25 |
| | Acceleration (g) (x-axis) | 0.80 |
| | Acceleration (g) (y-axis) | 1.50 |
| | Acceleration (g) (z-axis) | 0.70 |
| | Yaw rate (degrees/sec) | 9 |
| | Distance (cm) | 14 |
| | Pressure (pounds/in$^2$) | 48 |
| | Image captured (Y/N) | Y |
| | Audio captured (Y/N) | N |
| Record # act-3 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:18.7 |
| | Geo-location data | 2650.9256, N, 08003.5234, W |
| | Signal strength (% of maximum) | 86 |
| | Gain | 45 |
| | Signal frequency (kHz) | 1 |
| | Facility depth (meters) | 3.5 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 245 |
| | Inclination (degrees) | 27 |
| | Acceleration (g) (x-axis) | 0.50 |
| | Acceleration (g) (y-axis) | 1.00 |
| | Acceleration (g) (z-axis) | 1.00 |
| | Yaw rate (degrees/sec) | 11 |
| | Distance (cm) | 14 |
| | Pressure (pounds/in$^2$) | 50 |
| | Image captured (Y/N) | Y |
| | Audio captured (Y/N) | N |

While Tables 23 and 24 respectively indicate the collection of environmental information and operational information separately, and as part of an actuation data set, it should be appreciated that various embodiments of the present invention are not limited in this respect. In particular, both environmental information and operational information may be collected together as part of a given actuation data set. Furthermore, the inclusion of one or both of environmental information and operational information in an electronic record such as the electronic record 3402 need not be limited to one or more particular actuation data sets; rather, in some exemplary implementations, one or both of environmental information and operational information may be included as a unique component of an electronic record apart from any particular actuation data set (e.g., one or both of environmental and operational information may be common to, or "shared by," one or more actuation data sets).

As mentioned previously, locate transmitters may also include environmental and/or operational sensors to sense environmental and/or operating conditions. Such information may be useful in assessing the general environmental conditions of a locate and/or marking operation and the operating conditions of the locate transmitter, among other things. An example and description of a locate transmitter that includes environmental and/or operation sensors is described in co-pending U.S. patent application entitled, "Locate Transmitter having Enhanced Features for Underground Facility Locate Operations, and Associated Methods and Systems" filed on Jun. 18, 2010 and assigned Ser. No. 12/818,195, which is incorporated herein by reference.

IX. Assessing Operation and/or Use of a Locate/Marking Device

As described above, environmental information provided by environmental sensors 3120 and/or operational information provided by operational sensors 3130, as well as any of the other constituent components of locate information, marking information, and landmark information discussed herein, may be used to assess whether a locate/marking device is being used and/or whether a locate and/or marking operation was or is being performed in accordance with recommended practices or within recommended environmental or operational conditions. As an illustrative example, there may be certain preferred environmental conditions in which a locate/marking device may be used and/or in which a locate and/or marking operation may be performed. Additionally, there may be certain preferred process tolerances with respect to performing locate and/or marking operations. For example, there may be a minimum ambient light specification, a certain angle specification with respect to the locate/marking device relative to a target surface, a certain distance specification (i.e., distance from target surface), a certain motion specification with respect to sweeping the locate/marking device, and the like. Violations of these process tolerances may result in poorly performed locate and/or marking operations, which may result in poor customer satisfaction and an increased risk of damage to facilities or danger to construction personnel. Other environmental and operational tolerances may also be applicable to locate and/or marking operations, and it should be appreciated that those listed above are non-limiting examples provided for purposes of illustration.

In view of the foregoing, according to another aspect of the present invention, a locate/marking device, or a mobile device 200 communicatively couple to a locate/marking device 3100, may include an operations monitoring application that operates in combination with the locate/marking device. The operations monitoring application may be installed on the locate/marking device or on the mobile device. The operations monitoring application may provide for detecting and monitoring the use of locating equipment such as the locate/marking devices described herein for out-of-tolerance environmental or operational conditions. For example, the operations monitoring application may provide for detecting and monitoring the use of the locate/marking device within the limits of its product specifications with respect to, for example, any combination of the ambient temperature, humidity, velocity, and acceleration. Additionally or alternatively, monitoring may be based on certain standard operating procedures (e.g., as established by a facility owner, a locate contractor, a regulatory body, etc.). Other bases for monitoring the operation of a locate/marking device may also be used.

According to one aspect of this embodiment, once an out-of-tolerance condition is detected, either environmental or operational, an out-of-tolerance alert or notification may be provided to the user (technician) of the locate/marking device. In some exemplary implementations, the out-of-tolerance alert may be generated by the control electronics of the locate/marking device or by an application in operation on the mobile device 200 in conjunction with electronics of the mobile device, although not all implementations are limited in this respect. Additionally or alternatively, a record of such out-of-tolerance alerts may be stored, such as a record of alert acknowledgments that may be stored or transmitted by the locate/marking device and/or mobile device in response to the alert, with or without technician acknowledgement. In some implementations where an alert may lead to an appreciable error in a locate and/or marking operation, operation of the locate/marking device may be disabled until the alert condition is corrected.

Detailed descriptions of embodiments of an operations monitoring application and its uses can be found in co-pending U.S. Non-provisional application Ser. No. 12/703,958, entitled "Marking Apparatus Having Enhanced Features for Underground Facility Marking Operations, and Associated Methods and Systems," filed Feb. 11, 2010, and in co-pending U.S. Non-provisional application Ser. No. 12/704,087, entitled "Locate Apparatus Having Enhanced Features for Underground Facility Locate Operations, and Associated Methods and Systems," filed on Feb. 11, 2010, both of which are incorporated by reference. In various implementations, the operations monitoring application as described in these references may be embodied as an application operable on a mobile device 200 communicatively coupled to a locate/marking device 3100.

X. Enhancements to Determination of Location of Locate/Marking Device

According to some embodiments, it may be desirable to know the location of the tip of the locate/marking device, as for example, the tip may be the portion of the locate/marking device located in close proximity to the ground when a locate technician sweeps the locate/marking device over the ground to detect a buried facility or moves the device over the ground to mark a buried facility. Determining the location of the tip of a locate/marking device can be important for embodiments in which the operational sensors, e.g., accelerometers and gyroscopes, are only located in a mobile device 200 affixed at or near the top of the locate/marking device 3100, as depicted in FIGS. 26-29. Thus, for example, determining the motion of the tip of the locate/marking device may allow for assessment of technician manipulation of the locate/marking device, which may be used for quality control, training purposes, and standard setting, among other things. Determining the location of the tip of the locate/marking device may also allow for correcting the locate and/or marking data to more accurately represent where facilities are located and where marks are dispensed.

Thus, according to another aspect of the present invention, methods and apparatus are provided for determining the location of the tip of a locate/marking device. However, it should be appreciated that the tip of the locate/marking device is a non-limiting example of a specific point of interest of a locate/marking device for which it may be desirable to know the location, as, for example, other portions of the locate/marking device may be of interest in other embodiments. The methods and apparatus described herein may be applied equally well to the determination of any point of interest on the locate/marking device.

One approach for determining the location of the tip of the locate/marking device (e.g., the portion near the marking material holder 140 shown in FIG. 3, or near detection electronics 1620 shown in FIG. 18), or any other point of interest on the locate/marking device, is to place a location tracking system at that point. Thus, according to one embodiment, a locate/marking device, such as any of the locate/marking devices described previously herein, may include a location tracking system 130 as discussed in other embodiments (e.g., a GPS receiver), wherein the location tracking system is disposed at or sufficiently near the tip of the locate/marking device, allowing for determination of the location of the tip of the locate/marking device. Thus, the location tracking system 130 may provide the geo-location of the tip of the locate/marking device, which, as mentioned, may be useful for a variety of reasons. For example, the geo-location information provided by the location tracking system may be used to record the motion of the tip of the locate/marking device, which may be used for detection of out-of-tolerance operation of the locate/marking device, determination of operating patterns of technicians, or for various other purposes.

While the above-described embodiment provides a location tracking system positioned at the point of interest on the locate/marking device, such positioning of a location tracking system may not always be possible or advantageous. For example, as explained previously herein, in some embodiments the operation of the location tracking system may be facilitated by positioning the location tracking system toward the top of the locate/marking device, for example if the location tracking system is a GPS receiver or a GPS tracking system included in mobile device 200. However, as mentioned, it may be desirable in some embodiments to determine the location of the tip of the locate/marking device, or any other point of interest of the locate/marking device, which in some situations will not correspond to the top of the locate/marking device. Thus, according to one embodiment, methods and apparatus are provided for determining the location of a point of interest of a locate/marking device when a location tracking system is located at a different point on the locate/marking device. For simplicity of explanation, the following examples will be discussed assuming that a location tracking system is located near the top of the locate/marking device and that the point of interest of the locate/marking device is the tip of the locate/marking device. It should be appreciated that the described apparatus and techniques may apply equally well to other positions of the location tracking system and points of interest on the locate/marking device.

Figure 35:
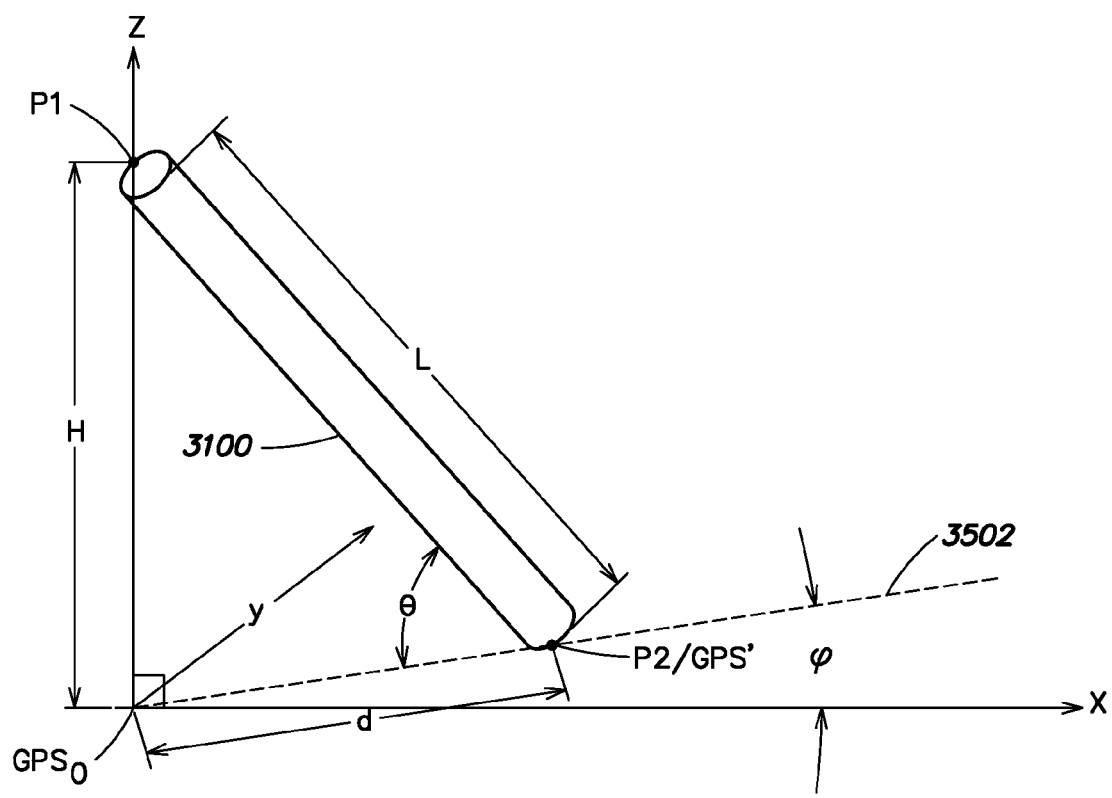
FIG. 35 illustrates a configuration for determining the difference in location between two points of a locate receiver, according to one embodiment of the present invention.

To facilitate the following discussion, it is useful to first consider the physical configuration at issue for determining the location of the tip of the locate/marking device when the location tracking system is located at or near the top of the locate/marking device. For this purpose, the locate/marking device may be represented in simplified form as an elongated rod or stick. FIG. 35 illustrates a perspective view of such a simplified representation of a locate/marking device, shown as locate/marking device 3100.

In FIG. 35, the x-y plane represents the ground and the z-direction represents the vertical direction perpendicular to the ground. The point P1 may be the location of a location tracking system (e.g., a GPS receiver), and in some embodiments may correspond generally to the top of the locate/marking device, for example near where the technician may hold the locate/marking device if it is a handheld device. The point P2 represents the point of interest of the locate/marking device, and in this non-limiting example corresponds generally to the tip of the locate/marking device. The point P2 may be assumed to be at ground level, i.e., in the x-y plane (z=0) for purposes of simplicity, except as described below in those embodiments in which the distance of P2 from the x-y plane may be measured. The shortest distance between P1 and P2 is given by L, which in some embodiments may correspond to the length of the locate/marking device, although not all embodiments are limited in this respect. For example, if the locate/marking device has a non-linear shape, the distance L may not correspond to the length of the locate/marking device. The locate/marking device 3100 may be projected onto the x-y plane (z=0) along the dashed line 3502, which therefore lies in the x-y plane. The distance between the points P1 and P2 in the x-y plane (i.e., along the dashed line 3502) is represented by d. The distance between the point P1 and ground is given by H (i.e., z=H). At any given time, the locate/marking device may make an angle θ with respect to the x-y plane, i.e., with respect to ground in this non-limiting example. The projection of the locate/marking device on the x-y plane, i.e., along the line 3502, may be at an angle φ in the x-y plane with respect to the x axis. In some embodiments, the x-axis may be defined to align with true North, although all embodiments are not limited in this respect.

According to one embodiment, a locate/marking device, such as locate/marking device 3100 may comprise a location tracking system at the point P1. The location tracking system may provide the geo-location of the point P1 with respect to the x-y plane, represented as $GPS_o$. The geo-location of P2 in the x-y plane may be represented by GPS'. As will be explained, GPS' may be determined based on a value of $GPS_o$ given by a location tracking system and determination of suitable combinations of L, d, H, θ, and φ. The value of L may be known before the locate operation begins, for example since it may be set after manufacture of the locate/marking device. The values of d, H, θ, and φ may be directly sensed during operation of the locate/marking device or may be calculated using suitable ones of the operational sensors 1530, as will be described below.

According to one embodiment, the geo-location of the tip of a locate/marking device, such as locate/marking device 3100, may be determined using the value of $GPS_o$ given by the location tracking system at P1 and accelerometer data from an accelerometer positioned at or sufficiently near the tip of the locate/marking device (i.e., at point P2 in FIG. 35).

In this embodiment, it is assumed that the value of L is known or determined in any suitable manner. The accelerometer in this non-limiting embodiment is a 3-axis accelerometer. By suitable analysis of the acceleration values for each axis, using known algorithms, the angle θ that the locate/marking device 3100 makes with the ground may be determined (see, e.g., the previous discussion of how to use an accelerometer as an inclinometer, as described by Shanghai Vigor Technology Development Co.). Based on the known distance L and the determined angle θ, the distance d between $GPS_o$ and GPS' in the x-y plane may be calculated (using the fact that the cosine of θ is equal to d/L).

Once the distance d is known, the value of GPS' may be derived from $GPS_o$ if the angle φ is known, since φ may provide the direction from $GPS_o$ to GPS' (again, in some embodiments the x-axis may be aligned with, or taken as, true North, such that φ may represent an angle with respect to true North). The value of φ may be determined in one of several manners. One manner for determining φ is from the readout of a compass of the locate/marking device, such as previously described compass 1704. If the location tracking system providing $GPS_o$ is a GPS receiver, then the value of φ may alternatively be taken from the heading information provided as part of the NMEA data stream provided by the GPS receiver. A third alternative for determining φ is to calculate a direction of motion based on multiple GPS points taken from the location tracking system. According to this third alternative, multiple GPS points taken at different times may be used to calculate a direction of motion by, for example, determining the direction indicated by a straight line connecting the multiple GPS points. Other methods for determining φ are also possible, as these are non-limiting examples. Once φ is known, the value of GPS' may then be determined from $GPS_o$, d and φ. Once GPS' is determined, it may be used instead of $GPS_o$ (or in addition to $GPS_o$) as more accurate geo-location data, which may be included, for example, in one or more event entries and/or electronic records as discussed above.

According to an alternative embodiment, the value of GPS' may be determined from a measured value of $GPS_o$ using an inclinometer on the locate/marking device, such as inclinometer 1706, previously described. The inclinometer may provide the value of θ. In this embodiment, it is assumed that the value of L is known or determined in any suitable manner. Thus, the value of d may be determined using L and θ, as explained above. The value of φ may be determined in any suitable manner, for example using any of the techniques described above. The value of GPS' may then be determined from $GPS_o$, d, and φ, as noted above.

According to another embodiment, the value of GPS' may be determined from a measured value of $GPS_o$ using a proximity sensor, such as previously described proximity sensor 1712. In this embodiment, it is assumed that the value of L is known or determined in any suitable manner. The proximity sensor may be positioned at P1 and configured to measure the value of H. Assuming that the point P2 is at or very near the ground (i.e., having a vertical height of approximately zero), the value of H and the known distance L of the locate/marking device may be used to determine d, for example using the Pythagorean theorem. The value of φ may be determined in any suitable manner, for example using any of the techniques described above. The value of GPS' may then be determined using $GPS_o$, d, and φ.

As explained, the above-described example, in which a single proximity sensor is used to determine the value of H, may provide suitable results when it is assumed that the point P2 has zero vertical height. In one embodiment, that assumption may be avoided by also including a proximity sensor at the point P2 and configured to measure the distance between P2 and the ground. Then, the difference in height between P1 and P2 (rather than the value of H) may be used in connection with the known distance L to determine the distance d (e.g., using the Pythagorean Theorem). The value of ϕ may be determined in any suitable manner, for example using any of the techniques described above. The value of GPS' may then be determined using $GPS_o$, d, and ϕ.

According to a further alternative embodiment, the value of GPS' may be determined from a measured value of $GPS_o$ using two 3-axis accelerometers on the locate/marking device. One accelerometer may be located at the point P1 on the locate/marking device, while the second may be located at the point P2. Using the techniques described in U.S. Patent Application Publication 2008/0255795, which is incorporated herein by reference in its entirety, the location of P2 relative to P1 may be determined.

As mentioned, in some instances it may be desirable to track the motion of a specific portion of a locate/marking device, such as the tip of the locate/marking device, for any one of the reasons previously described. In those embodiments in which the locate/marking device includes a location tracking system providing a value of $GPS_o$ for a different point on the locate/marking device than the point of interest, the tracking of the point of interest may be performed by determining GPS' (the location of the point of interest) for each value of $GPS_o$ as the locate/marking device is moved using any of the above-described techniques.

However, in some instances, the value of $GPS_o$ provided by the location tracking system may not have sufficient accuracy to allow for a desired level of accuracy in tracking the motion at the desired point on the locate/marking device (e.g., the point P2). For example, when performing a locate operation, a technician may move the locate/marking device by distances that are relatively small compared to the resolution of the location tracking system. For example, when sweeping the locate/marking device over the ground, the sweeping pattern may include segments smaller than the resolution of the location tracking system (e.g., smaller than approximately 30 inches in some embodiments). In such instances, using the above-described techniques for determining GPS' as the point P2 moves may not sufficiently capture the movement with a desired resolution. Thus, the techniques described below may be used.

According to one embodiment, the motion of the point P2 may be tracked by using any of the above-described techniques to get an initial value of GPS' and then using data from an accelerometer at the point P2 to determine the distance traveled in the x and y directions. This technique is commonly referred to in the relevant arts as "dead reckoning." In this embodiment, the accelerometer may provide acceleration data for the x and y axes. That data may be integrated twice to determine the total distance traveled in the x and y directions, thus giving the position of P2 at any point in time relative to any initial GPS' value. Alternatively, the accelerometer may output velocity data for each axis, which may be integrated to determine the total distance traveled in the x and y directions. A specific example is now described with respect to FIG. 36.

Figure 36:
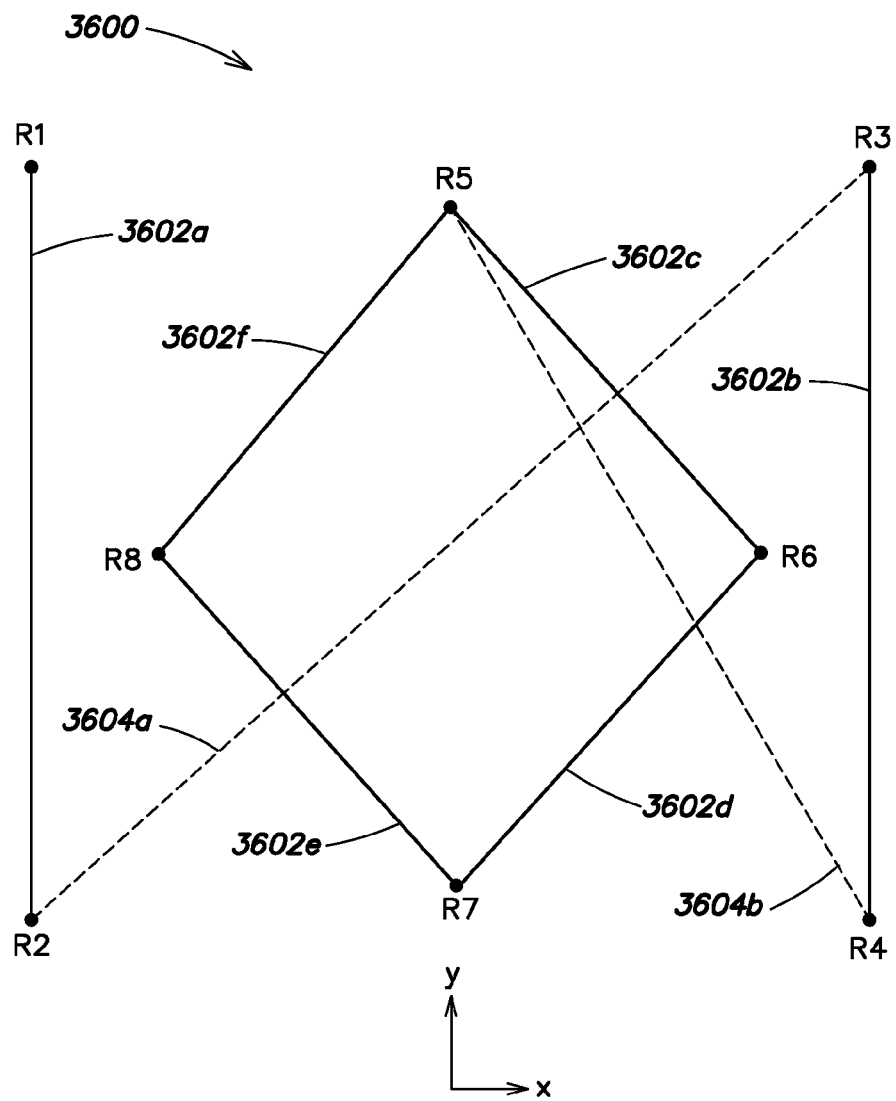
FIG. 36 illustrates a pattern of motion of a locate/marking device, according to various of the embodiments described herein.

FIG. 36 illustrates a top view of a non-limiting example of a pattern of motion 3600 that may be made by a technician using one of the locate/marking devices described herein, e.g., when undertaking a locate operation. The illustrated pattern is shown for purposes of illustration only, as it should be appreciated that various patterns and sweeping motions may be made by a technician using a locate/marking device.

The pattern of motion 3600 comprises lines 3602a-3602f. The solid lines in FIG. 36 correspond to when the actuation system of the locate/marking device (e.g., actuation system 120) is activated. Lines 3604a and 3604b, described below, are shown as dashed lines because the actuation system is not actuated as the locate/marking device traversed the paths indicated by those lines.

The making of the pattern of motion 3600 by a locate/marking device may be determined as follows. First, the technician may begin the pattern at the point R1, at which time the technician actuates the actuation system (e.g., to record magnetic field data). The location of point R1 may correspond to the initial location of the tip of the locate/marking device and therefore may be determined from a value of $GPS_o$ of the top of the locate/marking device and any of the above-described techniques for determining the location of the tip relative to the location of the top of the locate/marking device.

The technician may then begin to move the locate/marking device along the path indicated by line 3602a, ending at the point R2. The motion of the tip of the locate/marking device along line 3602a may be determined from the output of an accelerometer at the tip of the locate/marking device, providing an output signal for both the x and y directions. According to one embodiment, the output of the accelerometer is velocity data for both the x and y axes, and is output periodically, for example twice per second, although higher and lower data output rates are possible. The velocity values for each of the x and y axes may be multiplied by the time duration between samples of the accelerometer (e.g., one-half of a second in this non-limiting example) to get the distance traveled in the x and y directions from the initial point R1. Alternatively, the total velocity of the locate/marking device may be multiplied by the time duration between samples of the accelerometer, and the direction of motion may be determined by comparing the velocity values for the x and y axes to each other, e.g., by taking the ratio of the velocity along the x-axis to the velocity along the y-axis. Either way, the distance traveled in the x and y directions may be determined.

In the non-limiting example of FIG. 36, the first line, i.e., line 3602a, may serve as a base line or reference line, from which the angle of subsequent motions may be referenced. Thus, in FIG. 36, the angle of the second motion of the technician, from points R2 to R3 along the path indicated by line 3604a may be determined by reference to the direction of line 3602a since the accelerometer output will indicate a change from the motion along the path of line 3602a. The distance and direction of the line 3604a may be determined as described above for line 3602a. Again, the line 3604a is shown as a dashed line, as the actuation system of the locate/marking device is not activated while the locate/marking device traverses the illustrated path.

The locate/marking device is subsequently moved along line 3602b (from point R3 to R4), then along line 3604b (from point R4 to R5), then along line 3602c (from point R5 to R6), along line 3602d (from point R6 to R7), along line 3602e (from point R7 to R8), and finally along line 3602f (from point R8 back to point R5). The length and relative direction of each of the indicated lines may be determined as described above for line 3602a.

Thus, it should be appreciated that according to this non-limiting embodiment, a value of $GPS_o$ provided by a location tracking system is used only to determine the initial location of R1, after which the locations of point R2-R8 are determined using dead reckoning.

Also, it should be appreciated that while the relative orientation of each of the indicated lines is determined from the dead reckoning techniques described, the absolute, or actual, orientation is not determined from the accelerometer data since the actual orientation of line 3602a is not determined from the accelerometer data. Thus, according to one embodiment an additional step of determining an actual orientation of the line 3602a may be performed. According to one non-limiting embodiment, the actual orientation of line 3602a may be given by a heading provided by a compass of the locate/marking device while the line 3602a is made. Other techniques may alternatively be used to determine the actual direction of the first motion of the pattern of motion.

According to the above-described embodiment, the location of the tip of a locate/marking device may be determined by determining an initial location using a location tracking system and subsequently using the dead reckoning techniques described. Because the error associated with dead reckoning may increase as the distance traversed increases, it may be desirable in some embodiments to "reset" the dead reckoning by determining a new initial location value using a location tracking system. For example, referring to the pattern of motion 3600, in one embodiment the location of R1 may be determined from a value of $GPS_o$ given by a location tracking system and any of the techniques described for determining a value of GPS' for the given $GPS_o$. Subsequently, dead reckoning may be used to determine the paths of lines 3602a, 3604a, 3602b, and 3604b. According to one embodiment, the location of point R5 is not determined from dead reckoning, but rather may be determined by getting a value of $GPS_o$ at the point R5 and calculating a corresponding value of GPS'. Then, dead reckoning may be used to determine the locations of lines 3602c-3602f. In this manner, location errors that accumulate using dead reckoning may be minimized or eliminated.

Accordingly, it should be understood that a new initial location point serving as a starting point for the use of dead reckoning may be set at any suitable intervals during a locate operation. Suitable criteria for determining when to set a new initial location point for the use of dead reckoning include setting a new initial point for the beginning of each new motion of a pattern that a technician makes (e.g., each new sweeping segment of a sweeping pattern), for each new pattern, for each new locate job, or every time the dead reckoning data indicates a threshold total distance has been traveled (e.g., 5 meters, 10 meters, 50 meters, or any other threshold value). This list is not exhaustive, as other criteria may also be used to determine when to set a new initial location point for the use of dead reckoning.

Figure 1B:
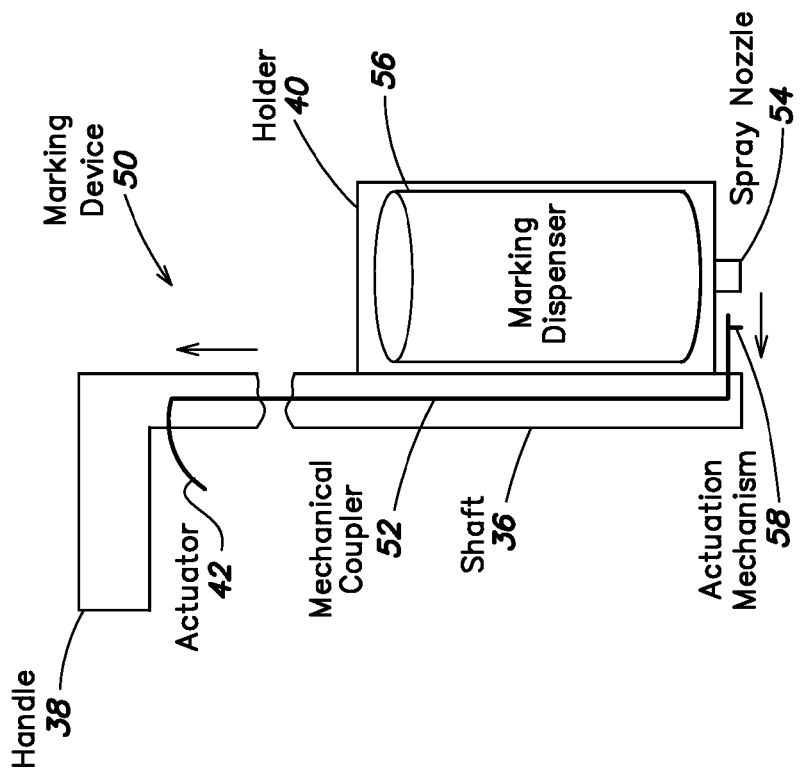

XI. Example Embodiment of a Locate/Marking Device Communicatively Coupled to a Mobile Device In one illustrative embodiment, a simple marking device or marking wand, similar to the marking device 50 of FIG. 1B, is coupled to a mobile phone. In one example of such an embodiment, the mobile phone is an Android phone available from Motorola, and various applications that could be adapted for use in conjunction with a marking operation are placed in operation on the phone (some of the applications are available on-line). The exemplary embodiment described below is provided primarily for instructive and illustrative purposes and is not intended to be limiting in any way of the various embodiments of the inventive locate/marking device—mobile device combination.

In this example implementation, various types of operational and environmental data was recorded by the mobile phone during trial marking operations and simulated marking and/or locate operations. The data was generated by environmental and operational sensors available on the phone. Data derived from the sensors was stored and later exported via a standard USB interface for subsequent analysis. The data was exported in comma separated value (CSV) file format.

The phone was mounted near the handle 38 of the marking device, and the device was used to mark both dots and dashes on a grassy area. Geo-location data was recorded through a GPS tracking device available on the phone while the marks were dispensed. A microphone on the mobile phone was used to record acoustic emission arising from mechanical action of an actuator 42 on the marking device 50 as marks were dispensed. The acoustic emission occurs approximately at the initiation of dispensing marking paint and again at approximately the termination of dispensing the paint, so that two acoustic signals bound an interval during which marking paint is dispensed by the marking device in this embodiment. An example of acoustic data exported from the mobile phone for subsequent analysis is shown below in Table 25. The data was exported in a comma separated value file format, but may be exported in any suitable file format. For Table 25, the data has been truncated and reformatted for illustrative purposes only.

TABLE 25

| Source: Sound Level | |
|---|---|
| Time (s) | Sound Level (%) |
| 0.00 | 1.97 |
| 0.10 | 2.03 |
| 0.20 | 1.57 |
| 0.30 | 2.06 |
| 0.40 | 1.53 |
| 0.50 | 0.78 |
| 0.60 | 0.74 |
| 0.70 | 0.73 |
| 0.80 | 1.34 |
| 0.90 | 4.56 |
| 1.00 | 1.59 |

Figure 37A:
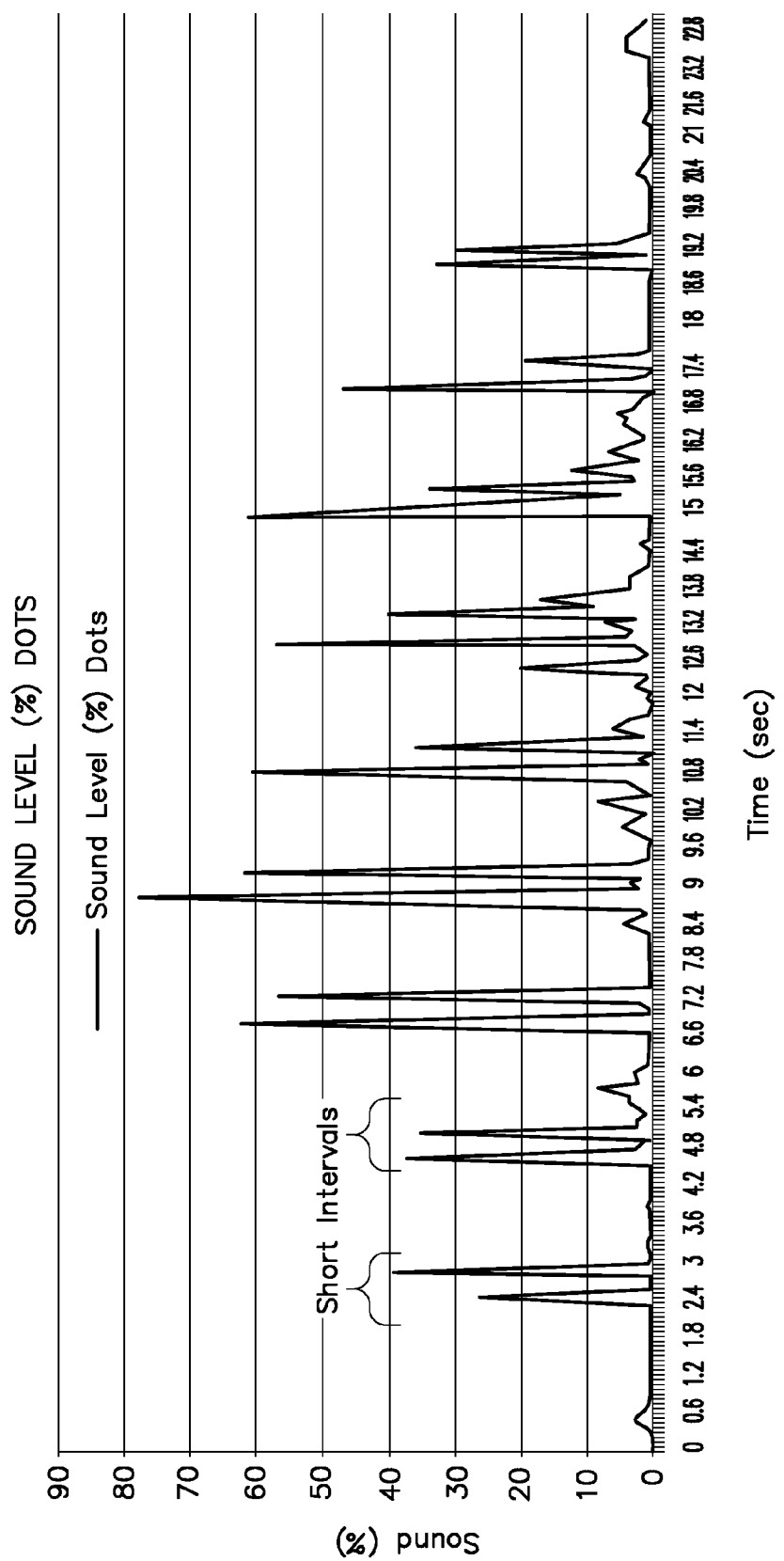
FIGS. 37A and 37B are plots of acoustic data generated and recorded by a mobile phone affixed to a marking device during a marking operation, wherein the short and long intervals correspond to the marking of dots and dashes, respectively.
Figure 37B:
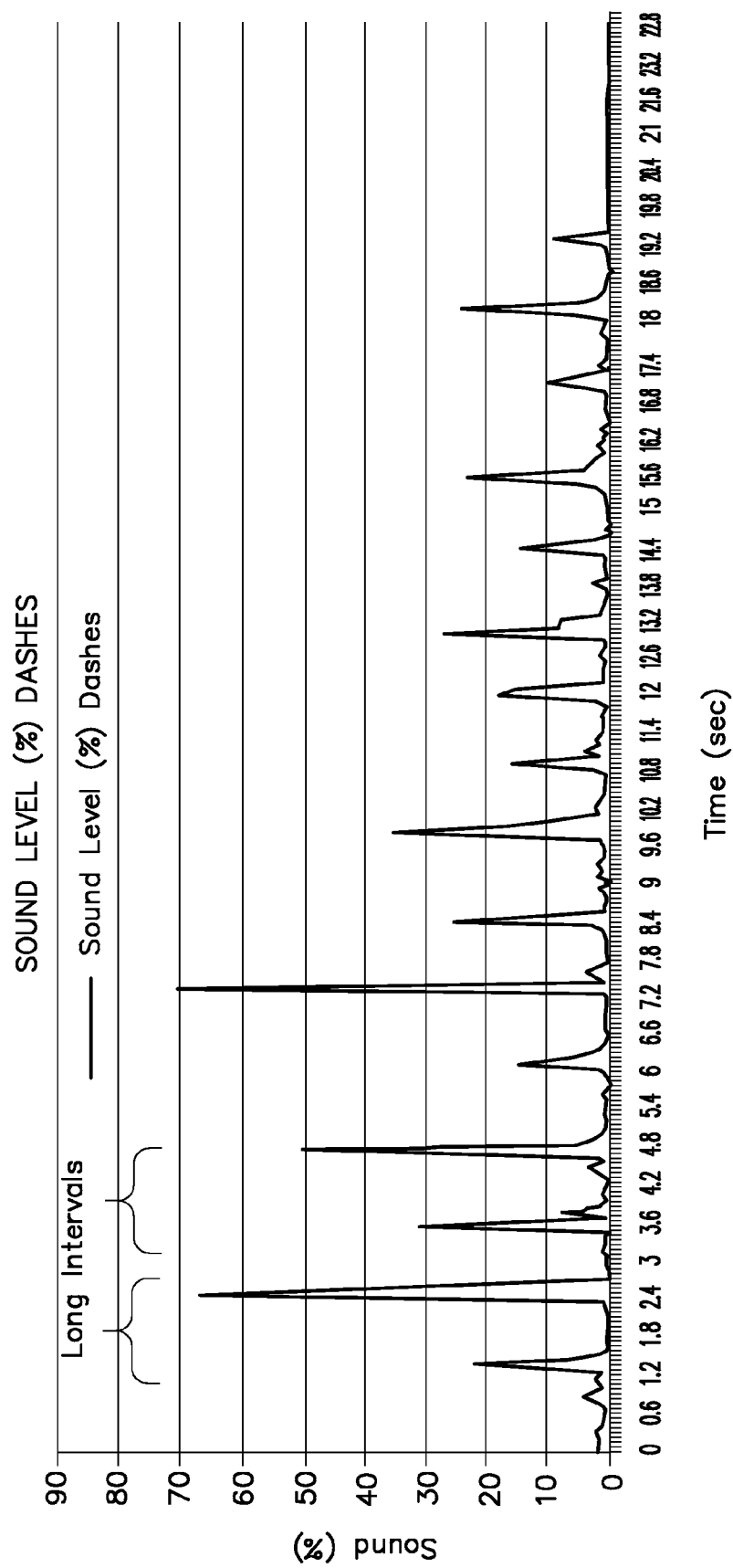
Figure 38A:
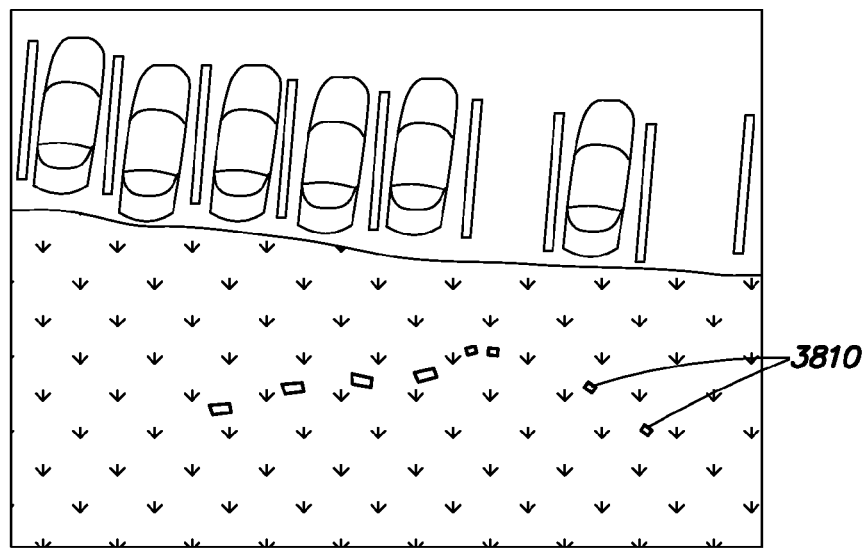
FIGS. 38A and 38B represent overlays of geo-location data generated and recorded by a mobile phone affixed to a marking device during the marking of dots and dashes on a grassy area, according to one embodiment of the present invention.
Figure 38B:
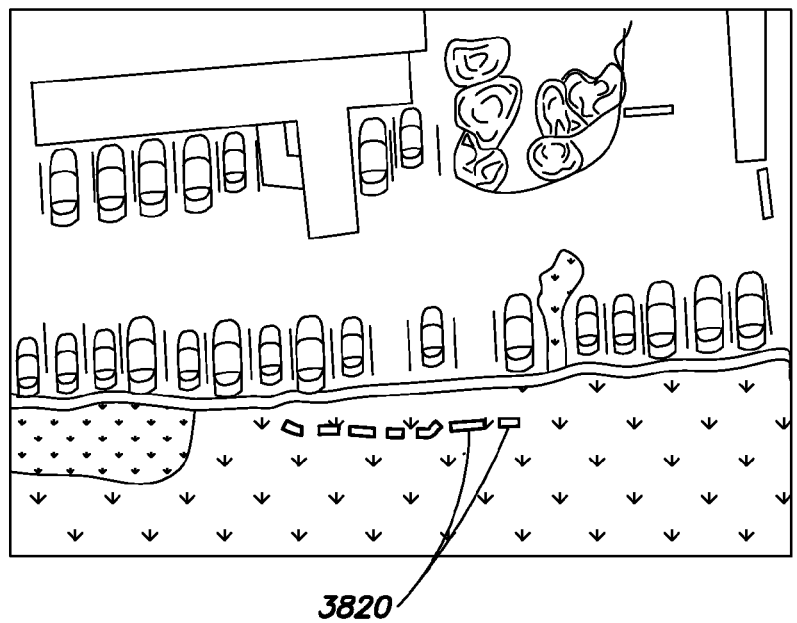

Data representative of the acoustic emission for the marking of dots and dashes is plotted in FIG. 37A (dots) and FIG. 37B (dashes). The short intervals indicate that dots were dispensed, whereas the long intervals indicate that dashes were dispensed by the marking device. The acoustic data recorded during a marking operation may be processed, e.g., using a peak-detection algorithm on data similar to that shown in FIGS. 37A-B, to determine time intervals during which paint is dispensed from the marking device 50. Further, the length of the dispensing interval may identify whether a tentative marking has been made (dots) or whether a final marking has been made (dashes). The acoustic data may also be processed in conjunction with GPS data collected during the marking operation to determine approximately where the marks were made. The GPS data for the marking operation was also processed, aligned with, and plotted as an overlay on an aerial image of a grassy area in which marks were dispensed. The GPS data representative of the dots and dashes are shown as overlays in the images of FIG. 38A (dots 3810) and FIG. 38B (dashes 3820).

Additional information can be collected during a marking operation from operational sensors and environmental sensors on the mobile device. In this example, the mobile phone was equipped with 3-axis accelerometers, a magnetic sensor, and a temperature sensor. The yaw, pitch and roll data were derived from the accelerometer and the magnetic sensor and were provided directly as an output of the phone (i.e., exported for analysis). This data can be used to determine an orientation of the locate/marking device with respect to a "normal use" orientation. An example of yaw, pitch, and roll data is shown in Table 26. Again the data has been truncated and reformatted for illustrative purposes only.

TABLE 26

| Source: Orientation | | | |
|---|---|---|---|
| Time (s) | Yaw (deg) | Pitch (deg) | Roll (deg) |
| 0.000 | 0.938 | −26.000 | −4.422 |
| 0.106 | 0.906 | −27.328 | 0.172 |
| 0.208 | 0.891 | −25.766 | −0.734 |
| 0.309 | 0.906 | −26.203 | −1.125 |
| 0.410 | 0.922 | −27.141 | −1.063 |
| 0.512 | 0.922 | −26.219 | −0.609 |
| 0.613 | 0.891 | −24.891 | 0.781 |
| 0.714 | 0.875 | −27.156 | 0.484 |
| 0.815 | 0.734 | −25.797 | 7.891 |
| 0.916 | 0.781 | −23.859 | −1.281 |
| 1.017 | 1.063 | −38.063 | −18.625 |

Figure 39A:
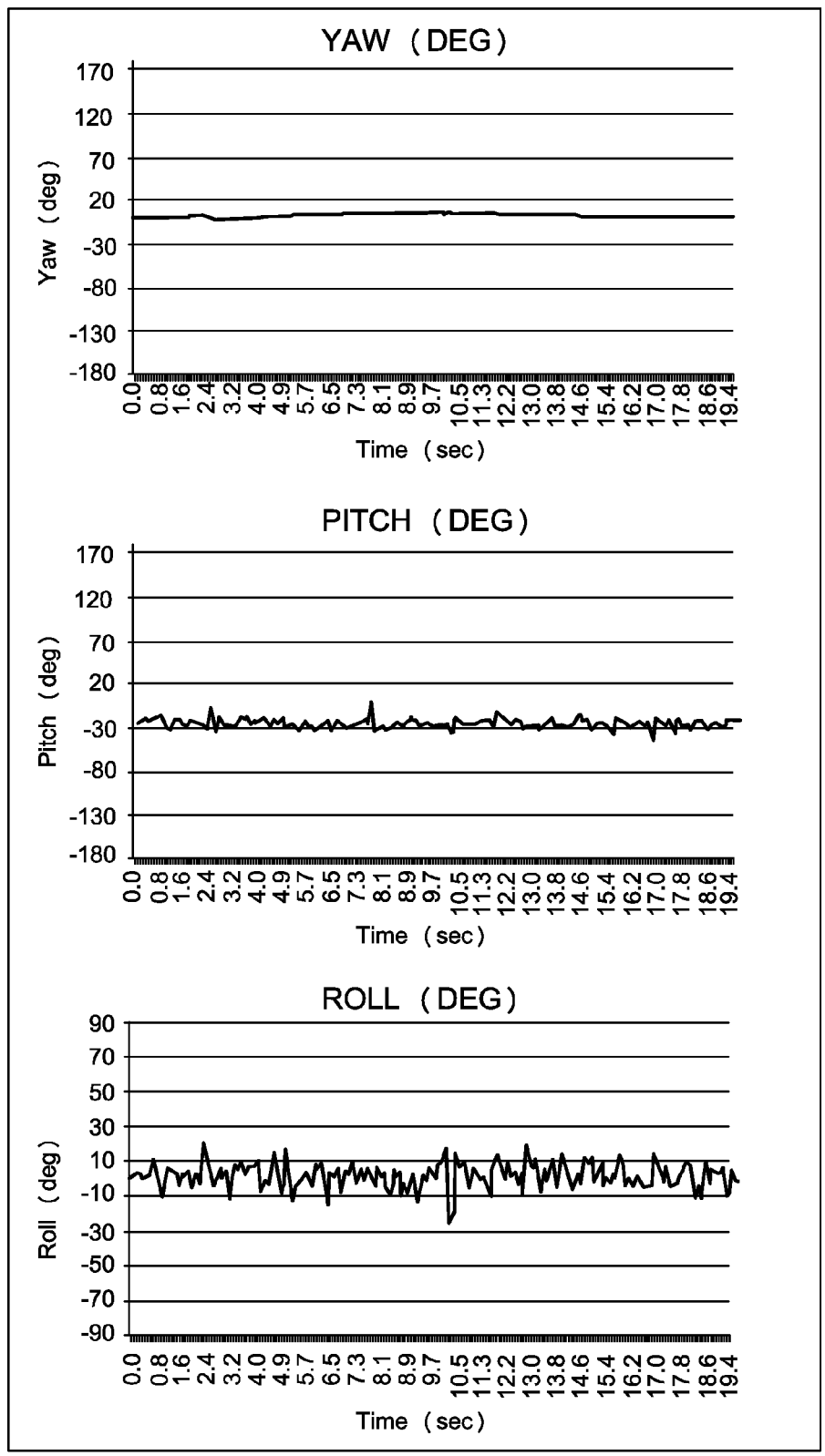
FIG. 39A are plots of yaw, pitch, and roll data generated and recorded by a mobile phone affixed to a marking device during a simulated marking operation conducted according to standard operating procedures, according to one embodiment of the present invention.
Figure 39B:
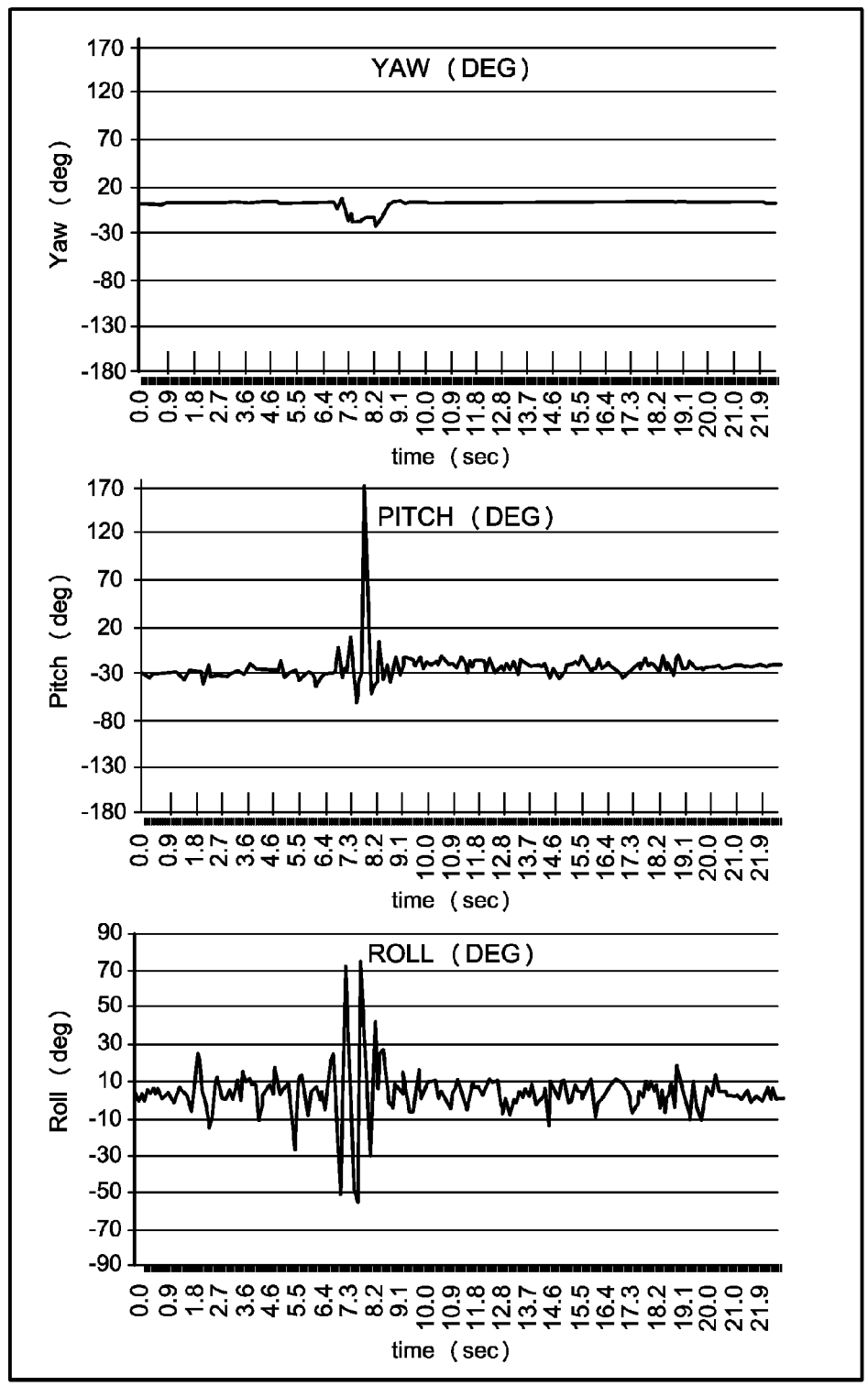
FIG. 39B are plots of yaw, pitch, and roll data generated and recorded by a mobile phone affixed to a marking device during a marking operation in which a dog attacked the technician.

An example of yaw, pitch, and roll data generated and recorded by the mobile phone during a normal marking operation is plotted in FIG. 39A. The data is representative of the mobile phone and marking device orientation. The data shows that the phone is pitched at about −30 degrees and exhibits minor variations in yaw and roll. FIG. 39B shows similar data with a large spike occurring at about 8 seconds. This spike in the data was due to use of the marking device to fend off an attacking dog. The unusual motion of the marking device to which the mobile phone is coupled is clearly recorded by the operational sensors.

Figure 39C:
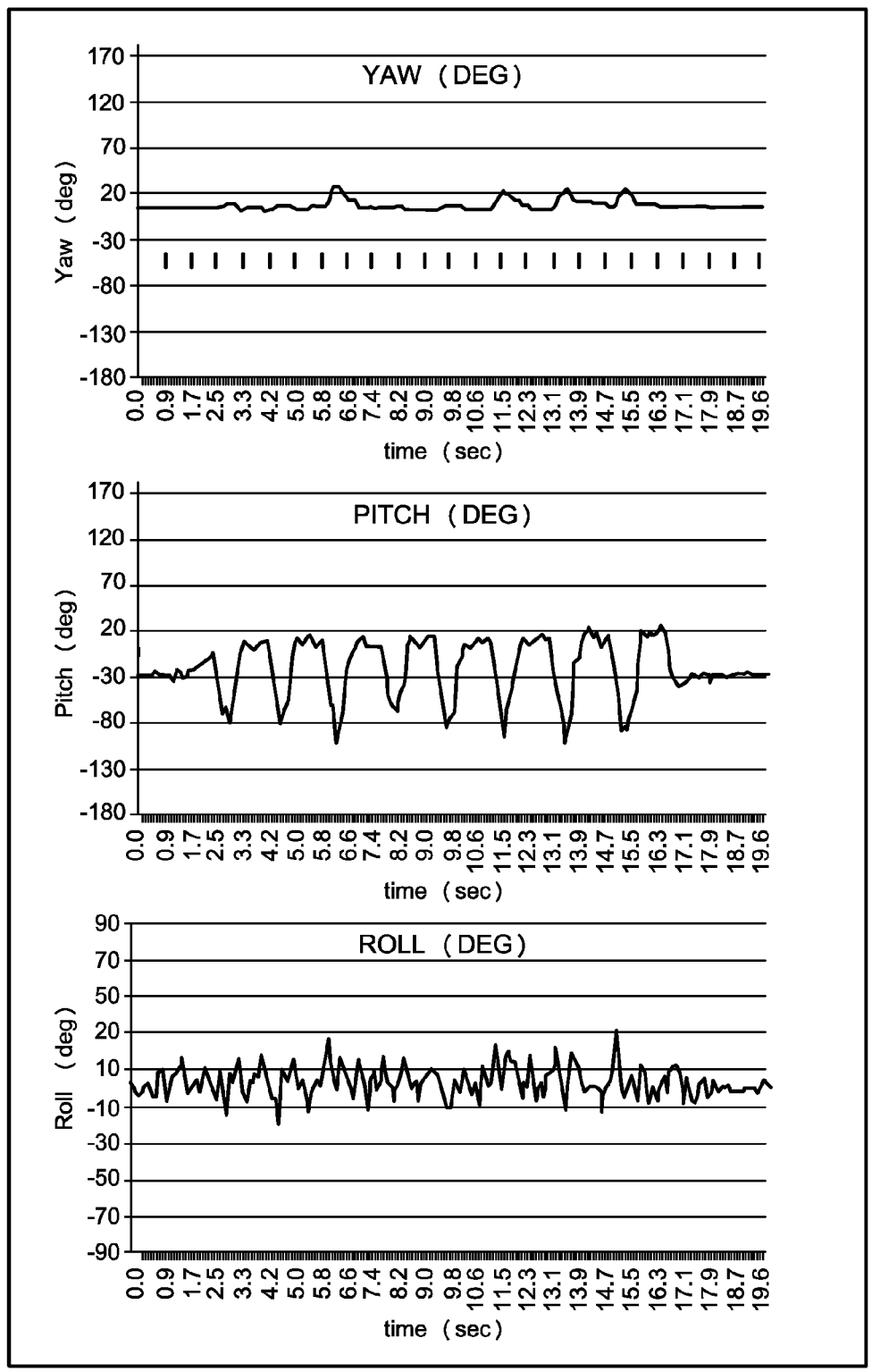
FIG. 39C are plots of yaw, pitch, and roll data generated and recorded by a mobile phone affixed to a marking device during a simulated marking operation conducted in an inappropriate manner (e.g., swinging the marking device)

FIG. 39C shows yaw, pitch, and roll data for the marking device—mobile phone combination when the marking device is used in a manner unsuitable for dispensing marks. In this data set, the pitch data reflects a swinging action of the marking device. This swinging action is clearly detected and can result in an unacceptable dispensing of the marking material.

Data output from accelerometers on the mobile phone was also recorded and processed to determine the velocity of the marking device during marking operations. An example of acceleration data is shown below in Table 27. The data in Table 27 was truncated and reformatted for illustrative purposes only. The time values shown in the table are relative time values, i.e., time measured from the start of a marking operation. However, a local time value, e.g., 15:03.012, may be used instead. The data was exported from the mobile phone in a comma separated value (CSV) data format, but may be exported in any suitable format. In some implementations, the data may be processed on the mobile phone and only velocity or position data along with time data exported.

TABLE 27

| Source: Acceleration | | | |
|---|---|---|---|
| Time (s) | X (m/s^2) | Y (m/s^2) | Z (m/s^2) |
| 0.000 | −0.245 | 0.000 | 0.000 |
| 0.101 | −0.520 | 4.442 | 0.000 |
| 0.203 | 0.284 | 4.315 | 8.895 |
| 0.304 | −0.373 | 4.364 | 8.846 |
| 0.406 | −0.216 | 4.335 | 8.855 |
| 0.507 | 0.020 | 4.540 | 8.855 |
| 0.609 | −0.157 | 4.423 | 8.895 |
| 0.715 | 0.137 | 4.246 | 8.983 |
| 0.820 | 1.196 | 4.129 | 8.610 |
| 0.921 | 1.216 | 4.021 | 8.532 |
| 1.031 | −1.314 | 5.678 | 8.365 |

Figure 40A:
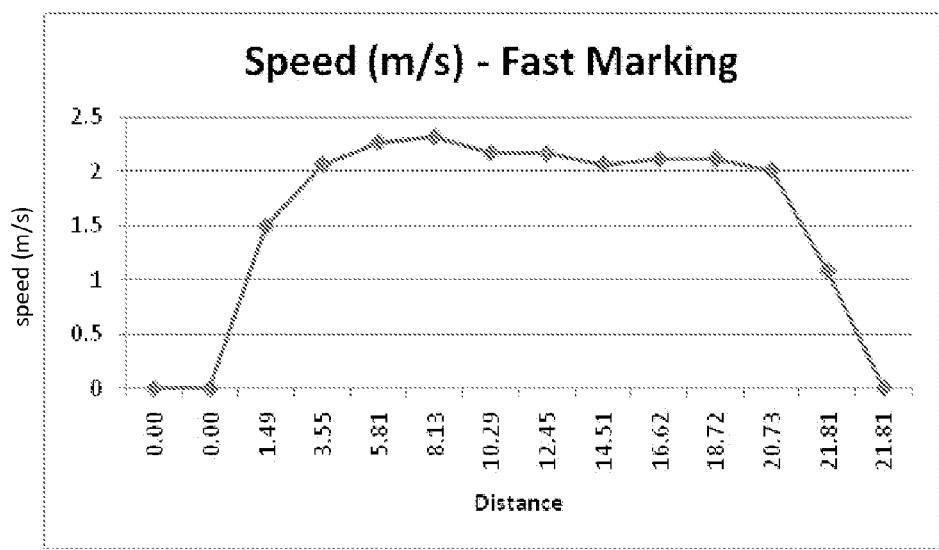
FIGS. 40A and 40B show plots of velocity of a mobile phone affixed to a marking device during two simulated marking operations, one executed too quickly (40A) suggesting running by the technician, and one executed at an acceptable pace (40B)
Figure 40B:
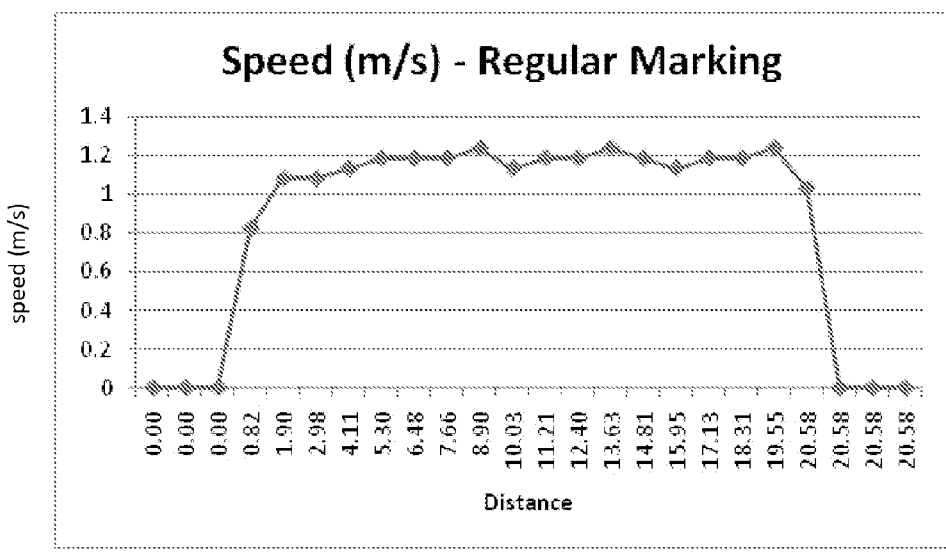

The acceleration data may be processed to yield velocity or speed information (e.g., via integration). Alternatively, velocity or speed information may be provided by the GPS tracking device in the phone (e.g., see Table 29 below). FIG. 40A shows velocity data, obtained from the phone's GPS tracking device, for a first marking operation which was done too quickly—at a running pace. FIG. 40B shows velocity data for a normal marking operation. Velocity data can be used to determine whether a marking operation was carried out according to standard operating procedures.

Figure 41:
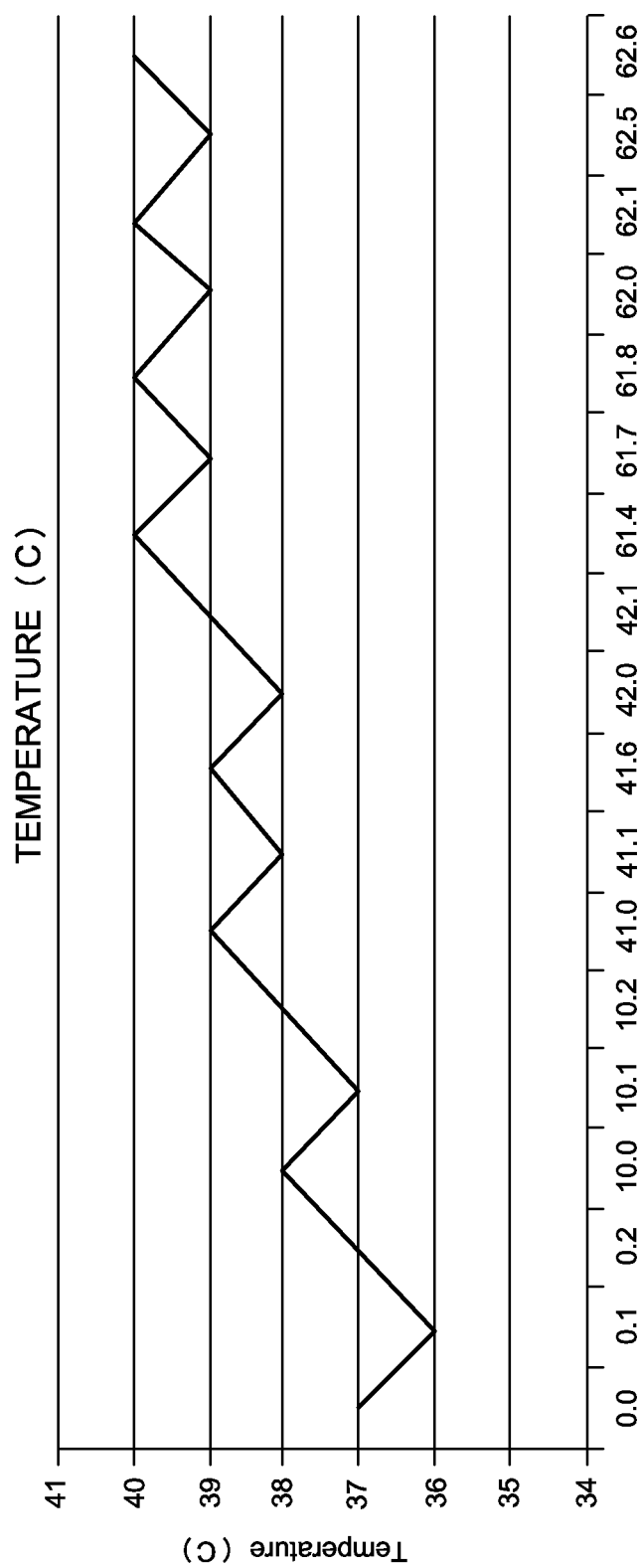
FIG. 41 is a plot of environmental temperature data generated and recorded by a mobile phone affixed to a marking device and exposed to an outdoor environment.

Temperature data was also recorded with the mobile phone during a marking operation, and is shown in FIG. 41. The fluctuations in temperature are believed to be due to discretization noise (rounding to the nearest degree).

The mobile phone also included magnetic sensors, which can provide compass functionality. Data from the magnetic sensors was also exported, and an example of magnetic data is shown in Table 28. The magnetic data may be processed to provide bearing or heading information when the locate/marking device is in motion. This data may be less reliable than other location and orientation data since local magnetic fields can be affected by the presence of certain metals, e.g., heavy machinery.

TABLE 28

| Source: Magnetic Field | | | |
|---|---|---|---|
| Time (s) | X (uT) | Y (uT) | Z (uT) |
| 0.000 | −0.563 | 58.375 | −37.625 |
| 0.106 | −0.563 | 59.375 | −38.625 |
| 0.208 | −0.563 | 58.375 | −38.625 |
| 0.309 | −0.813 | 58.375 | −38.125 |
| 0.512 | −0.813 | 58.125 | −37.875 |
| 0.613 | −0.813 | 58.375 | −37.875 |
| 0.714 | −1.063 | 58.375 | −37.625 |
| 0.815 | −1.563 | 58.375 | −37.375 |
| 0.916 | −1.313 | 58.125 | −37.125 |
| 1.017 | −1.063 | 56.625 | −36.375 |
| 1.118 | −0.563 | 56.375 | −36.125 |

Figure 42A:
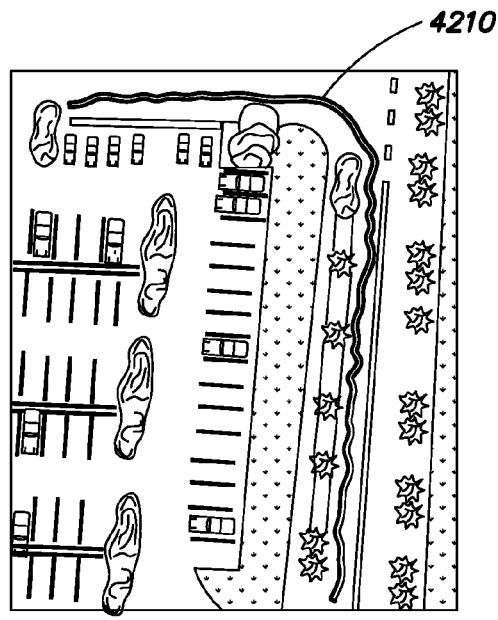
FIGS. 42A and 42B depict geo-location data generated and recorded by a location tracking system of a mobile phone affixed to a marking device, wherein the data was subsequently overlaid on aerial images of the areas in which the data was recorded.
Figure 42B:
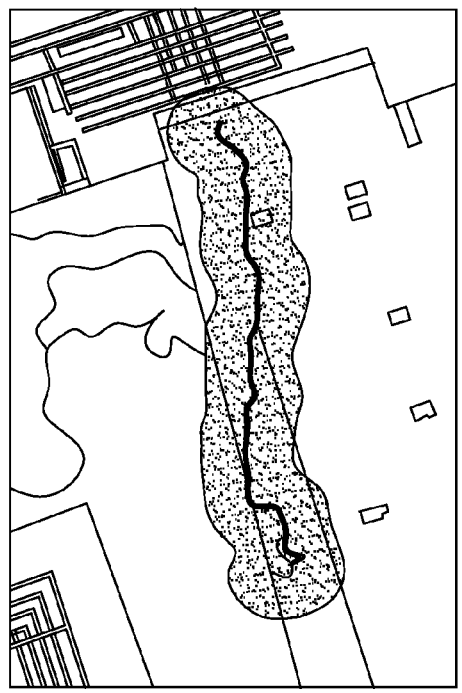

The accuracy of the mobile phone's GPS tracking device was tested by walking with the marking device and attached mobile phone along a roadside curb while collecting GPS data. The GPS data was later processed, aligned, and overlaid on a geo-referenced aerial image of the same area. The result is shown in FIG. 42A. The plotted overlaid line 4210 follows the roadside curb within a few feet. The phone's GPS tracking device was also tested by walking underneath a structure, e.g., into a building. The result is shown in FIG. 42B, and shows that the location tracking system of the mobile phone can perform acceptably well even underneath a structure including masonry and steel. For the plotted data of FIG. 42B, an electronic buffer region was included and displayed around the nominal data, based at least in part on accuracy information provided by the GPS tracking device, as an example of an accuracy or confidence zone that may be indicated electronically for an actual marking operation.

A mobile device may include software applications to process at least a portion of data from a plurality of sensors to provide composite location, orientation, and motion information. In another implementation, the Android phone was adapted to provide location and motion information based on the phone's GPS location tracking capability. An example of data set of this location and tracking information was exported from the phone for analysis, and is shown in Table 29. In Table 29, "accuracy" refers to an estimated accuracy of the GPS position.

TABLE 29

| | | | Source: Location (GPS) | | | | | |
|---|---|---|---|---|---|---|---|---|
| Time (s) | Latitude (deg) | Longitude (deg) | Accuracy (m) | Speed (m/s) | Bearing (deg) | Acceleration (m/s^2) | Distance (m) | Altitude (m) |
| 0.00 | 26.83543 | −80.09529 | 8 | 0.00 | 0.00 | 0.00 | 0.00 | −4.5 |
| 0.57 | 26.83546 | −80.09530 | 3 | 0.00 | 0.00 | 0.00 | 0.00 | 3.8 |
| 1.57 | 26.83546 | −80.09530 | 3 | 0.00 | 0.00 | 0.00 | 0.00 | 3.8 |
| 2.57 | 26.83546 | −80.09530 | 2 | 0.82 | 73.00 | 0.82 | 0.82 | 4.9 |
| 3.57 | 26.83546 | −80.09529 | 2 | 1.08 | 75.70 | 0.26 | 1.90 | 4.6 |
| 4.57 | 26.83546 | −80.09528 | 2 | 1.08 | 75.80 | 0.00 | 2.98 | 4.7 |
| 5.57 | 26.83546 | −80.09527 | 2 | 1.13 | 74.00 | 0.05 | 4.11 | 4.8 |
| 6.57 | 26.83546 | −80.09526 | 2 | 1.18 | 75.50 | 0.05 | 5.30 | 4.7 |
| 7.57 | 26.83547 | −80.09525 | 2 | 1.18 | 78.00 | 0.00 | 6.48 | 4.9 |
| 8.57 | 26.83547 | −80.09524 | 2 | 1.18 | 72.20 | 0.00 | 7.66 | 4.4 |
| 9.57 | 26.83547 | −80.09523 | 2 | 1.23 | 72.00 | 0.05 | 8.90 | 3.9 |

Other applications operable on the mobile phone were implemented to demonstrate their potential use in conjunction with a marking operation. In a first application, the mobile phone includes bar code reading functionality such that the type of marking material to be dispensed could be identified using image capture capability of the mobile phone's camera. For this embodiment, the camera was used to image a barcode on a marking material can. The image was then submitted to a web-based search engine via a mobile phone application such as "Barcode Scanner" available ZXing or "Lynee Barcode Reader" available from Lynkware S.A.S. through the Droid Market Place. The submitted barcode can be machine recognized, and information about the product returned to the mobile phone for review and/or data storage.

In a second application, the mobile device includes a color detection system in which the color of marking material dispensed can be identified using an application such as "What Color" available from Jarcon in operation on the mobile phone. For this implementation, the phone may be used to view a dispensed utility mark (e.g., via the phone's camera). The color composition (e.g., red (R), green (G), blue (B) values, hue, saturation, etc.) of a selected region of the image can be provided as data for output, e.g., displayed, transmitted to an external device or remote computer, or stored in memory.

Although most data was exported from the mobile phone for subsequent analysis in the test apparatus as described above, other approaches to data processing and recordation are considered to be equivalents and within the scope of the invention. For example, custom software applications can be adapted to execute a portion, most, or all data processing on the mobile device. Results from data processing may be exported to a remote computer for further processing and/or data storage. In some embodiments, data accumulated from sensors on the mobile device and/or on the locate/marking device may be exported as raw data to a remote computer 150 for processing, or the data accumulated may be partially processed by the mobile device and/or locate/marking device and then stored or exported to a remote computer.

XII. Conclusion

Regarding the marking devices, locate devices and combined locate and marking devices according to various embodiments of the invention described herein, the data (e.g., locate information and marking information) that may be acquired and analyzed is not limited to that described with reference to the various figures and tables herein, and may be used for any purpose. The data of interest that may be acquired and analyzed may include, but is not limited to, various timestamp data, geo-location information, direction information, any information included in the standard data stream of the locate tracking system (e.g., GPS system), color/type of marking material, amount of marking material in a marking dispenser, serial number of marking dispenser (e.g., barcode, RFID), ID information (e.g., individual, vehicle, wage and/or hour compliance), battery status of the device, angle of spray of marking material (e.g., using an inclinometer), wired/wireless connection status, Bluetooth® signal strength, storage capacity of the local memory, temperature, humidity, light level, movement of the device, mode of operation of the device, docking state of the device (e.g., docked/undocked, charging/not charging), alerts against expectations in performance (e.g., compare amount and/or type of marking material sprayed against facility maps), and any combination thereof.

The information, such as shown in various tables herein, that may be acquired by use of the data acquisition systems, apparatus and methods described herein, may be used for any purpose. In an embodiment, the information of the data acquisition system may be analyzed against expected locate and marking operations in order to gain benefits in, for example, operating efficiency, personnel management, inventory management, quality control, training operations, safety, customer satisfaction, and the like.

Additionally, the information that is acquired by use of the data acquisition systems, apparatus, and methods of the present disclosure may be correlated to other aspects of locate and marking operations. This correlation may occur, for example, by performing complex event processing (CEP) using multiple data streams from multiple devices. For example, one or more data streams (e.g., respective event entries or one or more electronic records) transmitted by a locate device, a marking device, or a combined locate and marking device may be correlated to information obtained from one or more other devices in order to aggregate, assess, evaluate, draw insights from, take action on this information, and any combination thereof. Correlating disparate data streams may be useful in order to better interpret and/or gain new interpretations that are useful. For example, by analyzing the aggregated data, field service providers may gain visibility into the distributed workforce, may take corrective and/or any other constructive action to improve process management, may improve and/or develop best practices, and any combination thereof. In an embodiment, certain trends may be identified by correlating historical records of the amount of time that is spent performing locate and marking operations to other information, such as, but not limited to, the time of day, time of year, address of the locate site, experience of the locate technician, weather conditions, heavy or light traffic times, and the like.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. In a system comprising:
  a hand-held locate device including at least one receiver antenna and a first communication interface; and
  a mobile location tracking system communicatively coupled to the hand-held locate device and including a second communication interface,
  a method for performing at least one of generating and logging geographic information relating to a locate operation, the locate operation being performed by a locate technician, using the hand-held locate device, in response to a locate ticket and in advance of planned excavation activities at a dig area identified by the locate ticket, the method comprising:
  A) using the hand-held locate device to detect a presence or an absence of at least one underground facility in the dig area by detecting, via the at least one receiver antenna of the hand-held locate device, a magnetic field from a target object;
  B) transmitting from the hand-held locate device, via the first communication interface of the hand-held locate device, one or more electronic signals indicating the detection of the presence or the absence of the at least one underground facility during A);
  C) receiving, via the second communication interface of the mobile location tracking system, the one or more electronic signals indicating the detection of the presence or the absence of the at least one underground facility during A); and
  D) in response to C), performing via the mobile location tracking system the at least one of generating and logging the geographic information relating to the performance of the locate operation.

2. The method of claim 1, wherein the mobile location tracking system further comprises a global positioning system (GPS) sensor or a global navigation satellite system (GNSS) receiver, and wherein D) further comprises providing, by the global positioning system (GPS) sensor or the global navigation satellite system (GNSS) receiver, the geographic information relating to the performance of the locate operation.

3. The method of claim 1, wherein the mobile location tracking system further comprises a cellular interface, and wherein D) further comprises:
  receiving, by the cellular interface of the mobile location tracking system, signals from cellular radiotelephone towers; and
  triangulating, by the mobile location tracking system and based on the received signals, to provide the geographic information relating to the performance of the locate operation.

4. The method of claim 1, wherein in D), the geographic information comprises at least one longitude coordinate and at least one latitude coordinate.

5. The method of claim 1, further comprising wearing, by the locate technician during the performance of the locate operation, the mobile location tracking system.

6. The method of claim 5, further comprising mechanically coupling the mobile location tracking system to the locate technician using at least one of a harness, a belt, a bag, a strap, and a holster.

7. The method of claim 1, wherein each of the first communication interface and the second communication interface comprises at least one of a universal serial bus interface (USB) and an Ethernet interface.

8. The method of claim 1, wherein each of the first communication interface and the second communication interface includes a wireless interface, and wherein:
  B) comprises wirelessly transmitting the one or more electronic signals from the first communication interface of the hand-held locate device; and
  C) comprises wirelessly receiving the one or more electronic signals via the second communication interface of the mobile location tracking system.

9. The method of claim 8, wherein the wireless interface comprises a WiFi interface.

10. The method of claim 8, wherein the wireless interface comprises a Bluetooth interface.

11. The method of claim 8, wherein the wireless interface comprises a short range wireless sensor interface.

12. The method of claim 1, wherein the mobile location tracking system comprises a mobile telecommunication and computing device.

13. The method of claim 12, wherein the mobile telecommunication and computing device comprises at least one of a smart phone and a personal digital assistant (PDA).

14. The method of claim 1, wherein the mobile location tracking system further comprises a display device, and wherein the method further comprises:
  displaying, on the display device, visual information based at least in part on the geographic information relating to the performance of the locate operation.

15. The method of claim 14, wherein the visual information is based, at least in part, on at least one of facilities map data, survey map data, land survey data, photographic image data, construction drawings, aerial image data and engineering drawings relating to the dig area identified by the locate ticket.

16. The method of claim 14, further comprising:
displaying, on the display device, an aerial image of at least a portion of the dig area identified by the locate ticket; and
overlaying, on the aerial image, geographic information relating to the performance of the locate operation.

17. The method of claim 1, wherein the mobile location tracking system further comprises at least one input device to provide additional information relating to the performance of the locate operation, and wherein the method further comprises:
logging, by the processor, the additional information together with the geographic information relating to the performance of the locate operation.

18. The method of claim 17, wherein the input device comprises at least one of: a temperature sensor; a humidity sensor; a light sensor; an image capture device; an audio recorder; an accelerometer; a magnetic sensor; an inclinometer; a proximity sensor; a yaw rate sensor; a bar code reader; and a color detection sensor.

19. The method of claim 1, further comprising:
providing, by the mobile location tracking system, at least one of redundant, shared, and/or backup functionality for performing the at least one of generating and logging the geographic information.

20. A system for performing at least one of generating and logging geographic information relating to a locate operation, the locate operation being performed by a locate technician in response to a locate ticket and in advance of planned excavation activities at a dig area identified by the locate ticket, the system comprising:
A) a hand-held locate device to detect a presence or an absence of at least one underground facility during the locate operation performed by the locate technician in response to the locate ticket and in advance of the planned excavation activities at the dig area identified by the locate ticket, the hand-held locate device comprising:
  A1) at least one receiver antenna to detect a magnetic field from a target object; and
  A2) a first communication interface to transmit, from the hand-held locate device, one or more electronic signals indicating the detection of the presence or the absence of the at least one underground facility during the performance of the locate operation; and
B) a mobile location tracking system communicatively coupled to the hand-held locate device, the mobile location tracking system comprising:
  B1) a second communication interface to receive, from the hand-held locate device, the one or more electronic signals indicating the detection of the presence or the absence of the at least one underground facility during the performance of the locate operation;
  B2) a memory to store processor-executable instructions; and
  B3) a processor, communicatively coupled to the memory and the second communication interface, to perform, responsive to receiving the one or more electronic signals from the hand-held locate device and upon execution of the processor-executable instructions, at least one of generating and logging the geographic information relating to the performance of the locate operation.

21. The system of claim 20, wherein the mobile location tracking system comprises a global positioning system (GPS) sensor or a global navigation satellite system (GNSS) receiver to provide the geographic information relating to the performance of the locate operation.

22. The system of claim 20, wherein the mobile location tracking system comprises a cellular interface to perform triangulation by use of cellular radiotelephone towers to provide the geographic information relating to the performance of the locate operation.

23. The system of claim 20, wherein the geographic information comprises at least one longitude coordinate and at least one latitude coordinate.

24. The system of claim 20, wherein the mobile location tracking system is configured to be worn by the locate technician during the locate operation.

25. The system of claim 24, further comprising at least one of a harness, a belt, a bag, a strap, and a holster to mechanically couple the mobile location tracking system to the locate technician.

26. The system of claim 20, wherein at least one of the first communication interface and the second communication interface comprises a wired interface, the wired interface comprising at least one of a universal serial bus interface (USB) and an Ethernet interface.

27. The system of claim 20, wherein at least one of the first communication interface and the second communication interface comprises a wireless communication interface.

28. The system of claim 27, wherein the wireless communication interface comprises a WiFi interface.

29. The system of claim 20, wherein the wireless communication interface comprises a Bluetooth interface.

30. The system of claim 20, wherein the wireless communication interface comprises a short range wireless sensor interface.

31. The system of claim 20, wherein the mobile location tracking system comprises a mobile telecommunication and computing device.

32. The system of claim 31, wherein the mobile telecommunication and computing device comprises at least one of a smart phone and a personal digital assistant (PDA).

33. The system of claim 20, wherein the mobile location tracking system further comprises a display device, and wherein the display device displays visual information based at least in part on the geographic information relating to the performance of the locate operation.

34. The system of claim 33, wherein the visual information is based, at least in part, on at least one of facilities map data, survey map data, land survey data, photographic image data, construction drawings, aerial image data and engineering drawings relating to the dig area identified by the locate ticket.

35. The system of claim 33, wherein the display device displays the geographic information relating to the performance of the locate operation overlaid on an aerial image of at least a portion of the dig area identified by the locate ticket.

36. The system of claim 20, wherein the mobile location tracking system comprises at least one input device to provide additional information relating to performance of the locate operation, and wherein in B3) the processor logs the additional information together with the geographic information relating to the performance of the locate operation.

37. The system of claim 36, wherein the input device comprises at least one of: a temperature sensor; a humidity sensor; a light sensor; an image capture device; an audio recorder; an accelerometer; a magnetic sensor; an inclinometer; a proximity sensor; a yaw rate sensor; a bar code reader; and a color detection system.

38. The system of claim 20, wherein the mobile location tracking system provides at least one of redundant, shared, and/or backup functionality for performing the at least one of generating and logging the geographic information.

39. A mobile location tracking system to generate and/or log geographic information relating to performance of a locate operation, the locate operation performed by a locate technician in response to a locate ticket and in advance of planned excavation activities at a dig area identified by the locate ticket, the mobile location tracking system configured to be carried or worn by the locate technician and comprising:
- A1) a first communication interface to receive one or more electronic signals from a hand-held locate device used by the locate technician to perform the locate operation, the one or more electronic signals indicating a detection of a presence or an absence of at least one underground facility during the performance of the locate operation;
- A2) a memory to store processor-executable instructions and an indication of the one or more electronic signals received from the hand-held locate device; and
- A3) a processor, communicatively coupled to the memory and the first communication interface, to perform, responsive to receiving the one or more electronic signals from the hand-held locate device via the first communication interface and upon execution of the processor-executable instructions, at least one of generating and logging the geographic information relating to the performance of the locate operation.

40. The system of claim 39, further comprising at least one of a harness, a belt, a bag, a strap, and a holster to mechanically couple the mobile location tracking system to the locate technician.

41. The system of claim 40, wherein the first communication interface comprises a wireless communication interface including one of:
- a WiFi interface;
- a Bluetooth interface; and
- a short range wireless sensor interface.

42. The system of claim 41, further comprising a global positioning system (GPS) sensor or a global navigation satellite system (GNSS) receiver to provide the geographic information relating to the performance of the locate operation.

43. The system of claim 41, further comprising a cellular interface to perform triangulation by use of cellular radiotelephone towers to provide the geographic information relating to the performance of the locate operation.

44. The system of claim 41, in combination with:
- B) the hand-held locate device to detect the presence or the absence of the at least one underground facility during the locate operation performed by the locate technician in response to the locate ticket and in advance of the planned excavation activities at the dig area identified by the locate ticket, the hand-held locate device comprising:
  - B1) at least one receiver antenna to detect a magnetic field from a target object; and
  - B2) a second wireless communication interface to transmit, from the hand-held locate device, the one or more electronic signals indicating the detection of the presence or the absence of the at least one underground facility during the performance of the locate operation.

* * * * *